United States Patent
Wakita et al.

(10) Patent No.: US 8,340,869 B2
(45) Date of Patent: Dec. 25, 2012

(54) RIDING TYPE VEHICLE AND METHOD OF CONTROLLING RIDING TYPE VEHICLE

(75) Inventors: Yumi Wakita, Nara (JP); Yumiko Kato, Osaka (JP); Mizuho Sakakibara, Tokyo (JP); Kenichi Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/551,867

(22) Filed: Jul. 18, 2012

(65) Prior Publication Data
US 2012/0283929 A1 Nov. 8, 2012

Related U.S. Application Data

(63) Continuation of application No. PCT/JP2011/005101, filed on Sep. 9, 2011.

(30) Foreign Application Priority Data

Sep. 13, 2010 (JP) ................................ 2010-204122
Oct. 1, 2010 (JP) ................................ 2010-223501
Feb. 14, 2011 (JP) ................................ 2011-028077

(51) Int. Cl.
*B62D 11/00* (2006.01)
*G06F 19/00* (2011.01)
(52) U.S. Cl. ............ 701/41; 701/99; 180/316; 180/331; 700/275; 477/1
(58) Field of Classification Search .................... 701/36, 701/41, 99, 124; 180/316, 326, 329–331, 180/446, 907; 700/275; 280/657, 771; 477/1, 477/209, 210
See application file for complete search history.

(56) References Cited

U.S. PATENT DOCUMENTS

| | | | | |
|---|---|---|---|---|
| 5,364,151 A * | 11/1994 | Yurasits | ..................... | 296/65.09 |
| 6,578,854 B2 * | 6/2003 | Wucherpfennig et al. | .... | 180/330 |
| 6,655,483 B2 * | 12/2003 | Hayashi | ....................... | 180/65.1 |
| 7,967,724 B2 * | 6/2011 | Kojima et al. | .................. | 477/97 |
| 7,987,032 B2 * | 7/2011 | Uenuma et al. | ................. | 701/49 |
| 8,249,773 B2 * | 8/2012 | Kawada et al. | ................. | 701/36 |

(Continued)

FOREIGN PATENT DOCUMENTS

JP  5-76365  10/1993

(Continued)

OTHER PUBLICATIONS

Yamada et al, Modeling and Control on Passenger Posture Behavior Considering Seat Angle of Electrical Wheelchair, Proceedings of the SICE Annual Conference, 2010, pp. 2016-2021.*

(Continued)

*Primary Examiner* — Russell Frejd
(74) *Attorney, Agent, or Firm* — Wenderoth, Lind & Ponack, L.L.P.

(57) ABSTRACT

A vehicle includes a contact-position-dependent type operational intention determining unit that detects a change in posture of a rider using posture sensors for a backrest disposed in areas of a backrest with which left and right shoulder blades of the rider come into contact, and thereby determines whether there is an operational intention of the rider; and a left-right amount-of-change comparison type turn intention determining unit that determines, only when it is determined that there is an operational intention, whether there is a left or right turn intention of the rider from a difference between sensor output values located left-right symmetrically.

22 Claims, 100 Drawing Sheets

U.S. PATENT DOCUMENTS

| | | | |
|---|---|---|---|
| 2005/0093357 A1 | 5/2005 | Takeda et al. | |
| 2010/0070132 A1* | 3/2010 | Doi | 701/36 |
| 2010/0168993 A1* | 7/2010 | Doi et al. | 701/124 |
| 2010/0206652 A1* | 8/2010 | Kielland | 180/220 |
| 2011/0132135 A1* | 6/2011 | Kim | 74/551.3 |
| 2011/0238217 A1* | 9/2011 | Kume et al. | 700/275 |
| 2011/0304110 A1* | 12/2011 | Long | 280/33.992 |

FOREIGN PATENT DOCUMENTS

| | | |
|---|---|---|
| JP | 7-136957 | 5/1995 |
| JP | 3029566 | 10/1996 |
| JP | 10-23613 | 1/1998 |
| JP | 11-153949 | 6/1999 |
| JP | 11-198075 | 7/1999 |
| JP | 2004-16275 | 1/2004 |
| JP | 2005-94898 | 4/2005 |
| JP | 2005-132525 | 5/2005 |
| JP | 2007-54181 | 3/2007 |
| JP | 2010-68654 | 3/2010 |

OTHER PUBLICATIONS

Yamashita et al, Tailor-made Modeling and Sway Control of Human Posture Riding on Electrical Wheelchair for Comfort Driving, 2010 IEEE/RSJ International Conference on Intelligent Robots and Systems, 2010, pp. 6034-6039.*

International Search Report issued Dec. 6, 2011 in International (PCT) Application No. PCT/JP2011/005101.

* cited by examiner

UPPER SIDE

LOWER SIDE

SEX: FEMALE
BUILD: HEIGHT 155-160 cm
WEIGHT 45-50 kg
SITTING CONDITIONS: NO LEANING (Fig. 9A)

SEX: FEMALE
BUILD: HEIGHT 150-155 cm
WEIGHT 45-50 kg
SITTING CONDITIONS: NO LEANING (Fig. 9A)

SEX: MALE
BUILD: HEIGHT 170-175 cm
       WEIGHT 65-70 kg
SITTING CONDITIONS: LEANING (Fig. 9B)

SEX: MALE
BUILD: HEIGHT 175-180 cm
       WEIGHT 65-70 kg
SITTING CONDITIONS: LEANING (Fig. 9B)

SEX: FEMALE
BUILD: HEIGHT 150-155 cm
       WEIGHT 50-55 kg
SITTING CONDITIONS: LEANING (FIG. 9B)

AREA IN BACKREST UPPER LEFT PORTION

SEX: FEMALE
BUILD: HEIGHT 155-160 cm
       WEIGHT 45-50 kg
TURNING MOTION CONDITIONS: SHIFT Fig. 9D

UPPER SIDE ↑
↓ LOWER SIDE

SEX: FEMALE
BUILD: HEIGHT 150-155 cm
       WEIGHT 45-50 kg
TURNING MOTION CONDITIONS: TWIST Fig. 9C

SEX: MALE
BUILD: HEIGHT 170-175 cm
       WEIGHT 65-70 kg
TURNING MOTION CONDITIONS: TWIST Fig. 9D

UPPER SIDE ↑ ↓ LOWER SIDE

SEX: MALE
BUILD: HEIGHT 170-180 cm
       WEIGHT 65-70 kg
TURNING MOTION CONDITIONS: TWIST Fig. 9C

SEX: FEMALE
BUILD: HEIGHT 150-155 cm
       WEIGHT 50-55 kg
TURNING MOTION CONDITIONS: TWIST Fig. 9C

SEX: FEMALE
BUILD: HEIGHT 155-160 cm
       WEIGHT 45-50 kg
MOTION OF PICKING UP BAGGAGE ON FORWARD LEFT

SEX: FEMALE
BUILD: HEIGHT 150-155 cm
       WEIGHT 45-50 kg
MOTION OF PICKING UP BAGGAGE ON FORWARD LEFT

UPPER SIDE ↑ ↓ LOWER SIDE

SEX: MALE
BUILD: HEIGHT 170-175 cm
       WEIGHT 65-70 kg
MOTION OF EXTENDING HIS HAND
FOR DOORKNOB AT CENTER LEFT

SEX: MALE
BUILD: HEIGHT 175-180 cm
       WEIGHT 65-70 kg
MOTION OF EXTENDING HIS HAND
FOR DOORKNOB AT CENTER LEFT

UPPER SIDE

LOWER SIDE

SEX: FEMALE
BUILD: HEIGHT 150-155 cm
       WEIGHT 50-55 kg
RIDING MOTION

91

PRESSURE DISTRIBUTION AREA

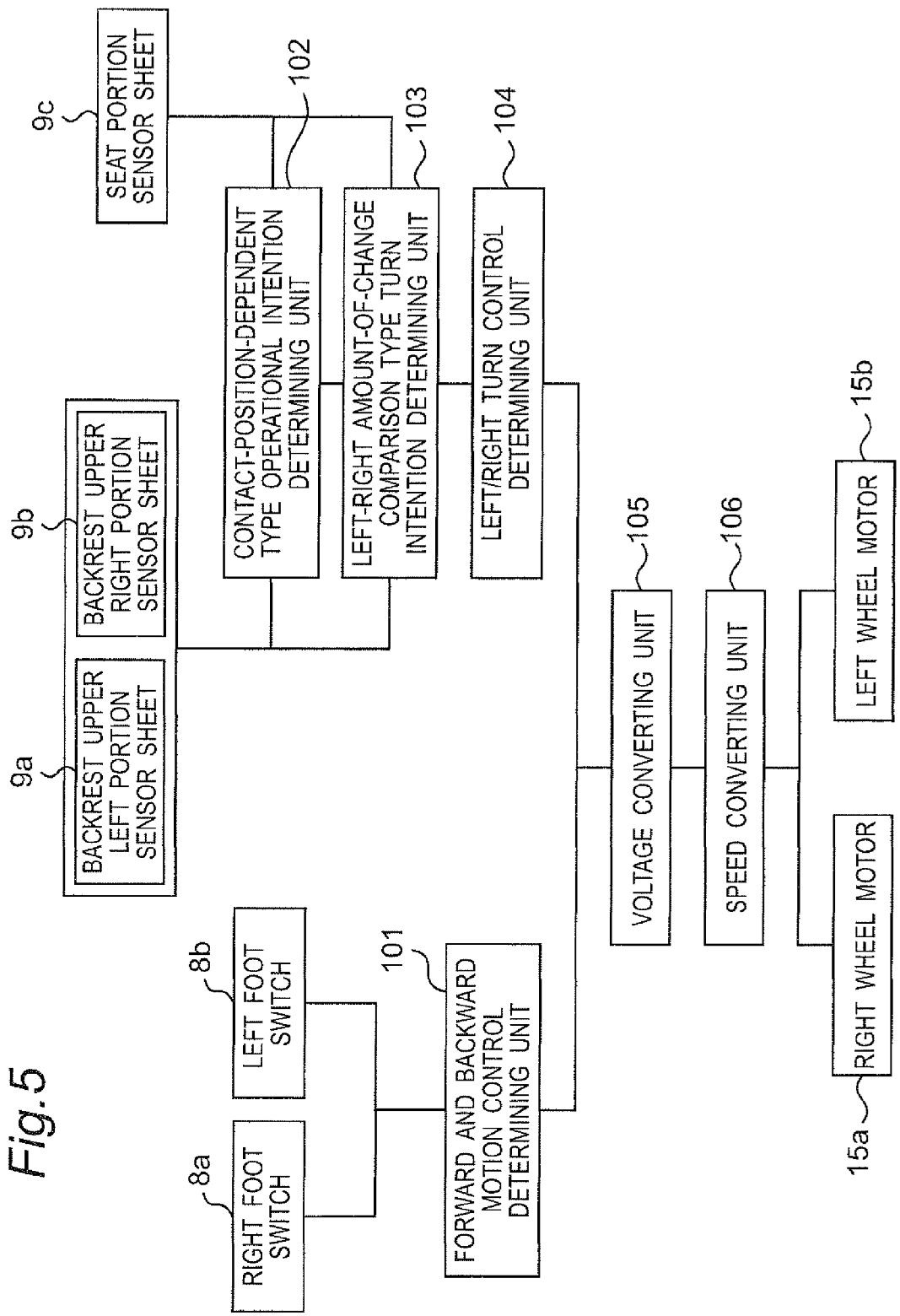

Fig. 6

|  | FORWARD MOTION FOOT SWITCH SIGNAL ON | FORWARD MOTION FOOT SWITCH SIGNAL OFF |
|---|---|---|
| BACKWARD MOTION FOOT SWITCH SIGNAL ON | RIGHT WHEEL MOTOR 2.5V<br>LEFT WHEEL MOTOR 2.5V | RIGHT WHEEL MOTOR 1.5V<br>LEFT WHEEL MOTOR 1.5V |
| BACKWARD MOTION FOOT SWITCH SIGNAL OFF | RIGHT WHEEL MOTOR 3.5V<br>LEFT WHEEL MOTOR 3.5V | RIGHT WHEEL MOTOR 2.5V<br>LEFT WHEEL MOTOR 2.5V |

*Fig.8*

| RIGHT TURN | LEFT TURN |
|---|---|
| RIGHT WHEEL MOTOR -0.5V<br>LEFT WHEEL MOTOR 0.5V | RIGHT WHEEL MOTOR 0.5V<br>LEFT WHEEL MOTOR -0.5V |

AREA IN BACKREST LOWER CENTRAL PORTION

SEX: FEMALE
BUILD: HEIGHT 155-160 cm
　　　　WEIGHT 45-50 kg
SITTING CONDITIONS: Fig. 9A

SEX: FEMALE
BUILD: HEIGHT 150-155 cm
　　　　WEIGHT 45-50 kg
SITTING CONDITIONS: Fig. 9A

SEX: MALE
BUILD: HEIGHT 170-175 cm
　　　　WEIGHT 65-70 kg
SITTING CONDITIONS: FIG. 9B

SEX: MALE
BUILD: HEIGHT 175-180 cm
　　　　WEIGHT 65-70 kg
SITTING CONDITIONS: FIG. 9B

UPPER SIDE ↑
↓ LOWER SIDE

SEX: FEMALE
BUILD: HEIGHT 150-155 cm
　　　　WEIGHT 50-55 kg
SITTING CONDITIONS: Fig. 9B

SEX: FEMALE
BUILD: HEIGHT 155-160 cm
　　　　WEIGHT 45-50 kg
TURNING MOTION CONDITIONS: Fig. 9D

SEX: FEMALE
BUILD: HEIGHT 150-155 cm
   WEIGHT 45-50 kg
TURNING MOTION CONDITIONS: TWIST Fig. 9C

SEX: MALE
BUILD: HEIGHT 170-175 cm
   WEIGHT 65-70 kg
TURNING MOTION CONDITIONS: SHIFT Fig. 9D

SEX: MALE
BUILD: HEIGHT 175-180 cm
   WEIGHT 65-70 kg
TURNING MOTION CONDITIONS: TWIST Fig. 9C

SEX: FEMALE
BUILD: HEIGHT 150-155 cm
        WEIGHT 50-55 kg
TURNING MOTION CONDITIONS: Fig. 9C

UPPER SIDE ↑

↓ LOWER SIDE

SEX: FEMALE
BUILD: HEIGHT 155-160 cm
        WEIGHT 45-50 kg
MOTION OF PICKING UP BAGGAGE ON FORWARD LEFT

SEX: FEMALE
BUILD: HEIGHT 150-155 cm
        WEIGHT 45-50 kg
MOTION OF PICKING UP BAGGAGE ON FORWARD LEFT

UPPER SIDE
LOWER SIDE

SEX: MALE
BUILD: HEIGHT 170-175 cm
       WEIGHT 65-70 kg
MOTION OF EXTENDING HIS HAND
FOR DOORKNOB AT CENTER LEFT

SEX: MALE
BUILD: HEIGHT 175-180 cm
       WEIGHT 65-70 kg
MOTION OF EXTENDING HIS HAND
FOR DOORKNOB AT CENTER LEFT

UPPER SIDE
LOWER SIDE

SEX: FEMALE
BUILD: HEIGHT 150-155 cm
       WEIGHT 50-55 kg
RIDING MOTION

91
PRESSURE DISTRIBUTION AREA

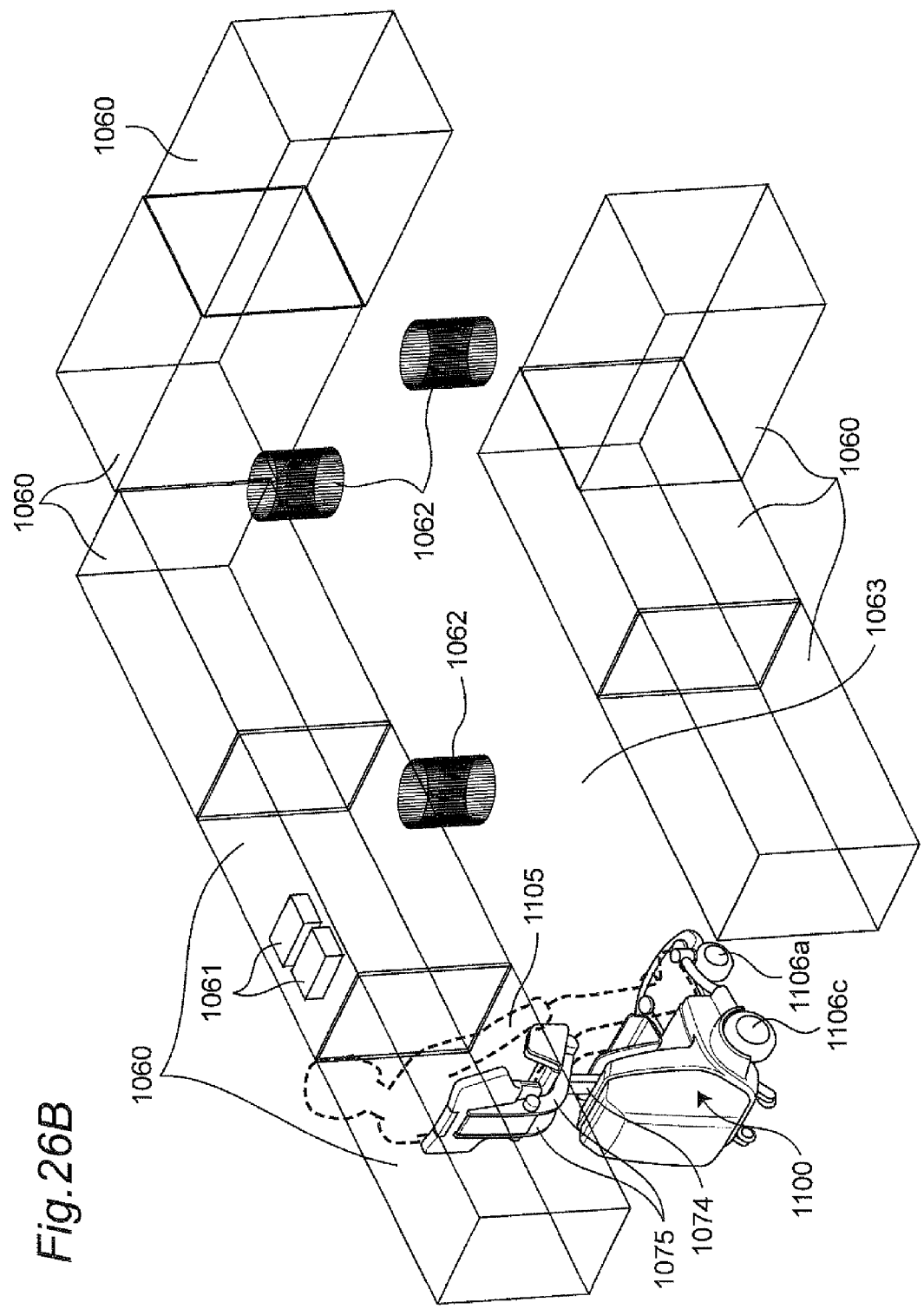

Fig.30A
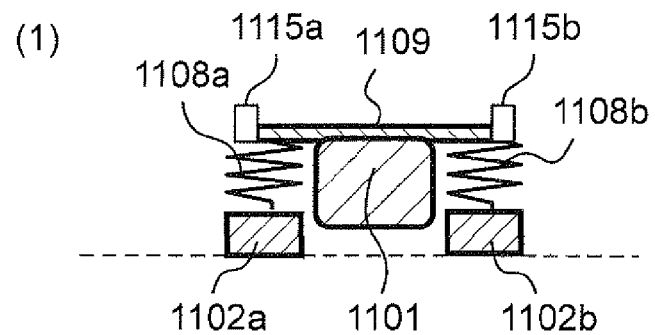
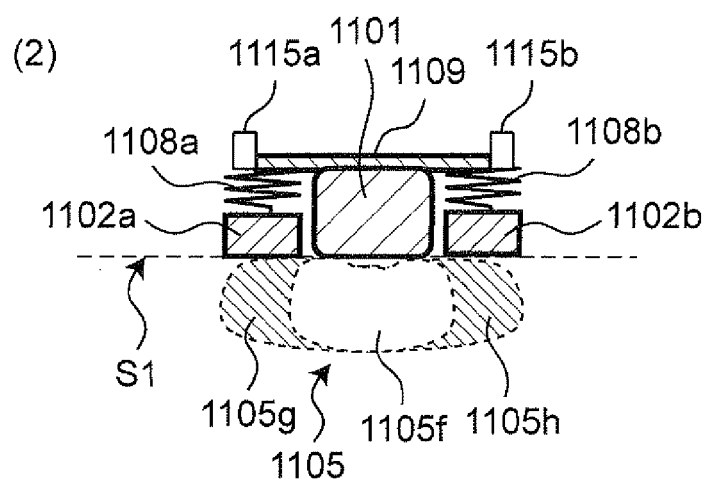
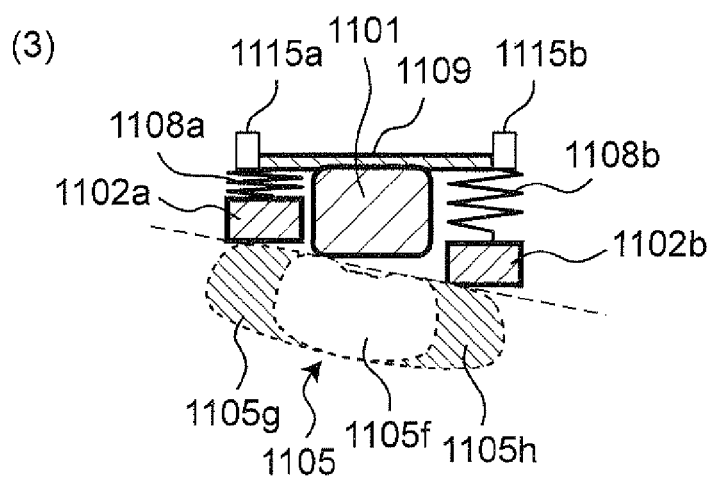

Fig.30B
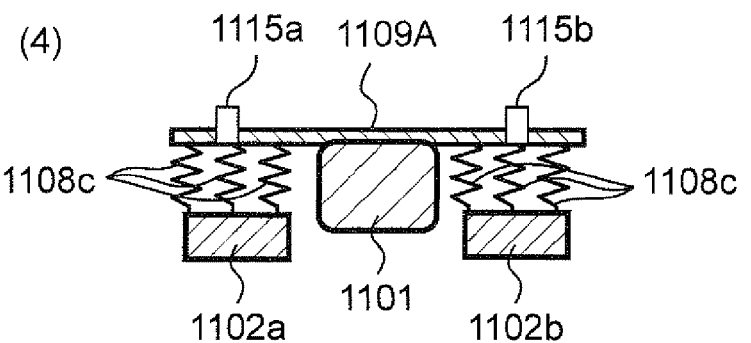
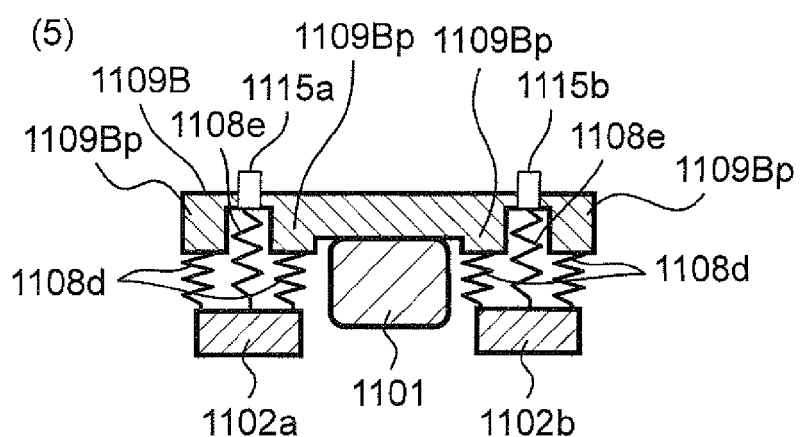
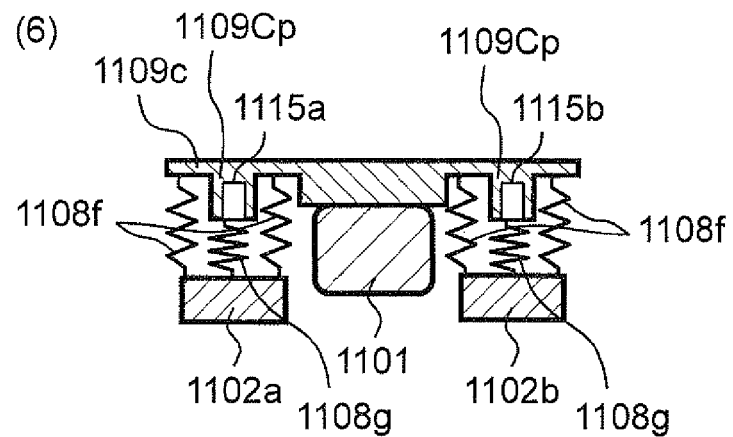

Fig.31A
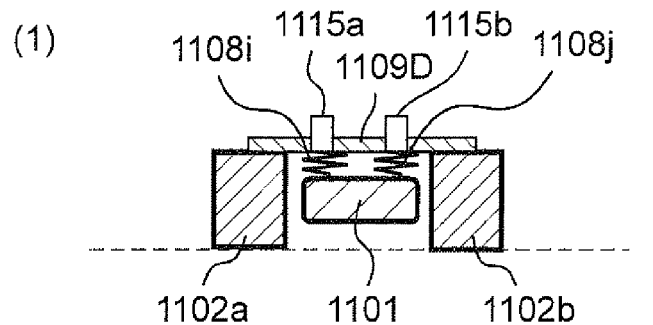
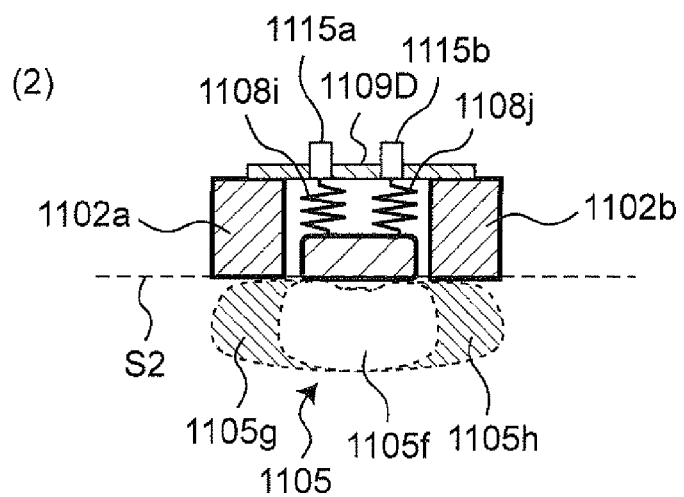
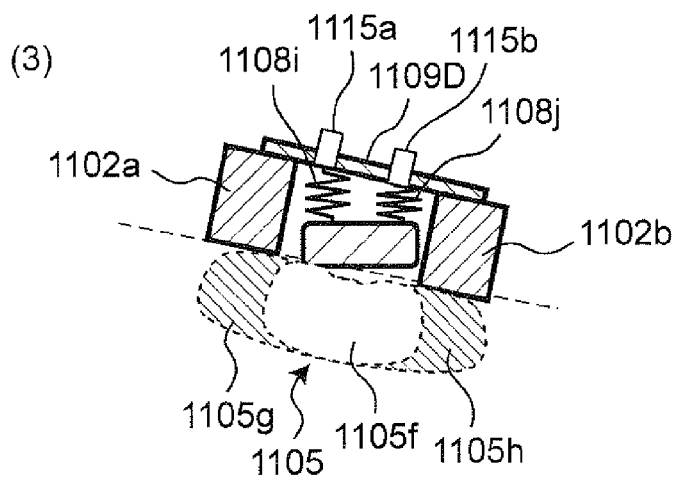

Fig.31B
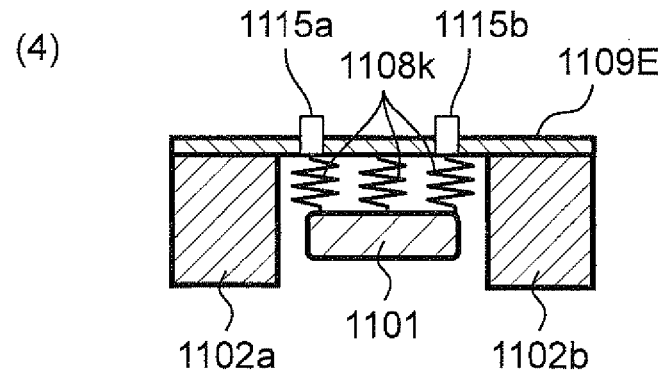
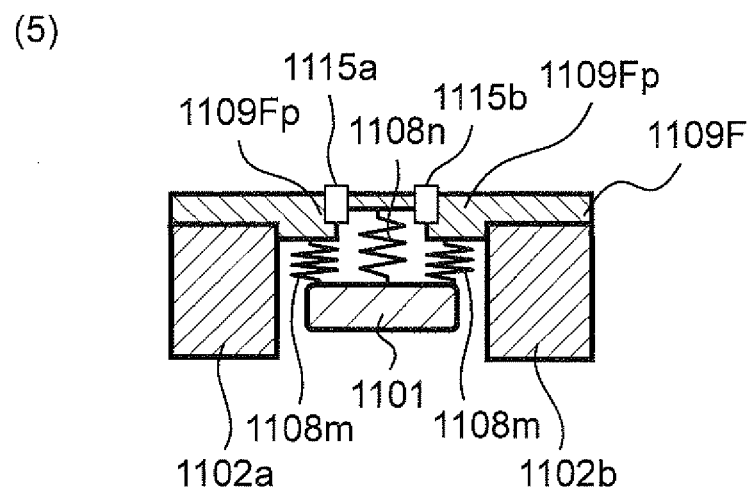
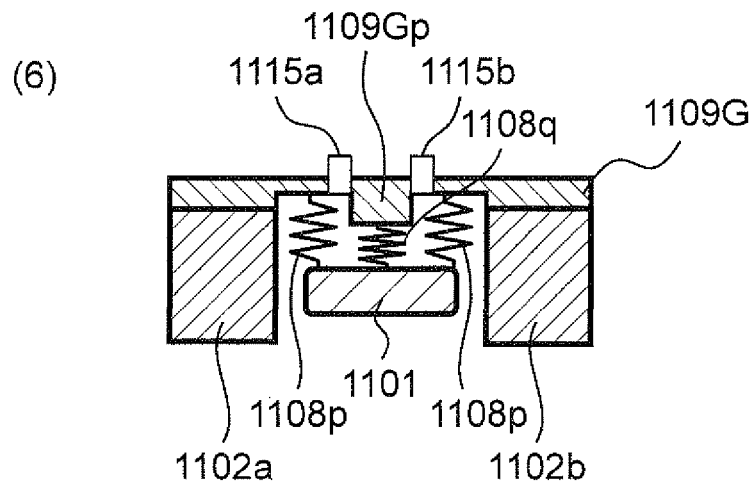

Fig.38A
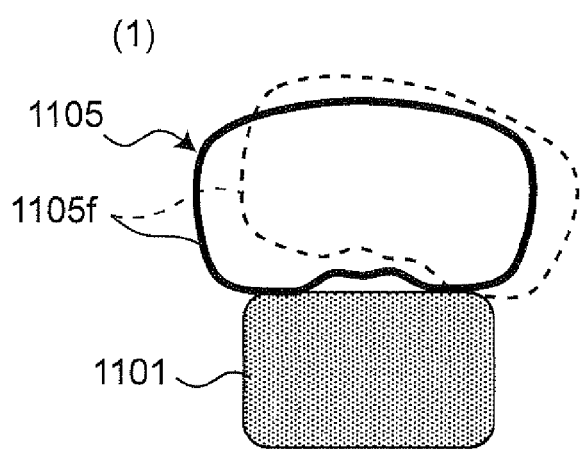
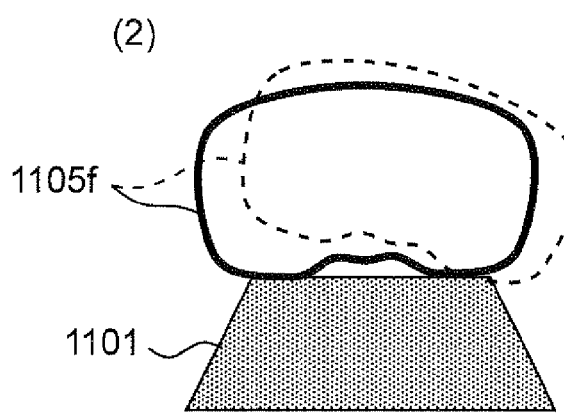
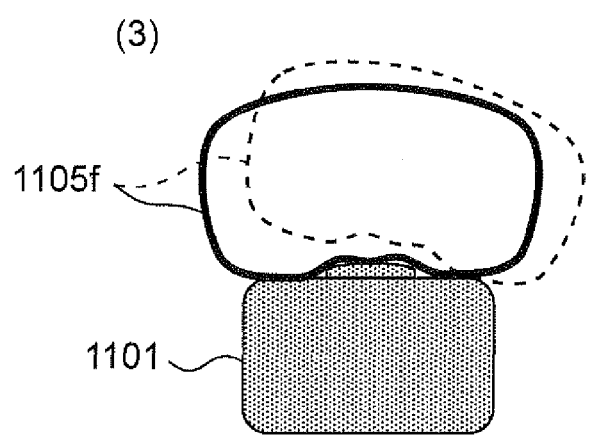

Fig.38B
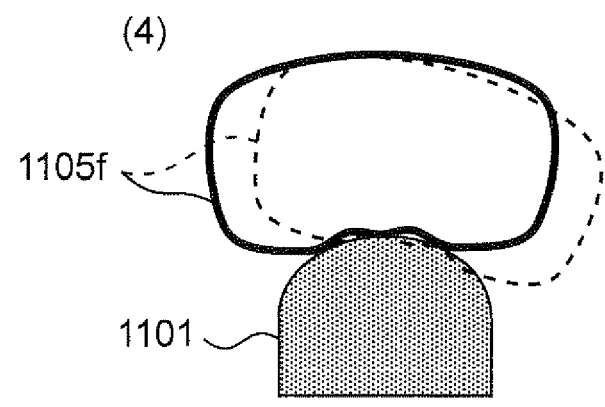
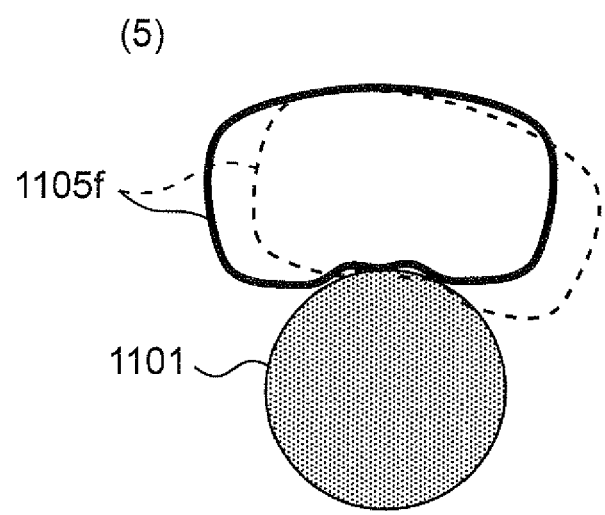
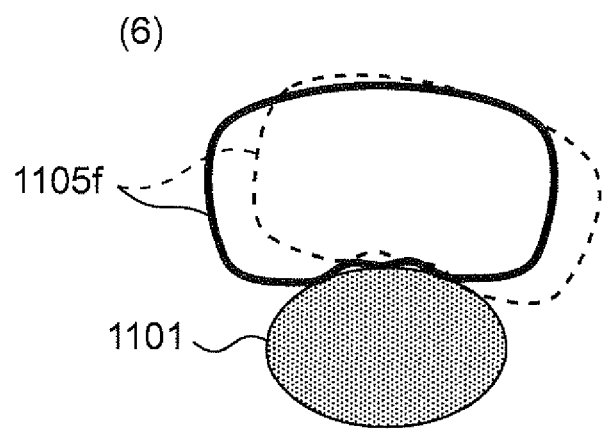

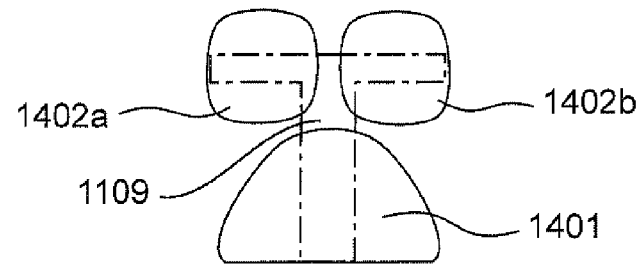
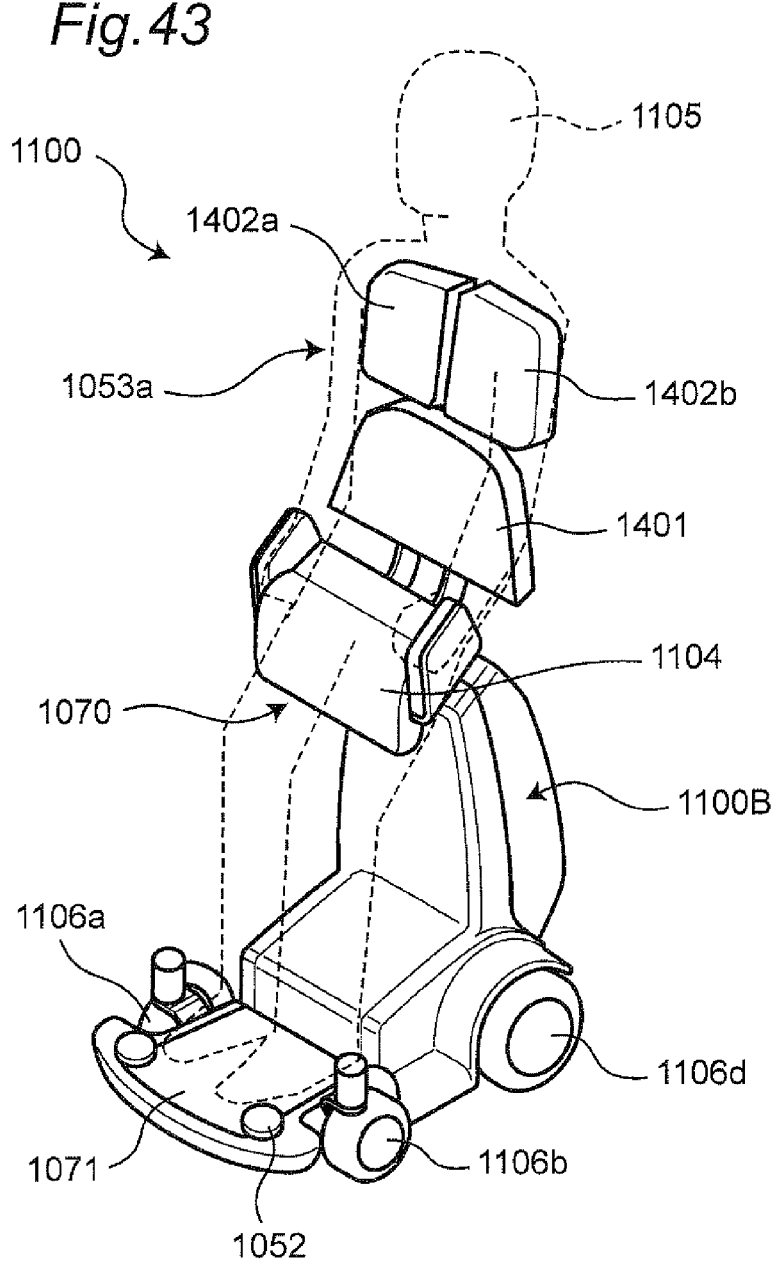

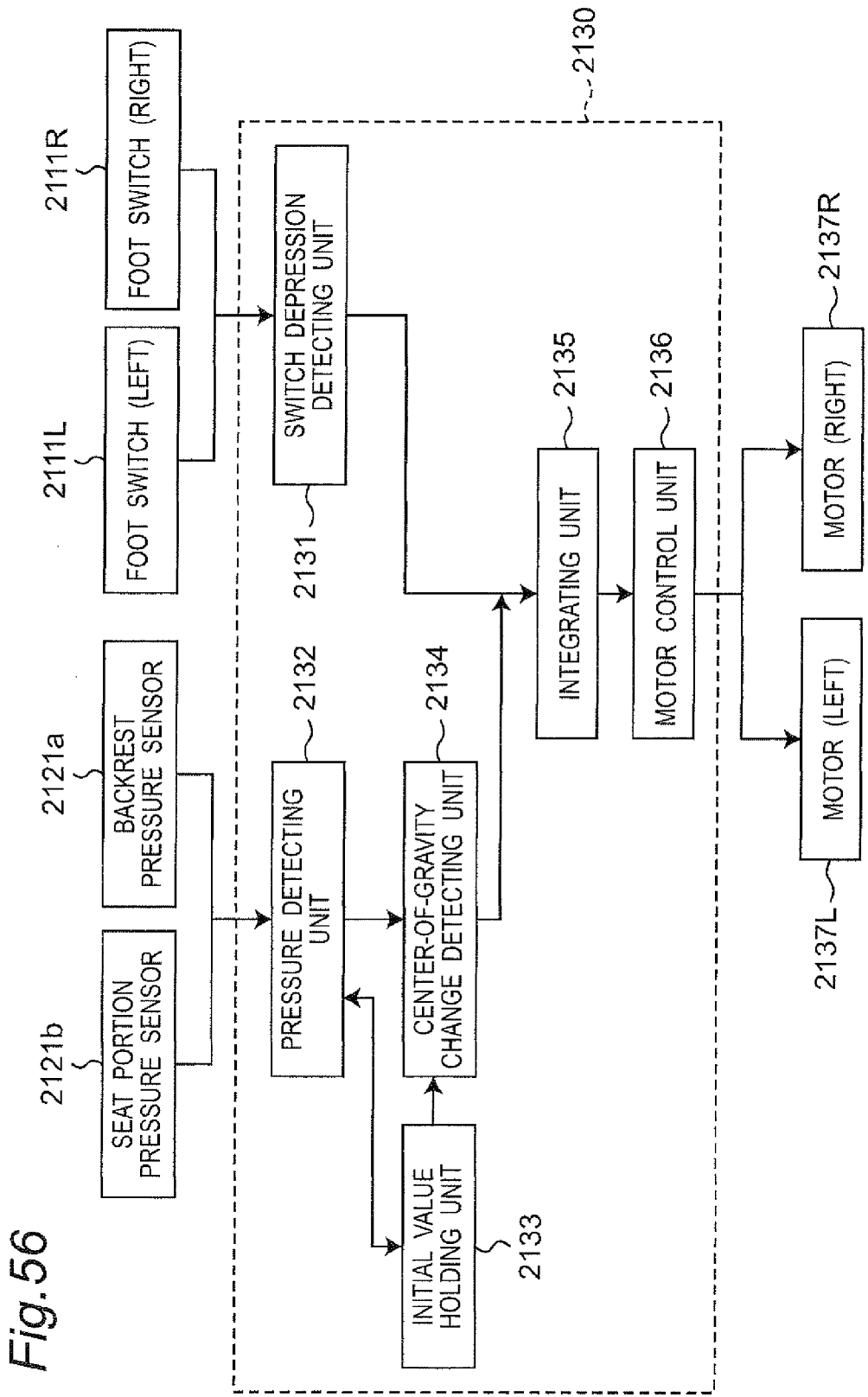

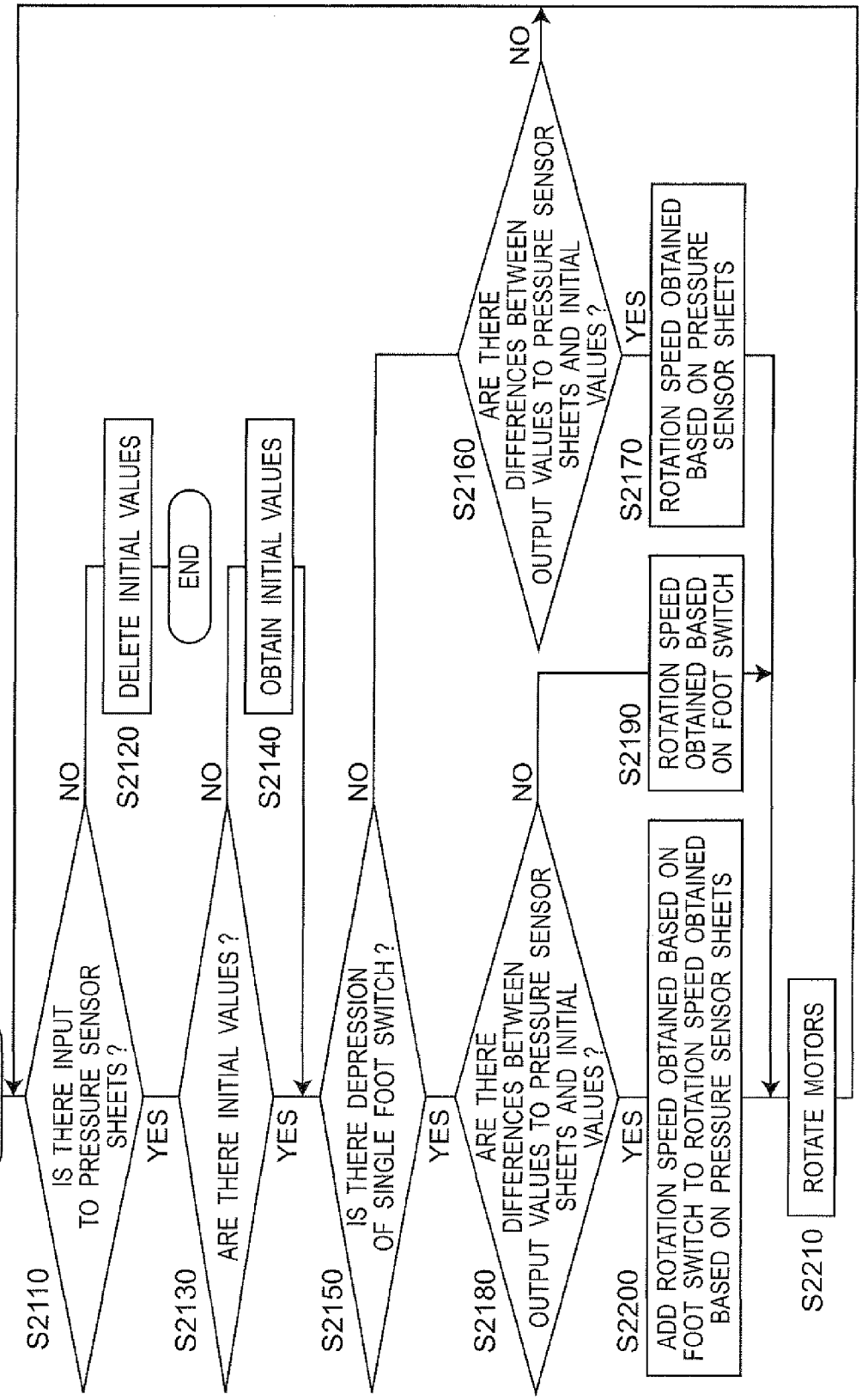

RIDING TYPE VEHICLE AND METHOD OF CONTROLLING RIDING TYPE VEHICLE

CROSS-REFERENCE TO RELATED APPLICATIONS

This is a continuation application of International Application No. PCT/JP2011/005101, with an international filing date of Sep. 9, 2011, which claims priority of Japanese Patent Applications Nos.: 2010-204122, 2010-223501, and 2011-028077 filed on Sep. 13, 2010, Oct. 1, 2010, and Feb. 14, 2011, the contents of which are incorporated herein by reference.

TECHNICAL FIELD

The present invention relates to a riding type vehicle and a method of controlling a riding type vehicle, in which a rider performs operation control by postural change.

BACKGROUND ART

Compact single-seat mobility aid equipment represented by a motorized wheelchair, etc., normally uses a joystick as operating means. A user uses a joystick to indicate direction by holding an end of the lever that can freely pivot in all directions with his/her hand and tilting the lever in an intended turn direction. Although the joystick provides easiness to allow to indicate all directions with a single lever, since the user always needs to indicate direction using his/her hand, the user has difficulty in performing operation when his/her hands are full of baggage, etc. In addition, since human's natural sense of direction indication does not coincide with manual tilt indication, there are issues such as the need for practice until the user gets used to direction indication operation. In addition, there is a drawback in that a joystick is difficult to be used by a rider having disability in his/her hands.

In view of the above-described conventional issues, there is proposed an operating means for estimating a rider's intention of direction change or acceleration/deceleration operation by detecting a physical variable quantity of a seat which occurs from a change in the posture of the rider, and controlling mobility equipment based on the estimation result (Patent Literature 1). In addition, in order to avoid erroneous equipment control caused by a change in the posture of a rider that does involve operational intention, such as when the posture is unconsciously changed at acceleration, the amount of change in the seat caused by a postural change that is not obviously intended such as at acceleration is detected in advance and the amount of change caused by an operational intention is corrected by the amount of change, whereby equipment control that accurately reflects an operational intention is enabled (Patent Literature 2).

CITATION LIST

Patent Literature

Patent Literature 1: Japanese Unexamined Patent Publication No. 2005-094898
Patent Literature 2: Japanese Unexamined Patent Publication No. 2004-016275

SUMMARY OF THE INVENTION

However, although Patent Literature 1 proposes an equipment control means that allows a user to perform operation with human's natural sense of direction indication and without using his/her hand, even when an unintentional postural change occurs, if the postural change is detected as a physical variable quantity, then the mobility equipment is controlled and thus operation of the mobility equipment that is against the rider's intention is performed. Therefore, Patent Literature 1 not only provides difficulty in operation but is also likely to cause accidents.

Patent Literature 2 discloses a configuration for resolving the above-described issue. When posture is slightly changed unconsciously, by accurately calculating a corrected amount of change, erroneous equipment control can be avoided. However, even without a rider's operational intention, when a large postural change occurs as a result of the intention of performing motion other than operation, a corrected amount change cannot be accurately calculated and thus the equipment is controlled against the intention.

For example, when a person extends his/her hand to try to pick up an object on his/her left or right at getting in or out of the equipment or during riding, in many cases, the rider's posture is changed to an unstable riding posture, which rather causes an issue that accidents are more likely to be caused.

One non-limiting and exemplary embodiment provides a riding type vehicle and a method of controlling a riding type vehicle, in which a user can perform Operation with human's natural sense of direction indication by performing operation using postural change without using his/her hand, and in addition, even when the user's posture is changed without an operational intention, safety with no erroneous operation can be guaranteed regardless of the magnitude of the postural change.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: a riding type vehicle comprising:

a vehicle main body;

a backrest supported above the vehicle main body and supporting a back of a rider;

a seat portion disposed above the vehicle main body and below the backrest, and supporting a gluteal region of the rider;

a plurality of drive wheels rotatably supported at a lower portion of the vehicle main body;

a driving unit disposed at the lower portion of the vehicle main body, that drives the plurality of drive wheels to allow the vehicle main body to make a forward motion, a backward motion, or a turn;

a posture sensor for the backrest disposed in a portion of the backrest with which left and right shoulder blades of the rider come into contact;

a contact-position-dependent type operational intention determining unit that determines whether there is an operational intention of the rider, by the posture sensor detecting a change in a posture of the rider;

a left-right amount-of-change comparison type turn intention determining unit that determines, only when the operational intention determining unit determines that there is an operational intention of the rider, whether a difference between pressure values of portions with which the left and right shoulder blades of the rider come into contact exceeds a seating confirmation threshold value, and determines that there is a left or right turn intention of the rider when it is determined that the difference between the pressure values exceeds the seating confirmation threshold value, the pressure values being outputted from the posture sensor for the backrest; and a drive control unit that performs drive control of the driving unit according to the left or right turn intention of the rider determined by the turn intention determining unit.

These general and specific aspects may be implemented using a system, a method, and a computer program, and any combination of systems, methods, and computer programs.

As described above, according to the riding type vehicle and the method of controlling the riding type vehicle, by the provision of the posture sensor disposed on the backrest, the operational intention determining unit that makes the determination using a contact area and the intensity of contact pressure as indices, and the left-right amount-of-change comparison type turn intention determining unit, a safe riding type vehicle and a safe method of controlling a riding type vehicle can be provided in which even if a large postural change occurs as a result of the intention of performing motion other than operation, the vehicle does not erroneously make a left or right turn or perform a movement operation.

BRIEF DESCRIPTION OF DRAWINGS

These and other aspects and features of the present invention will become clear from the following description taken in conjunction with the embodiments thereof with reference to the accompanying drawings, in which:

FIG. 5 is a configuration view of vehicle operation control by postural change in the first embodiment of the present invention;

FIG. 6 is a view for describing a motor voltage conversion table for the vehicle of the first embodiment of the present invention;

FIG. 8 is a view for describing a voltage additional value conversion table for turning control of the vehicle of the first embodiment of the present invention;

FIG. 26B is a view describing a use environment of the standing position riding type vehicle according to the fifth embodiment;

FIG. 30A is a schematic top view of a turning control apparatus, and (1), (2), and (3) of FIG. 30A are respectively schematic top views of the turning control apparatus when the rider of the standing position riding type vehicle does not ride (natural state), when going in a straight line (normal state), and when making a turn;

FIG. 30B is a schematic top view of a turning control apparatus, and (4), (5), and (6) of FIG. 30B are respectively schematic top views of turning control apparatuses in a state of achieving balance with natural length, a state of achieving balance with tension, and a state of achieving balance with tension, which are various exemplary configurations of a spring when the rider of the standing position riding type vehicle does not ride (when no loading);

FIG. 31A is a top view of a turning control apparatus, and (1), (2), and (3) of FIG. 31A are respectively top views of the turning control apparatus when a rider of a standing position riding type vehicle of a modification of the fifth embodiment does not ride (natural state), when going in a straight line (normal state), and when making a turn;

FIG. 31B is a top view of a turning control apparatus, and (4), (5), and (6) of FIG. 31B are respectively schematic top views of turning control apparatuses in a state of achieving balance with natural length, a state of achieving balance with tension, and a state of achieving balance with tension, which are various exemplary configurations of a spring when the rider of the standing position riding type vehicle of the variant of the fifth embodiment does not ride (when no loading);

FIG. 38A is a schematic view showing the shape of a fixed backrest portion, and (1), (2), and (3) of FIG. 38A are respectively schematic views showing various shapes of the fixed backrest portion suitable in the fifth embodiment (fixed backrest portion having the effect of restoring the posture to a steady posture);

FIG. 38B is a schematic view showing the shape of a fixed backrest portion, and (4), (5), and (6) of FIG. 38B are respectively schematic views showing various shapes of the fixed backrest portion suitable in the fifth embodiment (fixed backrest portion having the effect of maintaining an unsteady posture);

FIG. 42B is a view describing the shapes of backrest portions in the eighth embodiment;

FIG. 43 is a view describing a configuration of the standing position riding type vehicle of the eighth embodiment;

FIG. 56 is a functional block diagram of the standing position riding type vehicle according to the ninth embodiment of the present invention;

FIG. 57 is a flowchart showing the operation of the standing position riding type vehicle according to the ninth embodiment of the present invention;

FIG. 58G is a bird's-eye front view of the standing position riding type vehicle according to the ninth embodiment of the present invention;

FIG. 58H is a bird's-eye rear view of the standing position riding type vehicle according to the ninth embodiment of the present invention;

FIG. 59 is a side view of a seating posture for a conventional work chair;

FIG. 60 is a perspective view of the conventional work chair;

FIG. 61 is a side view of a conventional vehicle for industrial use;

FIG. 62A is a side view of a seating posture for the conventional vehicle for industrial use;

FIG. 62B is a side view of a seating posture for the conventional vehicle for industrial use; and FIG. 63 is a view of a conventional wheelchair having a standing assist function.

DETAILED DESCRIPTION

Figure 1:
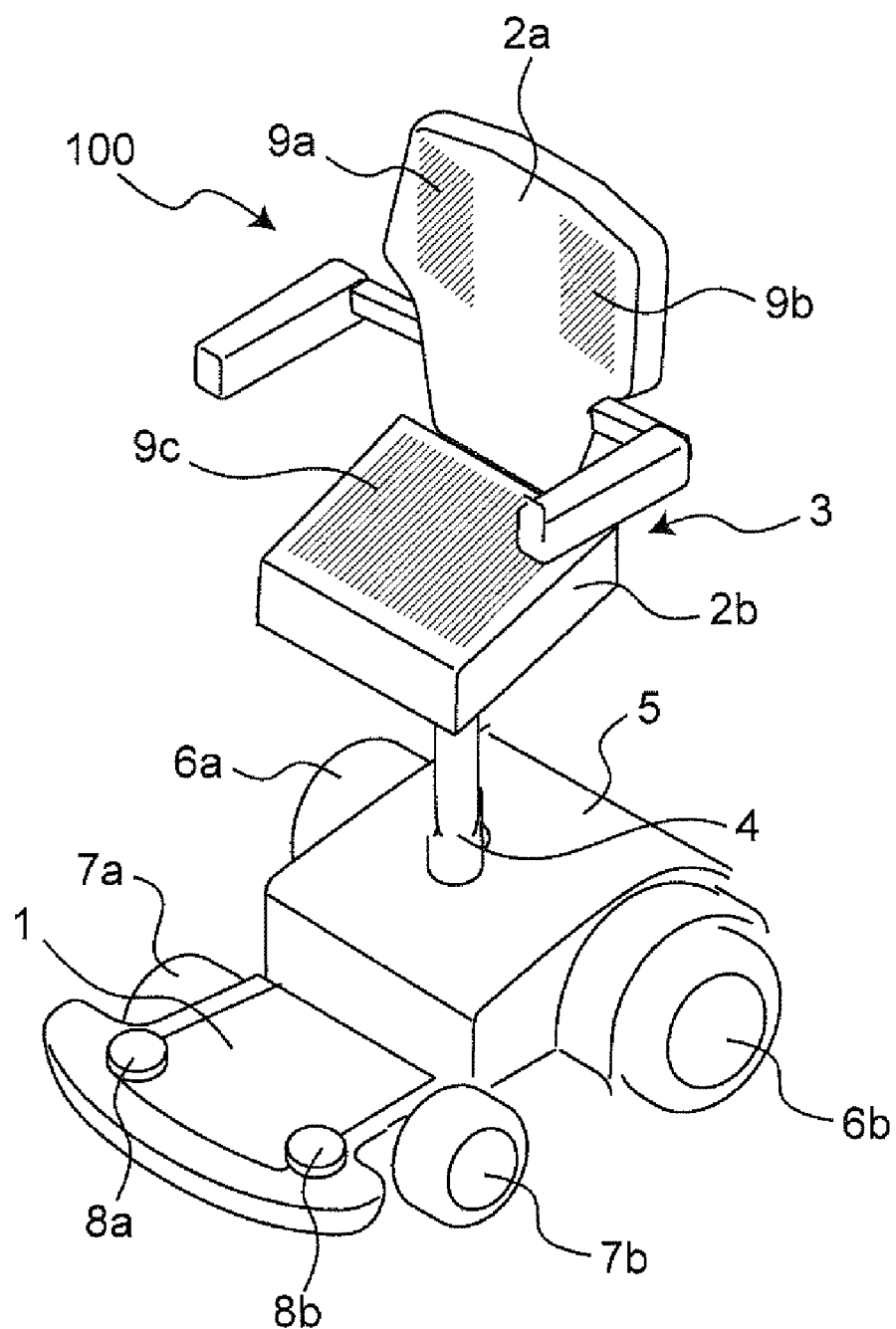
FIG. 1 is an external view of a vehicle of a first embodiment of the present invention.

Prior to continuing the description of the present invention, the same components in the accompanying drawings are denoted by the same reference numerals.

Prior to making a detailed description of embodiments of the present invention below with reference to the drawings, various aspects of the present invention will be described.

According to a first aspect of the present invention, there is provided a riding type vehicle comprising:

a vehicle main body;

a backrest supported above the vehicle main body and supporting a back of a rider;

a seat portion disposed above the vehicle main body and below the backrest, and supporting a gluteal region of the rider;

a plurality of drive wheels rotatably supported at a lower portion of the vehicle main body;

a driving unit disposed at the lower portion of the vehicle main body, that drives the plurality of drive wheels to allow the vehicle main body to make a forward motion, a backward motion, or a turn;

a posture sensor for the backrest disposed in a portion of the backrest with which left and right shoulder blades of the rider come into contact;

a contact-position-dependent type operational intention determining unit that determines whether there is an operational intention of the rider, by the posture sensor detecting a change in a posture of the rider;

a left-right amount-of-change comparison type turn intention determining unit that determines, only when the operational intention determining unit determines that there is an operational intention of the rider, whether a difference between pressure values of portions with which the left and right shoulder blades of the rider come into contact exceeds a seating confirmation threshold value, and determines that there is a left or right turn intention of the rider when it is determined that the difference between the pressure values exceeds the seating confirmation threshold value, the pressure values being outputted from the posture sensor for the backrest; and a drive control unit that performs drive control of the driving unit according to the left or right turn intention of the rider determined by the turn intention determining unit.

By such a configuration, a safe riding type vehicle can be provided in which even if a large postural change occurs as a result of the intention of performing motion other than operation, the vehicle does not erroneously make a left or right turn or perform a movement operation. Furthermore, a riding type vehicle can be provided in which by identifying the disposition position of the posture sensor for the backrest to be near positions with which the left and right shoulder blades of the rider come into contact, even if the seating posture varies by the habit of the rider, when the rider makes a great change in his/her posture to the left or right without the intention of performing operation, the vehicle does not erroneously make a left or right turn or perform a movement operation and an intention determination can be stably made.

According to a second aspect of the present invention, there is provided the riding type vehicle according to the first aspect, wherein the portion of the backrest with which the left and right shoulder blades of the rider come into contact and which has the posture sensor for the backrest disposed therein is an area with which the left and right shoulder blades of the rider come into contact.

According to a third aspect of the present invention, there is provided the riding type vehicle according to the first or second aspect, wherein the posture sensor for the backrest is disposed in a portion with which backrest upper left and right portions can come into contact, the backrest upper left and right portions including the left and right shoulder blades of the rider and further including back portions where back ribs are located at a width of the shoulder blades.

According to a fourth aspect of the present invention, there is provided the riding type vehicle according to any one of the first to third aspects, further comprising a posture sensor for the seat portion disposed in a portion of the seat portion with which the gluteal region of the rider comes into contact.

According to a fifth aspect of the present invention, there is provided the riding type vehicle according to any one of the first to fourth aspects, wherein the turn intention determining unit determines whether there is a turn intention of the rider, from information on a relationship between a magnitude of pressure received by the posture sensor from parts of the rider from the left and right shoulder blades thereof to the back ribs thereof, and a size of an area where the pressure is equal to or beyond a certain value.

By such a configuration, a safe riding type vehicle can be provided in which even if a large postural change occurs as a result of the intention of performing motion other than operation, the vehicle does not erroneously make a left or right turn or perform a movement operation. Furthermore, a riding type vehicle can be provided in which by identifying the disposition position of the posture sensor for the backrest to be near positions with which the left and right shoulder blades of the rider come into contact, even if the seating posture varies by the habit of the rider, when the rider makes a great change in his/her posture to the left or right without the intention of performing operation, the vehicle does not erroneously make a left or right turn or perform a movement operation and an intention determination can be stably made.

According to a sixth aspect of the present invention, there is provided the riding type vehicle according to any one of the first to fifth aspects, wherein the operational intention determining unit determines that there is an operational intention when a magnitude of pressure of the posture sensor for the backrest exceeds a backrest pressure threshold value or a size of an area with pressure equal to or beyond a certain value exceeds a backrest area threshold value, and when a magnitude of pressure of the posture sensor for the seat portion exceeds a seat portion pressure threshold value or a size of an area with pressure equal to or beyond a certain value exceeds a seat portion area threshold value, and the turn intention determining unit determines that there is a left or right turn intention of the rider when the operational intention determining unit determines that there is an operational intention and a difference in pressure sum total value between left and right in portions with which the left and right shoulder blades of the rider respectively come into contact exceeds the seating confirmation threshold value, the pressure sum total values being sum total values of pressure in areas where the posture sensor for the backrest indicates pressure equal to or beyond a certain value.

By such a configuration, in addition to the advantageous effects of the riding type vehicles of the first to fifth aspects, the rider riding in a stable riding state can also be confirmed. Therefore, even if left/right turn control is performed, the safety of the rider can be guaranteed.

According to a seventh aspect of the present invention, there is provided the riding type vehicle according to any one of the first to fifth aspects, further comprising a posture sensor for a backrest lower central portion that can come into contact with a part of the backrest with which a back portion where lumbar vertebrae of the rider are located comes into contact, wherein the operational intention determining unit determines that there is an operational intention when a magnitude of pressure of the posture sensor for the backrest lower central portion exceeds a backrest lower central portion pressure threshold value or a size of an area with pressure equal to or beyond a certain value exceeds a backrest lower central portion area threshold value, and when a magnitude of pressure of the posture sensor for the seat portion exceeds a seat portion pressure threshold value or a size of an area with pressure equal to or beyond a certain value exceeds a seat portion area threshold value, and the turn intention determining unit determines that there is a left or right turn intention of the rider when the operational intention determining unit determines that there is an operational intention and a difference in pressure sum total value between left and right in the portions with which the left and right shoulder blades of the rider respectively come into contact exceeds the seating confirmation threshold value, the pressure sum total values being sum total values of pressure in areas where the posture sensor for the backrest indicates pressure equal to or beyond a certain value.

By such a configuration, in addition to the advantageous effects of the riding type vehicles of the first to fifth aspects, the rider riding in a stable riding state can also be confirmed. Therefore, even if left/right turn control is performed, the safety of the rider can be guaranteed.

According to an eighth aspect, there is provided the riding type vehicle according to any one of the first to fifth aspects, wherein the operational intention determining unit determines that there is an operational intention when a magnitude of sensor pressure from the posture sensor for the backrest lower central portion and the posture sensor for the seat portion exceeds a backrest lower central portion pressure threshold value or a size of an area with pressure equal to or beyond a certain value exceeds a backrest lower central portion area threshold value, and the turn intention determining unit determines that there is a left or right turn intention of the rider when the operational intention determining unit determines that there is an operational intention and a difference in pressure sum total value between left and right exceeds the seating confirmation threshold value, the pressure sum total values being sum total values of pressure in areas where the posture sensor for the backrest provided in the portions with which the left and right shoulder blades of the rider come into contact indicates pressure equal to or beyond a certain value.

By such a configuration, in addition to the advantageous effects of the riding type vehicles of the first to fifth aspects, the rider riding in a stable riding state can also be confirmed. Therefore, even if left/right turn control is performed, the safety of the rider can be guaranteed.

According to a ninth aspect of the present invention, there is provided the riding type vehicle according to any one of the first to eighth aspects, further comprising:

a riding posture determining unit that analyzes pressure distribution conditions of each posture sensor using a size of an area where the posture sensor indicates a value equal to or beyond a certain value, the pressure distribution conditions varying by riding posture of the rider; and a weight determining unit that determines, using the distribution conditions of output values from the posture sensor analyzed by the riding posture determining unit, a weight for the output values from the posture sensor, wherein in at least one of a determination process by the operational intention determining unit that determines whether there is an operational intention and a determination process by the turn intention determining unit that determines whether there is a left or right turn intention of the rider, as the output values from the posture sensor, output values from the posture sensor obtained by weighting the output values from the posture sensor by the weight determining unit are used.

According to a tenth aspect of the present invention, there is provided the riding type vehicle according to any one of the first to ninth aspects, further comprising:

a riding posture determining unit that determines a difference in riding posture by comparing pressure sum total values, the pressure sum total values being sum total values of pressure in areas where the posture sensor for the backrest and the posture sensor for the seat portion indicate pressure equal to or beyond a certain value; and a weight determining unit that determines, when a pressure sum total value of the posture sensor for the backrest and a pressure sum total value of the posture sensor for the seat portion are in specified ranges, a weight for each sensor using a whole pressure sum total value obtained by further summing the pressure sum total values of the respective sensors, or using a ratio of the pressure sum total value of each sensor to a maximum pressure sum total value of each sensor, the pressure sum total value of the posture sensor for the backrest being a sum total value of pressure in an area where the posture sensor for the backrest contactably disposed at the backrest upper left and right portions of the rider indicates pressure equal to or beyond a certain value, and the pressure sum total value of the posture sensor for the seat portion being a sum total value of pressure in an area where the posture sensor for the seat portion indicates pressure equal to or beyond a certain value, wherein the turn intention determining unit is configured by a left-right amount-of-change comparison type turn intention determining unit that determines whether there is a left or right turn intention of the rider using a difference between left and right pressure sum total values of the posture sensor for the backrest, the left and right pressure sum total values being weighted by the weight determined by the weight determining unit.

By such a configuration, in addition to the advantageous effects of the riding type vehicles of the first to ninth aspects, by determining whether there are an operational intention and a left or right turn intention using sensor output values which are weighted on a posture-sensor-by-posture-sensor basis, taking into account the difference in riding posture between riders, a reduction in determination accuracy caused by the difference in seating posture between riders is improved, enabling to make a more accurate operational intention determination.

According to an eleventh aspect of the present invention, there is provided the riding type vehicle according to any one of the first to ninth aspects, further comprising:

a riding posture determining unit that determines a difference in riding posture by comparing pressure sum total values, the pressure sum total values being sum total values of pressure in areas where the posture sensor for the backrest and the posture sensor for the backrest lower central portion indicate pressure equal to or beyond a certain value; and a weight determining unit that determines, when a pressure sum total value of the posture sensor for the backrest and a pressure sum total value of the posture sensor for the backrest lower central portion are in specified ranges, a weight for each sensor using a whole pressure sum total value obtained by further summing the pressure sum total values of the respective sensors, or using a ratio of the pressure sum total value of each sensor to a maximum pressure sum total value of each sensor, the pressure sum total value of the posture sensor for the backrest being a sum total value of pressure in an area where the posture sensor for the backrest contactably disposed at the backrest upper left and right portions of the rider indicates pressure equal to or beyond a certain value, and the pressure sum total value of the posture sensor for the backrest lower central portion being a sum total value of pressure in an area where the posture sensor for the backrest lower central portion indicates pressure equal to or beyond a certain value, wherein the turn intention determining unit is configured by a left-right amount-of-change comparison type turn intention determining unit that determines whether there is a left or right turn intention of the rider using a difference between left and right pressure sum total values of the posture sensor for the backrest, the left and right pressure sum total values being weighted by the weight determined by the weight determining unit.

By such a configuration, in addition to the advantageous effects of the riding type vehicles of the first to ninth aspects, by determining whether there are an operational intention and a left or right turn intention using sensor output values which are weighted on a posture-sensor-by-posture-sensor basis, taking into account the difference in riding posture between riders, a reduction in determination accuracy caused by the difference in seating posture between riders is improved, enabling to make a more accurate operational intention determination.

According to a twelfth aspect of the present invention, there is provided the riding type vehicle according to any one of the ninth to eleventh aspects, wherein when output values from the posture sensor for the seat portion, the posture sensor for the backrest lower central portion, or the posture sensor for the backrest exceed a threshold value indicating an upper limit of measurement, the weight determining unit sets a weight for a corresponding sensor to a smaller value than those for other sensors or to zero, and the turn intention determining unit determines whether there is a left or right turn intention using output values from the posture sensor for the backrest, the output values being weighted by the weight determined by the weight determining unit.

By such a configuration, in addition to the advantageous effects of the riding type vehicles of the ninth to eleventh aspects, by determining whether there are an operational intention and a left or right turn intention using sensor output values which are weighted on a posture-sensor-by-posture-sensor basis, taking into account the difference in riding posture between riders, a reduction in determination accuracy caused by the difference in seating posture between riders is improved, enabling to make a more accurate operational intention determination.

According to a thirteenth aspect of the present invention, there is provided the riding type vehicle according to any one of the first to twelfth aspects, further comprising: a notifying unit that issues a notification to urge the rider to ride so as to come into contact with the seat portion when, as a result of analysis by the riding posture determining unit, output values from the posture sensor for the seat portion are less than or equal to the seating confirmation threshold value.

By such a configuration, in addition to the advantageous effects of the riding type vehicles of the first to twelfth aspects, a riding type vehicle can be provided in which when output values from the sensor for the seat portion in a riding posture of the rider during movement are extremely small, there is a possibility that the rider rides in a standing position or in an unstable posture where the rider leans only against the backrest, without being seated in the seat portion, and thus, a notification is issued to sit in the seat portion, whereby not only an improvement in the accuracy of operational intention determination but also safety with no accidents can be achieved.

According to a fourteenth aspect of the present invention, there is provided the riding type vehicle according to any one of the first to thirteenth aspects, further comprising: a footrest supported at a front portion of the vehicle main body and supporting soles of feet of the rider.

According to a fifteenth aspect of the present invention, there is provided the riding type vehicle according to any one of the first to fourteenth aspects, wherein backrest portions that can come into contact with at least a spine or lumbar vertebrae of the rider include a fixed backrest portion fixed regardless of whether there is contact of the rider; and movable backrest portions, portions of which each having the posture sensor for the backrest can be moved by contact of the rider.

By such a configuration, in addition to the advantageous effects of the first to fourteenth aspects, by mounting a posture sensor for the backrest on each movable portion, the rider him/herself can know that his/her turn intention has been transmitted to the vehicle, and people around the vehicle can also visually determine a rider's turn intention. Thus, vehicle turning control can performed more securely and safely.

According to a sixteenth aspect of the present invention, there is provided the riding type vehicle according to the fifteenth aspect, wherein a front side of each of the left and right movable backrest portions is provided on substantially a same plane as a front side of the fixed backrest portion, and a main displacement direction of each of the left and right movable backrest portions is a direction perpendicular to the plane.

By such a configuration, in addition to the advantageous effect of the fifteenth aspect, by mounting a posture sensor for the backrest on each movable portion, the rider him/herself can know that his/her turn intention has been transmitted to the vehicle, and people around the vehicle can also visually determine a rider's turn intention. Thus, vehicle turning control can be performed more securely and safely.

According to a seventeenth aspect of the present invention, there is provided the riding type vehicle according to the fifteenth or sixteenth aspect, wherein the drive control unit converts a displacement of each the left and right movable backrest portions into a distance and changes a drive instruction according to an amount of change in the distance.

By such a configuration, in addition to the advantageous effect of the fifteenth or sixteenth aspect, by mounting a posture sensor for the backrest on each movable portion, the rider him/herself can know that his/her turn intention has been transmitted to the vehicle, and people around the vehicle can also visually determine a rider's turn intention. Thus, vehicle turning control can be performed more securely and safely.

According to an eighteenth aspect of the present invention, there is provided the riding type vehicle according to any one of the fifteenth to seventeenth aspects, wherein each of the movable backrest portions and the fixed backrest portion are coupled together by an elastic material so as to be movable with respect to the vehicle main body.

By such a configuration, in addition to the advantageous effects of the fifteenth to seventeenth aspects, by mounting a posture sensor for the backrest on each movable portion, the rider him/herself can know that his/her turn intention has been transmitted to the vehicle, and people around the vehicle can also visually determine a rider's turn intention. Thus, vehicle turning control can be performed more securely and safely.

According to a nineteenth aspect of the present invention, there is provided the riding type vehicle according to any one of the first to eighteenth aspects, wherein in a state as viewed from a side with respect to a movement direction of the vehicle main body which is orthogonal to a backrest surface, the backrest surface of the backrest is tilted backward, an angle of the tilt formed with a vertical plane is 10 degrees, and an angle formed by the backrest and a seat surface of a gluteal region support portion is 135 degrees.

According to a twentieth aspect of the present invention, there is provided the riding type vehicle according to any one of the first to nineteenth aspects, wherein a footrest surface of the footrest is tilted backward, an angle of the footrest surface formed with a horizontal plane is 10 degrees, and an angle formed by the backrest surface of the backrest and the footrest surface of the footrest is 90 degrees.

According to a twenty first aspect of the present invention, there is provided a method of controlling a riding type vehicle, wherein the riding type vehicle includes a seat portion and backrest portions operated by a change in posture of a rider and provided such that the rider is in a substantially standing position when riding in the vehicle, the backrest portions include a fixed backrest portion disposed in a position that can come into contact with a body trunk of the rider and fixed to a standing position riding type vehicle main body; and movable backrest portions that can be moved with respect to the riding type vehicle main body achieving the substantially standing position and that can follow a change in posture of the rider, the method comprising:

with the movable backrest portions disposed left-right symmetrically with respect to the fixed backrest portion, detecting left and right moving displacements by a backrest posture sensor; and by a drive control unit, calculating an amount of displacement from each of the moving displacements detected by the sensor and outputting a drive instruction based on the amounts of displacement, thereby allowing the riding type vehicle to make a turn.

By this, in addition to the advantageous effect of the above-described aspect, the loads on the legs and feet of the user can be reduced in a posture with very little load on the spine. Therefore, while riding in a posture with a smaller load on the body, turning control by postural change can be implemented. Furthermore, since the angle is such an angle that facilitates the motion of daily activities in a forward-leaning manner or the motion of standing up, in operation control by postural change the user can perform movement operation without using his/her hand. Thus, the effect of ensuring user's workability is further improved.

According to a twenty second aspect of present invention, there is provided a method of controlling a riding type vehicle that controls drive of a riding type vehicle including a vehicle main body; a backrest supported above the vehicle main body and supporting a back of a rider; a seat portion disposed above the vehicle main body and below the backrest, and supporting a gluteal region of the rider; a plurality of drive wheels rotatably supported at a lower portion of the vehicle main body; and a driving unit disposed at the lower portion of the vehicle main body and driving the plurality of drive wheels to allow the vehicle main body to make a forward motion, a backward motion, or a turn, the method comprising:

detecting, by a posture sensor for the backrest, a change in posture of the rider, thereby determining whether there is an operational intention of the rider by a contact-position-dependent type operational intention determining unit, the posture sensor for the backrest being disposed in a portion of the backrest with which left and right shoulder blades of the rider come into contact, only when the operational intention determining unit determines that there is an operational intention of the rider, determining, by a left-right amount-of-change comparison type turn intention determining unit, whether a difference between pressure sum total values exceeds a seating confirmation threshold value, and determining that there is a left or right turn intention of the rider when the difference between the pressure sum total values exceeds the seating confirmation threshold value, the pressure sum total values being sum total values of pressure in areas where the sensor provided in the portion with which the left and right shoulder blades of the rider come into contact indicates pressure equal to or beyond a certain value, and the sum total values being outputted from the posture sensor for the backrest, and performing, by a drive control unit, drive control of the driving unit according to the left or right turn intention of the rider determined by the turn intention determining unit.

By such a configuration, a safe riding type vehicle can be provided in which even if a large postural change occurs as a result of the intention of performing motion other than operation, the vehicle does not erroneously make a left or right turn or perform a movement operation. Furthermore, a riding type vehicle can be provided in which by identifying the disposition position of the posture sensor for the backrest to be near positions with which the left and right shoulder blades of the rider come into contact, even if the seating posture varies by the habit of the rider, when the rider makes a great change in his/her posture to the left or right without the intention of performing operation, the vehicle does not erroneously make a left or right turn or perform a movement operation and an intention determination can be stably made.

First to third embodiments of the present invention will be described in detail below with reference to the drawings.

Prior to making a detailed description of the first to third embodiments of the present invention below with reference to the drawings, various aspects of the present invention will be described.

According to a first aspect of the present invention, there is provided a riding type vehicle comprising:

a vehicle main body;

a backrest supported above the vehicle main body and supporting a back of a rider;

a seat portion disposed above the vehicle main body and below the backrest, and supporting a gluteal region of the rider;

a footrest supported at a front portion of the vehicle main body and supporting soles of feet of the rider;

a plurality of drive wheels rotatably supported at a lower portion of the vehicle main body;

a driving unit disposed at the lower portion of the vehicle main body, that drives the plurality of drive wheels to allow the vehicle main body to make forward motion, a backward motion, or a turn;

a posture sensor for the backrest disposed in a portion of the backrest with which left and right shoulder blades of the rider come into contact;

a posture sensor for the seat portion disposed in a portion of the seat portion with which the gluteal region of the rider comes into contact;

a contact-position-dependent type operational intention determining unit that determines whether there is an operational intention of the rider, from information on a relationship between positions of the respective posture sensors and magnitudes of values outputted from the respective posture sensors;

a left-right amount-of-change comparison type turn intention determining unit that determines, only when the operational intention determining unit determines that there is an operational intention of the rider, whether a difference between pressure values of portions with which the left and right shoulder blades of the rider come into contact exceeds a threshold value, and determines that there is a left or right turn intention of the rider when it is determined that the difference between the pressure values exceeds the threshold value, the pressure values being outputted from the posture sensor for the backrest; and a drive control unit that performs drive control of the driving unit according to the left or right turn intention of the rider determined by the turn intention determining unit.

By such a configuration, a safe riding type vehicle can be provided in which even if a large postural change occurs as a result of the intention of performing motion other than operation, the vehicle does not erroneously make a left or right turn or perform a movement operation.

According to a second aspect of the present invention, there is provided the riding type vehicle according to the first aspect, in which the posture sensor for the backrest is disposed in a portion of the backrest with which backrest upper left and right portions can come into contact, the backrest upper left and right portions including the left and right shoulder blades of the rider and further including back portions where back ribs are located at a width of the shoulder blades.

By this configuration, a safe riding type vehicle can be provided in which even if a large postural change occurs as a result of the intention of performing motion other than operation, the vehicle does not erroneously make a left or right turn or perform a movement Operation. Furthermore, a riding type vehicle can be provided in which by identifying the disposition position of the posture sensor for the backrest to be near positions with which the left and right shoulder blades of the rider come into contact or near a position with which the hip bone of the rider comes into contact, even if the seating posture varies by the habit of the rider, when the rider makes a great change in his/her posture to the left or right without the intention of performing operation, the vehicle does not erroneously make a left or right turn or perform a movement operation and an intention determination can be stably made.

According to a third aspect of the present invention, there is provided the riding type vehicle according to the second aspect, in which:

the operational intention determining unit determines that there is an operational intention when both of a sum total value of output values from the posture sensor for the backrest and a sum total value of output values from the posture sensor for the seat portion exceed their respective threshold values; and the turn intention determining unit determines that there is a left or right turn intention of the rider when the operational intention determining unit determines that there is an operational intention and a difference between sensor output values from the posture sensors for the backrest located left-right symmetrically exceeds threshold value.

By this configuration, a safe riding type vehicle can be provided in which even if a large postural change occurs as a result of the intention of performing motion other than operation, the vehicle does not erroneously make a left or right turn or perform a movement operation. Furthermore, a riding type vehicle can be provided in which by identifying the disposition position of the posture sensor for the backrest to be near positions with which the left and right shoulder blades of the rider come into contact or near a position with which the hip bone of the rider comes into contact, even if the seating posture varies by the habit of the rider, when the rider makes a great change in his/her posture to the left or right without the intention of performing operation, the vehicle does not erroneously make a left or right turn or perform a movement operation and an intention determination can be stably made.

According to a fourth embodiment of the present invention, there is provided the riding type vehicle according to the first aspect, further comprising:

a posture sensor for a backrest lower central portion that can come into contact with a part of the backrest with which a back portion where lumbar vertebrae are located comes into contact, wherein the operational intention determining unit determines whether there is an operational intention of the rider, from information on a relationship between positions of the posture sensor for the backrest, the posture sensor for the seat portion, and the posture sensor for the backrest lower central portion and magnitudes of values outputted from the respective posture sensors.

By such a configuration, a safe riding type vehicle can be provided in which even if a large postural change occurs as a result of the intention of performing motion other than operation, the vehicle does not erroneously make a left or right turn or perform a movement operation. Furthermore, a riding type vehicle can be provided in which by identifying the disposition position of the posture sensor for the backrest to be near positions with which the left and right shoulder blades of the rider come into contact or near a position with which the hip bone of the rider comes into contact and near a position with which the back portion where the lumbar vertebrae are located comes into contact, even if the seating posture varies by the habit of the rider, when the rider makes a great change in his/her posture to the left or right without the intention of performing operation, the vehicle does not erroneously make a left or right turn or perform a movement operation and an intention determination can be stably made.

According to a fifth aspect of the present invention, there is provided the riding type vehicle according to the fourth aspect, in which:

the operational intention determining unit determines that there is an operational intention when outputs values from the posture sensor for the backrest lower central portion and the posture sensor for the seat portion exceed their respective threshold values; and the turn intention determining unit determines that there is a left or right turn intention of the rider when the operational intention determining unit determines that there is an operational intention and a difference in output values between left and right in portions of the posture sensor for the backrest with which the left and right shoulder blades of the rider respectively come into contact exceeds a threshold value.

By this configuration, a safe riding type vehicle can be provided in which even if a large postural change occurs as a result of the intention of performing motion other than operation, the vehicle does not erroneously make a left or right turn or perform a movement operation. Furthermore, a riding type vehicle can be provided in which by identifying the disposition position of the posture sensor for the backrest to be near positions with which the left and right shoulder blades of the rider come into contact or near a position with which the hip bone of the rider comes into contact and near a position with which the back portion where the lumbar vertebrae are located comes into contact, even if the seating posture varies by the habit of the rider, when the rider makes a great change in his/her posture to the left or right without the intention of performing operation, the vehicle does not erroneously make a left or right turn or perform a movement operation and an intention determination can be stably made.

According to a sixth aspect of the present invention, there is provided the riding type vehicle according to any one of the first to fifth aspects, further comprising:

a riding posture determining unit that analyzes distribution conditions of output values from the posture sensors which vary by the posture of the rider, using the output values from the posture sensors; and a weight determining unit that determines weights for the output values from the posture sensors, using the distribution conditions of the output values from the posture sensors analyzed by the riding posture determining unit, wherein in at least one of a determination process by the operational intention determining unit that determines whether there is an operational intention and a determination process by the turn intention determining unit that determines whether there is a left or right turn intention of the rider, output values from the posture sensors obtained by weighting the output values from the posture sensors by the weight determining unit are used.

By this configuration, a safe riding type vehicle can be provided in which even if a large postural change occurs as a result of the intention of performing motion other than operation, the vehicle does not erroneously make a left or right turn or perform a movement operation. Furthermore, a safe riding type vehicle can be provided in which by determining whether there are an operational intention and a left or right turn intention using sensor output values which are weighted on a posture-sensor-by-posture-sensor basis, taking into account the difference in riding posture between riders, a reduction in determination accuracy caused by the difference in seating posture between riders is improved and an operational intention determination is stably made and thus erroneous operation of the vehicle does not occur.

According to a seventh aspect of the present invention, there is provided the riding type vehicle according to the sixth aspect, comprising:

a riding posture determining unit that analyzes a habit of a riding posture from sensor output values from the posture sensor for the backrest and the posture sensor for the seat portion;

a weight determining unit that determines, when a backrest upper left and right portion sensor output value and a seat portion sensor output value are in specified ranges, weights for the respective sensors using the output values from the sensors or a ratio of each sensor output value to a maximum output value of each sensor; and a left-right amount-of-change comparison type turn intention determining unit that determines whether there is a left or right turn intention of the rider, using a difference between left and right output values from the respective sensors weighted by the determined weights.

By this configuration, a safe riding type vehicle can be provided in which even if a large postural change occurs as a result of the intention of performing motion other than operation, the vehicle does not erroneously make a left or right turn or perform a movement operation. Furthermore, a safe riding type vehicle can be provided in which by determining whether there is a left or right turn intention, using sensor output values which are weighted on a posture-sensor-by-posture-sensor basis, taking into account the difference in riding posture between riders, a reduction in determination accuracy caused by the difference in seating posture between riders is improved and an operational intention determination is stably made and thus erroneous operation of the vehicle does not occur.

According to an eighth aspect of the present invention, there is provided the vehicle according to the sixth aspect, in which:

the riding posture determining unit compares sensor output values in a riding posture from the posture sensor for the backrest and the posture sensor for the backrest lower central portion with their respective threshold values, and thereby analyzes distribution conditions of the output values from the posture sensors which vary by the posture of the rider;

the weight determining unit determines weights for the posture sensor for the backrest lower central portion and the posture sensor for the backrest, using the output values from the posture sensor for the backrest lower central portion and the posture sensor for the backrest or using a ratio between the output values; and the operation intention determining unit determines whether there is an operational intention of the rider, from sensor output values weighted by the weights determined by the weight determining unit.

By this configuration, a safe riding type vehicle can be provided in which even if a large postural change occurs as a result of the intention of performing motion other than operation, the vehicle does not erroneously make a left or right turn or perform a movement operation. Furthermore, a safe riding type vehicle can be provided in which by determining whether there is an operational intention, using sensor output values which are weighted on a posture-sensor-by-posture-sensor basis, taking into account the difference in riding posture between riders, a reduction in determination accuracy caused by the difference in seating posture between riders is improved and an operational intention determination is stably made and thus erroneous operation of the vehicle does not occur.

According to a ninth aspect of the present invention, there is provided the vehicle according to the sixth aspect, in which:

the riding posture determining unit compares sensor output values in a riding posture from the posture sensor for the seat portion and the posture sensor for the backrest with their respective threshold values, and thereby grasps distribution conditions of the output values from the posture sensors which vary by the posture of the rider;

the weight determining unit determines weights for the sensors for the seat portion and the backrest, using the output values from the posture sensor for the seat portion or using a ratio between a seat portion output sum total value of the output values and a backrest output sum total value of the output values from the posture sensors for the backrest, the weight being used when determining whether there is a left or right turn intention; and the turn intention determining unit determines whether there is a left or right turn intention of the rider, from a difference between sensor values located left-right symmetrically, using sensor output values weighted by the weights determined by the weight determining unit.

By this configuration, a safe riding type vehicle can be provided in which even if a large postural change occurs as a result of the intention of performing motion other than operation, the vehicle does not erroneously make a left or right turn or perform a movement operation. Furthermore, a safe riding type vehicle can be provided in which by determining whether there is an operational intention, using sensor output values which are weighted on a posture-sensor-by-posture-sensor basis, taking into account the difference in riding posture between riders, a reduction in determination accuracy caused by the difference in seating posture between riders is improved and an operational intention determination is stably made and thus erroneous operation of the vehicle does not occur.

According to a tenth aspect of the present invention, there is provided the vehicle according to the first aspect, in which:

when output values from the posture sensor for the seat portion or the posture sensor for the backrest exceed a threshold value indicating an upper limit of measurement, the weight determining unit sets a weight for a corresponding sensor to a smaller value than that for the other sensor or to zero, and the turn intention determining unit determines whether there is a left or right turn intention, using output values from the sensors weighted by the weights determined by the weight determining unit.

By this configuration, a safe riding type vehicle can be provided in which even if a large postural change occurs as a result of the intention of performing motion other than operation, the vehicle does not erroneously make a left or right turn or perform a movement operation. Furthermore, a riding type vehicle can be provided in which by performing a process in which, when each sensor output value exceeds a measurement upper limit threshold value due to a riding posture, the weight for a corresponding sensor is set to zero, a sensor that cannot reflect a left or right turn intention is excluded, whereby a turn intention is more accurately reflected and there is no erroneous operation.

According to an eleventh aspect of the present invention, there is provided the vehicle according to any one of the first to tenth aspects, further comprising: a notifying unit that issues a notification to the rider to urge him/her to ride so as to come into contact with the seat portion when, as a result of analysis by the riding posture determining unit, sensor output values from the seat portion are less than or equal to the seating confirmation threshold value.

By this configuration, a safe riding type vehicle can be provided in which even if a large postural change occurs as a result of the intention of performing motion other than operation, the vehicle does not erroneously make a left or right turn or perform a movement operation. Furthermore, a riding type vehicle can be provided in which when output values from the sensor for the seat portion in a riding posture of the rider during movement are extremely small, there is a possibility that the rider rides in a standing position or in an unstable posture where the rider leans only against the backrest, without being seated in the seat portion, and thus, a notification is issued to sit in the seat portion, whereby not only an improvement in the accuracy of operational intention determination but also safety with no accidents can be achieved.

According to a twelfth aspect of the present invention, there is provided a method of controlling a riding type vehicle that controls drive of a riding type vehicle comprising a vehicle main body; a backrest supported above the vehicle main body and supporting a back of a rider; a seat portion disposed above the vehicle main body and below the backrest, and supporting a gluteal region of the rider; a footrest supported at a front portion of the vehicle main body and supporting soles of feet of the rider; a plurality of drive wheels rotatably supported at a lower portion of the vehicle main body; and a driving unit disposed at the lower portion of the vehicle main body and driving the plurality of drive wheels to allow the vehicle main body to make a forward motion, a backward motion, or a turn, the method comprising:

determining, by a contact-position-dependent type operational intention determining unit, whether there is an operational intention of the rider, from information on a relationship between positions of a posture sensor for the backrest and a posture sensor for the seat portion and magnitudes of values outputted from the respective posture sensors, the posture sensor for the backrest being disposed in a portion of the backrest with which left and right shoulder blades of the rider come into contact, and the posture sensor for the seat portion being disposed in a portion of the seat portion with which the gluteal region of the rider comes into contact;

only when the operational intention determining unit determines that there is an operational intention of the rider, determining, by a left-right amount-of-change comparison type turn intention determining unit, whether a difference between pressure values in portions with which the left and right shoulder blades of the rider respectively come into contact exceeds a threshold value, and determining that there is a left or right turn intention of the rider when the difference between the pressure values exceeds the threshold value, the pressure values being outputted from the posture sensor for the backrest; and performing, by a drive control unit, drive control of the driving unit according to the left or right turn intention of the rider determined by the turn intention determining unit.

By such a configuration, a safe method of controlling a riding type vehicle can be provided in which even if a large postural change occurs as a result of the intention of performing motion other than operation, the vehicle does not erroneously make a left or right turn or perform a movement operation.

First to third embodiments of the present invention will be described below with reference to the drawings.

First Embodiment

Figure 2:
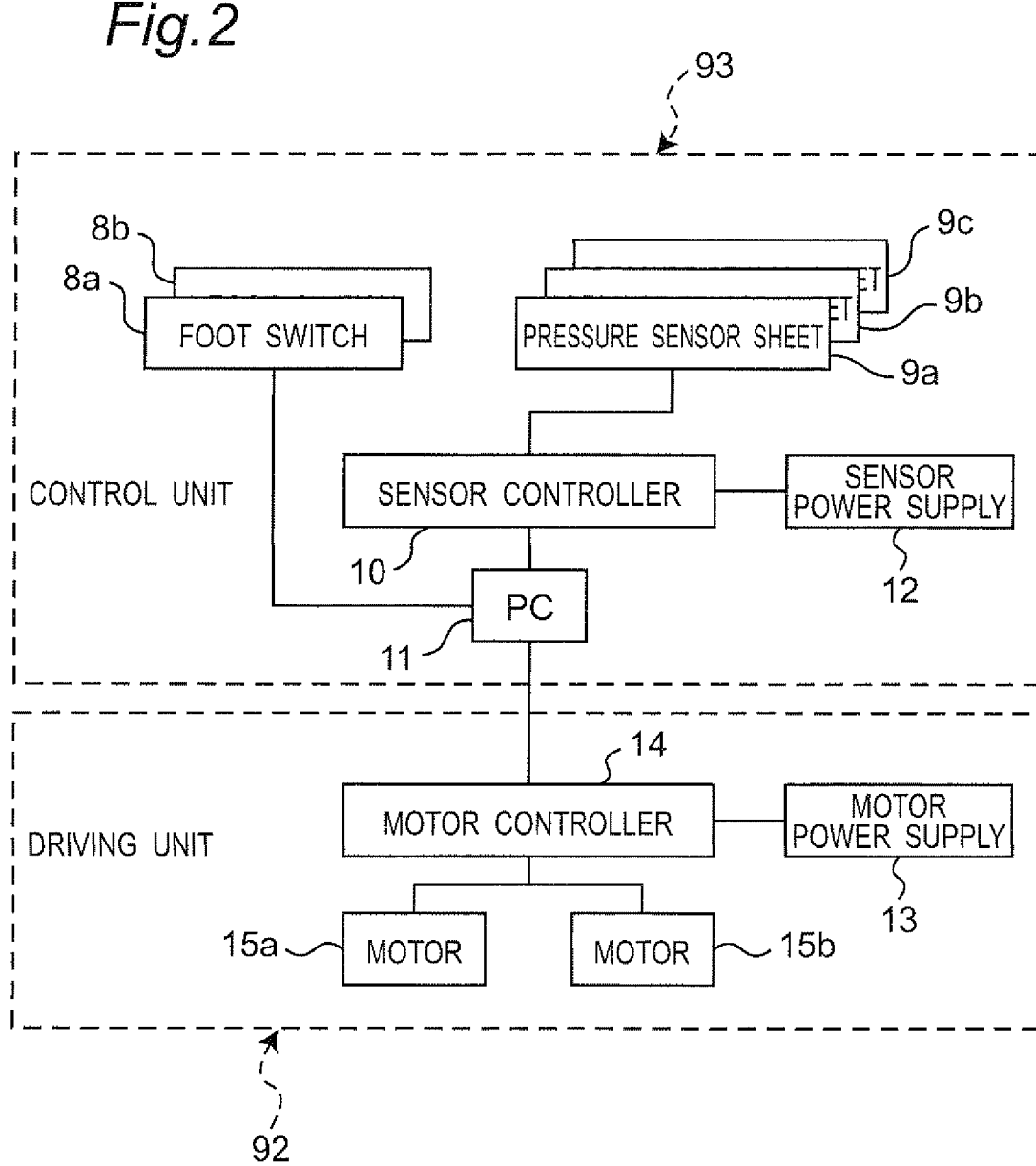
FIG. 2 is a block diagram of a hardware configuration of the vehicle of the first embodiment of the present invention.

FIGS. 1 and 2 are an external view and a block diagram of a hardware configuration of a standing position riding type vehicle 100 which is an example of a riding type vehicle (an example of mobility aid equipment) which a method of controlling a riding type vehicle according to a first embodiment of the present invention can be applied.

Note that in the following description a portion of the vehicle 100 with which the upper body of a rider 91 which is a part above his/her lower back comes into contact when the rider 91 rides in the vehicle 100 is referred to as a backrest, and a portion of the vehicle 100 with which the lower body of the rider 91 which is a part below his/her hip joint comes into contact is referred to as a seat portion. Note also that regions including left and right shoulder blades 50a and 50b of the rider 91 and further including back portions 51a and 51b where the back ribs are located at the width of the shoulder blades are referred to as backrest upper left and right portions. Note also that a portion of a backrest portion with which a back portion 52 where the lumbar vertebrae of the rider 91 are located comes into contact is referred to as a backrest lower central portion.

The standing position riding type vehicle 100 shown in FIG. 1 includes at least a seat 3 that functions as a chair including at least a backrest 2a having a backrest surface that supports a part of the rider 91 riding in the standing position riding type vehicle 100, from the lower back to back (at least the back), and a seat portion 2b having a seat surface that supports the gluteal region and ischial bone (at least the gluteal region) of the rider 91 riding in the standing position riding type vehicle 100; and a plate-like footrest 1 having a footrest surface that supports the soles of the feet of the rider 91 riding in the standing position riding type vehicle 100.

More specifically, the standing position riding type vehicle 100 has a vehicle main body 5; the backrest 2a supported above the vehicle main body 5; the seat portion 2b disposed above the vehicle main body 5 and below the backrest 2a so as to be coupled to the backrest 2a; and the footrest 1 fixedly supported at a front portion of a lower portion of the vehicle main body 5. The vehicle main body stores in the lower portion thereof a control unit 93 including a power supply 12; and a driving unit 92 including a power supply 13, motors 15a and 15b, etc.

The seat 3 having the backrest 2a and the seat portion 2b is disposed on the upper portion side of the standing position riding type vehicle 100 such that the position thereof can be adjusted in an up-down direction from the lower portion of the vehicle main body 5 via a post 4. At the lower portion of the vehicle main body 5 there are rotatably disposed four wheels 6a, 6b, 7a, and 7b in total, for example, on both sides thereof so that the standing position riding type vehicle 100 can move forward and backward and can make a turn with the four wheels 6a, 6b, 7a, and 7b. In the standing position riding type vehicle 100 of the first embodiment, a mobile mechanism is configured by providing the freely rotatable front wheels 7a and 7b on the right and left sides of the footrest 1 and providing the drive wheels 6a and 6b on the right and left sides of a rear portion of the lower portion of the main body 5. The driving unit 92 includes a motor controller 14 that functions as an example of a drive control unit; the motor power supply 13; and the right and left motors 15a and 15b. By this, the driving unit 92 drives the plurality of drive wheels 6a and 6b independently of each other which are disposed at the lower portion of the vehicle main body 5, to allow the standing position riding type vehicle 100 to make a forward motion, a backward motion, or a turn.

The footrest 1 has, for example, two foot switches 8a and 8b mounted on the right and left sides of the front thereof. One foot switch 8a is used for forward motion and the other foot switch 8b is used for backward motion. This pair of foot switches 8a and 8b is an example of operation input means used by the rider 91 to perform operation of the standing position riding type vehicle 100. In the example of the first embodiment, the foot switches 8a and 8b are disposed in a left/right pair. For example, the right foot switch 8a is a switch that inputs a forward motion instruction by stepping on the switch, and the left foot switch 8b is a switch that inputs a backward motion instruction by stepping on the switch.

In addition, pressure sensor sheets 9a, 9b, and 9c which are an example of a posture sensor (e.g., a pressure sensor) are installed on the backrest 2a and the seat portion 2b. Specifically, the right and left pressure sensor sheets for the backrest 9a and 9b which are an example of a posture sensor for the backrest are disposed in portions of the backrest 2a with which the regions of the backrest upper left and right portions including the left and right shoulder blades 50a and 50b of the rider 91 and further including the back portions 51a and 51b where the back ribs are located at the width of the shoulder blades 50a and 50b can come into contact (specifically, areas with which the regions of the backrest upper left and right portions can come into contact). The pressure sensor sheet for the seat portion 9c which is an example of a posture sensor for the seat portion is disposed in a part or all of the surface of the seat portion 2b with which the gluteal region of the rider 91 can come into contact (specifically, part or all of the area with which the gluteal region can come into contact). The pressure sensor sheets 9a, 9b, and 9c; though a detailed description thereof will be separately made below, detect an intention (instruction) of the rider 91 to operate the vehicle 100.

The vehicle main body 5 includes therein a sensor controller 10, the sensor power supply 12, the driving unit 92 (the motor controller 14, the motor power supply 13, and the motors 15a and 15b), and a PC (Personal Computer) 11.

The sensor controller 10 accepts, as input, output values of pressure elements that form each of the pressure sensor sheets 9a, 9b, and 9c, calculates a sum total value of the output values of the pressure elements that form each of the pressure sensor sheets 9a, 9b, and 9c, and outputs a pressure value of each of the sensor sheets 9a, 9b, and 9c.

The PC 11 accepts, as input, output signals from the foot switches 8a and 8b and output sum total values from the sensor controller 10, and includes a forward and backward motion control determining unit 101, an operational intention determining unit 102, a left/right turn intention determining unit 103, a left/right turn control determining unit 104, and a voltage value converting unit 105. The PC 11 performs the processes performed by the forward and backward motion control determining unit 101, the operational intention determining unit 102, the left/right turn intention determining unit 103, the left/right turn control determining unit 104, and the voltage converting unit 105 and thereby outputs voltage values of the right and left motors 15a and 15b. The forward and backward motion control determining unit 101 receives on/off output signals from the two foot switches 8a and 8b and converts the signals into voltage values for motors for driving the left and right wheels and thereafter outputs the voltage values to the voltage value converting unit 105. The operational intention determining unit 102 accepts, as input, output information from the pressure sensor sheets 9a, 9b, and 9c and outputs operational intention determination information to the left/right turn intention determining unit 103. The left/right turn intention determining unit 103 accepts, as input, output information from the pressure sensor sheets 9a, 9b, and 9c and accepts, as input, the operational intention determination information outputted from the operational intention determining unit 102, and outputs left/right turn intention determination information to the left/right turn control determining unit 104. The left/right turn control determining unit 104 accepts, as input, the left/right turn intention determination information outputted from the left/right turn intention determining unit 103 and converts the left/right turn intention determination information into voltage additional values for motors for driving the left and right wheels and outputs the voltage additional values to the voltage value converting unit 105. The voltage value converting unit 105 obtains voltage values for driving the motors for the left and right wheels 15b and 15a from the voltage values for motors for driving the left and right wheels outputted from the forward and backward motion control determining unit 101 and the voltage additional values for motors for driving the left and right wheels outputted from the left/right turn control determining unit 104, and outputs the voltage values to the motor controller 14.

The sensor power supply 12 is a power supply for the pressure sensor sheets 9a, 9b, and 9c and the sensor controller 10, and the motor power supply 13 is a power supply for driving the motor controller 14 and the motors 15a and 15b. Note that the PC 11 includes therein a power supply. The motor controller 14 accepts, as input, the voltage values of the motors 15a and 15b for the right and left wheels outputted from the voltage value converting unit 105 and converts, by a speed converting unit 106 included in the motor controller 14, the voltage values into the rotation speeds of the motors 15a and 15b and thereby drives the motors 15a and 15b. Specifically, the motor controller 14 determines, by the speed converting unit 106, the rotation speeds of the respective motors 15a and 15b from motor voltages determined by the PC 11, and issues a forward or backward motion instruction according to the inputs to the foot switches 8a and 8b. The motors 15a and 15b are driven independently of each other to rotate forward and reversely, according to outputs from the motor controller 14.

The PC performs the exchange of signals and control between the sensor controller 10 and the motor controller 14.

Figure 3A:
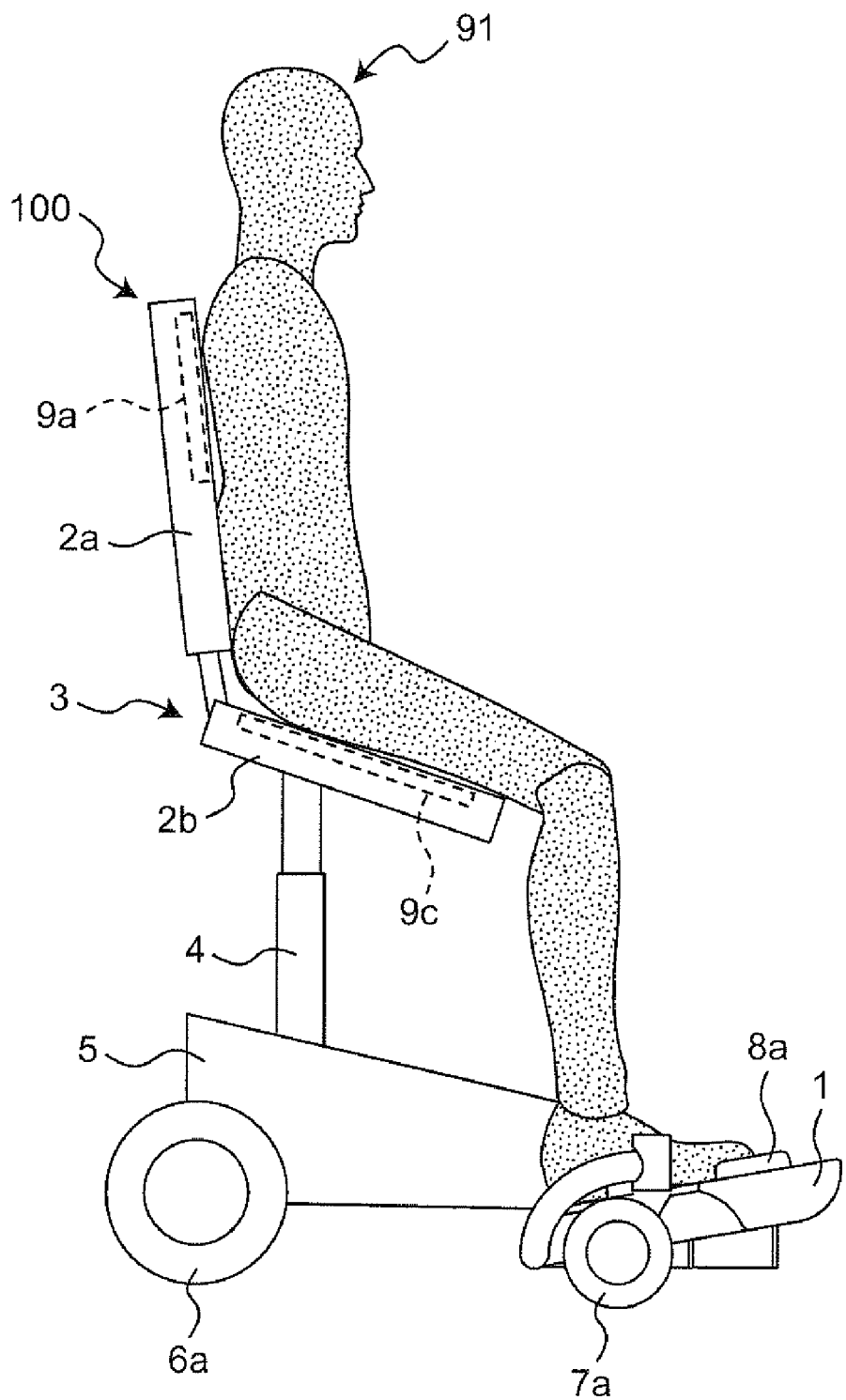
FIG. 3A is a side view of the vehicle showing disposition of posture sensors of the vehicle of the first embodiment of the present invention.
Figure 3B:
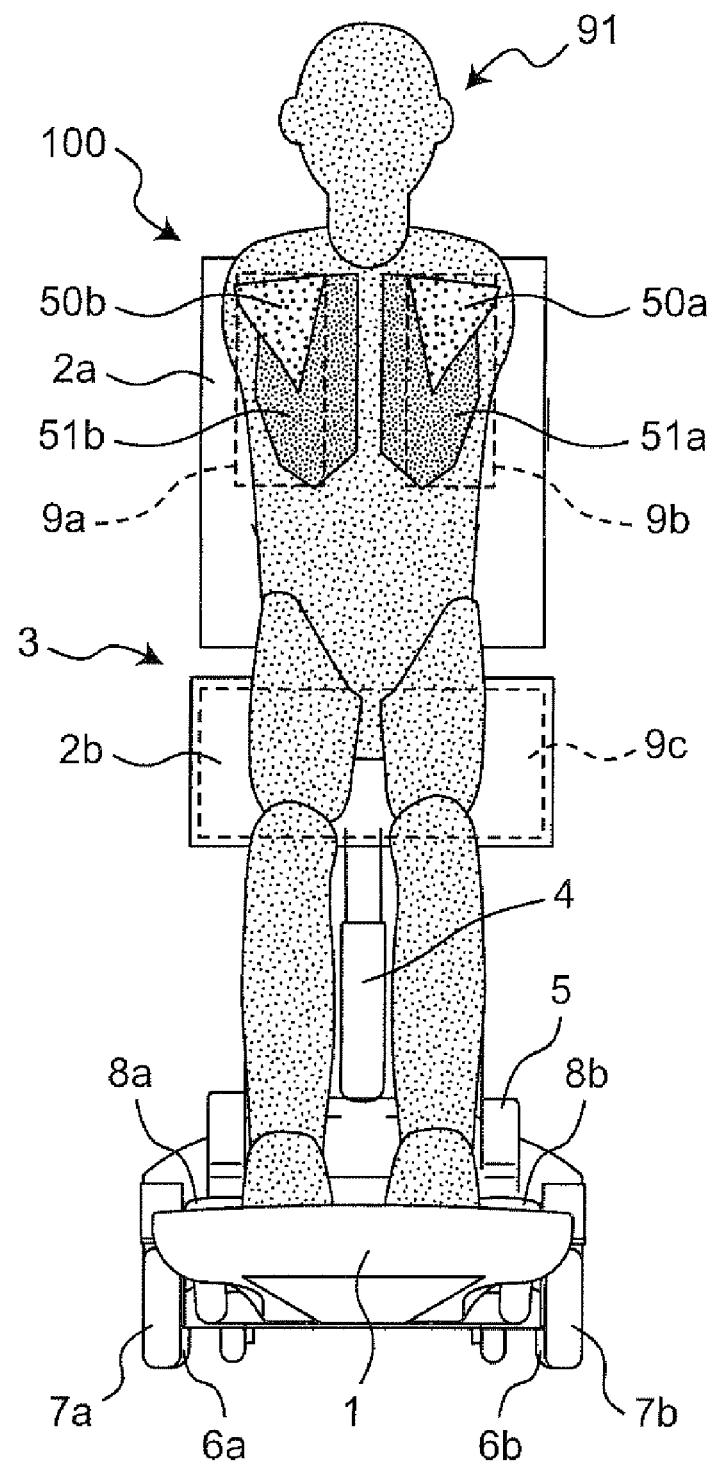
FIG. 3B is a front view of the vehicle showing disposition of the posture sensors of the vehicle of the first embodiment of the present invention.

In FIGS. 3A and 3B, the positions of the pressure sensor sheets 9a, 9b, and 9c are indicated by dashed lines. In the backrest 2a, the pressure sensor sheets 9a and 9b are formed by installing sheet sensors at two locations on the left and right sides of a upper portion of the backrest (i.e., the backrest upper left and right portions) which are positions with which a part of each of the portions on the back side of the ribs 51a and 51b present within the width of the left and right shoulder blades 50a and 50b of the rider 91 comes into contact. For example, when the above-described condition is converted in average adult body shape, in the case of the width of the upper portion of the backrest being 38 cm (±5 cm), the pressure sensor sheets 9a and 9b each have a size including a position with a width of 5 cm to 10 cm and a height of 15 cm to 30 cm from each of the upper left and right corners. A single sheet sensor may be used in place of two sheet sensors, provided that the sheet sensor can cover all of the areas of the above-described two locations where the right and left sensor sheets 9a and 9b are disposed, or conversely, each location may be divided into a plurality of sections, and thus the number of sheets is not limited to one or two. A sheet sensor which is an example of the pressure sensor sheets 9a and 9b refers to, for example, a sheet having multiple piezoelectric pressure-sensitive elements (piezoelectric elements) arranged in a matrix.

FIGS. 4A to 4K show experimental results suggesting that the above-described two locations, the backrest upper left and right portions, are suitable as the positions of the sensor sheets 9a and 9b for determining whether there is a left or right turn intention. Here, to determine whether there is a left or right turn intention of the rider 91, there is a need to dispose sensor sheets in positions considering the following conditions (1) to (3).

(1) The positions allow a natural change in posture which is made when there is a left or right turn intention to be reflected.

(2) The positions allow a change to be reflected even if motion in which an intention is reflected varies between individuals.

(3) The positions in which a change does not occur when there is no left or right turn intention.

Figure 4A:
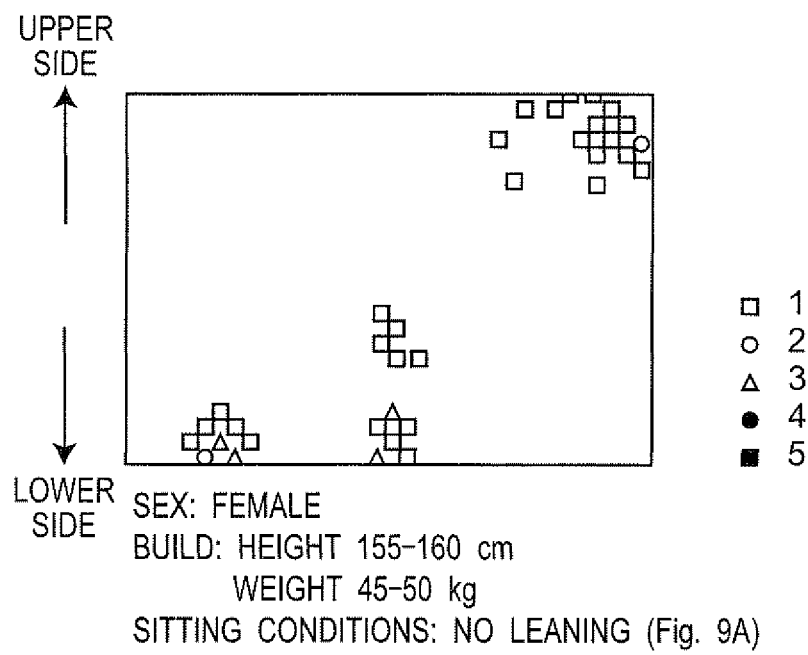
FIG. 4A is a pressure distribution view detected by pressure sensors for a backrest when a rider rides in the vehicle of the first embodiment of the present invention or when making a motion.
Figure 4B:
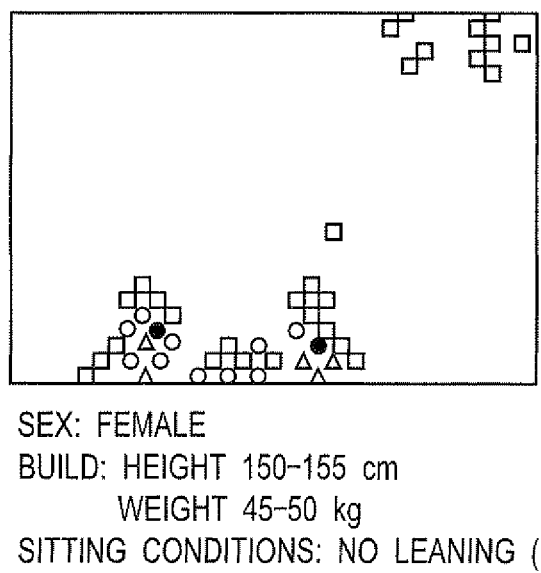
FIG. 4B is a pressure distribution view detected by the pressure sensors for a backrest when a rider rides in the vehicle of the first embodiment of the present invention or when making a motion.
Figure 4C:
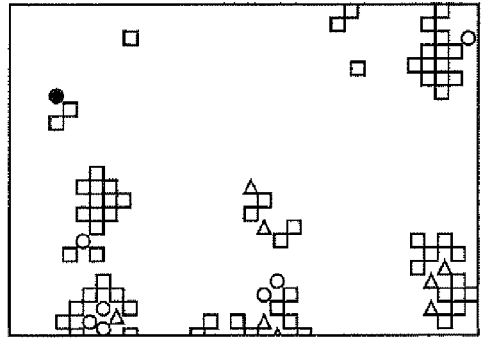
FIG. 4C is a pressure distribution view detected by the pressure sensors for a backrest when a rider rides in the vehicle of the first embodiment of the present invention or when making a motion.
Figure 4D:
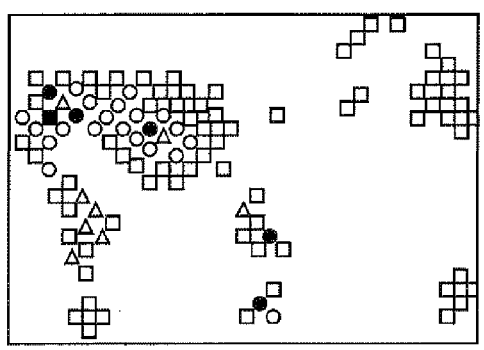
FIG. 4D is a pressure distribution view detected by the pressure sensors for a backrest when a rider rides in the vehicle of the first embodiment of the present invention or when making a motion.
Figure 4E:
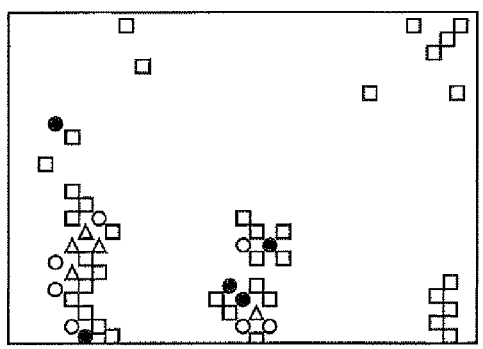
FIG. 4E is a pressure distribution view detected by the pressure sensors for a backrest when a rider rides in the vehicle of the first embodiment of the present invention or when making a motion.
Figure 4F:
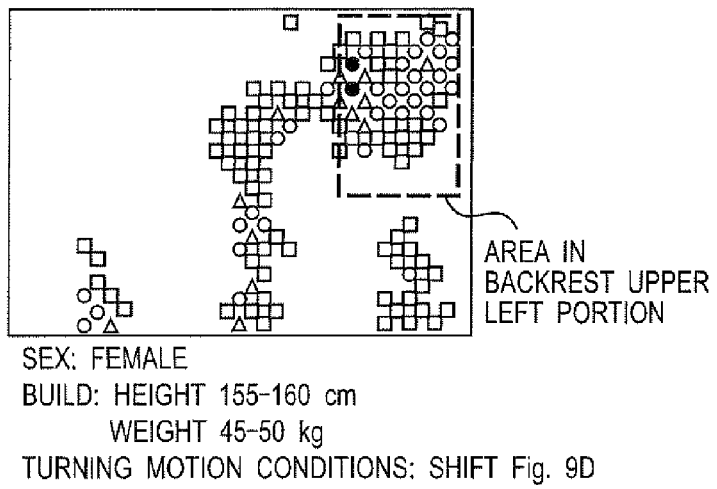
FIG. 4F is a pressure distribution view detected by the pressure sensors for a backrest when a rider rides in the vehicle of the first embodiment of the present invention or when making a motion.
Figure 4G:
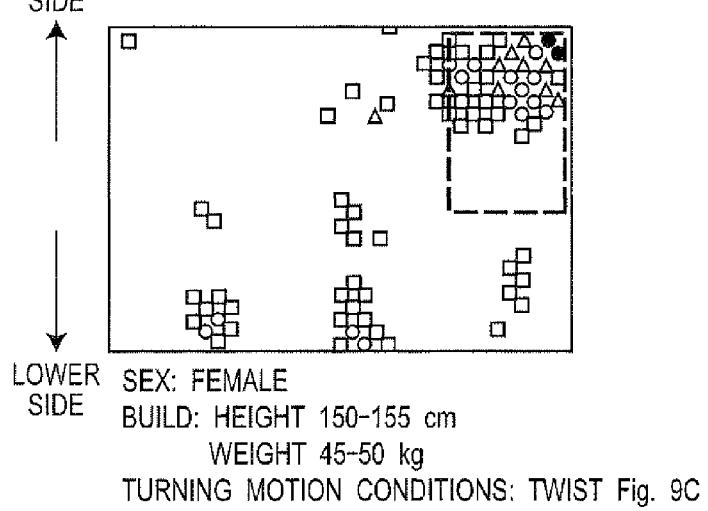
FIG. 4G is a pressure distribution view detected by the pressure sensors for a backrest when a rider rides in the vehicle of the first embodiment of the present invention or when making a motion.
Figure 4H:
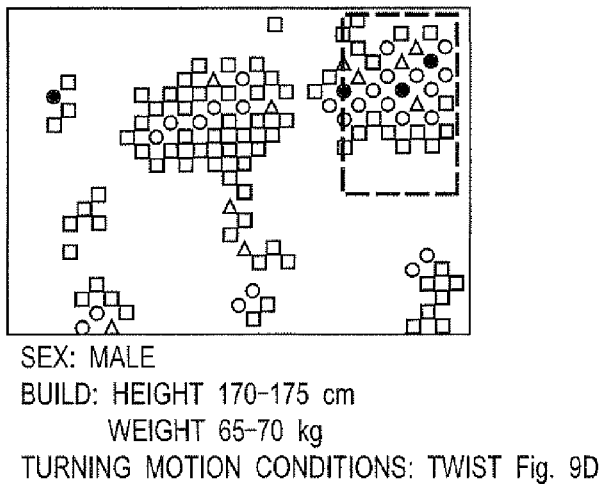
FIG. 4H is a pressure distribution view detected by the pressure sensors for a backrest when a rider rides in the vehicle of the first embodiment of the present invention or when making a motion.
Figure 4I:
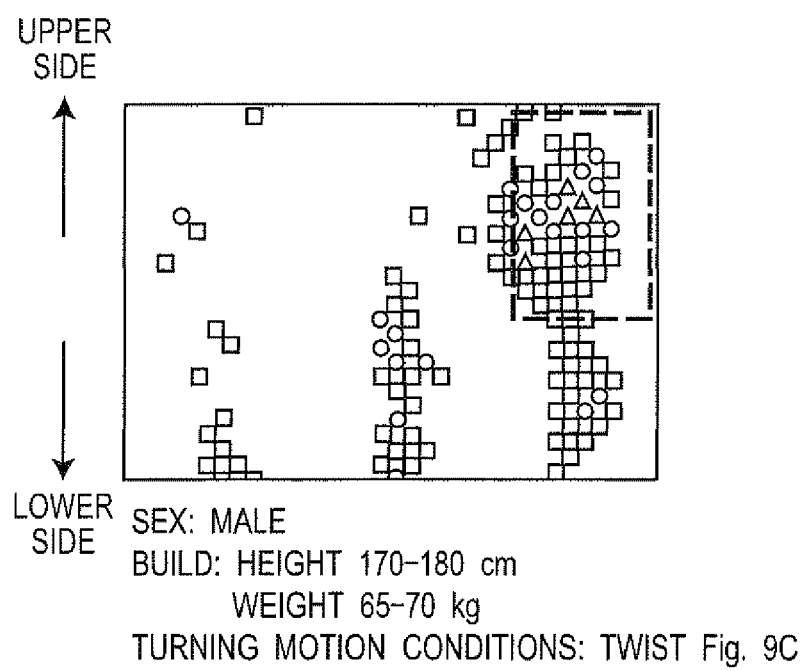
FIG. 4I is a pressure distribution view detected by the pressure sensors for a backrest when a rider rides in the vehicle of the first embodiment of the present invention or when making a motion.
Figure 4J:
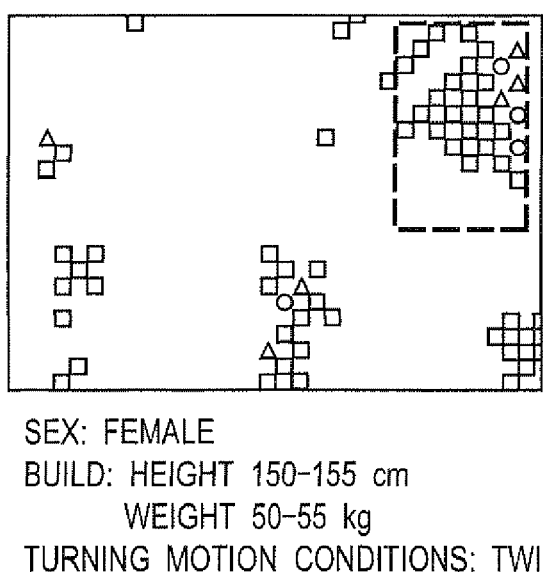
FIG. 4J is a pressure distribution view detected by the pressure sensors for a backrest when a rider rides in the vehicle of the first embodiment of the present invention or when making a motion.
Figure 9A:
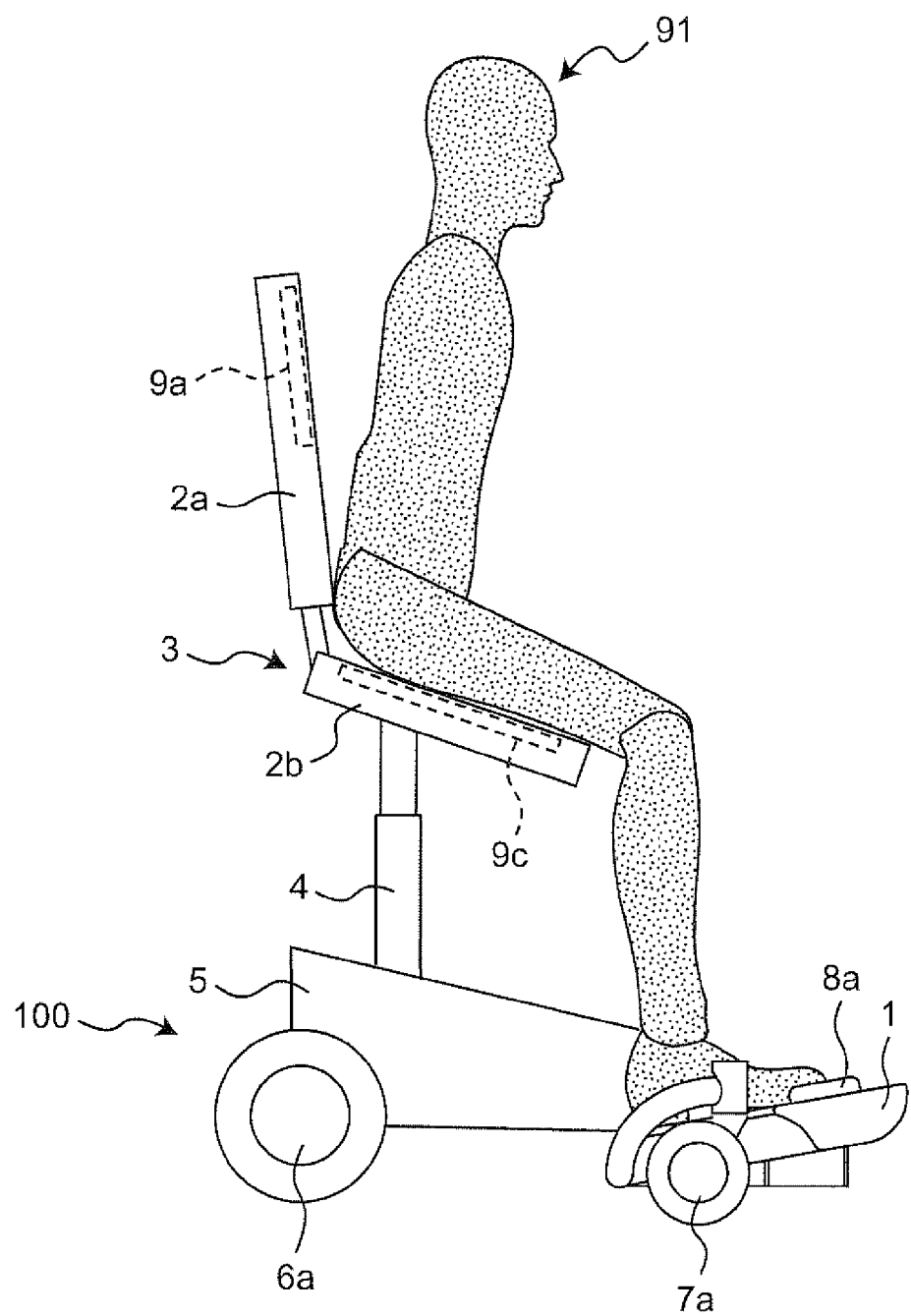
FIG. 9A is an image view of a riding posture of a rider in the first embodiment of the present invention.
Figure 9B:
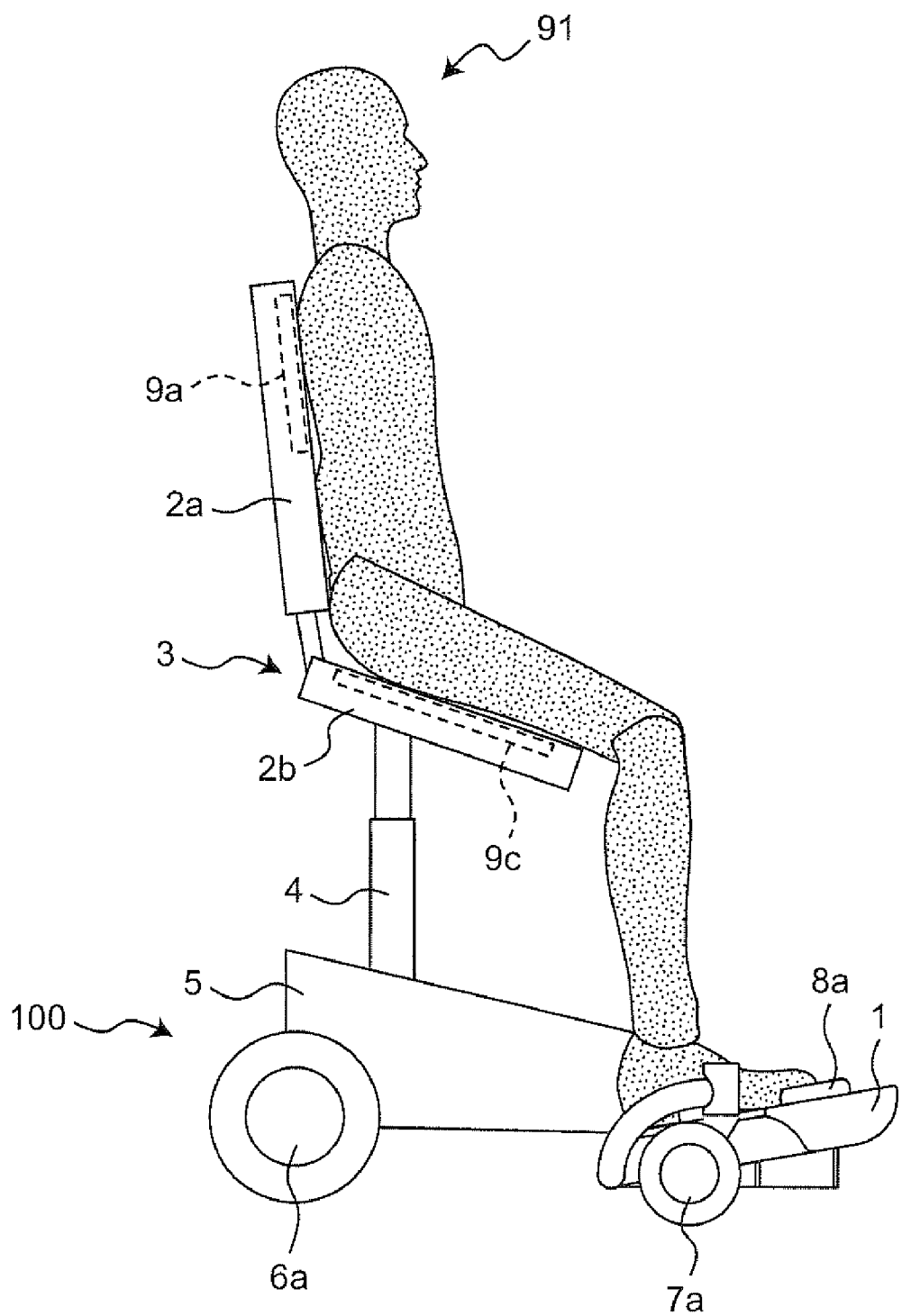
FIG. 9B is an image view of a riding posture of the rider in the first embodiment of the present invention.

FIGS. 4A to 4E are views respectively showing pressure distributions which are detected by the pressure sensor sheets for the backrest 9a and 9b when five riders ride in the standing position riding type vehicle 100. FIGS. 4A, 4B, and 4E are for females and FIGS. 4C and 4D are for males. Though there is a difference in pressure distribution between males and females, even with the same gender, the pressure distribution varies between the cases of FIGS. 4A and 4B where it is presumed that the riders are seated without leaning against the backrest 2a and the cases of FIGS. 4C to 4E where the riders lean their weights against the backrest 2a. Even if the riders lean their weights against the backrest 2a, in the same way, the pressure distribution varies by the degree of weight leaned. Thus, it can be seen, that the pressure distribution conditions vary by the postural habit of the rider 91. Namely, the postural habit of the rider 91 as used herein refers to that each individual rider 91 has a posture unique thereto and the pressure distribution conditions vary by the posture of the rider 91. FIGS. 9A and 9B show image views of seating postures. FIG. 9A is an image view showing that the rider 91 is seated not much leaning against the backrest 2a, and FIG. 9B is an image view showing that the rider 91 is seated in a posture where she or he leans against the backrest 2a while being seated in the seat portion 2b.

Figure 9C:
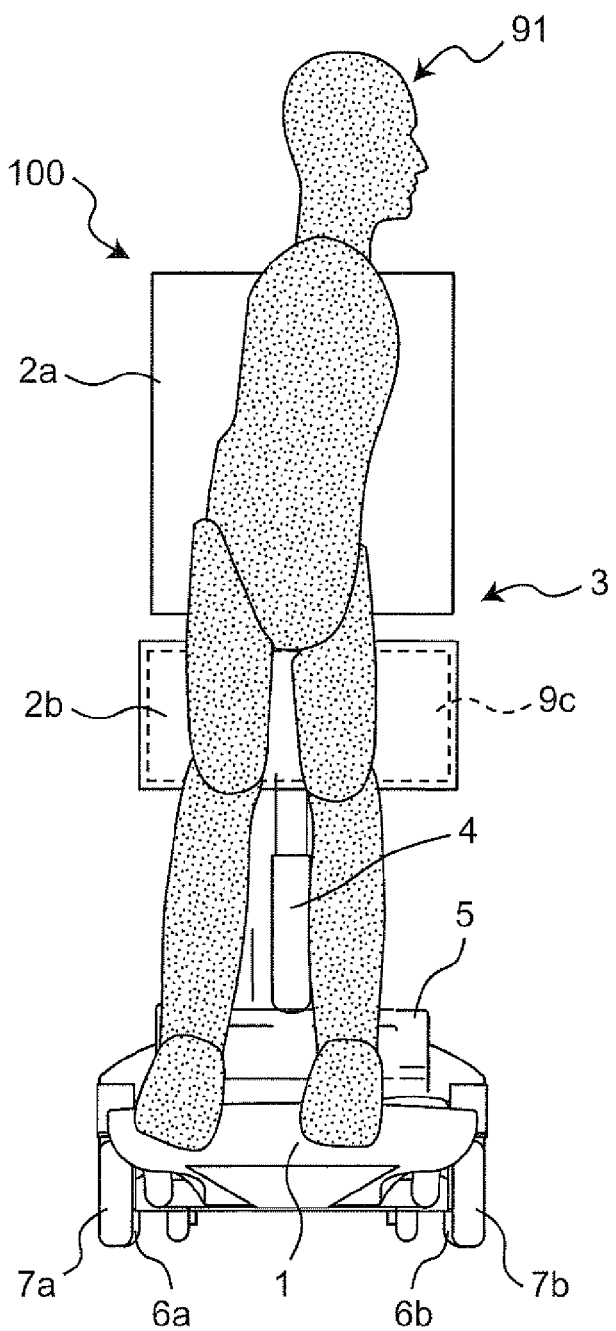
FIG. 9C is a view showing an image of a rider's posture when there is a turn intention in the first embodiment of the present invention.
Figure 9D:
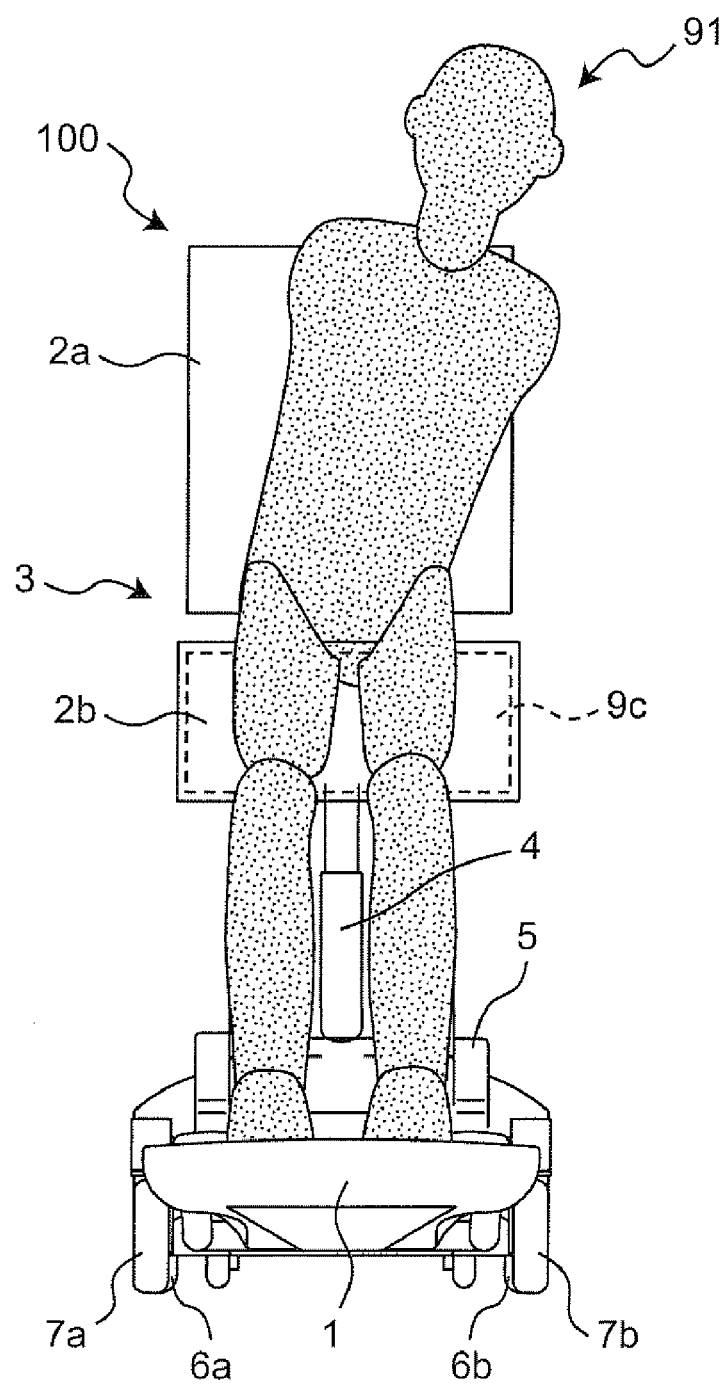
FIG. 9D is an image view of a rider's posture when there is a turn intention in the first embodiment of the present invention.

FIGS. 4F to 4J are views showing pressure distributions of the pressure sensor sheets for the backrest 9a and 9b for the case of urging the foregoing five riders 91 to make a left turn. While in FIGS. 4G, 4I, and 4J the foregoing three riders 91 show the intention of making a turn by twisting their bodies to the right, in FIGS. 4F and 4H the foregoing two riders 91 show the intention of making a turn by leaning their bodies to the right without twisting their bodies. The respective turning postures are shown in FIGS. 9C and 9D. The pressure distribution varies greatly by the difference in turning posture between the riders 91, in addition to individual differences in pressure distribution when riding. However, pressure is applied by all of the riders 91 in the same manner to the backrest upper left portions indicated by dashed lines in FIGS. 4F to 4J (dashed-line rectangular areas shown at the upper right in FIGS. 4F to 4J). As such, according to FIGS. 4A to 4J, it can be seen that pressure is applied intensively to the backrest upper left portion, independent of the difference in individual body shape or turning posture. It has been found that the case of a right turn has the same tendency and pressure is applied intensively to the backrest upper right portion.

Figure 4K:
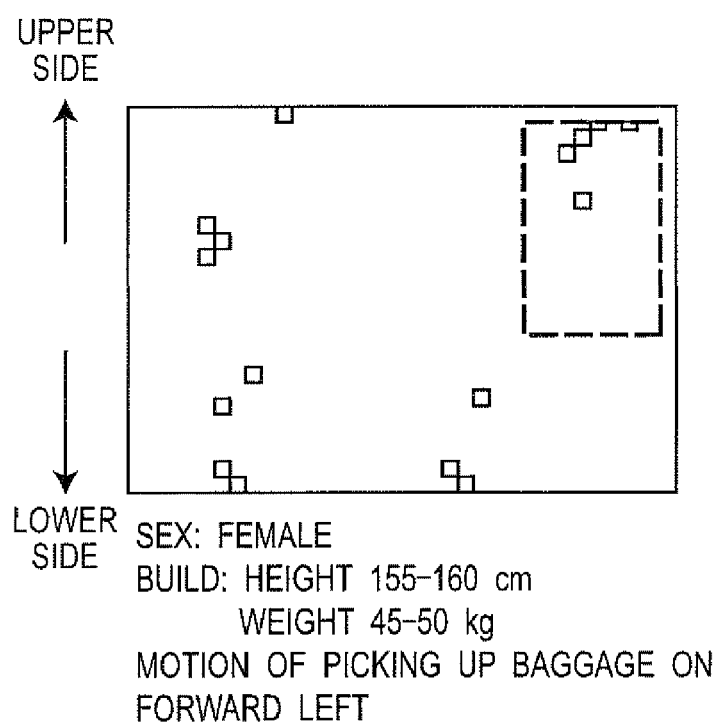
FIG. 4K is a pressure distribution view detected by the pressure sensors for a backrest when a rider rides in the vehicle of the first embodiment of the present invention or when making a motion.
Figure 4L:
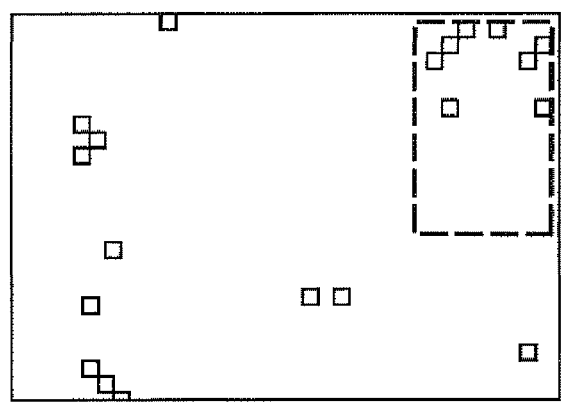
FIG. 4L is a pressure distribution view detected by the pressure sensors for a backrest when a rider rides in the vehicle of the first embodiment of the present invention or when making a motion.
Figure 4M:
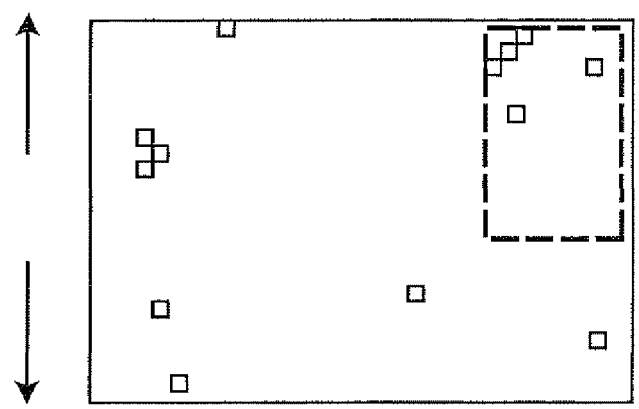
FIG. 4M is a pressure distribution view detected by the pressure sensors for a backrest when a rider rides in the vehicle of the first embodiment of the present invention or when making a motion.
Figure 4N:
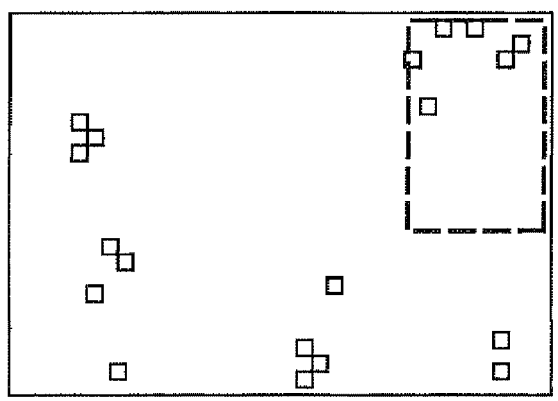
FIG. 4N is a pressure distribution view detected by the pressure sensors for a backrest when a rider rides in the vehicle of the first embodiment of the present invention or when making a motion.
Figure 4O:
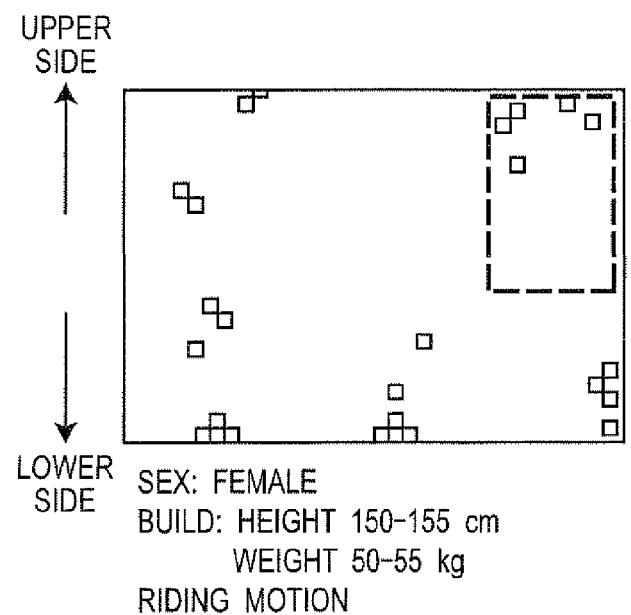
FIG. 4O is a pressure distribution view detected by the pressure sensors for a backrest when a rider rides in the vehicle of the first embodiment of the present invention or when making a motion.
Figure 4P:
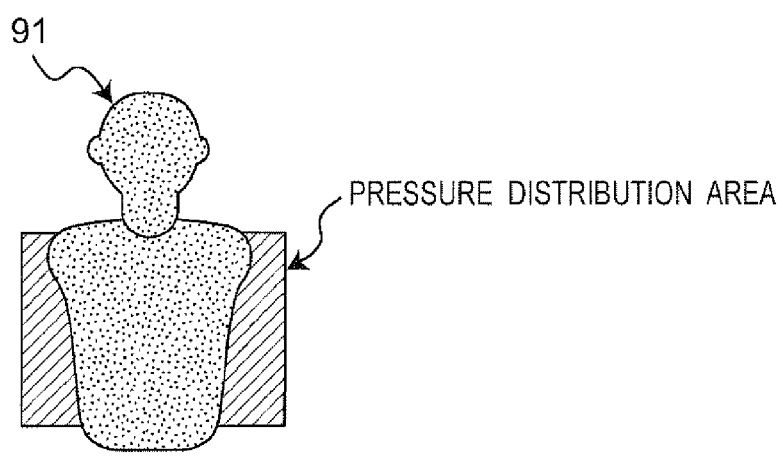
FIG. 4P is a view describing a range of a pressure distribution detected by the pressure sensors for a backrest when the riders ride in the vehicle of the first embodiment of the present invention or when making a motion.

FIGS. 4K to 4O show examples of pressure distribution for the case in which there is no left or right turn intention of the riders 91. FIGS. 4K and 4L are views showing pressure distributions of the backrest 2a for the case in which the riders 91 make a motion to pick up baggage in the left front of the riders 91 while the riders 91 are riding in the standing position riding type vehicle 100. FIGS. 4M and 4N are views showing pressure distributions of the backrest 2a obtained when the riders 91 extend their hands to the center-left for a doorknob to open and close a door on the forward left side of the riders 91 while the riders 91 are riding in the standing position riding type vehicle 100. FIG. 4O is a view showing a pressure distribution obtained when the rider 91 rides in the standing position riding type vehicle 100. In the changes in these activity postures, almost no pressure is applied to the backrest upper left portion and thus it is considered that by utilizing the pressure value of the backrest upper left portion, a distinction can be made between the case in which the posture is changed with the intention of making a turn and the case with no intention of making a turn.

As is also clear from these results, the backrest upper left portion satisfies the above-described three conditions (1) to (3) which are beneficial to determine a left turn intention.

FIG. 5 is a block diagram of a control process performed by the vehicle 100 of the first embodiment.

An on/off output signal from the foot switch for forward motion 8a or the foot switch for backward motion 8b is inputted to the PC 11 and is converted, by the forward and backward motion control determining unit 101 included in the PC 11, into voltage values for motors for driving the left and right wheels. For example, voltage conversion performed by the forward and backward motion control determining unit 101 follows a table in FIG. 6. The contents of the table are stored in an internal storage unit of the forward and backward motion control determining unit 101. According to the table, specifications are such that the motors 15a and 15b receive voltage values from 0 V to 5 V. The forward and backward motion control determining unit 101 determines that the motors 15a and 15b rotate in a forward motion direction when the motors 15a and 15b receive a voltage value of 2.5 V or more. The forward and backward motion control determining unit 101 determines that the motors 15a and 15b rotate in a backward motion direction when the motors 15a and 15b receive a voltage value less than 2.5 V. The forward and backward motion control determining unit 101 determines that the motors 15a and 15b stop rotation when the motors 15a and 15b receive a voltage value of 2.5 V. An example of the case in which the forward and backward motion control determining unit 101 is designed to make such determination is shown in the table in FIG. 6. For safety, specifications are such that the forward and backward motion control determining unit 101 determines to stop rotation when both of the switches 8a and 8b are simultaneously turned on.

Outputs from the respective piezoelectric elements of the pressure sensor sheets 9a, 9b, and 9c are inputted to the personal computer 11 via the sensor controller 10, and the operational intention determining unit 102 and the left/right turn intention determining unit 103 in the PC 11 determine whether there is an operational intention and whether there is a left or right turn intention independently of each other.

Figure 7:
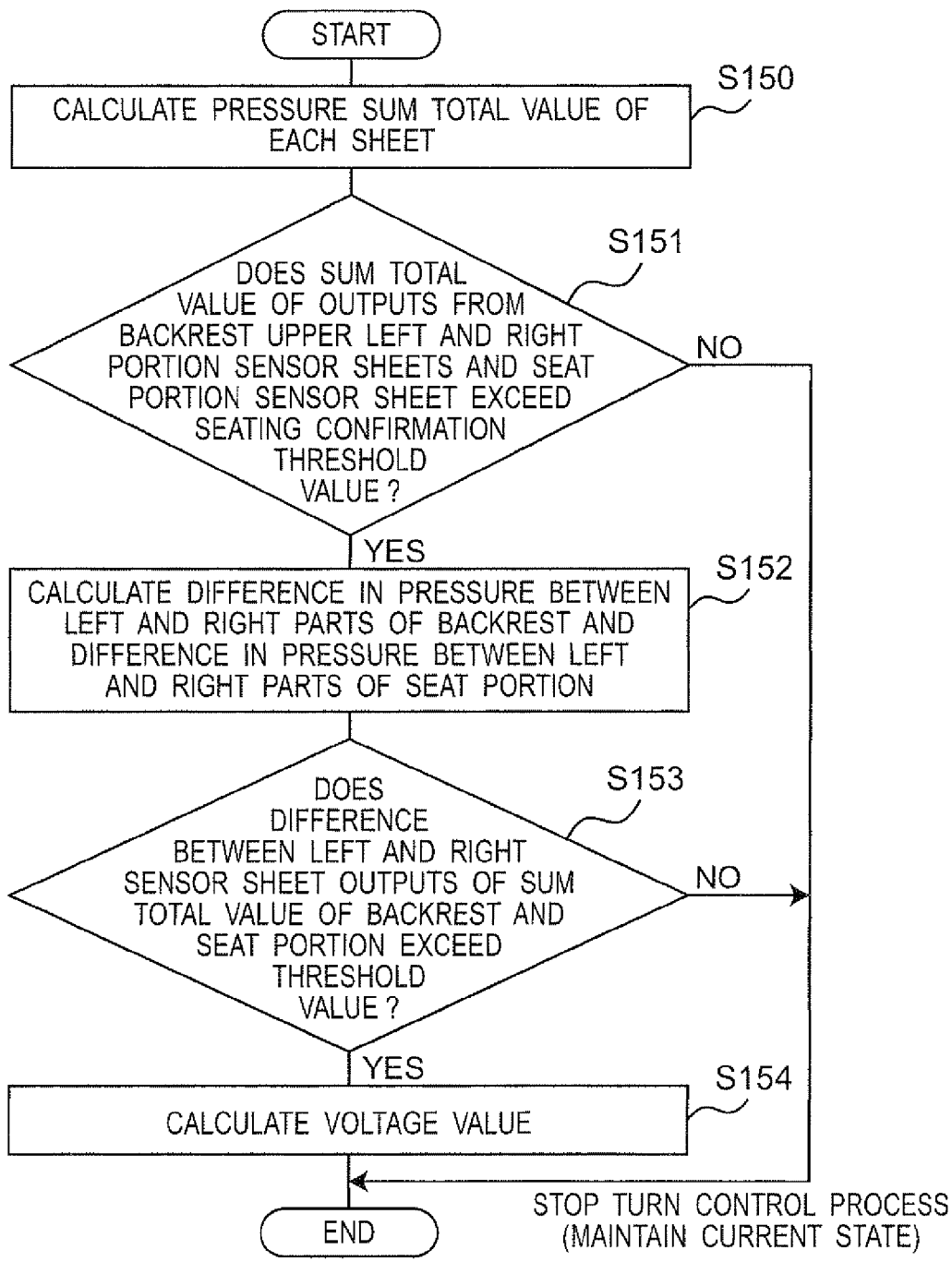
FIG. 7 is a flowchart of an intention determination process of the vehicle of the first embodiment of the present invention.

FIG. 7 shows a detailed intention determination flow.

First, at step S150, a sum total value of the pressure values of piezoelectric elements of the pressure sensor sheets 9a, 9b, and 9c is calculated by the sensor controller 10 for each of the pressure sensor sheets 9a, 9b, and 9c.

In the following, the pressure sum total values of the respective pressure sensor sheets 9a, 9b, and 9c each are a sum total value of pressure in an area where each sensor sheet indicates pressure equal to or beyond a certain value, and are referred to as a "backrest upper right pressure sum total value", a "backrest upper left pressure sum total value", and a "seat portion pressure sum total value". In addition, for the backrest 2a, a value obtained by adding up the backrest upper right pressure sum total value and the backrest upper left pressure sum total value is referred to as a "backrest pressure sum total value". Furthermore, for the seat portion 2b, a sum total value of piezoelectric elements on the right half side from the center of the seat portion 2b (hereinafter, referred to as a "seat portion right side pressure sum total value") and a sum total value of piezoelectric elements on the left half side (hereinafter, referred to as a "seat portion left side pressure sum total value") are separately calculated by the sensor controller 10. Furthermore, the sensor controller 10 calculates a sum total value of the backrest pressure sum total value and the seat portion pressure sum total value.

Next, at step S151, the operational intention determining unit 102 determines whether the sum total value of the backrest pressure sum total value and the seat portion pressure sum total value which is outputted from the sensor controller 10 exceeds a seating confirmation threshold value which is preset in the operational intention determining unit 102. Only when the operational intention determining unit 102 determines that the sum total value of the backrest pressure sum total value and the seat portion pressure sum total value exceeds the seating confirmation threshold value, the operational intention determining unit 102 determines that there is an operational intention and thus proceeds to step S152.

The seating confirmation threshold value at this time is set so as not to be below a sum total value of a backrest pressure sum total value and a seat portion pressure sum total value which is obtained when the rider 91 rides in the vehicle 100 and takes a posture to perform operation. If the seating confirmation threshold value is not set to a value greater than a pressure value that is obtained when the rider 91 pushes the backrest 2a or the seat portion 2b with his/her one hand without the rider 91 riding in the seat 3, then there is a risk that when the rider 91 just pushes the seat portion 2b with his/her one hand, the operational intention determining unit 102 may erroneously determine that the rider 91 is seated.

Accordingly, for example, experimentally, assuming that the backrest 2a has 7×10 piezoelectric elements on each side and the seat portion 2b has 20×10 piezoelectric elements and each piezoelectric element indicates a pressure value in levels 1 to 5, it is appropriate to set the seating confirmation threshold value for the seat portion 2b to 200 which represents that one-half side of the seat portion 2b has a pressure value of 2.

In addition, for the seating confirmation threshold value, a fixed value may be used, but when the vehicle 100 is used for the first time, a sum total value of a backrest pressure sum total value and a seat portion pressure sum total value of output actual measured values from the sensor sheets 9a, 9b, and 9c for when the rider 91 rides in the vehicle 100 for the first time may be recorded in the operational intention determining unit 102 and a value obtained by multiplying the sum total value of the output actual measured values by 0.5 to 0.7 may be set as the seating confirmation threshold value.

If the operational intention determining unit 102 determines at step S151 that the sum total value of the backrest pressure sum total value and the seat portion pressure sum total value is less than or equal to the seating confirmation threshold value, then the operational intention determining unit 102 determines that there is no operational intention and thus, stops the determination process and a control process subsequent thereto, and the vehicle 100 continues the current operation (maintains the current state). Although in a condition for the above-described intention determination, determination is made such that the operational intention determining unit 102 determines whether a sum total value exceeds a preset threshold value, seating confirmation threshold values for a backrest upper right pressure sum total value, a backrest upper left pressure sum total value, a seat portion right side pressure sum total value, and a seat portion left side pressure sum total value may be individually set by the operational intention determining unit 102, and when the operational intention determining unit 102 determines that sum total values located left-right symmetrically both exceed their respective seating confirmation threshold values, the operational intention determining unit 102 may determine that there is an operational intention. At this time, only when the rider 91 rides in the center of the seat 3 without leaning extremely to the right or left side, the operational intention determining unit 102 determines that there is an operational intention and thus a safer vehicle 100 and a control method therefor can be provided.

Then, at step S152, the turn intention determining unit 103 calculates the absolute value of the difference between the backrest upper right pressure sum total value and the backrest upper left pressure sum total value (the difference in pressure between the backrest left and right) and the absolute value of the difference between the seat portion right side pressure sum total value and the seat portion left side pressure sum total value (the difference in pressure between the seat portion left and right).

Subsequently, if the turn intention determining unit 103 determines at step S153 that the absolute value of a sum total value of the differences calculated by the turn intention determining unit 103 exceeds a left-right pressure difference threshold value which is preset in the turn intention determining unit 103, then the turn intention determining unit 103 determines that there is a turn intention. For example, when the seating confirmation threshold, value is set to the above-described 200, assuming that the turn intention determining unit 103 determines that there is a turn intention when the turn intention determining unit 103 determines that 50 which is one-half of 100, one side, or more is shifted to the opposite side by a turn intention (e.g., the right side has 150 and the left side has 50), the left-right pressure difference threshold value is set to 100 which is twice as large as 50.

If the turn intention determining unit 103 determines at this step S153 that the sum total value of the differences is a positive value and the absolute value the sum total value exceeds the left-right pressure difference threshold value, then the turn intention determining unit 103 determines that it is a right turn. If the turn intention determining unit 103 determines that the sum total value of the differences is a negative value and the absolute value of the sum total value exceeds the left-right pressure difference threshold value, then the turn intention determining unit 103 determines that it is a left turn. Since the rider 91 is not always seated in the seat 3 left-right symmetrically, the left-right pressure difference threshold value at this time needs to be set to a value greater than the absolute value of the difference in pressure between left and right which is obtained when the rider 91 is seated in the seat 3 leaning to the right or left. For example, experimentally, it is appropriate to set, as the left-right pressure difference threshold value, a value obtained by multiplying a maximum value of the absolute values of differences in pressure between left and right which are obtained when having a plurality of persons sit in advance by a factor of 1.2.

If the turn intention determining unit 103 considers in the process at step S153 that there is a left or right turn intention, then in a process at step S154 the left/right turn control determining unit 104 performs conversion into voltage additional values for motors driving the left and right wheels, based on the determined result. In the conversion at this time, when the turning direction is determined to be left or right, voltage additional values are uniquely determined by the left/right turn control determining unit 104. For example, according to the table in FIG. 8, if the turn is determined to be a right turn, then setting is performed to add −0.5 V to the motor for the right wheel 15a and +0.5 V to the motor for the left wheel 15b. Then, at the same step S154, the voltage value converting unit 105 sets, as voltage values for driving the left and right motors, values obtained by adding the voltage additional values for the left and right which are calculated by the left/right turn control determining unit 104 to the voltage values of the right and left drive wheels 6a and 6b which are calculated by the forward and backward motion control determining unit 101. The motor controller 14 converts the voltage values into rotation speeds, whereby the motors for the left and right wheels 15h and 15a are driven.

According to the configuration of the first embodiment, a safe riding type vehicle 100 or a safe method of controlling a riding type vehicle can be provided in which even if a large postural change occurs as a result of the intention of performing motion other than operation, the vehicle 100 does not erroneously make a left or right turn or perform a movement operation. Furthermore, a riding type vehicle and a method of controlling a riding type vehicle can be provided in which by identifying the disposition positions of the pressure sensor sheets 9a and 9b of the backrest 2a to be near positions with which the left and right shoulder blades 50a and 50b of the rider 91 come into contact, even if the seating posture varies by the habit of the rider 91, when the rider 91 makes a great change in his/her posture to the left or right without the intention of performing operation, the vehicle 100 does not erroneously make a left or right turn or perform a movement operation and an intention determination can be stably made.

Second Embodiment

In a riding type vehicle and a method of controlling a riding type vehicle according to a second embodiment of the present invention, a pressure sensor sheet for a backrest lower central portion (an example of a pressure sensor) 9d which functions as an example of a posture sensor for a backrest lower central portion is additionally disposed in a lower central portion of a backrest 2a, whereby a postural change with a turn operation intention and postural changes caused by other activities can be more accurately identified over the first embodiment.

Specifically, in the first embodiment, stable operation can be performed by postural change in both of the case in which a rider 91 sits back in a seat portion 2b and the case in which the rider 91 sits on the edge of the seat portion 2b while leaning against the backrest 2a; however, the former case in which the rider 91 sits back gives the rider 91a greater sense of security in actual operation while moving. When it is premised that the rider sits back, according to a riding type vehicle and a method of controlling a riding type vehicle shown in the second embodiment of the present invention, a postural change with a turn operation intention and postural changes caused by other activities can be more accurately identified over the first embodiment.

Figure 10:
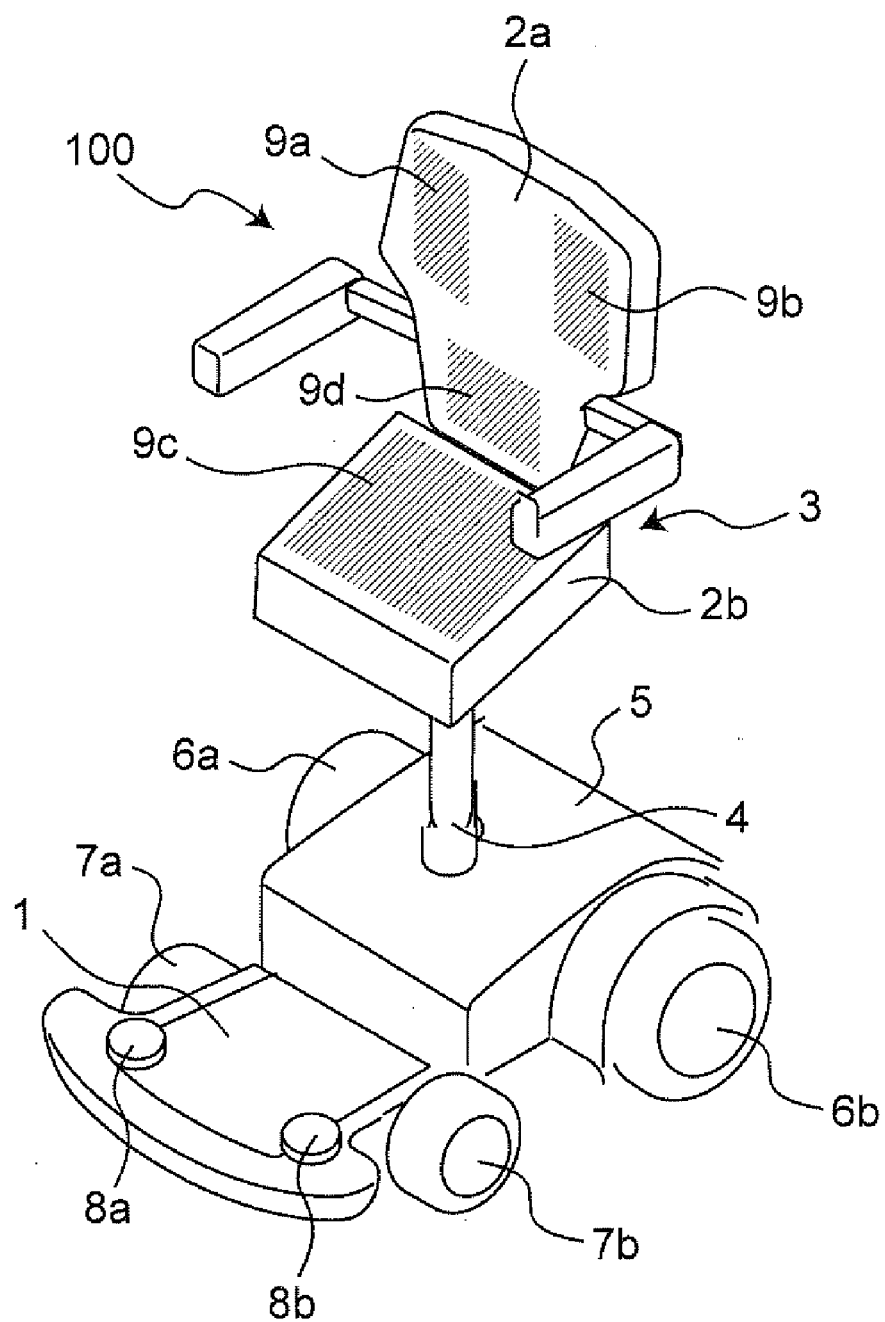
FIG. 10 is an external view of a vehicle of a second embodiment of the present invention.
Figure 11:
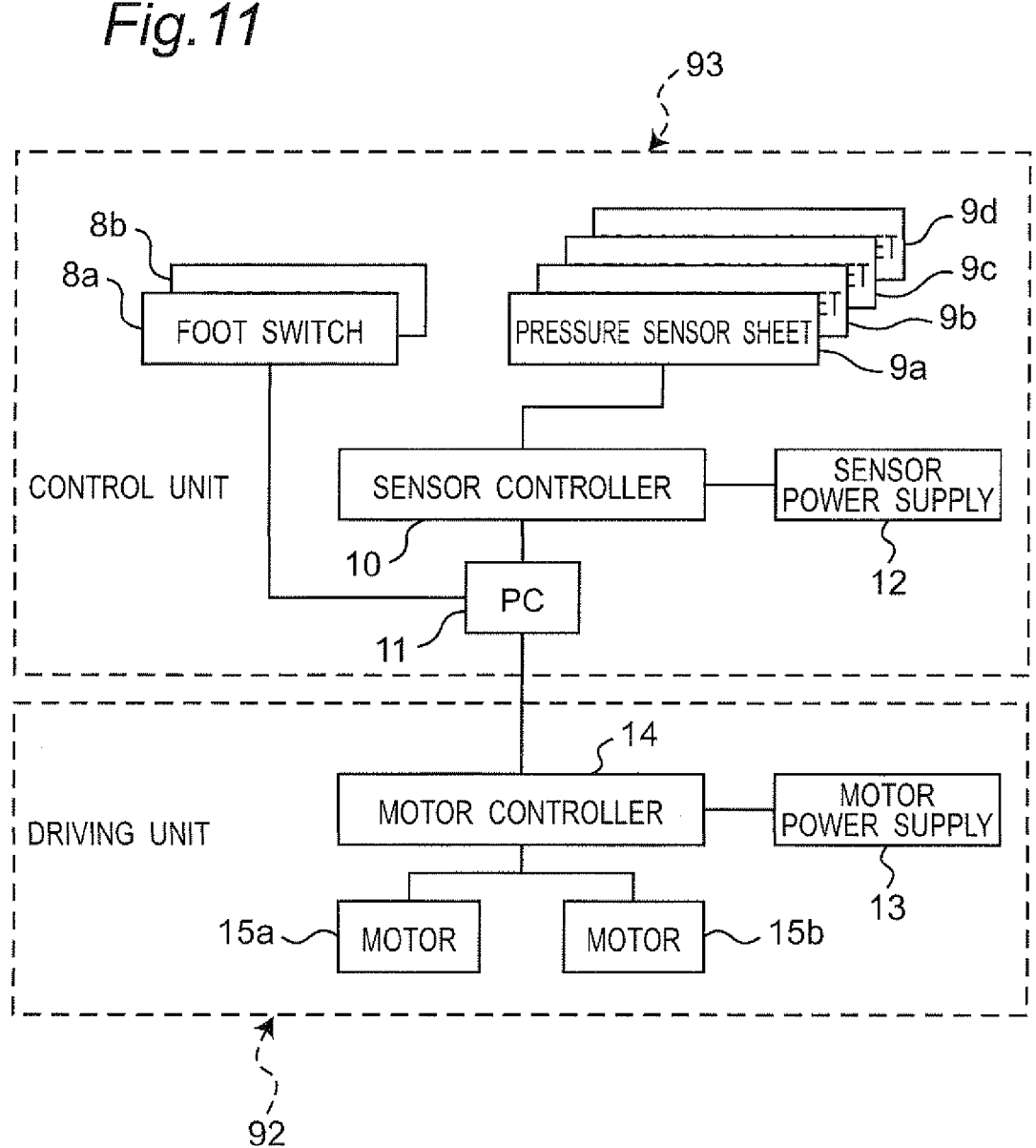
FIG. 11 is a block diagram of a hardware configuration of the vehicle of the second embodiment of the present invention.

FIGS. 10 and 11 are an external view and a block diagram of a hardware configuration of a vehicle of the second embodiment of the present invention. The hardware configuration is the same as that shown in FIGS. 1 and 2 except that the pressure sensor sheet for a backrest lower central portion 9d is additionally disposed in the lower central portion of the backrest 2a in the external view and block diagram of the hardware configuration in FIGS. 1 and 2 which are described in the first embodiment.

Figure 12A:
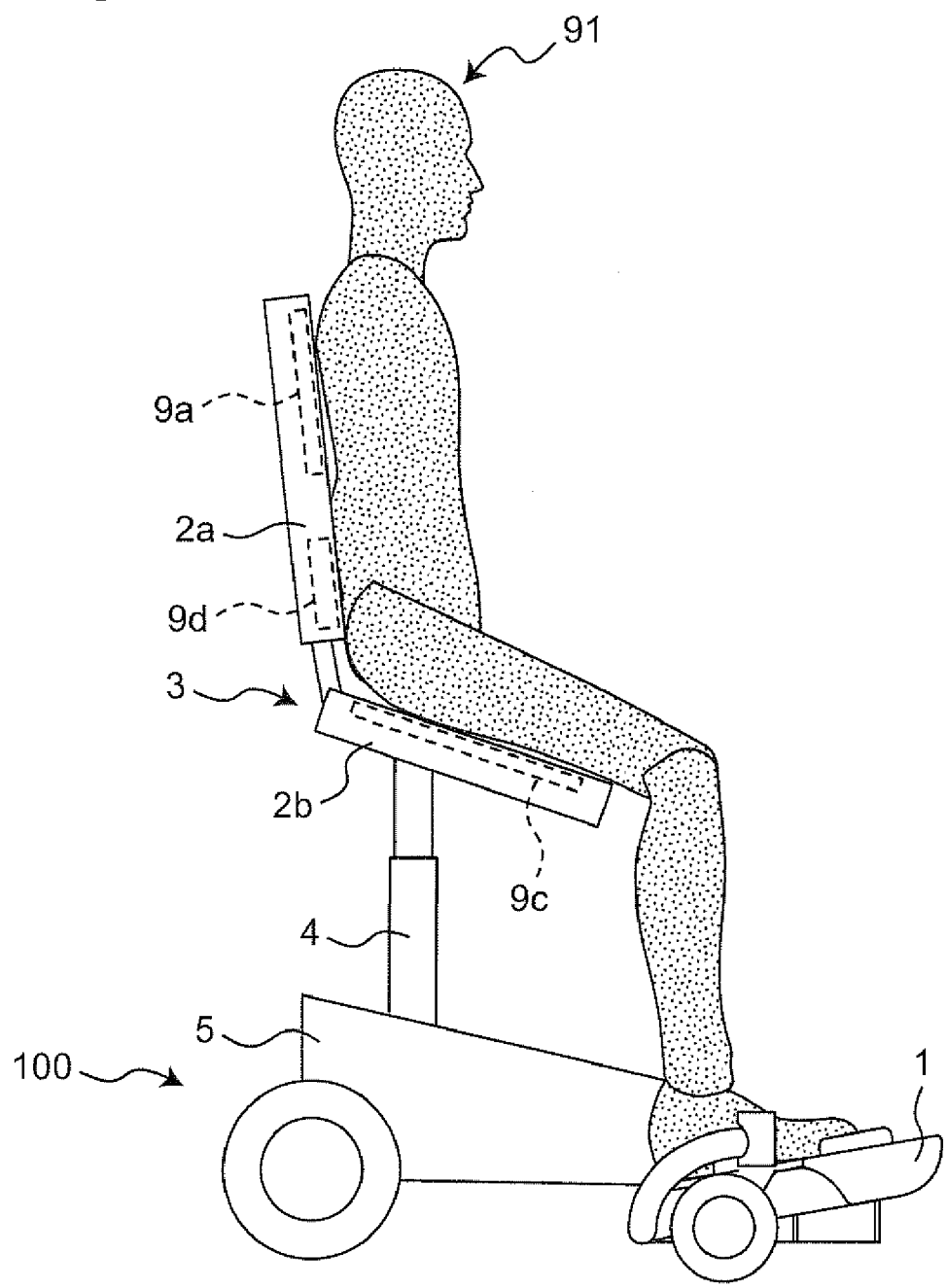
FIG. 12A is a side view of the vehicle showing disposition of posture sensors of the vehicle of the second embodiment of the present invention.
Figure 12B:
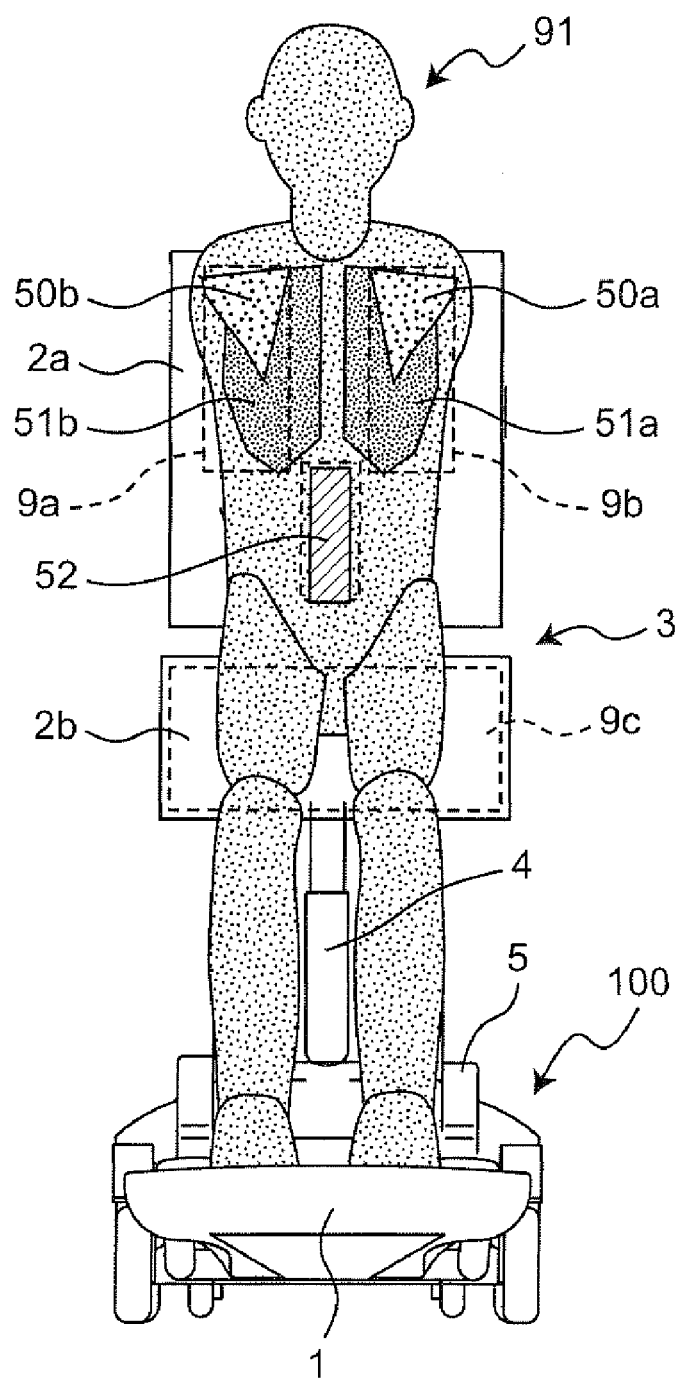
FIG. 12B is a front view of the vehicle showing disposition of the posture sensors of the vehicle of the second embodiment of the present invention.

FIGS. 12A and 12B show the positions of pressure sensor sheets 9a, 9b, 9c, and 9d in the second embodiment.

The pressure sensor sheet for the sheet portion 9c with which the gluteal region of the rider 91 can come into contact is disposed in part or all of the surface of the seat portion 2b. In addition, the backrest 2a has the pressure sensor sheets 9a and 9b disposed at two locations, backrest upper left and right portions, which are positions with which a part of each of portions on the back side of the ribs 51a and 51b present within the width of left and right shoulder blades 50a and 50b of the rider 91 comes into contact. Furthermore, the pressure sensor sheet 9d which is the same as other pressure sensor sheets is disposed in a lower central portion 52 which is a location where the lumbar vertebrae of the rider 91 are located, as a pressure sensor sheet for the backrest lower central portion. For example, the sheet size of the pressure sensor sheets 9a and 9b for the backrest upper left and right portions is the same as that described in the first embodiment, and the sheet size of the pressure sensor sheet 9d for the backrest lower central portion has a width of 3 to 5 cm in a left-right direction and a height of 15 to 20 cm, with a portion of the backrest 2a of 35 cm to 40 cm from a upper portion of the backrest 2a being the upper center. A single sheet sensor may be used provided that the sheet sensor covers positions with which the two locations, the upper left and right portions 50a and 50b, and the lower central portion 52 come into contact, and thus the sheets can be any in number. For the configuration of the pressure sensor sheet for the backrest lower central portion 9d, for example, a sheet having piezoelectric pressure-sensitive elements (piezoelectric elements) arranged in a matrix is used.

The fact that the two locations, the backrest upper left and right portions, are suitable as the positions of sensor sheets for determining whether there is a left or right turn intention is described in the first embodiment. FIG. 12 shows experimental results suggesting that the pressure sensor sheet for the backrest lower central portion 9d disposed in the lower central portion 52 which is a location where the lumbar vertebrae are located is suitable for determining whether there is an operational intention.

To determine whether there is an operational intention, there is a need to dispose a sensor sheet in a position that satisfies the following conditions.

(4) The position with which the rider comes into contact in a situation in which there is an operational intention (a natural riding posture during movement); and (5) the position that can make a distinction even during riding between activities with no operational intention (getting in and out, opening and closing a door, activities during shopping, etc.) and the above-described situation in which there is an operational intention.

Figure 25A:
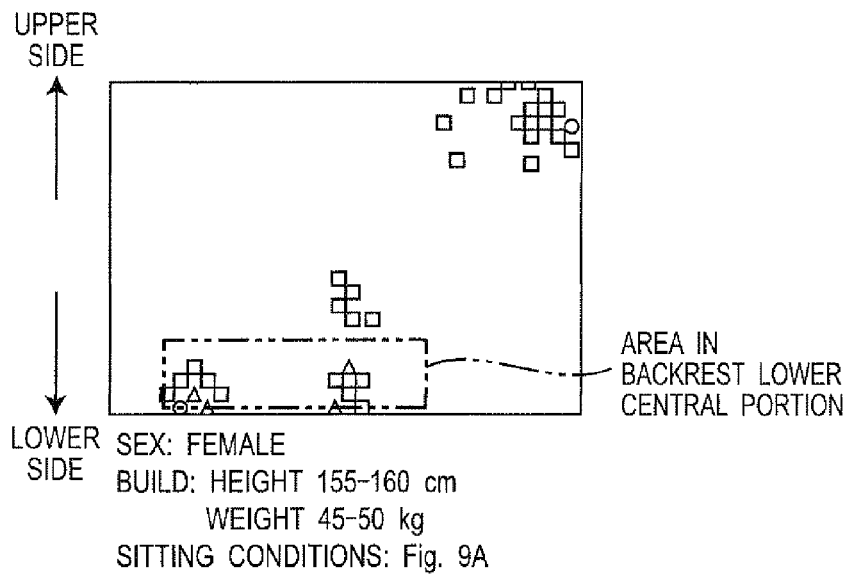
FIG. 25A is a pressure distribution view detected by pressure sensors for a backrest when a rider rides in the vehicle of the second embodiment of the present invention or when making a motion.
Figure 25B:
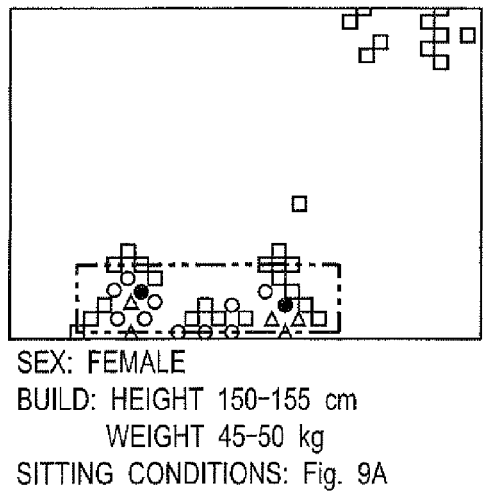
FIG. 25B is a pressure distribution view detected by the pressure sensors for a backrest when a rider rides in the vehicle of the second embodiment of the present invention or when making a motion.
Figure 25C:
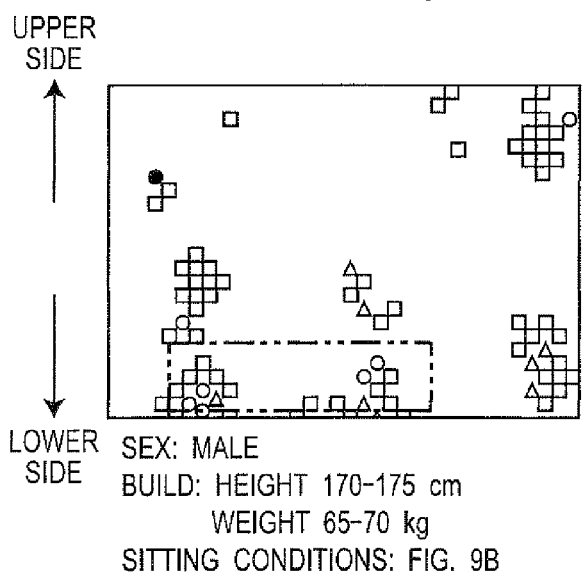
FIG. 25C is a pressure distribution view detected by the pressure sensors for a backrest when a rider rides in the vehicle of the second embodiment of the present invention or when making a motion.
Figure 25D:
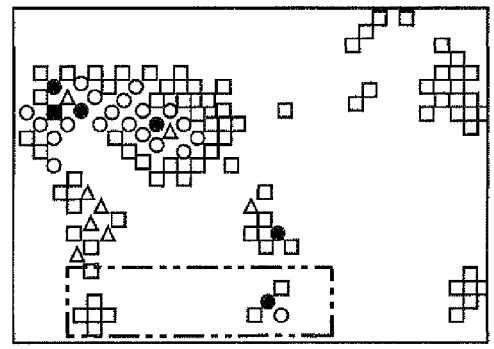
FIG. 25D is a pressure distribution view detected by the pressure sensors for a backrest when a rider rides in the vehicle of the second embodiment of the present invention or when making a motion.
Figure 25E:
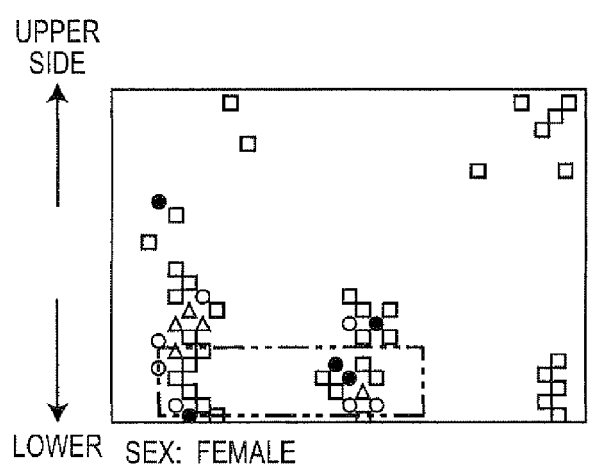
FIG. 25E is a pressure distribution view detected by the pressure sensors for a backrest when a rider rides in the vehicle of the second embodiment of the present invention or when making a motion.
Figure 25F:
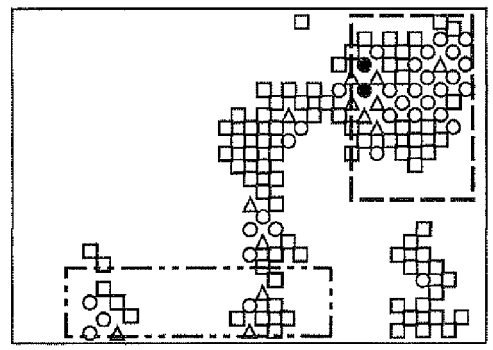
FIG. 25F is a pressure distribution view detected by the pressure sensors for a backrest when a rider rides in the vehicle of the second embodiment of the present invention or when making a motion.
Figure 25G:
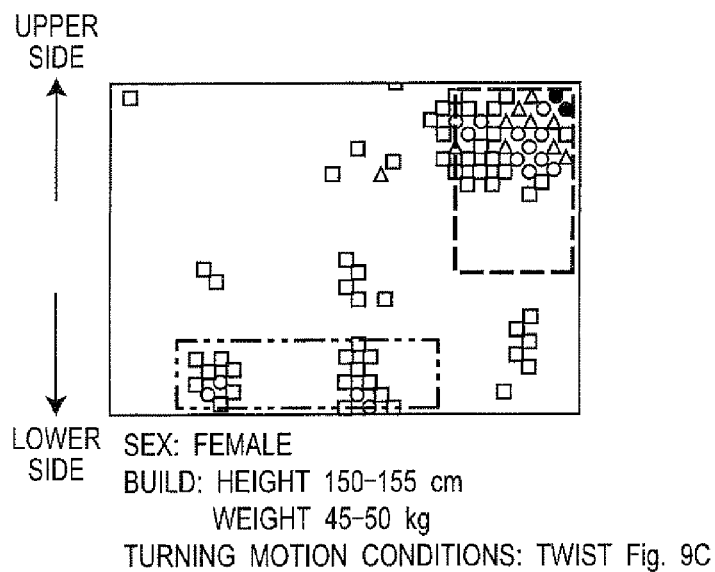
FIG. 25G is a pressure distribution view detected by the pressure sensors for a backrest when a rider rides in the vehicle of the second embodiment of the present invention or when making a motion.
Figure 25H:
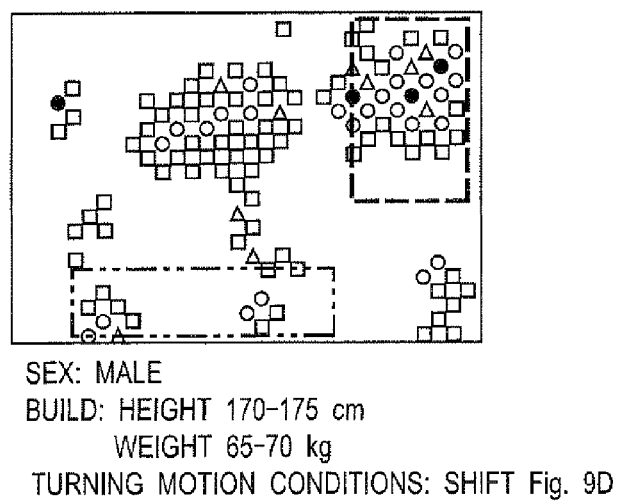
FIG. 25H is a pressure distribution view detected by the pressure sensors for a backrest when a rider rides in the vehicle of the second embodiment of the present invention or when making a motion.
Figure 25I:
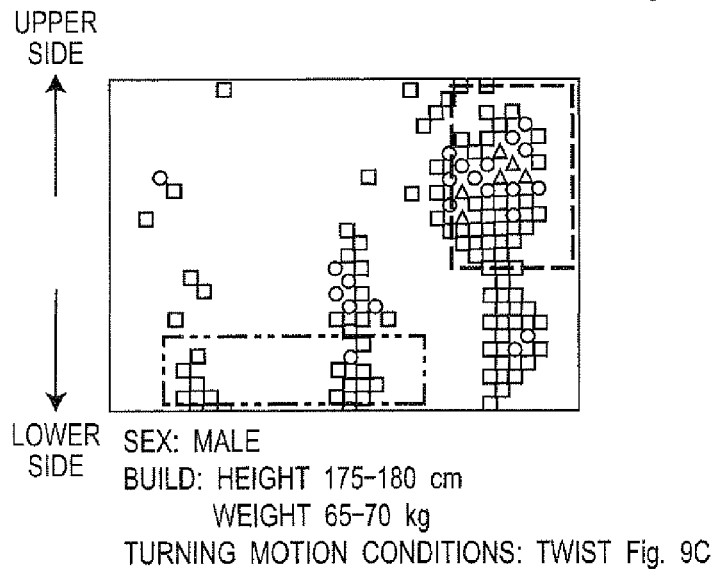
FIG. 25I is a pressure distribution view detected by the pressure sensors for a backrest when a rider rides in the vehicle of the second embodiment of the present invention or when making a motion.
Figure 25J:
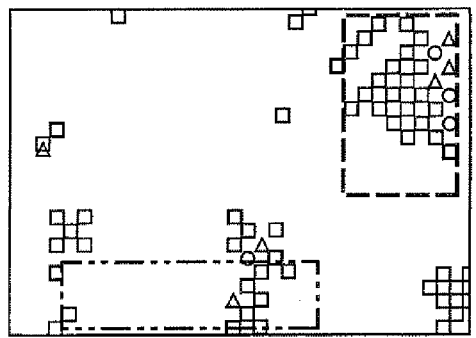
FIG. 25J is a pressure distribution view detected by the pressure sensors for a backrest when a rider rides in the vehicle of the second embodiment of the present invention or when making a motion.
Figure 25K:
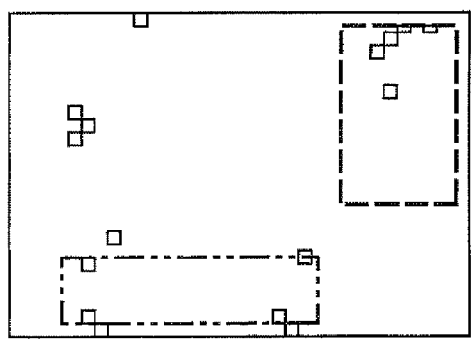
FIG. 25K is a pressure distribution view detected by the pressure sensors for a backrest when a rider rides in the vehicle of the second embodiment of the present invention or when making a motion.
Figure 25L:
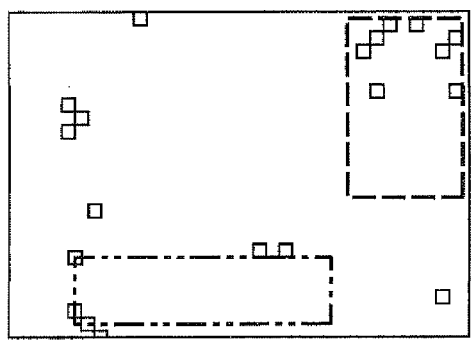
FIG. 25L is a pressure distribution view detected by the pressure sensors for a backrest when a rider rides in the vehicle of the second embodiment of the present invention or when making a motion.
Figure 25M:
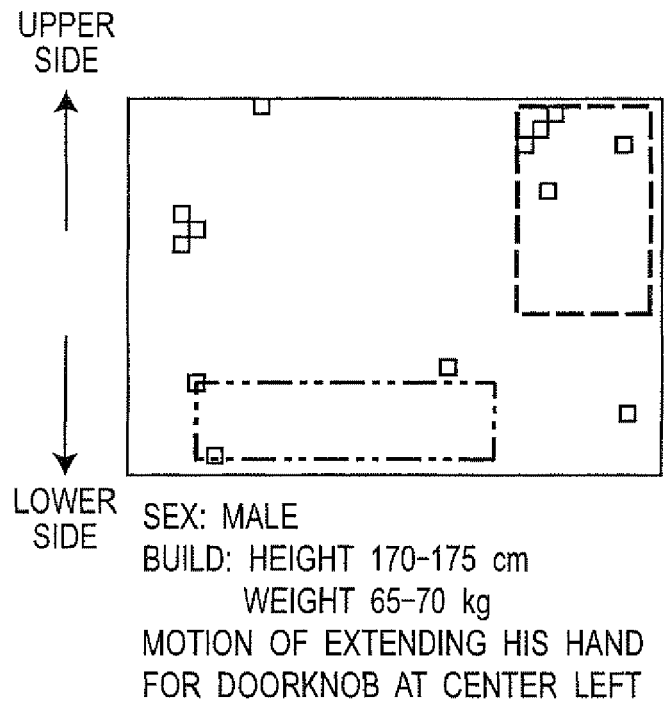
FIG. 25M is a pressure distribution view detected the pressure sensors for a backrest when a rider rides in the vehicle of the second embodiment of the present invention or when making a motion.
Figure 25N:
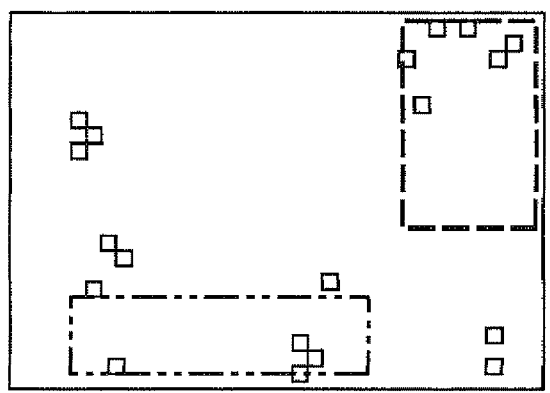
FIG. 25N is a pressure distribution view detected by the pressure sensors for a backrest when a rider rides in the vehicle of the second embodiment of the present invention or when making a motion.
Figure 25O:
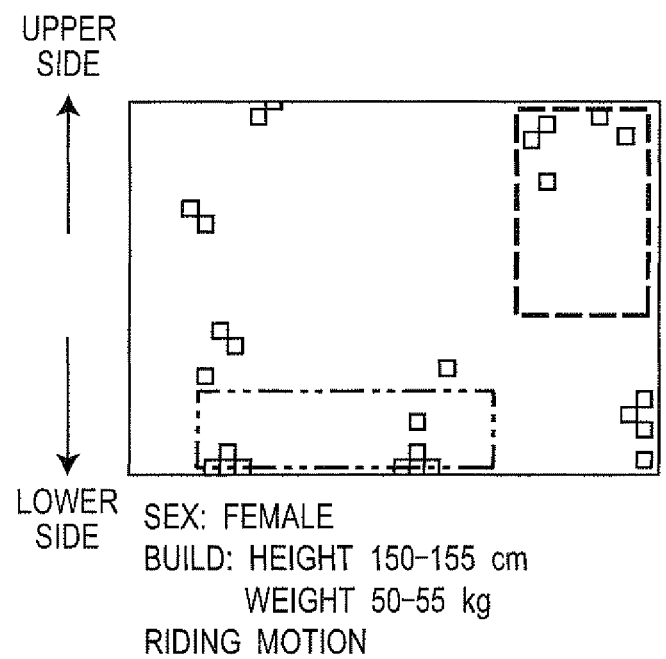
FIG. 25O is a pressure distribution view detected by the pressure sensors for a backrest when a rider rides in the vehicle of the second embodiment of the present invention or when making a motion.
Figure 25P:
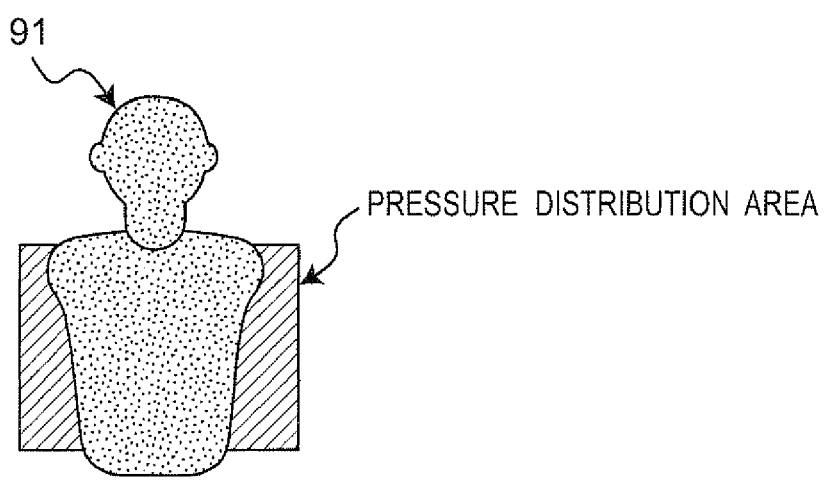
FIG. 25P is a view describing a range of a pressure distribution detected by the pressure sensors for a backrest when the riders ride in the vehicle of the second embodiment of the present invention or when making a motion.

FIGS. 25A to 25E are views respectively showing pressure distributions which are detected by the pressure sensor sheets for the backrest 9a and 9b and the pressure sensor sheet for the backrest lower central portion 9d when five riders ride in a standing position riding type vehicle 100. FIGS. 25A and 25B show that riders ride in the vehicle 100 not much leaning against the backrest 2a while being seated in the seat portion 2b, and FIGS. 25C to 25E show that riders ride in the vehicle 100 leaning against the backrest 2a while being seated in the seat portion 2b. As described in the first embodiment, they are as shown in the images in FIGS. 9A, 9B, and 25B. Therefore, in FIGS. 25A and 25B almost no pressure is applied to a portion of the backrest 2a from the middle to upper portions, but pressure is applied to the middle portion of the backrest 2a in FIGS. 25C to 25E and to the upper portion of the backrest 2a in FIG. 25D. However, it can be seen that in all of FIGS. 25A to 25E a pressure value equal to or beyond a certain value is observed in the backrest lower central portion (a dash-double-dotted rectangular area shown in the lower central portion).

Furthermore, in backrest pressure distributions for the case with a left turn intention shown in FIGS. 25F to 25J, too, likewise, it can be seen that in all of FIGS. 25F to 25J a pressure value equal to or beyond a certain value is observed in the backrest lower central portion.

On the other hand, in pressure distributions for various activities that do not involve a turn intention which are shown in FIGS. 25K to 25O, the posture leans forward for activities and thus a pressure distribution is not observed in the backrest 2a.

Therefore, the backrest lower central portion is a portion where a significant difference is made between the case with an operational intention and the case with no operational intention, and thus is considered to be a position suitable for determining whether there is an operational intention.

Figure 13:
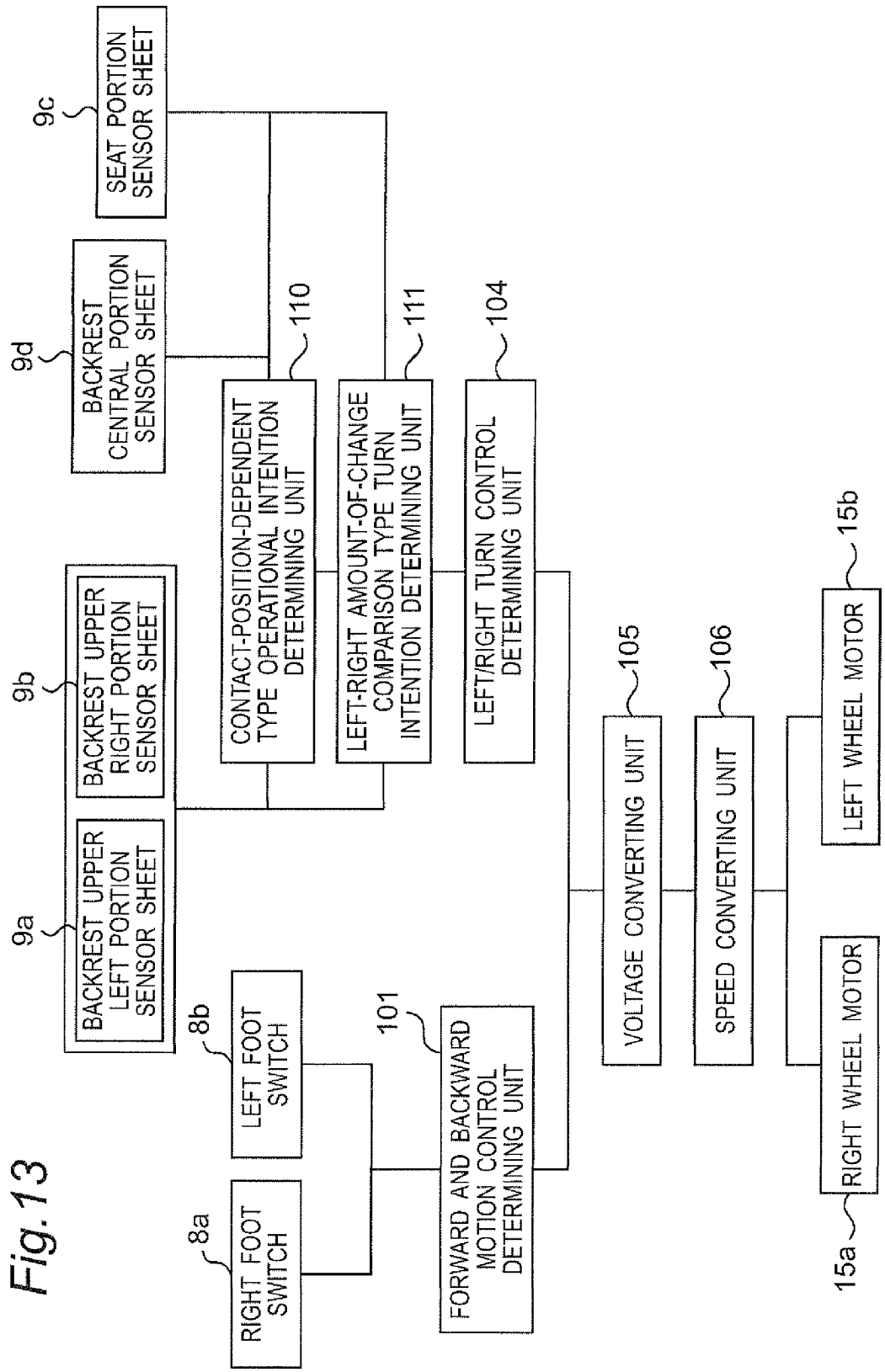
FIG. 13 is a configuration view of vehicle operation control by postural change in the second embodiment of the present invention.

FIG. 13 is a block diagram of a control process performed by the vehicle 100 in the second embodiment. The same configurations as those in FIG. 5 in the first embodiment also have the same operations and thus are denoted by the same reference numerals and description thereof is omitted.

An output from each piezoelectric element of the pressure sensor sheets 9a, 9b, 9c, and 9d set in four locations surrounded by dashed lines which are shown in FIGS. 12A and 12B is inputted to a personal computer 11 via a sensor controller 10, and a contact-position-dependent type operational intention determining unit 110 in the personal computer 11 performs posture analysis of the rider and estimation of a left or right turn operation intention taking into account the posture analysis, and furthermore, a left-right amount-of-change comparison type turn intention determining unit 111 performs estimation of the intention of turning the vehicle 100 to the left or right.

Figure 14:
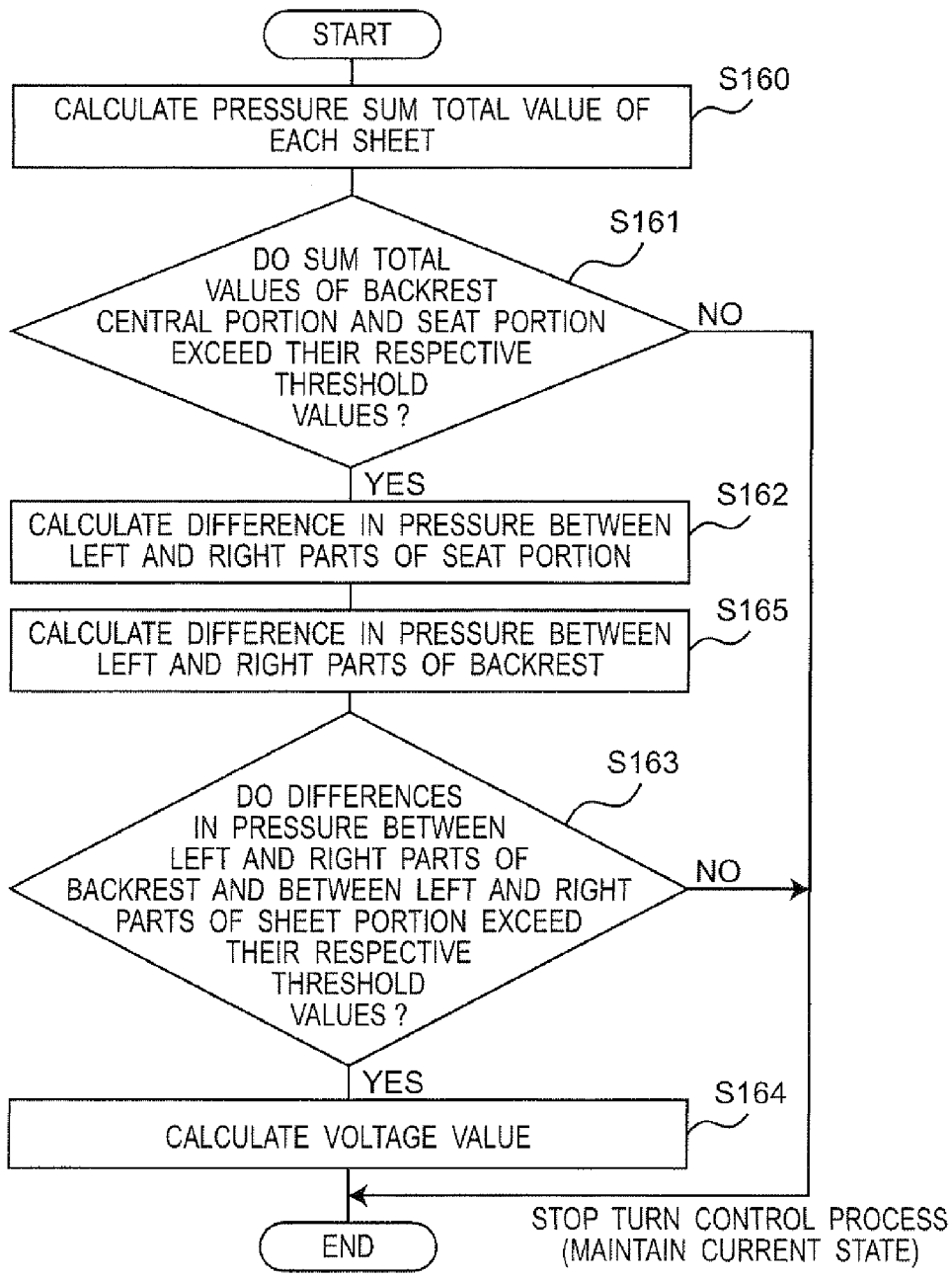
FIG. 14 is a flowchart of an intention determination process of the vehicle of the second embodiment of the present invention.

FIG. 14 shows a detailed intention determination flow.

First, at step S160, a sum total value of the pressure values of piezoelectric elements of the pressure sensor sheets 9a, 9b, 9c, and 9d is calculated by the sensor controller 10 for each of the pressure sensor sheets 9a, 9b, 9c, and 9d. The pressure sum total values of the respective pressure sensor sheets 9a, 9b, 9c, and 9d are hereinafter referred to as a "backrest upper right pressure sum total value", a "backrest upper left pressure sum total value", a "seat portion pressure sum total value", and a "backrest lower center pressure sum total value". Furthermore, for the seat portion 2b, a sum total value of piezoelectric elements on the right half side from the center of the seat portion 2b (hereinafter, referred to as a "seat portion right side pressure sum total value") and a sum total value of piezoelectric elements on the left half side (hereinafter, referred to as a "seat portion left side pressure sum total value") are separately calculated by the sensor controller 10.

Then, at step S161, the operational intention determining unit 110 determines whether the backrest lower center pressure sum total value and the seat portion pressure sum total value which are outputted from the sensor controller 10 exceed their respective seating confirmation threshold values which are preset in the operational intention determining unit 110. If the operational intention determining unit 110 determines that both of the backrest lower center pressure sum total value and the seat portion pressure sum total value exceed their respective seating confirmation threshold values, then the operational intention determining unit 110 determines that there is an operational intention and thus proceeds to step S162.

It is appropriate to set the seating confirmation threshold value for the backrest lower center pressure sum total value at this time, based on the same principle as that for the seating confirmation threshold value for the backrest in the first embodiment.

For example, as a specific example, when a sheet sensor includes 10×4 piezoelectric elements and each piezoelectric element pressure value is outputted in five levels, 1 to 5, 10 which represents that about a quarter of the piezoelectric elements indicate a value of 1 or more is set as the seating confirmation threshold value. Note, however, that when the pressure sum total value of the sheet for the case of no contact with anything exceeds 10, a value exceeding that value is set as the seating confirmation threshold value. The seating confirmation threshold value for the seat portion pressure sum total value is set in the same manner as that in the first embodiment.

If the operational intention determining unit 110 determines at step S161 that even one of the backrest lower center pressure sum total value and the seat portion pressure sum total value is less than or equal to its seating confirmation threshold value, then the operational intention determining unit 110 considers that there is no operational intention and thus stops the determination process and a control process subsequent thereto regardless of the other pressure value, and the vehicle 100 continues the current operation (maintains the current state). The way to determine the seating confirmation threshold values is the same as that in the foregoing first embodiment. Although in a condition for the above-described intention determination, determination is made such that the operational intention determining unit 110 determines whether a backrest lower center pressure sum total value and a seat portion pressure sum total value exceed their respective preset seating confirmation threshold values, the operational intention determining unit 110 may determine that there is an operational intention when the operational intention determining unit 110 determines that a backrest lower center pressure sum total value exceeds its seating confirmation threshold value and a seat portion right side pressure sum total value and a seat portion left side pressure sum total value exceed their respective seating confirmation threshold values. At this time, only when the rider 91 rides in the center of a seat 3 without leaning extremely to the right or left side, the operational intention determining unit 110 determines that there is an operational intention and thus a safer vehicle 100 and a control method therefor can be provided.

Then, the turn intention determining unit 111 calculates at steps S162 and S165 the difference between the seat portion right side pressure sum total value and the seat portion left side pressure sum total value (the difference in pressure between the seat portion left and right) and, the difference between the backrest upper right pressure sum total value and the backrest upper left pressure sum total value (the difference in pressure between the backrest left and right).

A process performed by a left/right turn control determining unit 104 at the next step S163 and a process performed by a voltage converting unit 105 at step S164 are performed in the same manner as the process at step S153 and the process at step S154 in the first embodiment, whereby motors 15b and 15a are driven.

Specifically, if the turn intention determining unit 111 determines at step S163 that the difference between the seat portion right side pressure sum total value and the seat portion left side pressure sum total value (the difference in pressure between the seat portion left and right) which is calculated by the turn intention determining unit 111 exceeds a left-right pressure difference threshold value which is preset in the turn intention determining unit 111, then the turn intention determining unit 111 determines that there is a turn intention. For example, when the seating confirmation threshold value is set to the above-described 200, assuming that the turn intention determining unit 111 determines that there is a turn intention when the turn intention determining unit 111 determines that 50 which is one-half of 100, one side, or more is shifted to the opposite side by a turn intention (e.g., the right side has 150 and the left side has 50), the left-right pressure difference threshold value is set to 100 which is twice as large as 50.

If the turn intention determining unit 111 determines that the difference between the seat portion right side pressure sum total value and the seat portion left side pressure sum total value (the difference in pressure between the seat portion left and right) is less than or equal to the left-right pressure difference threshold value which is preset in the turn intention determining unit 111, then the turn intention determining unit 111 determines that there is no turn intention and thus stops the determination process and a control process subsequent thereto, and the vehicle 100 continues the current operation (maintains the current state).

If the turn intention determining unit 111 determines at this step S163 that the above-described difference is a positive value and exceeds the left-right pressure difference threshold value, then the turn intention determining unit 111 determines that it is a right turn. If the turn intention determining unit 111 determines that the above-described difference is a negative value and exceeds the left-right pressure difference threshold value, then the turn intention determining unit 111 determines that it is a left turn. Since the rider 91 is not always seated in the seat 3 left-right symmetrically, the left-right pressure difference threshold value at this time needs to be set to a value greater than the difference in pressure between the left and right which is obtained when the rider 91 is seated in the seat 3 leaning to the right or left. For example, experimentally, it is appropriate to set, as the left-right pressure difference threshold value, a value obtained by multiplying a maximum value of differences in pressure between left and right which are obtained when having a plurality of persons sit in advance by a factor of 1.2.

If the turn intention determining unit 111 considers in the process at step S163 that there is a left or right turn intention, then at step S164 the left/right turn control determining unit 104 performs conversion into voltage additional values for motors for driving the left and right wheels, based on the determined result. In the conversion at this time, when the turning direction is determined to be left or right, voltage additional values are uniquely determined by the left/right turn control determining unit 104. For example, according to the table in FIG. 8, if the turn is determined to be a right turn, then setting is performed to add −0.5 V to the motor for the right wheel 15*a* and +0.5 V to the motor for the left wheel 15*b*. Then, at the same step S164, the voltage value converting unit 105 sets, as voltage values for driving the left and right motors, values obtained by adding the voltage additional values for the left and right which are calculated by the left/right turn control determining unit 104 to the voltage values of right and left drive wheels 6*a* and 6*b* which are calculated by a forward and backward motion control determining unit 101, and a speed converting unit 106 included in a motor controller 14 converts the voltage values into rotation speeds, whereby the motors for the left and right wheels 15*b* and 15*a* are driven.

According to the configuration of the second embodiment, a safe riding type vehicle 100 or a safe method of controlling a riding type vehicle can be provided in which even if a large postural change occurs as a result of the intention of performing motion other than operation, the vehicle 100 does not erroneously make a left or right turn or perform a movement operation. Furthermore, a riding type vehicle and a method of controlling a riding type vehicle can be provided in which by identifying the disposition positions of the pressure sensor sheets 9*a*, 9*b*, and 9*d* of the backrest 2*a* to be near positions with which the left and right shoulder blades 50*a* and 50*b* of the rider 91 come into contact, or near a position with which a region around the hipbone comes into contact, and near a position with which a back portion where the lumbar vertebrae are located comes into contact (the lower central portion 52), even if the seating posture varies by the habit of the rider 91, when the rider 91 makes a great change in his/her posture to the left or right without the intention of performing operation, the vehicle 100 does not erroneously make a left or right turn or perform a movement operation and an intention determination can be stably made.

Third Embodiment

In the following riding type vehicle and method of controlling a riding type vehicle according to a third embodiment of the present invention, an embodiment is described which means for notifying a rider 91 (notifying unit), e.g., a speaker 20, is additionally disposed in the first embodiment.

Figure 15:
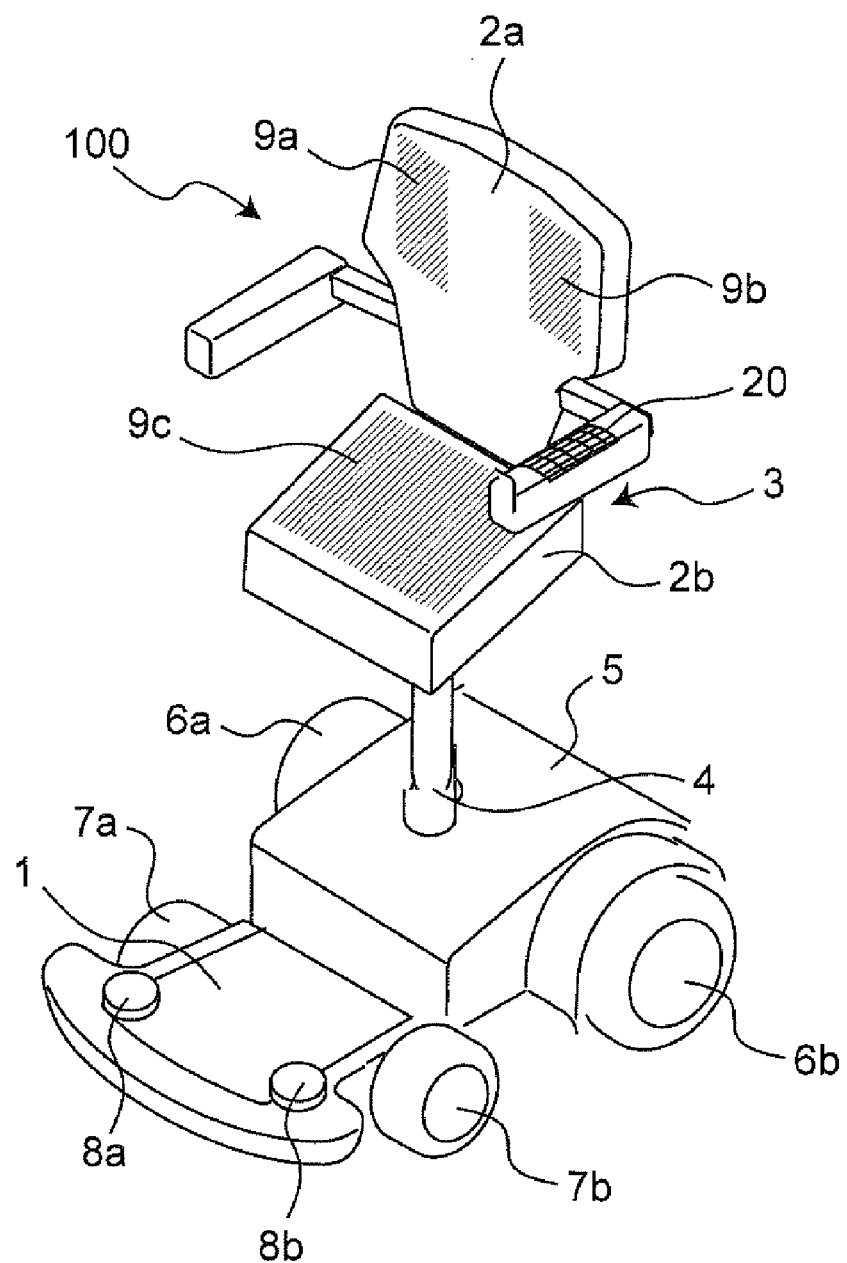
FIG. 15 is an external view of a vehicle of a third embodiment of the present invention.
Figure 16:
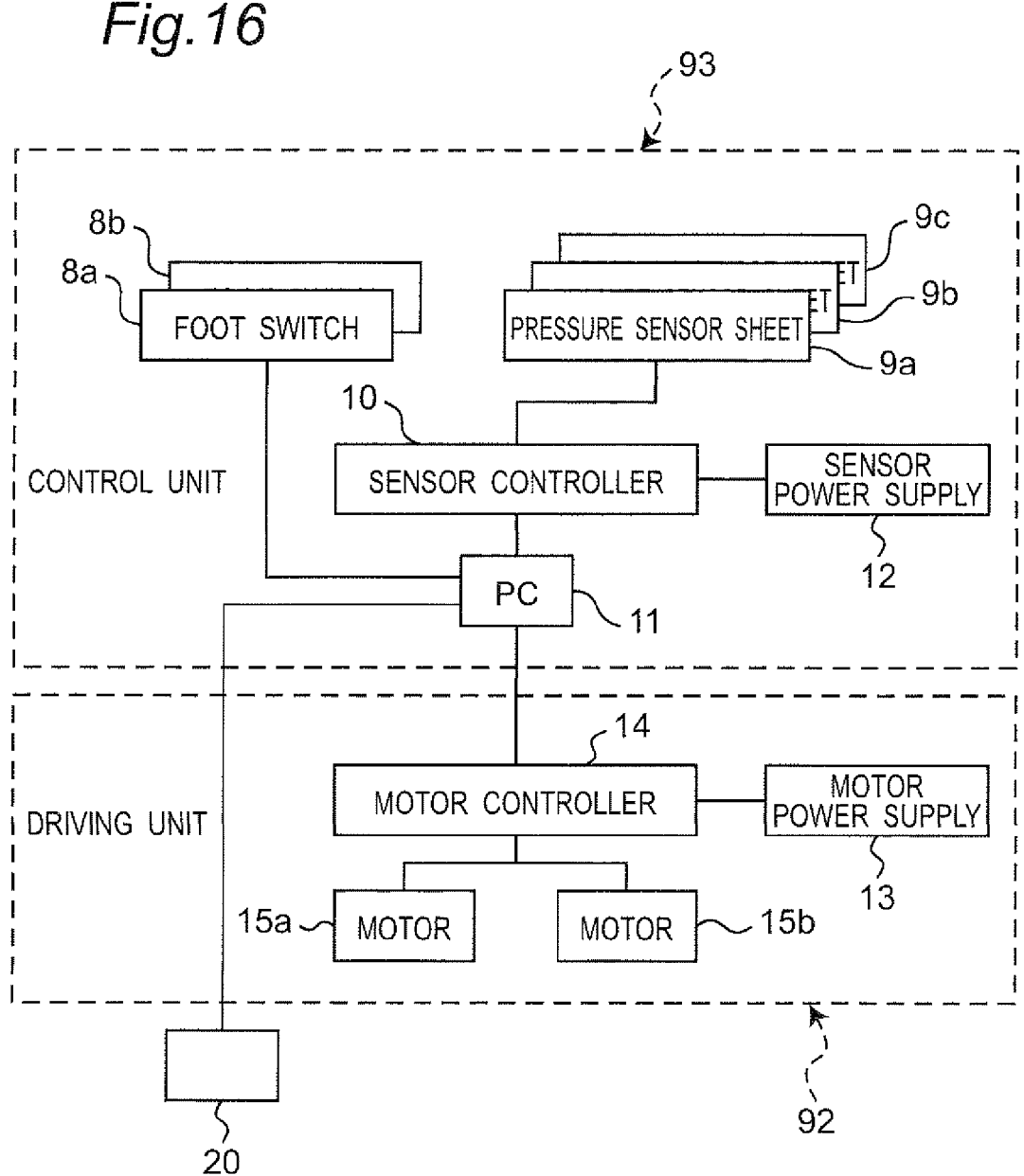
FIG. 16 is a block diagram of a hardware configuration of the vehicle of the third embodiment of the present invention.

FIGS. 15 and 16 are an external view and a block diagram of a hardware configuration of a vehicle 100 of the third embodiment of the present invention. The positions of pressure sensor sheets 9*a*, 9*b*, and 9*c* are the same as those in FIGS. 3A and 3B in the first embodiment.

On/off output signals from foot switches for forward and backward motion 8*a* and 8*b* are executed in the specifications described in the first embodiment, enabling forward and backward motion by the foot switches 8*a* and 8*b* Left and right turns are made using the posture sensors 9*a*, 9*b*, and 9*c* in the same manner as in the above-described first and second embodiments. Here too, as the posture sensors 9*a*, 9*b*, and 9*c*, pressure sensor sheets 9*a*, 9*b*, and 9*c* are used.

Figure 17:
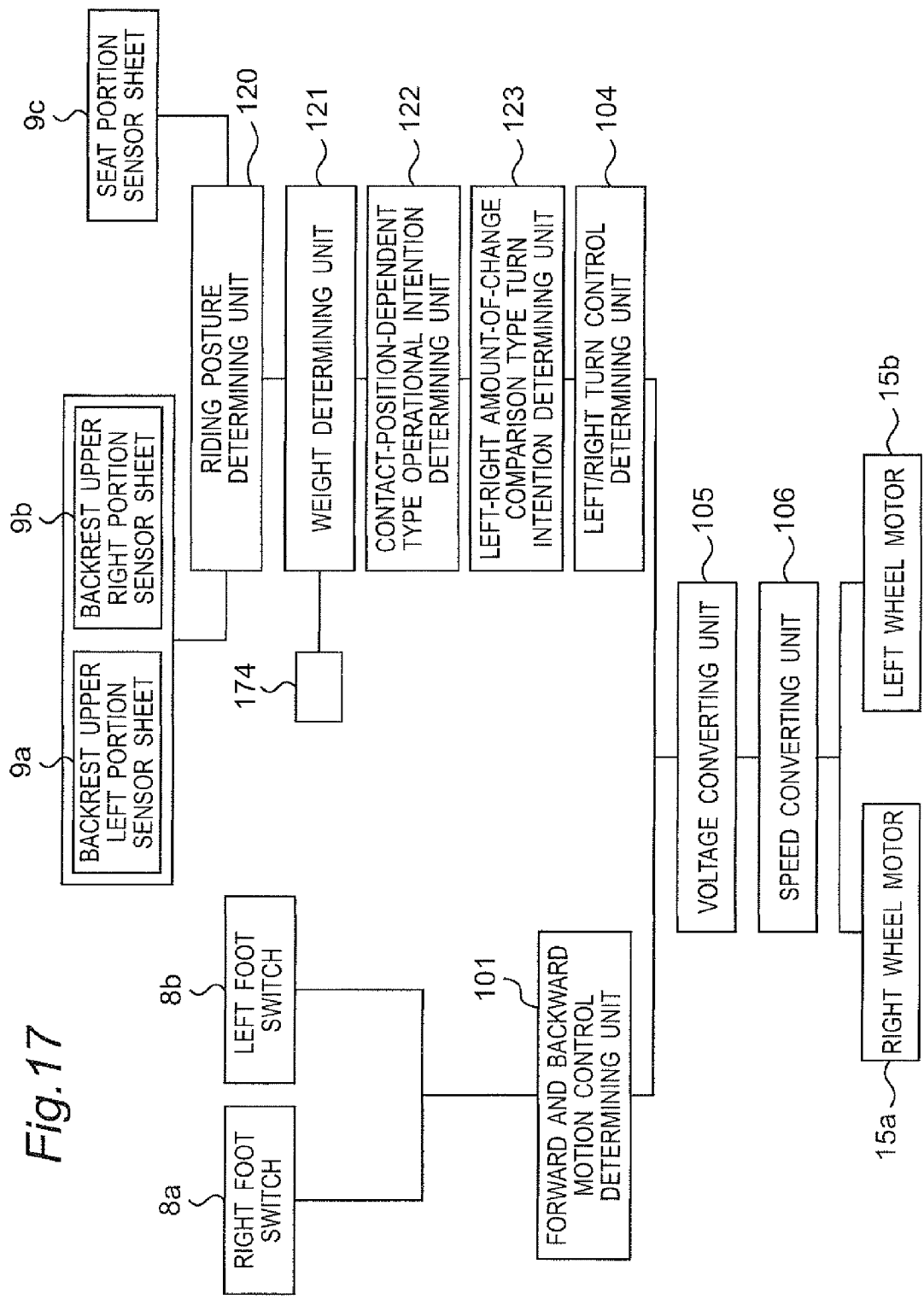
FIG. 17 is a configuration view of vehicle operation control by postural change in the third embodiment of the present invention.
Figure 18:
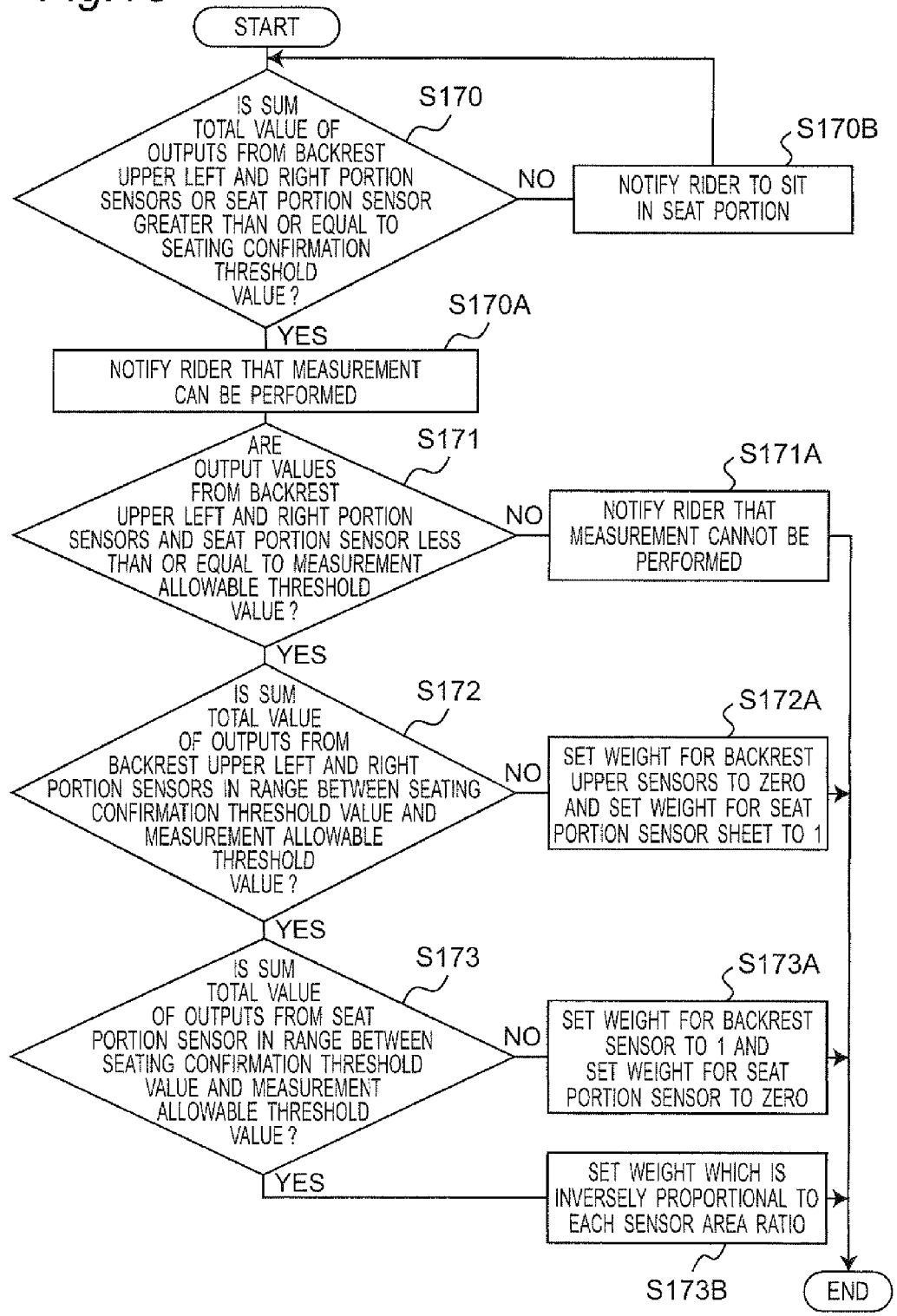
FIG. 18 is a flowchart of riding posture analysis and sensor weight learning processes in the third embodiment of the present invention.

FIG. 17 shows a configuration of the vehicle 100 of the third embodiment and FIG. 18 shows a flow of riding posture analysis and weight learning processes.

The configuration of the vehicle 100 in FIG. 17 includes a personal computer 11, a riding posture determining unit 120, a weight determining unit 121, an operational intention determining unit 122, a turn intention determining unit 123, a left/right turn control determining unit 104, a forward and backward motion control determining unit 101, and a voltage value converting unit 105. The forward and backward motion control determining unit 101 receives on/off output signals from the two foot switches 8*a* and 8*b* and converts the signals into voltage values for motors for driving the left and right wheels and thereafter outputs the voltage values to the voltage value converting unit 105. The riding posture determining unit 120 accepts, as input, output information outputted from the pressure sensor sheets 9*a*, 9*b*, and 9*c*, determines a riding posture based on the output information, and outputs information on the determination result to the weight determining unit 121. The weight determining unit 121 performs weight determination based on forward and backward motion control determination information outputted from the forward and backward motion control determining unit 101, and outputs information on the determination results to the operational intention determining unit 122. A weight information storage unit 174 having weight information recorded therein in advance is connected to the weight determining unit 121. The weight determining unit 121 performs weight determination based on the weight information stored in the weight information storage unit 174. The operational intention determining unit 122 performs operational intention determination based on the information outputted from the weight determining unit 121, intention determining unit 123. The turn intention determining unit 123 performs turn intention determination based on the information outputted from the operational intention determining unit 122, and outputs information on the determination to the left/right turn control determining unit 104. The Left/right turn control determining unit 104 accepts, as input, the information outputted from the turn intention determining unit 123, converts the information into voltage additional values for motors for driving the left and right wheels, and outputs the voltage additional values to the voltage value converting unit 105. The voltage value converting unit 105 determines voltage values for driving motors for the left and right wheels 15*b* and 15*a* from the voltage values for motors for driving both the left and right wheels outputted from the forward and backward motion control determining unit 101 and the voltage additional values for motors for driving the left and right wheels outputted from the left/right turn control determining unit 104, and outputs the voltage values to a motor controller 14.

Upon using the vehicle 100, first, before using the vehicle 100, the rider 91 is urged to ride in the vehicle 100 and the riding posture determining unit 120 compares in advance output values from the respective sensors 9*a*, 9*b*, and 9*c* obtained in a natural riding posture of the rider 91 with threshold values to grasp the habit of the rider 91.

There are provided in advance seating confirmation threshold values for confirming whether the rider 91 is in contact with a backrest 2*a* and a seat portion 2*b*, and measurement allowable threshold values for confirming whether output values from the sensors 9*a*, 9*b*, and 9*c* do not exceed an upper limit value so that differences in pressure between left and right for the sensors 9*a*, 9*b*, and 9*c* can be accurately calculated by the turn intention determining unit 123. The seating confirmation threshold value for the backrest 2*a* is set to be such a small value that does not fall below a pressure value obtained when nothing is in contact with the backrest 2*a*. For example, when the backrest 2*a* includes 7×10 piezoelectric elements and each piezoelectric element outputs a pressure value in five levels, 1 to 5, 20 which represents that 20% of all piezoelectric elements have a value of 1 or more may be set as the seating confirmation threshold value. The seating confirmation threshold value for the seat portion 2b is determined in the same manner as that described in the foregoing first embodiment. For the measurement allowable threshold values, for example, a value obtained when 80% of the total number of piezoelectric elements forming each of the pressure sensor sheets 9a, 9b, and 9c have an output value of 3 or more may be set.

The rider 91 is urged to ride in the vehicle 100 and the riding posture determining unit 120 checks changes in output values from the pressure sensor sheets 9a, 9b, and 9c at predetermined intervals, e.g., every five seconds, after urging the rider 91 to ride in the vehicle 100 by, for example, the speaker 20 which will be described later or a display apparatus which is not shown. For the changes, the riding posture determining unit 120 compares an output value from each of the pressure sensor sheets 9a, 9b, and 9c with an output value therefrom obtained five seconds ago. If the difference therebetween is below a value that is 5% of the current output value, then the riding posture determining unit 120 determines that there is no change. If the riding posture determining unit 120 determines that there is no ±5% change in output value from each of the pressure sensor sheets 9a, 9b, and 9c for five seconds, then a sensor controller 10 calculates an output sum total value of backrest upper left and right portions and a seat portion output sum total value. If the riding posture determining unit 120 determines at step S170 in FIG. 18 that both of these measured values are smaller than their respective seating confirmation threshold values, then the riding posture determining unit 120 determines that there is a possibility that, for example, the rider 91 rides on a footrest 1 in a standing position without the rider 91 coming into contact with the backrest 2a or the seat portion 2b, and proceeds to step S1703. At step S1703, based on the above-described determination process by the riding posture determining unit 120 in the PC 11, under control of the riding posture determining unit 120, the rider 91 is notified by the speaker 20 to ride in the vehicle 100 in a posture where he/she comes into contact with the seat portion 2b. For example, the message "sit in the seat portion" may be transmitted to the rider 91 from the speaker 20. Thereafter, processing returns to step S170 again.

If, at step S170, the riding posture determining unit 120 detects a state in which a change in output value from each of the sensor sheets 9a, 9b, and 9c is within ±5% for five seconds, then the riding posture determining unit 120 calculates output sum total values of the backrest 2a and the seat portion 2b. When the riding posture determining unit 120 determines that the calculated output sum total values exceed their respective seating confirmation threshold values, processing proceeds to step S170A and the rider 91 is notified by the speaker 20 that measurement can be performed. Thereafter, processing proceeds to step S171. As an example of the seating confirmation threshold value for the upper portion of the backrest at this step S170, 14 which represents that 20% more of all piezoelectric elements (7×10 piezoelectric elements) on one side of the backrest 2a have a value of 1 or more is set. As an example of the seating confirmation threshold value for the seat portion 2b at this step S170, when the seat portion 2b has 20×10 piezoelectric elements and pressure is indicated in five levels, 1 to 5, 200 which represents that one-half of the seat portion 2b have a value of 2 can be set.

If, at step S170, the output sum total values of the sensor sheets 9a, 9b, and 9c calculated by the riding posture determining unit 120 do not reach values greater than or equal to their respective seating confirmation threshold values even after consecutively performing measurement a predetermined number of times, e.g., five times, then a notification that measurement cannot be performed is issued or a more detailed instruction specifying each part is performed. For example, when the riding posture determining unit 120 determines that the output sum total value of the seat portion 2b is less than the seating confirmation threshold value, based on that information, under control of the riding posture determining unit 120, a notification urging the rider 91 to sit to come into contact with an area near the backrest 2a, such as "put your weight far back in the seat portion", may be issued to the rider 91 from the speaker 20. When the riding posture determining unit 120 determines that the output sum total value of the backrest 2a is less than the seating confirmation threshold value, based on that information, under control of the riding posture determining unit 120, a notification urging the rider 91 to sit to lean against the backrest 2a, such as "sit leaning against the back a little further", may be issued to the rider 91 from the speaker 20. As such, the riding posture determining unit 120 holds a plurality of output audio data of different types and performs control to select, based on a riding posture confirmation result, output audio data appropriate to the result and output the output audio data from the speaker 20. At step S171, the riding posture determining unit 120 determines whether both of the output sum total value of the backrest upper left and right portions and the seat portion output sum total value are greater than their respective measurement allowable threshold values. As an example of the measurement allowable threshold value (threshold value indicating an upper limit of measurement) for the backrest upper left and right portions, 210 which represents that over 80% of piezoelectric elements (e.g., 7×10 piezoelectric elements on one side) have a pressure value of 3 or more can be set as each threshold value. As an example of the measurement allowable threshold value for the seat portion 2b, 480 which represents that 80% of 20×10 piezoelectric elements have a pressure value of 3 or more can be set as the threshold value.

If the riding posture determining unit 120 determines at step S171 that both of the output sum total value of the backrest upper left and right portions and the seat portion output sum total value are greater than their respective measurement allowable threshold, values, then processing proceeds to step S171A and the fact that measurement cannot be performed because accurate measurement may not be able to be performed due to the weight of the rider 91 exceeding a certain value or due to an oversized body shape is notified to the rider 91 from the speaker 20 under control of the riding posture determining unit 120. For example, the message "sorry but proper operation cannot be performed" may be transmitted from the speaker 20. Thereafter, the series of riding posture analysis and weight learning processes end.

If the riding posture determining unit 120 determines at step S171 that either of the output sum total value of the backrest upper left and right portions and the seat portion output sum total value from the sensor sheets 9a, 9b, and 9c of the backrest 2a and the seat portion 2b is in the range between the seating confirmation threshold value and the measurement allowable threshold value, then processing proceeds to step S172.

Subsequently, at steps S172 and S173, the weight determining unit 121 sets (determines) weights for the respective sensor sheets 9a, 9b, and 9c based on the weight information stored in the weight information storage unit 174. Specifically, if the riding posture determining unit 120 determines that only the output value from the sensor sheet of either one of the backrest 2a and the seat portion 2b (the output sum total value of the backrest upper left and right portions or the seat portion output sum total value) is in the range between the seating confirmation threshold value and the measurement allowable threshold value, then the weight for the corresponding sensor sheet is set to 1 and the weight for a sensor sheet out of the range is set to zero (steps S172 and S173).

Specifically, first, at step S172, the weight determining unit 121 determines whether the output sum total value of the backrest upper left and right portions of the sensor sheets 9a and 9b of the backrest 2a is in the range between the seating confirmation threshold value and the measurement allowable threshold value. If the weight determining unit 121 determines that the output sum total value of the backrest upper left and right portions of the sensor sheets 9a and 9b of the backrest 2a is in the range between the seating confirmation threshold value and the measurement allowable threshold value, then processing proceeds to step S173. If the weight determining unit 121 determines that the output sum total value of the backrest upper left and right portions of the sensor sheets 9a and 9b of the backrest 2a is not in the range between the seating confirmation threshold value and the measurement allowable threshold value, then processing proceeds to step S172A and the weight determining unit 121 sets the weights for the sensor sheets 9a and 9b of the backrest 2a to zero and sets the weight for the sensor sheet 9c of the seat portion 2b to 1. Thereafter, the series of riding posture analysis and weight learning processes end.

At step S173, the weight determining unit 121 determines whether the seat portion output sum total value of the sensor sheet 9c of the seat portion 2b is in the range between the seating confirmation threshold value and the measurement allowable threshold value. If the weight determining unit 121 determines that the seat portion output sum total value of the sensor sheet 9c of the seat portion 2b is not in the range between the seating confirmation threshold value and the measurement allowable threshold value, then processing proceeds to step S173A and the weight determining unit 121 sets the weight for the sensor sheet 9c of the seat portion 2b to zero and sets the weights for the sensor sheets 9a and 9b of the backrest 2a to 1. Thereafter, the series of riding posture analysis and weight learning processes end.

If the weight determining unit 121 determines at step S173 that the seat portion output sum total value of the sensor sheet 9c of the seat portion 2b is in the range between the seating confirmation threshold value and the measurement allowable threshold value, then processing proceeds to step S173B. Namely, if the weight determining unit 121 determines that both of the output sum total value of the backrest upper left and right portions and the seat portion output sum total value of the sensor sheets 9a, 9b, and 9c are in the above-described range, then processing proceeds to step S173B from step S172 through step S173 and the weight determining unit 121 sets weights so that an operational intention or a left or right turn intention can be determined using all of the corresponding sensor sheets 9a, 9b, and 9c (step S173B). For example, the weights for the sensor sheets may be all set to 1; however, when the weight determining unit 121 determines that the absolute values of the pressure sum total values of the backrest 2a and the seat portion 2b differ greatly, e.g., differ five times or more, if the weights are set to 1, then a problem occurs that a part with a large sum total value becomes predominant as a criterion. Thus, the weight determining unit 121 may set the reciprocal of each sensor output value (as an example of a ratio between sensor output values) as a weight. In addition, since the above-described great difference between the sum total values results from a great difference between areas being in contact with the sensor sheets 9a, 9b, and 9c, in order to achieve normalization in all areas of the sensor sheets 9a, 9b, and 9c the weight determining unit 121 may set the reciprocal of an area as a weight. Thereafter, the series of riding posture analysis and weight learning processes end.

An output from each piezoelectric element of the pressure sensor sheets 9a, 9b, and 9c set in three locations surrounded by dashed lines which are shown in FIGS. 3A and 3B is inputted to the computer 11 via the sensor controller 10, and the riding posture determining unit 120, the contact-position-dependent type operational intention determining unit 122, etc., perform posture analysis of the rider 91 and estimation of a left or right turn operation intention taking into account the posture analysis, and the left-right amount-of-change comparison type turn intention determining unit 123 performs estimation of the intention of turning the vehicle 100 to the left or right.

Figure 19:
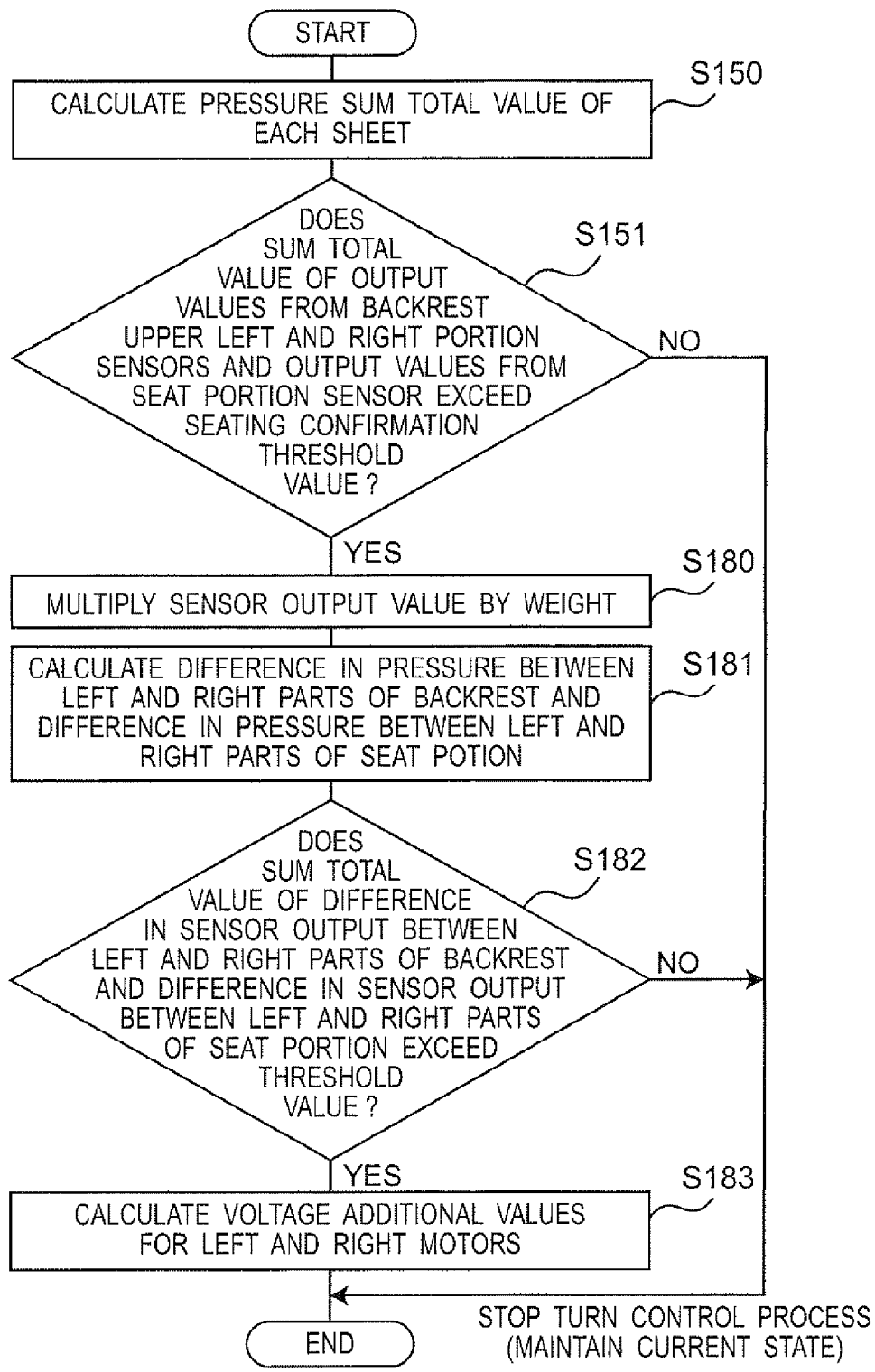
FIG. 19 is a flowchart of an intention determination process of the vehicle of the third embodiment of the present invention.

A flow of an intention determination process is shown in FIG. 19.

At step S150, a sum total value of the pressure values of piezoelectric elements is calculated by the sensor controller 10 for each of the pressure sensor sheets 9a, 9b, and 9c, and furthermore, a seat portion right side pressure sum total value and a seat portion left side pressure sum total value are calculated by the sensor controller 10.

Then, at step S151, the operational intention determining unit 122 adds up a backrest upper right pressure sum total value and a backrest upper left pressure sum total value which are outputted from the sensor controller 10 and determines whether a value obtained by further summing the added-up backrest pressure sum total value and the seat portion pressure sum total value exceeds the seating confirmation threshold value.

Only when the operational intention determining unit 122 determines that the sum total value of the backrest pressure sum total value and the seat portion pressure sum total value exceeds the seating confirmation threshold value, the operational intention determining unit 122 determines that there is an operational intention and thus proceeds to step S180.

If the operational intention determining unit 122 determines that the sum total value of the backrest pressure sum total value and the seat portion pressure sum total value is less than or equal to the seating confirmation threshold value, then the operational intention determining unit 122 determines that there is no operational intention and thus stops the determination process and a control process subsequent thereto and the vehicle 100 continues the current operation.

Here, although in a condition for the above-described intention determination, determination is made such that the operational intention determining unit 122 determines whether a sum total value exceeds a preset seating confirmation threshold value, seating confirmation threshold values for a backrest upper right pressure sum total value, a backrest upper left pressure sum total value, a seat portion right side pressure sum total value, and a seat portion left side pressure sum total value may be individually set, and when the operational intention determining unit 122 determines that sum total values present in a left-right symmetric position both exceed their respective seating confirmation threshold values, the operational intention determining unit 122 may determine that there is an operational intention. At this time, only when the rider 91 rides in the center of a seat 3 without leaning extremely to the right or left side, the operational intention determining unit 122 determines that there is an operational intention and thus a safer vehicle 100 and a control method therefor can be provided.

For the above-described threshold value, with reference to a minimum value of pressure values obtained in advance when multiple persons ride in the vehicle 100, the minimum value may be fixedly used but a threshold value obtained by deducting a certain value from a minimum value sensor output values measured at weight learning may be set.

Then, at step S180, the turn intention determining unit 123 sets values obtained by weighting the backrest upper right pressure sum total value, the backrest upper left pressure sum total value, the seat portion right side pressure sum total value, and the seat portion left side pressure sum total value by the weights which are determined by the weight determining unit 121 based on the weight information stored in the weight information storage unit 174, as their respective sensor values.

Subsequently, at step S181, the turn intention determining unit 123 calculates, using the sensor values, a difference between the backrest left and right sensor values and a difference between the seat portion left and right sensor values.

Then, at step S182, the turn intention determining unit 123 determines whether a sum total value of the differences exceeds a preset left/right turn intention determination threshold value.

If the turn intention determining unit 123 determines that the sum total value of the differences exceeds the preset left/right turn intention determination threshold value, then the turn intention determining unit 123 determines that there is a turn intention and thus proceeds to step S183.

If the turn intention determining unit 123 determines that the sum total value of the differences is less than or equal to the preset left/right turn intention determination threshold value, then the turn intention determining unit 123 determines that there is no turn intention and thus stops the determination process and a control process subsequent thereto and the vehicle 100 continues the current operation (maintains the current state).

If the turn intention determining unit 123 determines at this step S182 that the sum total value of the differences is a positive value and exceeds the left/right turn intention determination threshold value, then the turn intention determining unit 123 determines that it is a right turn. If the turn intention determining unit 123 determines that the sum total value of the differences is a negative value and exceeds the left/right turn intention determination threshold value, then the turn intention determining unit 123 determines that it is a left turn.

A process performed by the left/right turn control determining unit 104 at this step S182 and a process performed by the voltage converting unit 105 at the next step S183 are performed in the same manner as the process at step S153 and the process at step S154 in the first embodiment, whereby the motors 15b and 15a are driven.

Specifically, when the turning direction is determined to be left or right in the process at step S182, voltage additional values are uniquely determined by the left/right turn control determining unit 104. For example, according to the table in FIG. 8, if the turn is determined to be a right turn, then setting is performed to add −0.5 V to the motor for the right wheel 15a and +0.5 V to the motor for the left wheel 15b.

Then, at the same step S183, the voltage value converting unit 105 sets, as voltage values for driving the left and right motors, values obtained by adding the voltage additional values for the left and right which are calculated by the left/right turn control determining unit 104 to the voltage values of right and left drive wheels 6a and 6b which are calculated by the forward and backward motion control determining unit 101. A speed converting unit 106 included in the motor controller 14 converts the voltage values into rotation speeds, whereby the motors for the left and right wheels 15b and 15a are driven. According to the configuration of the third embodiment, a safe riding type vehicle 100 and a safe method of controlling a riding type vehicle can be provided in which even if a large postural change occurs as a result of the intention of performing motion other than operation, the vehicle 100 does not erroneously make a left or right turn or perform a movement operation. Furthermore, a riding type vehicle 100 and a method of controlling a riding type vehicle can be provided in which when output values from the sensor sheet 9c of the seat portion 2b in a riding posture of the rider 91 during movement are extremely small, there is a possibility that the rider 91 rides in a standing position or in an unstable posture where the rider 91 leans only against the backrest 2a, without being seated in the seat portion 2b, and thus, a notification is issued to the rider 91 by the speaker 20 to sit in the seat portion 2b, whereby not only an improvement in the accuracy of operational intention determination but also safety with no accidents can be achieved.

Fourth Embodiment

In the following riding type vehicle and method of controlling a riding type vehicle according to a fourth embodiment of the present invention, an embodiment in which means for notifying a rider 91, e.g., a speaker 20, is additionally disposed in the second embodiment is described.

Figure 20:
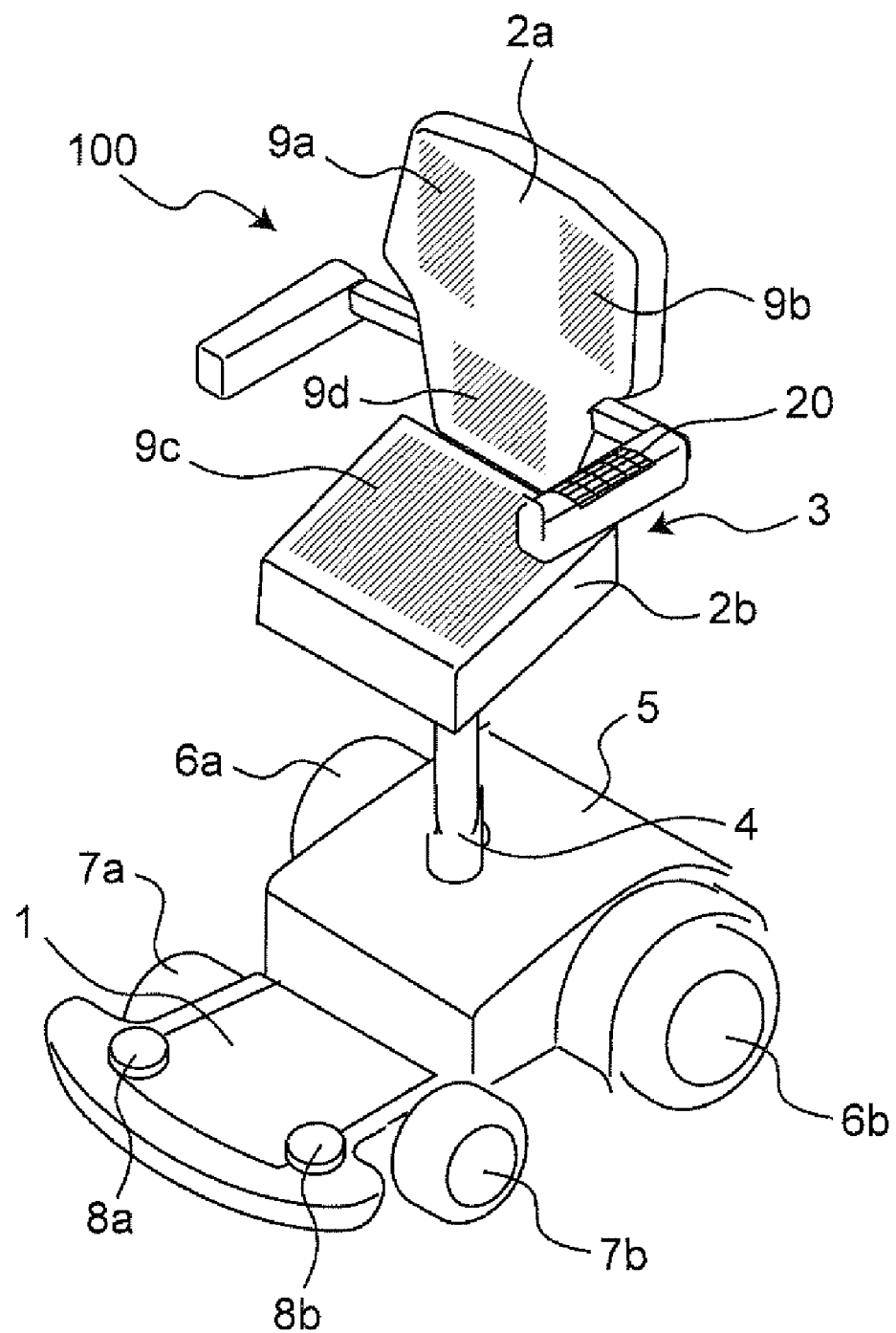
FIG. 20 is an external view of a vehicle of a fourth embodiment of the present invention.
Figure 21:
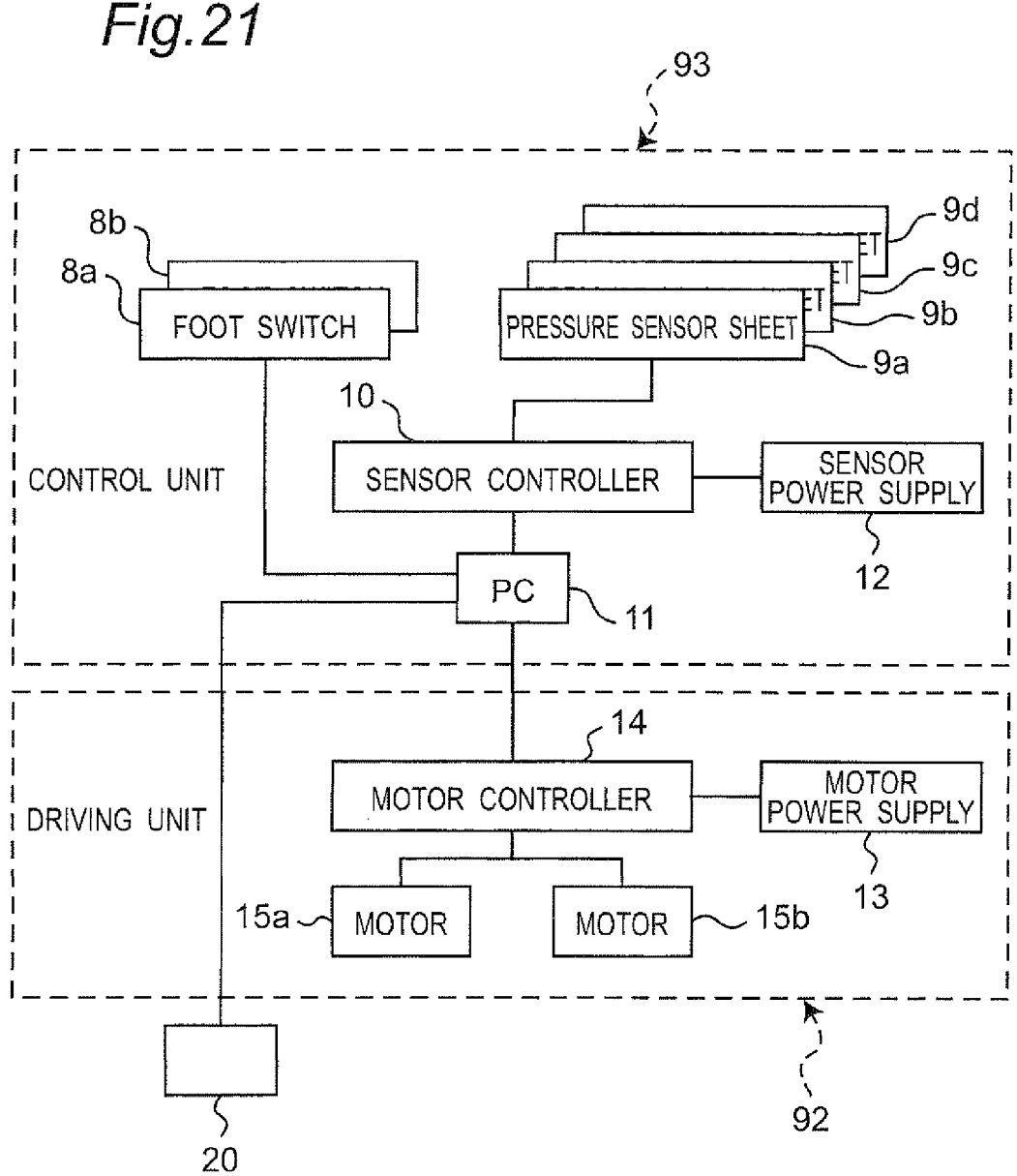
FIG. 21 is a block diagram of a hardware configuration of the vehicle of the fourth embodiment of the present invention.

FIGS. 20 and 21 are an external view and a block diagram of a hardware configuration of a vehicle 100 of the fourth embodiment of the present invention. The hardware configuration is the same as that shown in FIGS. 15 and 16 except that a pressure sensor sheet 9d is additionally disposed in a lower central portion of a backrest 2a in the external view and block diagram of the hardware configuration in FIGS. 15 and 16 which are described in the third embodiment. The position of the pressure sensor sheet 9d is the same as that in FIGS. 12A and 12B in the second embodiment.

In the fourth embodiment, in order to accurately determine an operational intention by pressure sensor sheets 9a, 9b, 9c, and 9d of the second embodiment even when the seating body shape or habit varies depending on the rider 91, a riding posture of the rider 91 is analyzed in advance and a weight determining unit 131 determines weights for the respective pressure sensor sheets 9a, 9b, 9c, and 9d which are optimal for the rider 91, from the analysis result.

Figure 22:
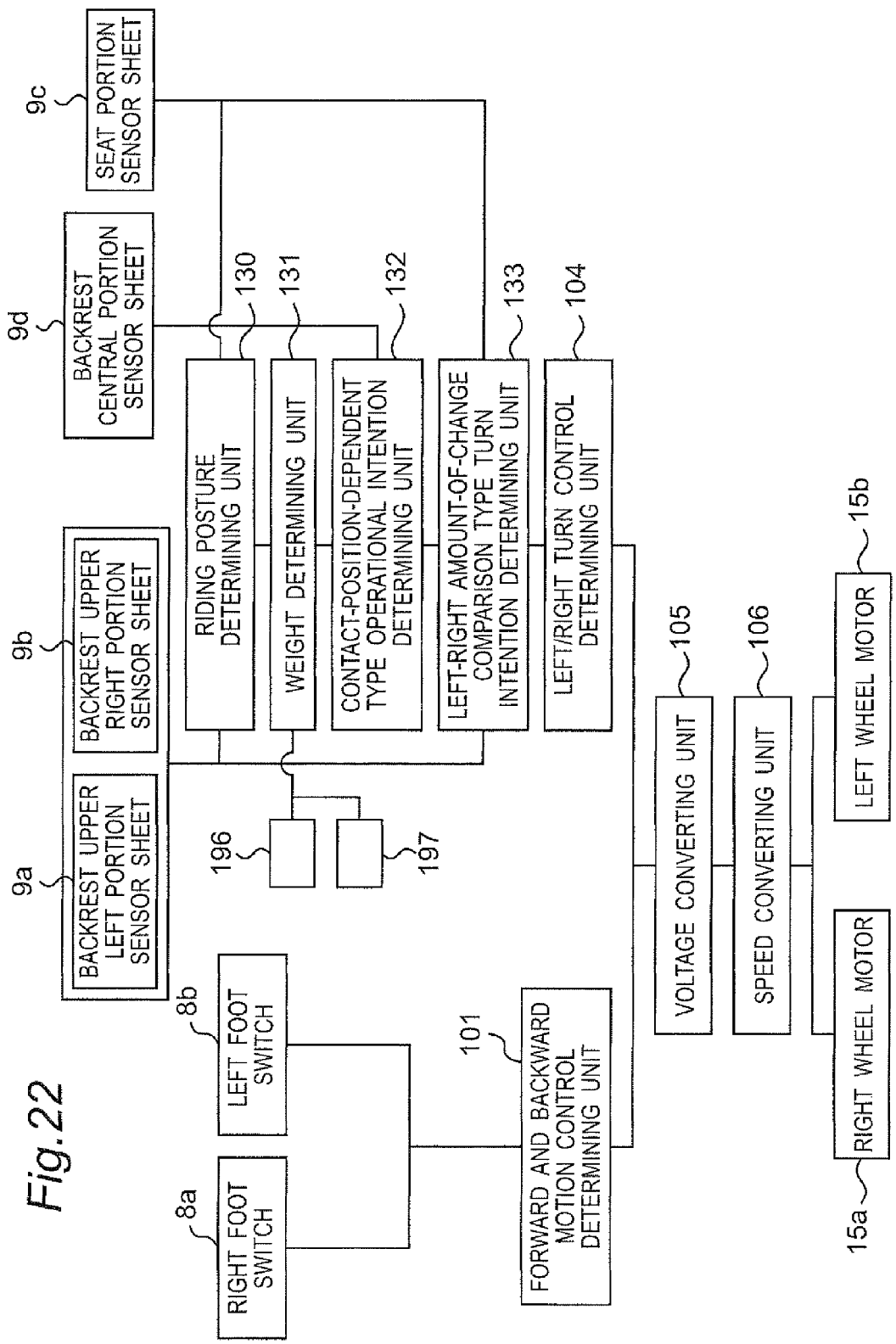
FIG. 22 is a configuration view of vehicle operation control by postural change in the fourth embodiment of the present invention.
Figure 23:
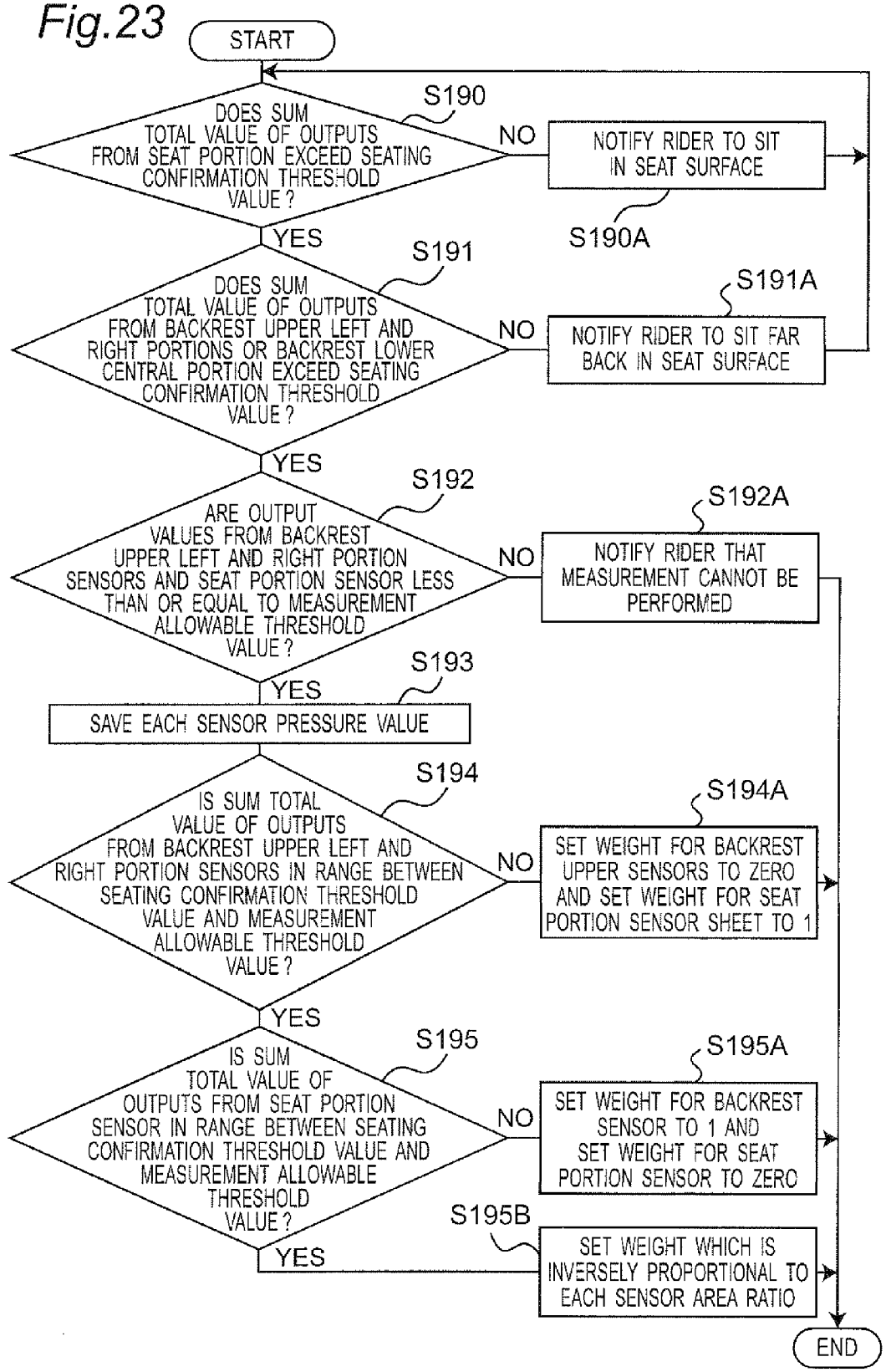
FIG. 23 is a flowchart of riding posture analysis and sensor weight learning processes in the fourth embodiment of the present invention.

FIG. 22 is a processing configuration view and FIG. 23 shows a flow of riding posture analysis and weight determination.

In a configuration of the vehicle 100 in FIG. 22, a personal computer 11 includes a riding posture determining unit 130, the weight determining unit 131, an operational intention determining unit 132, a turn intention determining unit 133, a left/right turn control determining unit 104, a forward and backward motion control determining unit 101, and a voltage value converting unit 105. The forward and backward motion control determining unit 101 receives on/off output signals from two foot switches 8a and 8b and converts the signals into voltage values for motors for driving the left and right wheels and thereafter outputs the voltage values to the voltage value converting unit 105. The riding posture determining unit 130 accepts, as input, output information outputted from the pressure sensor sheets 9a, 9b, 9c, and 9d, determines a riding posture based on the output information, and outputs information on the determination result to the weight determining unit 131. The weight determining unit 131 performs weight determination based on forward and backward motion control determination information outputted from the forward and backward motion control determining unit 101, and outputs information on the determination results to the operational intention determining unit 132. A weight information storage unit 197 having weight information recorded therein in advance is connected to the weight determining unit 131. The weight determining unit 131 performs weight determination based on the weight information stored in the weight information storage unit 197. The operational intention determining unit 132 performs operational intention determination based on the information from the weight determining unit 131, and outputs information on the determination to the turn intention determining unit 133. The turn intention determining unit 133 performs turn intention determination based on the information outputted from the operational intention determining unit 132 and the output information outputted from the pressure sensor sheets 9a, 9b, 9c, and 9d, and outputs information on the determination to the left/right turn control determining unit 104. The left/right turn control determining unit 104 accepts, as input, the information outputted from the turn intention determining unit 133, converts the information into voltage additional values for motors for driving the left and right wheels, and outputs the voltage additional values to the voltage value converting unit 105. The voltage value converting unit 105 determines voltage values for driving motors for the left and right wheels 15b and 15a from the voltage values for motors for driving the left and right wheels outputted from the forward and backward motion control determining unit 101 and the voltage additional values for motors for driving the left and right wheels outputted from the left/right turn control determining unit 104, and outputs the voltage values to a motor controller 14.

A flow of riding posture analysis and weight determination processes will be described below based on FIG. 23.

First, at step S190, before using the vehicle 100, the riding posture determining unit 130 compares in advance output values from the respective pressure sensor sheets 9a, 9b, 9c, and 9d obtained when the rider 91 rides in the vehicle 100. The riding posture determining unit 130 is provided in advance with seating confirmation threshold values for the backrest 2a and a seat portion 2b for confirming whether the rider 91 is in contact with the backrest 2a or the seat portion 2b; measurement allowable threshold values for confirming whether or not to exceed allowable values for measuring an operational intention and a left or right turn intention by the pressure sensor sheets 9a, 9b, 9c, and 9d. A seating confirmation threshold value for a backrest lower central portion is the same as that in the second embodiment and a seating confirmation threshold value for the seat portion 2b is the same as that in the third embodiment. For the measurement allowable threshold values for the backrest lower central portion and the seat portion 2b, as in the third embodiment, for example, a value obtained when 80% of the total number of piezoelectric elements forming each of the pressure sensor sheets 9c and 9d have an output value of 3 or more may be set.

As in the third embodiment, the rider 91 is urged to ride in the vehicle 100 by, for example, the speaker 20 which will be described later or a display apparatus which is not shown. The riding posture determining unit 130 checks changes in output values from the pressure sensor sheets 9a, 9b, 9c, and 9d at predetermined intervals, e.g., every five seconds, after urging the rider 91 to ride in the vehicle 100. For the changes, the riding posture determining unit 130 compares an output value from each of the pressure sensor sheets 9a, 9b, 9c, and 9d with an output value obtained therefrom five seconds ago. If the difference therebetween is below a value that is 5% of the current output value, then the riding posture determining unit 130 determines that there is no change. If the riding posture determining unit 130 determines that there is no ±5% change in output value from each of the pressure sensor sheets 9a, 9b, 9c, and 9d for five seconds, then a sensor controller 10 calculates an output sum total value of backrest upper left and right portions and a seat portion output sum total value.

Then, at this step S190, the riding posture determining unit 130 determines whether the output sum total value of the pressure sensor sheet 9c of the seat portion 2b exceeds the seating confirmation threshold value. If the riding posture determining unit 130 determines that the output sum total value of the pressure sensor sheet 9c of the seat portion 2b is less than or equal to the seating confirmation threshold value, then since there is a possibility that, for example, the rider 91 puts his/her weight only on the backrest 2a without being seated at getting in or out of the vehicle 100 or the rider 91 rides in the vehicle 100 in a standing position, processing proceeds to step S190A and the riding posture determining unit 130 notifies the rider 91 to sit in the seat portion 2b for safety. For example, the message "sit in the seat portion" may be transmitted from the speaker 20. Thereafter, processing returns to step S190 again.

If the riding posture determining unit 130 determines at step S190 that the output sum total value of the pressure sensor sheet 9c of the seat portion 2b exceeds the seating confirmation threshold value, then processing proceeds to step S191.

At step S191, the riding posture determining unit 130 determines whether both of the output sum total value of the backrest upper left and right portions and the output sum total value of the backrest lower central portion exceed their respective seating confirmation threshold values. If both of the output sum total value of the backrest upper left and right portions and the output sum total value of the backrest lower central portion are less than or equal to their respective seating confirmation threshold values, then processing proceeds to step S191A. The riding posture determining unit 130 determines that there is a possibility that, for example, the rider 91 rides in the vehicle 100 in a standing position or so as to bend his/her body far forward without being in contact with the backrest 2a. Based on that information, under control of the riding posture determining unit 130, the rider 91 is notified from the speaker 20 for safety to ride in the vehicle 100 in a posture where he/she comes into contact with the backrest 2a. For example, the message "sit far back in the seat portion" or "sit far back such that the lower back comes into contact with the backrest" may be transmitted from the speaker 20. Thereafter, processing returns to step S190 again.

At step S192, the riding posture determining unit 130 determines whether both of the output sum total value of the backrest upper left and right portions and the seat portion output sum total value exceed their respective measurement allowable threshold values. If the riding posture determining unit 130 determines that both of the output sum total value of the backrest upper left and right portions and the seat portion output sum total value exceed their respective measurement allowable threshold values, then processing proceeds to step S192A and the fact that measurement cannot be performed because accurate measurement may not be able to be performed due to the weight of the rider 91 exceeding a certain value or due to an oversized body shape is notified to the rider 91. For example, the message "sorry but proper operation cannot be performed" may be transmitted from the speaker 20 (step S192). Thereafter, the series of riding posture analysis and weight determination processes end.

If the riding posture determining unit 130 determines at step S192 that at least one of the output sum total value of the pressure sensor sheets 9a and 9b of the backrest upper left and right portions and the output sum total value of the pressure sensor sheet 9d of the backrest lower central portion is in the range between the seating confirmation threshold value and the measurement allowable threshold value, and moreover, the seat portion output sum total value is greater than or equal to the seating confirmation threshold value, then processing proceeds to step S193.

At step S193, output values from the respective sensor sheets 9a, 9b, 9c, and 9d are inputted to the weight determining unit 131 and are saved in a storage unit 196 of the weight determining unit 131.

Subsequently, at steps S194 and S195, the weight determining unit 131 sets (determines) weights for the respective sensor sheets 9a, 9b, 9c, and 9d based on the output values from the sensor sheets 9a, 9b, 9c, and 9d saved in the storage unit 196 and the weight information stored in the weight information storage unit 197. For example, the weight for a sensor sheet whose output value is between the seating confirmation threshold value and the measurement allowable threshold value may be set to 1 and the weights for a sensor sheet whose output value is other than that may be set to zero.

Specifically, first, at step S194, the weight determining unit 131 determines whether the output sum total value of the backrest upper left and right portions of the sensor sheets 9a and 9b of the backrest 2a is in the range between the seating confirmation threshold value and the measurement allowable threshold value. If the weight determining unit 131 determines that the output sum total value of the backrest upper left and right portions of the sensor sheets 9a and 9b of the backrest 2a is in the range between the seating confirmation threshold value and the measurement allowable threshold value, then processing proceeds to step S195. If the weight determining unit 131 determines that the output sum total value of the backrest upper left and right portions of the sensor sheets 9a and 9b of the backrest 2a is not in the range between the seating confirmation threshold value and the measurement allowable threshold value, then processing proceeds to step S194A and the weight determining unit 131 sets the weights for the sensor sheets 9a and 9b of the backrest 2a to zero and sets the weight for the sensor sheet 9c for the seat portion 2b to 1. Thereafter, the series of riding posture analysis and weight learning processes end.

At step S195, the weight determining unit 131 determines whether the seat portion output sum total value of the sensor sheet 9c of the seat portion 2b is in the range between the seating confirmation threshold value and the measurement allowable threshold value. If the weight determining unit 131 determines that the seat portion output sum total value of the sensor sheet 9c of the seat portion 2b is not in the range between the seating confirmation threshold value and the measurement allowable threshold value, then processing proceeds to step S195A and the weight determining unit 131 sets the weight for the sensor sheet 9c of the seat portion 2b to zero and sets the weights for the sensor sheets 9a and 9b of the backrest 2a to 1. Thereafter, the series of riding posture analysis and weight determination processes end.

If the weight determining unit 131 determines at step S195 that the seat portion output sum total value of the sensor sheet 9c of the seat portion 2b is in the range between the seating confirmation threshold, value and the measurement allowable threshold value, then processing proceeds to step S195B.

Step S195B is the case in which the weight determining unit 131 determines that both of the output values from the sensor sheets of the backrest upper left and right portions (the output sum total value of the backrest upper left and right portions) and the output values from the sensor sheet of the seat portion 2b (the seat portion output sum total value) are in the above-described range. As in the third embodiment, for example, the weights for the sensor sheets may be all set to 1, or in order to achieve normalization in all areas of the sensor sheets the reciprocal of an area may be set as a weight. Alternatively, the reciprocal of each sensor output value may be set as a weight.

Note that the determined weights and the output sum total values of the respective sensor sheets are saved in the storage unit 196 of the weight determining unit 131.

Then, when the vehicle 100 is actually used, first, an on/off output signal from the foot switch for forward motion 8a or the foot switch for backward motion 8b is executed in the specifications described in the first embodiment. An output from each piezoelectric element of the pressure sensor sheets 9a, 9b, 9c, and 9d set in four locations surrounded by dashed lines shown in FIGS. 12A and 12B is inputted to the personal computer 11 via the sensor controller 10, and the contact-position-dependent type operational intention determining unit 132 performs posture analysis of the rider 91 and estimation of a left or right turn operation intention taking into account the posture analysis, and the left-right amount-of-change comparison type turn intention determining unit 133 performs estimation of the intention of turning the vehicle 100 to the left or right.

Figure 24:
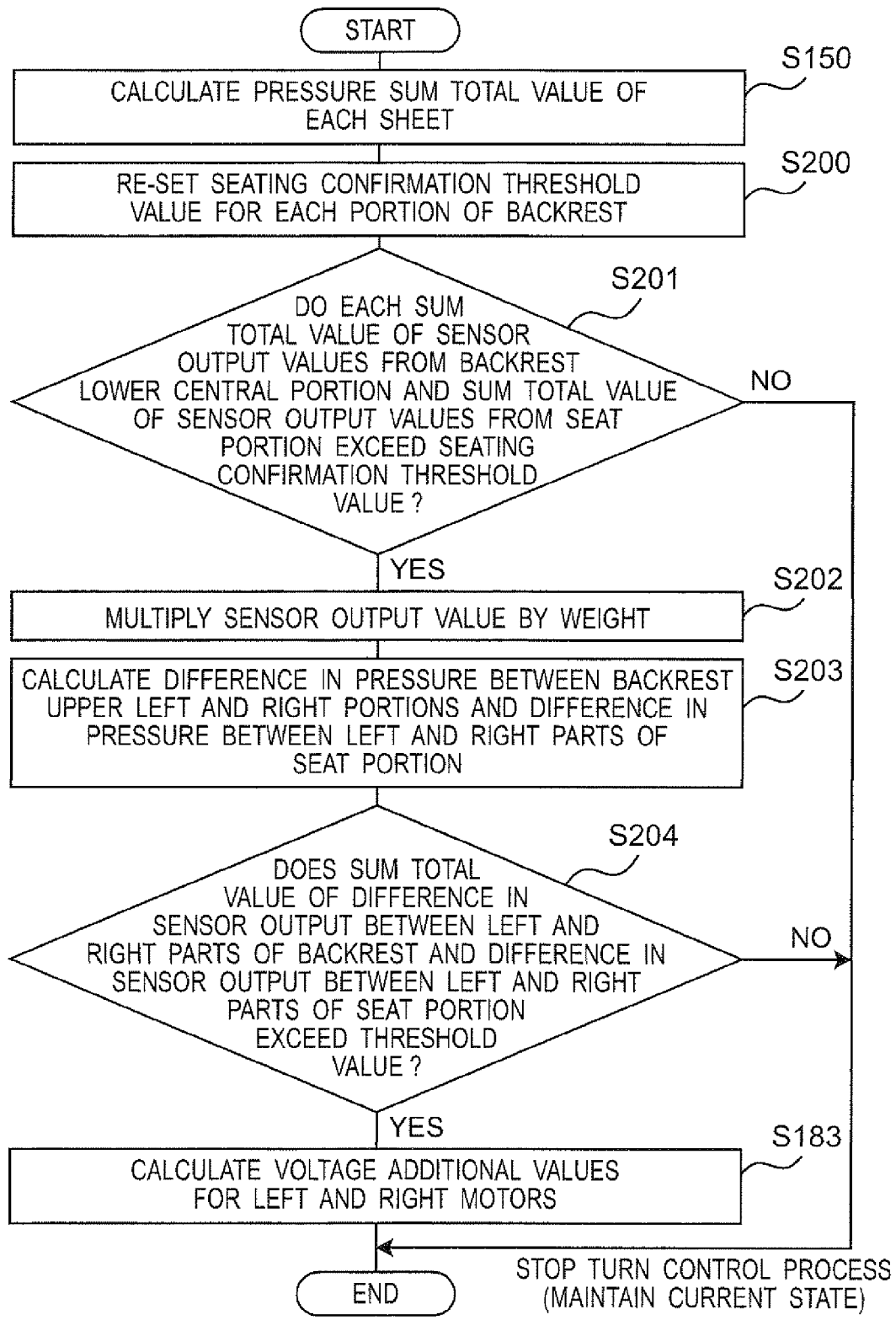
FIG. 24 is a flowchart of an intention determination process of the vehicle of the fourth embodiment of the present invention.

A detailed intention determination flow at this time is shown in FIG. 24.

First, at step S150, a sum total value of the pressure values of piezoelectric elements of the pressure sensor sheets 9a, 9b, 9c, and 9d is calculated by the sensor controller 10 for each of the pressure sensor sheets 9a, 9b, 9c, and 9d, and furthermore, a seat portion right side pressure sum total value and a seat portion left side pressure sum total value are calculated by the sensor controller 10.

Then, at step S200, the operational intention determining unit 132 may use preset seating confirmation threshold values, but may re-set the seating confirmation threshold values based on the output sum total values of the respective sensor sheets 9a, 9b, 9c, and 9d which are stored in the storage unit 196 of the weight determining unit 131 in the above. As is also described in the first embodiment, while the seating confirmation threshold values need to be set so as not to fall below the sum total values of pressure applied to the backrest 2a and the seat portion 2b when the rider 91 rides in the vehicle 100 and takes a posture to perform operation from now on, it also needs to be considered that when the rider 91 changes his/her posture in the range of his/her riding postural habit while being seated, too, the seating confirmation threshold values are set to values that do not exceed the changed value. For example, experimentally, it is appropriate to set a value that is one-half of each sensor output value stored in the storage unit 196 of the weight determining unit 131.

Then, at step S201, the operational intention determining unit 132 determines whether either or both of the output sum total value of the sensor sheet of the backrest lower central portion and the output sum total value of the sensor sheets of the backrest upper left and right portions, and the seat portion output sum total value exceed their respective re-set seating confirmation threshold values. If the operational intention determining unit 132 determines that either or both of the output sum total value of the sensor sheet of the backrest lower central portion and the output sum total value of the sensor sheets of the backrest upper left and right portions, and the seat portion output sum total value exceed their respective seating confirmation threshold values, then the operational intention determining unit 132 determines that there is an operational intention and thus proceeds to step S202. If the operational intention determining unit 132 determines that the above-described condition is not satisfied, then the operational intention determining unit 132 determines that there is no operational intention and thus stops the determination process and a control process subsequent thereto and the vehicle 100 continues the current operation. In a condition for the above-described intention determination, for the seat portion 2b, determination is made using the seat portion pressure sum total value, but when the seat portion right side pressure sum total value and the seat portion left side pressure sum total value exceed their respective threshold values, it may be determined that there is an operational intention. At this time, only when the rider 91 rides in the center of a seat 3 without leaning extremely to the right or left side, the operational intention determining unit 132 determines that there is an operational intention and thus a safer vehicle 100 can be provided.

Then, at step S202, the turn intention determining unit 133 sets values obtained by weighting a backrest upper right pressure sum total value, a backrest upper left pressure sum total value, a seat portion right side pressure sum total value, and a seat portion left side pressure sum total value by the weights determined by the weight determining unit 131, as their respective sensor values.

Subsequently, at step S203, the turn intention determining unit 133 calculates, using the sensor values, a difference between the backrest left and right sensor values and a difference between the seat portion left and right sensor values.

Then, at step S204, if the turn intention determining unit 133 determines that a sum total value of the difference between the backrest left and right sensor values and the difference between the seat portion left and right sensor values exceeds a preset left/right turn intention determination threshold value, then the turn intention determining unit 133 determines that there is a turn intention and thus proceeds to step S183.

If the turn intention determining unit 133 determines that the sum total value of the difference between the backrest left and right sensor values and the difference between the seat portion left and right sensor values is less than or equal to the preset left/right turn intention determination threshold value, then the turn intention determining unit 133 determines that there is no turn intention and thus stops the determination process and a control process subsequent thereto and the vehicle 100 continues the current operation (maintains the current state).

If the turn intention determining unit 133 determines at this step S204 that the sum total value of the differences is a positive value and exceeds the left/right turn intention determination threshold value, then the turn intention determining unit 133 determines that it is a right turn. If the turn intention determining unit 133 determines that the sum total value of the differences is a negative value and exceeds the left/right turn intention determination threshold value, then the turn intention determining unit 133 determines that it is a left turn.

At the next step S183, a process performed by the left/right turn control determining unit 104 and a process performed by the voltage converting unit 105 are performed in the same manner as in the first embodiment, whereby the motors 15b and 15a are driven.

According to the configuration of the fourth embodiment, a safe riding type vehicle 100 and a safe method of controlling a riding type vehicle can be provided in which even if a large postural change occurs as a result of the intention of performing motion other than operation, the vehicle 100 does not erroneously make a left or right turn or perform a movement operation. Furthermore, a riding type vehicle and a method of controlling a riding type vehicle can be provided in which by performing a process in which, when a sensor output value exceeds a measurement upper limit threshold value due to a riding posture, the weight for a corresponding sensor sheet is set to zero, the sensor sheet that cannot reflect a left or right turn intention is excluded, whereby a turn intention is more accurately reflected and there is no erroneous operation.

Note that the present invention can be applied not only to standing position riding type vehicles but also to normal single-seat vehicles with a seated position.

Fifth to Eighth Embodiments

Before describing fifth to eighth embodiments of the present invention in detail below with reference to the drawings, related conventional art will be described first.

The fifth to eighth embodiments of the present invention pertains to a standing position riding type vehicle which is mobility aid equipment steered by a rider changing his/her posture in the vehicle in which he/she rides in a substantially standing posture (neutral position), a method of controlling the turning of a standing position riding type vehicle, and a program for controlling the turning of a standing position riding type vehicle.

In recent years, an improvement of a living environment where elderly or disabled people can live safely and comfortably has been made.

For example, barrier-free design has been promoted in homes and public facilities. As a result, the area where elderly or disabled people can move around by themselves has been expanded.

Under such circumstances, attention is focused on mobility aid equipment that can be freely maneuvered by an elderly or disabled person by him/herself. While conventional mobility aid equipment is operated using a handle or joystick lever, there is proposed a technique for operating mobility aid equipment by a rider using a change in his/her posture. At the same time, in a seat in form where the rider sits with his/her knees bent greatly as in the case of a motorized wheelchair, since motion of sitting down or standing up is a great burden on the rider, there is a demand for mobility aid equipment in form that allows the rider to ride in a state as close as possible to a standing posture.

Figure 45A:
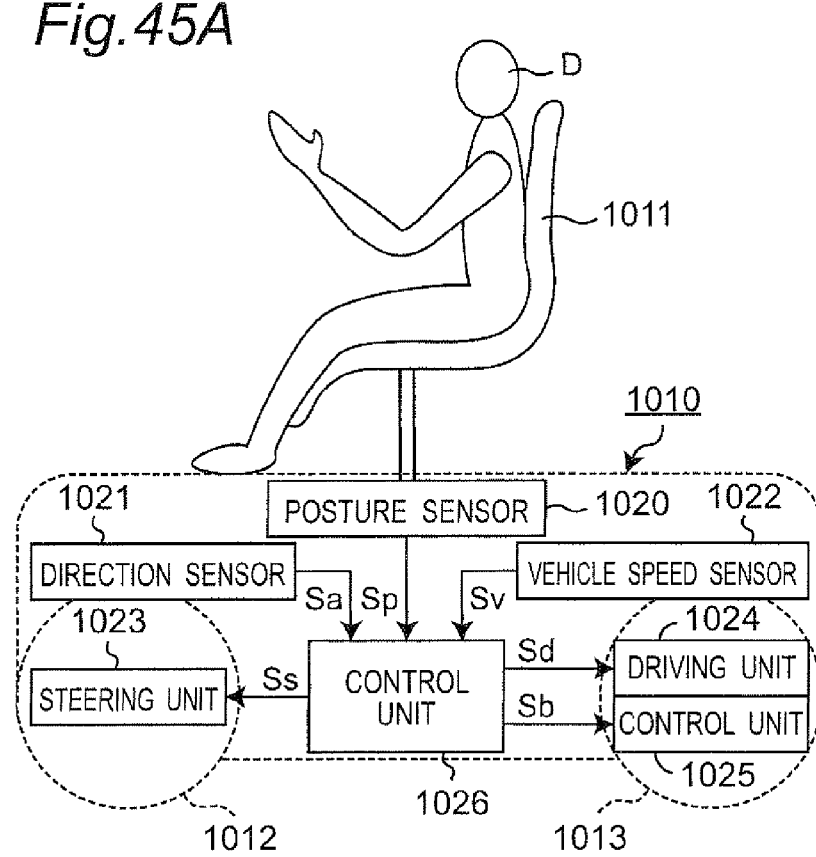
FIG. 45A is a schematic view of a vehicle described in Patent Literature 3.
Figure 45B:
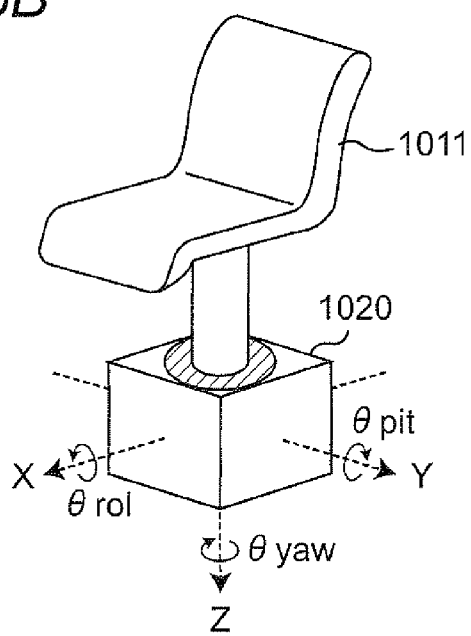
FIG. 45B is a schematic view of a seat of the vehicle described in Patent Literature 3.

For conventional mobility aid equipment, there is one that detects a posture of a driver riding in a vehicle and thereby allows the vehicle to perform driver's intended operation (see, for example, Patent Literature 2). FIGS. 45A and 45B are views showing a conventional vehicle described in Patent Literature 3 (Japanese Patent Application Laid-Open No. 2004-16275).

In FIGS. 45A and 45B, a motorized wheelchair 1010 which is a vehicle travels on the ground with a driver D sitting on a seat 1011 and riding therein. The motorized wheelchair 1010 includes a posture sensor 1020 provided at a lower portion of the seat 1011 to detect a change in the posture of the driver 3; a direction sensor 1021 that detects a direction of a front wheel 1012; a vehicle speed sensor 1022 that detects a moving speed; a steering unit 1023 that changes the direction of the front wheel 1012; a driving unit 1024 that drives a rear wheel 1013; a braking unit 1025 that brakes the rear wheel 1013; and a control unit 1026 that controls each unit. The posture sensor 1020 detects a variable or physical quantity of the seat 1011 occurring, as a result of the driver D changing his/her posture to lean his/her body in any of the front, back, left, and right directions. Based on the detection result, the control unit 1026 estimates motion intended by the driver D, e.g., motion of acceleration, deceleration, a left turn, or a right turn, and performs driving control.

However, according to conventional mobility aid equipment, in the case of mobility aid equipment in which a rider rides in a standing position or in a nearly standing state (substantially standing posture), there is a problem that the rider has difficulty in steering the equipment.

In conventional mobility aid equipment, a rider who steers a vehicle sits in a chair and the angle formed by the thigh and spine of the rider is roughly 90 degrees (90 degrees to 100 degrees). Furthermore, the load imposed by the weight of the rider is mainly applied to the coccyx and a region therearound (the gluteal region) and almost no load is applied to the knees. In addition, when the rider turns, for example, in a horizontal direction around the coccyx, the distance in the horizontal direction between the coccyx and the knees is large. Hence, since the moment around the rotation axis with the knees being the point of action can be increased, the rider can pivot the chair in a yaw direction by making a motion to swing his/her lower legs from side to side, bending the ankles to the left and right as viewed from the rider him/herself with the soles of the feet being the fulcrum, the knees being the point of action, and the feet fixed in one location. At this time, the rider does not change the posture of his/her upper body.

However, in mobility aid equipment in which the rider rides in a substantially standing posture, the angle formed by the thigh and lower legs is roughly 130 degrees or more (130 degrees to 180 degrees), and thus, this case greatly differs from the case of a seated posture in that the load imposed by the weight is applied to the knees and that the distance in the horizontal direction between the coccyx and the knees is short. Hence, compared with a seated state, the moment around the rotation axis is inevitably small. Therefore, in mobility aid equipment in which the rider rides in a standing position or in a nearly standing state, it is difficult for the rider to steer the equipment by producing a yaw-direction displacement in a chair (which is provided with a seat portion and a backrest (rest) portion) using his/her lower body. In addition, in a substantially standing posture, unlike the lower body that is stably held between the soles of the feet and the gluteal region, the upper body undergoes large movement due to centrifugal force and thus is unstable. Hence, an apparatus is required that steers mobility aid equipment such that the upper body is stably held with flexibility in upper body ensured.

In view of the above-described conventional problem, an object of the fifth to eighth embodiments of the present invention is therefore to provide a standing position riding type vehicle, a method of controlling the turning of a standing position riding type vehicle, and a program for controlling the turning of a standing position riding type vehicle, in which, while keeping a rider's posture in a substantially standing position stable, rider's intended steering can be implemented by detecting a change in the posture.

Various aspects of the fifth to eighth embodiments of the present invention will be described below.

According to a first aspect of the present invention, there is provided a standing position riding type vehicle steered by a change in a posture of a rider in which:

the standing position riding type vehicle includes a seat portion and backrest portions provided such that the rider is in a substantially standing position when riding in the vehicle;

the backrest portions include a fixed backrest portion disposed in a position that can come into contact with a body trunk of the rider, and fixed to a main body of the standing position riding type vehicle; and a first movable backrest portion and a second movable backrest portion movably mounted on the main body of the standing position riding type vehicle and capable of following a change in the posture of the rider;

the first movable backrest portion and the second movable backrest portion are disposed left-right symmetrically with respect to the fixed backrest portion;

a sensor that detects displacements of the respective first and second movable backrest portions; and the vehicle further includes a traveling control unit that calculates an amount of displacement from each of the displacements detected by the sensor and outputs a drive instruction based on the amounts of displacement and thereby allows the standing position riding type vehicle to make a turn.

According to a second aspect of the present invention, the standing position riding type vehicle according to the first aspect is provided in which:

the fixed backrest portion is disposed in a position that can come into contact with at least a spine or lumbar vertebrae of the rider; and the first and second movable backrest portions are disposed in positions that can respectively come into contact with the left and right shoulder blades of the rider.

According to a third aspect of the present invention, the standing position riding type vehicle according to the first or second aspect is provided in which:

front sides of the first and second movable backrest portions are provided on substantially a same plane as a front side of the fixed backrest portion; and a main displacement direction of each of the first and second movable backrest portions is a direction perpendicular to the plane.

According to a fourth aspect of the present invention, the standing position riding type vehicle according to any one of the first to third aspects is provided in which the traveling control unit converts the displacements of the respective first and second movable backrest portions into distances and changes a drive instruction according to amounts of change in the distances.

According to a fifth aspect of the present invention, the standing position riding type vehicle according to any one of the first to fourth aspects is provided in which each of the first and second movable backrest portions and the fixed backrest portion are coupled together by an elastic material so as to be movable with respect to the main body of the standing position riding type vehicle.

According to a sixth aspect of the present invention, there is provided a method of controlling turning of a standing position riding type vehicle in which:

the vehicle is steered by a change in a posture of a rider and including a seat portion and backrest portions provided such that the rider is in a substantially standing position when riding in the vehicle;

the backrest portions include a fixed backrest portion disposed in a position that can come into contact with a body trunk of the rider, and fixed to a main body of the standing position riding type vehicle; and a first movable backrest portion and a second movable backrest portion movably mounted on the main body of the standing position riding type vehicle and capable of following a change in the posture of the rider; and the first movable backrest portion and the second movable backrest portion are disposed left-right symmetrically with respect to the fixed backrest portion, the method including:

detecting, by a sensor, displacements of the respective first and second movable backrest portions; and calculating, by a traveling control unit, an amount of displacement from each of the displacements detected by the sensor and outputting a drive instruction based on the amounts of displacement and thereby allowing the standing position riding type vehicle to make a turn.

According to a seventh aspect of the present invention, there is provided a program for controlling turning of a standing position riding type vehicle in which:

the vehicle is steered by a change in a posture of a rider and including a seat portion and backrest portions provided such that the rider is in a substantially standing position when riding in the vehicle;

the backrest portions include a fixed backrest portion disposed in a position that can come into contact with a body trunk of the rider, and fixed to a main body of the standing position riding type vehicle; and a first movable backrest portion and a second movable backrest portion movably mounted on the main body of the standing position riding type vehicle and capable of following a change in the posture of the rider; and the first movable backrest portion and the second movable backrest portion are disposed left-right symmetrically with respect to the fixed backrest portion, the program causing a computer to function as:

a traveling control unit that calculates an amount of displacement from each of displacements of the respective first and second movable backrest portions detected by a sensor and outputs a drive instruction based on the amounts of displacement and thereby allows the standing position riding type vehicle to make a turn.

According to the standing position riding type vehicle, the method of controlling turning of a standing position riding type vehicle, and the program for controlling turning of a standing position riding type vehicle of the present invention, while stably maintaining the posture of a rider riding in a substantially standing position, steering intended by the rider can be implemented by detecting a change in the posture of the rider. In particular, since the movable backrest portions can be moved by contact of the rider, the rider him/herself and pedestrians around him/her can clearly realize that the rider has pushed the movable backrest portions, and thus, traveling operation can be performed smoothly.

The fifth to eighth embodiments of the present invention will be described below with reference to the drawings. Note that the reference numerals used in the drawings are all numbered in the 1000s in order to clearly distinguish from other embodiments.

Fifth Embodiment

In the following, first, a summary of a standing position riding type vehicle according to a fifth embodiment of the present invention will be described and then a detail thereof will be described.

Figure 26A:
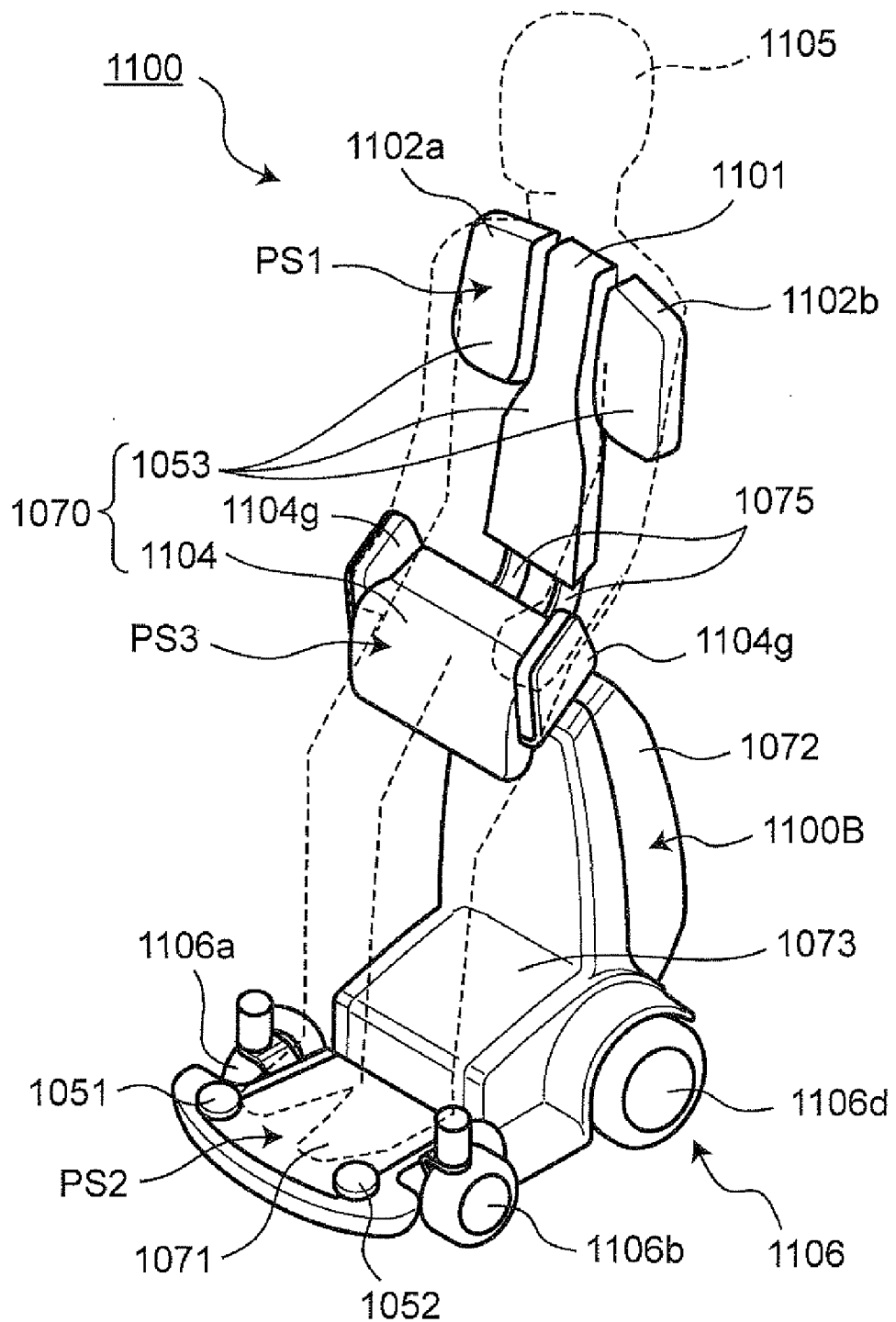
FIG. 26A is a perspective view describing a configuration of a standing position riding type vehicle according to a fifth embodiment of the present invention.

FIGS. 26A and 26B are views showing a configuration of a standing position riding type vehicle 1100 according to the fifth embodiment and a use environment thereof. The standing position riding type vehicle 1100 is an example of mobility aid equipment.

FIG. 26A is a perspective view of the standing position riding type vehicle. The standing position riding type vehicle 1100 is equipment that moves according to operation performed by a rider 1105 riding in the standing position riding type vehicle 1100. For example, the rider 1105 can move the standing position riding type vehicle 1100 forward or backward by operating a foot switch for forward motion 1051 or a foot switch for backward motion 1052 provided at the feet of the rider 1105. In addition, the rider 1105 can turn and move the standing position riding type vehicle 1100 in the left-right direction by operating backrest portions 1053 provided on the back of the rider 1105.

The rider 1105 rides in the standing position riding type vehicle 1100 in a substantially standing state (substantially standing posture (neutral position)). As used herein, the term "substantially standing state" refers to a posture where the femora and pelvis or the spine center line form an angle of roughly 135 degrees. This standing state is hereinafter referred to as a "substantially standing position".

FIG. 26B is a view showing an example of when the rider 1105 rides in the standing position riding type vehicle 1100 and moves around, for example, a product display section in a shopping mall. The rider 1105 can travel along a passageway 1063 sandwiched between product display shelves 1060 or stop, using the standing position riding type vehicle 1100. Thus, the rider 1105 can move at a speed equivalent to human walking speed, i.e., on the order of 5 km/hour, while allowing the standing position riding type vehicle 1100 to travel to a desired product display shelf 1060 and stop and then picking up a product 1061 on the product display shelf 1060, or allowing the standing position riding type vehicle 1100 to travel along the passageway 1063 and avoiding obstacles 1062 (including other pedestrians).

Figure 27:
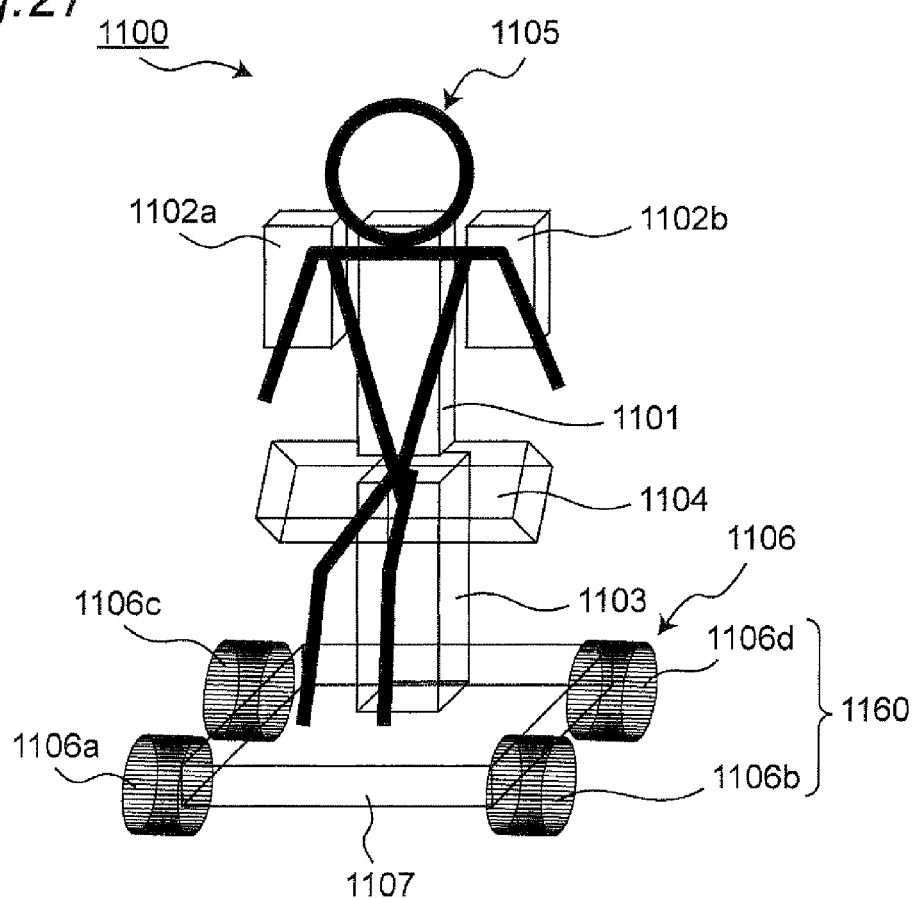
FIG. 27 is a bird's-eye view showing a schematic representation of the standing position riding type vehicle of the fifth embodiment.

FIG. 27 is a bird's-eye view showing a schematic representation of a standing position riding type vehicle including a turning control apparatus in the fifth embodiment.

In FIGS. 26A and 27, the standing position riding type vehicle 1100 is roughly configured by a main body unit 1100B of the standing position riding type vehicle and a seat 1070.

The main body unit 1100B of the standing position riding type vehicle includes a vehicle base 1160 and a support stand 1103.

The vehicle base 1160 has a chassis 1107 including a plate-like footrest 1071 having a footrest surface PS2 that supports the soles of the feet of the rider 1105 riding in the standing position riding type vehicle 1100; and a plurality of wheels 1106 (1106a, 1106b, 1106c, and 1106d) rotatably disposed on both sides of the chassis 1107.

The support stand 1103 is configured such that a post for the seat 1074 is fixed so as to rise up from the chassis 1107 and the seat 1070 is supported by the post for the seat 1074.

The seat 1070 has a seat portion 1104 provided on a upper portion of the post for the seat 1074 and having a seat surface PS3 that supports the gluteal region and ischial bone of the rider 1105 with the rider 1105 sitting thereon; and the backrest portions 1053 provided above the seat portion 1104 and having backrest surfaces PS1 that support a part of the rider 1105 from the lower back to back with the rider 1105 leaning his/her back thereagainst.

The backrest portions 1053 include a fixed backrest portion 1101 and movable backrest portions (a first movable backrest portion 1102a and a second movable backrest portion 1102b) that operate movement of the standing position riding type vehicle 1100. Though specific description will be made later, the first movable backrest portion 1102a or the second movable backrest portion 1102b is configured to have a left or right turn steering function, which enables to perform a left or right turn movement of the standing position riding type vehicle 1100 by pressing the first movable backrest portion 1102a or the second movable backrest portion 1102b with the left or right shoulder blade and a region therearound of the rider 1105. Note that the fixed backrest portion 1101 may be provided on the upper portion of the post for the seat 1074.

The fixed backrest portion 1101 is adjusted to come into contact with a body trunk 1105f of the rider 1105. Note that the "body trunk" 1105f of the rider 1105 refers to the spine and a region therearound of the rider 1105 or the lumbar vertebrae and a region therearound of the rider 1105, and includes both or one of them.

The first movable backrest portion 1102a and the second movable backrest portion 1102b are disposed in a left-right symmetric position with respect to the fixed backrest portion 1101, as viewed from the front side of the standing position riding type vehicle 1100. When the standing position riding type vehicle 1100 is in a stop state or a straight line traveling state (referred to as a "normal state"), the surfaces of the first movable backrest portion 1102a, the second movable backrest portion 1102b, and the fixed backrest portion 1101 that mainly come into contact with the right and left shoulder blades and body trunk 1105f of the rider 1105 are in the same plane. Specifically, the first movable backrest portion 1102a and the second movable backrest portion 1102b are adjusted so as to respectively come into contact with the right shoulder blade and a region therearound (a right shoulder portion 1105g) of the rider 1105 and the left shoulder blade and a region therearound (a left shoulder portion 1105h). Note that here in contrast with the body trunk 1105f, the "shoulder blade and a region therearound" are also represented as the "side of the body".

The vehicle main body 1100B has a control unit storage unit 1072 disposed at a rear portion thereof and has a battery and motor storage unit 1073 disposed on the chassis 1107 at a lower portion of the vehicle main body 1100B. The seat 1070 is disposed on the upper side of the standing position riding type vehicle 1100 such that the position thereof can be adjusted in an up-down direction from the lower portion of the vehicle main body 11003 via the post for the seat 1074 which is an example of the support stand 1103.

The footrest 1071 is fixed to the front portion side of the lower portion of the vehicle main body 1100B. The chassis 1107 at the lower portion of the vehicle main body 1100B has, for example, the four wheels 1106a, 1106b, 1106c, and 1106d in total rotatably disposed on surfaces on both sides thereof, and the standing position riding type vehicle 1100 can move forward and backward and turn by the four wheels 1106a, 1106b, 1106c, and 1106d. A seat portion 1104 of the seat 1070 is disposed such that the position thereof can be adjusted in an up-down direction from the lower portion of the vehicle main body 11008 via the post for the seat 1074. Above the seat 1070 there are fixedly disposed the backrest portions 1053 via a pair of posts for the backrest portions 1075 coupled to the post for the seat 1074.

A state in which, as shown in FIGS. 26A and 27, the body of the rider 1105 is supported in a posture where the head position equivalent to that for a standing position is maintained with the rider 1105 placing his/her feet on the footrest 1071, leaning his/her back on the backrest portions 1053, and placing his/her gluteal region on the seat surface PS3 of the seat portion 1104 is referred to as a "substantially standing posture" or "substantially standing state" or "ride in a neutral position". The posture of the rider 1105 at this time is referred to as a "neutral position". In addition, placing the gluteal region of the rider 1105 on the seat surface PS3 of the seat portion 1104 regardless of whether there is contact with the backrest portions 1053 is referred to as "sitting in the seat portion 1104".

The backrest portions 1053 can support a part of the rider 1105 from the lower back to back so that the rider 1105 can easily maintain a neutral position and can keep his/her head vertical without any load on his/her neck. The backrest portions 1053 have a backrest angle (an angle tilted about 10 degrees backward) at which a part of the rider 1105 from the lower back to back can be supported with respect to the seat surface PS3 of the seat portion 1104 and the footrest surface PS2 of the footrest 1071. A posture where the rider 1105 is tilted 10 degrees backward with respect to a forward motion direction in a state in which the rider 1105 rides in the standing position riding type vehicle 1100 in a neutral position is a natural posture to the rider 1105, which facilitates the motion of daily activities in a forward-leaning manner or the motion of standing up.

As described previously, the standing position riding type vehicle 1100 shown in FIG. 26A has the seat 1070 including the backrest portions 1053 having backrest surfaces that support a part of the rider 1105 from the lower back to back; and the seat portion 1104 having a seat surface that supports the gluteal region and ischial bone of the rider 1105.

The fixed backrest portion 1101 which is a backrest central portion and upper central portion is a flat portion which is one of the backrest portions 1053 that supports the curvatures of the spine and lumbar vertebrae of the rider 1105, and can stabilize the head position of the rider 1105 riding in a neutral position. For example, the fixed backrest portion 1101 indicates a central portion of the backrest portions 1053 having a width of the order of about one-third in a left-right width direction of the backrest portions 1053.

The first and second movable backrest portions 1102a and 1102b are flat portions of upper side portions of those of the backrest portions 1053 that are coupled to the fixed backrest portion 1101 so as to be disposed on both sides of the fixed backrest portion 1101 which is the backrest upper central portion, and that support both-side portions of the spine of the rider 1105. The first and second movable backrest portions 1102a and 1102b each indicate a portion of the backrest portions 1053 having a width of the order of about one-third in the left-right width direction of the backrest portions 1053.

In addition, the seat portion 1104 has side guards 1104g disposed on both sides thereof, forming surfaces in a vertical direction. The side guards 1104g prevent the body position from being shifted in a lateral direction relative to the seat portion 1104 when the rider 1105 rides in a neutral position.

The post for the seat 1074 is a post that is fixed to rise up in the vertical direction from the chassis 1107, to support the seat 1070. The post for the seat 1074 supports the seat 1070 by a known position adjustment mechanism such that the position of the seat 1070 can be adjusted in the up-down direction. The post for the seat 1074 has the pair of parallel posts for the backrest portions 1075 fixed at an upper end thereof. By the post for the seat 1074 and the pair of parallel posts for the backrest portions 1075, the seat portion 1104 and the backrest portions 1053 of the seat 1070 are coupled together to maintain the angle formed by the seat portion 1104 and the backrest portions 1053, thereby supporting the backrest portions 1053.

Of the four wheels 1106a, 1106b, 1106c, and 1106d, the rear wheels 1106c and 1106d are disposed at the rear portion on both sides of the lower portion of the vehicle main body 1100B so as to be rotatable forward and reversely. The rear wheels 1106c and 1106d are the drive wheels of the standing position riding type vehicle 1100 and make a left and right pair. The right and left axles of the rear wheels 11060 and 1106d function as an example of a drive apparatus and are respectively coupled to different electric-powered motors 1114a and 1114b which will be described later, and the rotation of the left and right axles is controlled independently of each other by a motor control unit 1113.

Of the four wheels 1106a, 1106b, 1106c, and 1106d, the front wheel's 1106a and 1106b with a smaller diameter than the rear wheels 1106c and 1106d are disposed at the front portion on both sides of the lower portion of the vehicle main body 1100E so as to be rotatable forward and reversely. The front wheels 1106a and 1106b are the front wheels of the standing position riding type vehicle 1100 and make a left and right pair. Each of the front wheels 1106a and 1106b has the same structure as a caster that rotatably supports a wheel by a swivel. Since the right and left front wheels 1106a and 1106b change their directions in 360 degrees by their respective swivels, they can move in all directions according to the drive of the rear wheels 1106c and 1106d.

The control unit storage unit 1072 stores therein a traveling control unit 1110 including a control computer and memory, which will be described later. The motor control unit 1113 in the traveling control unit 1110 performs drive control of the left and right electric-powered motors 1114b and 1114a independently of each other to rotate the axles of the right and left rear wheels 1106c and 1106d, forward and reversely. Specifically, the motor control unit 1113 determines operations of the standing position riding type vehicle 1100 such as forward motion, backward motion, left and right turns, and stop, according to an instruction input from the rider 1105 and controls the rotation directions (forward rotation, backward rotation, opposite rotation between left and right, and stop of rotation) and rotation speeds of the rear wheels 1106c and 1106d which are drive wheels.

The battery and motor storage unit 1073 disposed at the lower portion of the vehicle main body 1100E stores therein a battery (not shown) that supplies power required for operations of the standing position riding type vehicle 1100; and the left and right electric-powered motors 1114b and 1114a respectively coupled to the axles of the left and right rear wheels 1106d and 1106c. The battery supplies power required for operations to the control computer and memory stored in the control unit storage unit 1072, the left and right electric-powered motors 1114b and 1114a that are stored in the battery and motor storage unit 1073 and allow the left and right rear wheels 1106d and 1106c to rotate, and operation input means described below.

The foot switch for forward motion 1051 and the foot switch for backward motion 1052 are disposed at a front edge of the footrest 1071. The foot switch for forward motion 1051 and the foot switch for backward motion 1052 are an example of operation input means (forward and backward traveling control apparatus) used by the rider 1105 to perform operation of the standing position riding type vehicle 1100. In the example of the fifth embodiment, the foot switch for forward motion 1051 and the foot switch for backward motion 1052 are disposed in a left and right pair. For example, the right foot switch for forward motion 1051 is a switch that inputs a forward motion instruction to the motor control unit 1113 by stepping an the switch, and the left foot switch for backward motion 1052 is a switch that inputs a backward motion instruction to the motor control unit 1113 by stepping on the switch.

The post for the seat 1074 and the seat portion 1104 determine the height of the seat 1070 supported by the post for the seat 1074, using a known position adjustment mechanism provided to the post for the seat 1074 such that the rider 1105 is placed in a substantially standing position, in accordance with the height of a part of the rider 1105 from the feet to coccyx. For example, the configuration is such that the height of the seat 1070 can be changed between 100 cm at the maximum for young men to 50 cm for children. As a result, the height of the seat 1070 can be adjusted to place the rider 1105 in a substantially standing position. In addition, the fixed backrest portion 1101 may also be configured such that the position or tilt angle thereof can be adjusted using a known position adjustment mechanism to allow the rider 1105 to lean against the fixed backrest portion 1101 in a substantially standing posture.

Figure 28A:
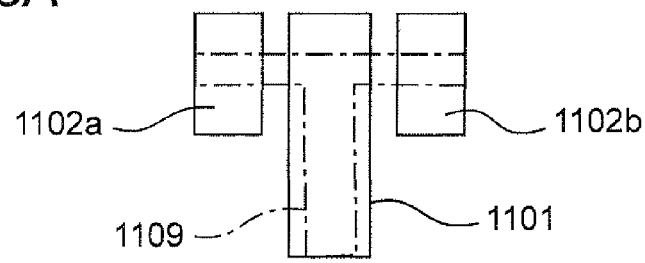
FIG. 28A is a view describing the shape of backrest portions of the standing position riding type vehicle of the fifth embodiment.

Note that in FIG. 27 the shapes of the backrest portions 1053 are shown as rectangular parallelepipeds, as shown in FIG. 28A. Specifically, the first movable backrest portion 1102a and the second movable backrest portion 1102b are rectangular parallelepipeds of the same shape and the same size, and the fixed backrest portion 1101 is a rectangular parallelepiped longer in length than the movable backrest portions.

Figure 28B:
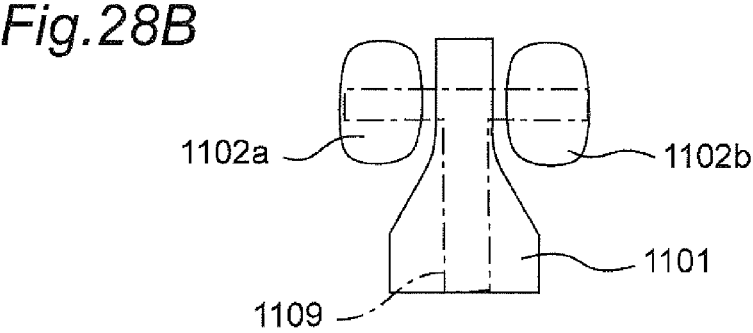
FIG. 28B is a view describing another shape of the backrest portions of the standing position riding type vehicle of the fifth embodiment.

However, as shown in FIG. 28B, as one example, the backrest portions 1053 have shapes that fit the body shape of the rider 1105 and do not inhibit a postural change. The standing position riding type vehicle in FIG. 26A adopts the shapes of the backrest portions 1053 in FIG. 28B. Specifically, the first movable backrest portion 1102a and the second movable backrest portion 1102b are rectangular parallelepipeds with rounded corners of the same shape and the same size. The fixed backrest portion 1101 is such that the gaps between the fixed backrest portion 1101 and the first movable backrest portion 1102a and the second movable backrest portion 1102b are small, a portion of the fixed backrest portion 1101 below the gaps between the fixed backrest portion 1101 and the first movable backrest portion 1102a and the second movable backrest portion 1102b spreads towards the edge thereof, and the fixed backrest portion 1101 is longer in length than the first movable backrest portion 1102a and the second movable backrest portion 1102b.

Figure 29A:
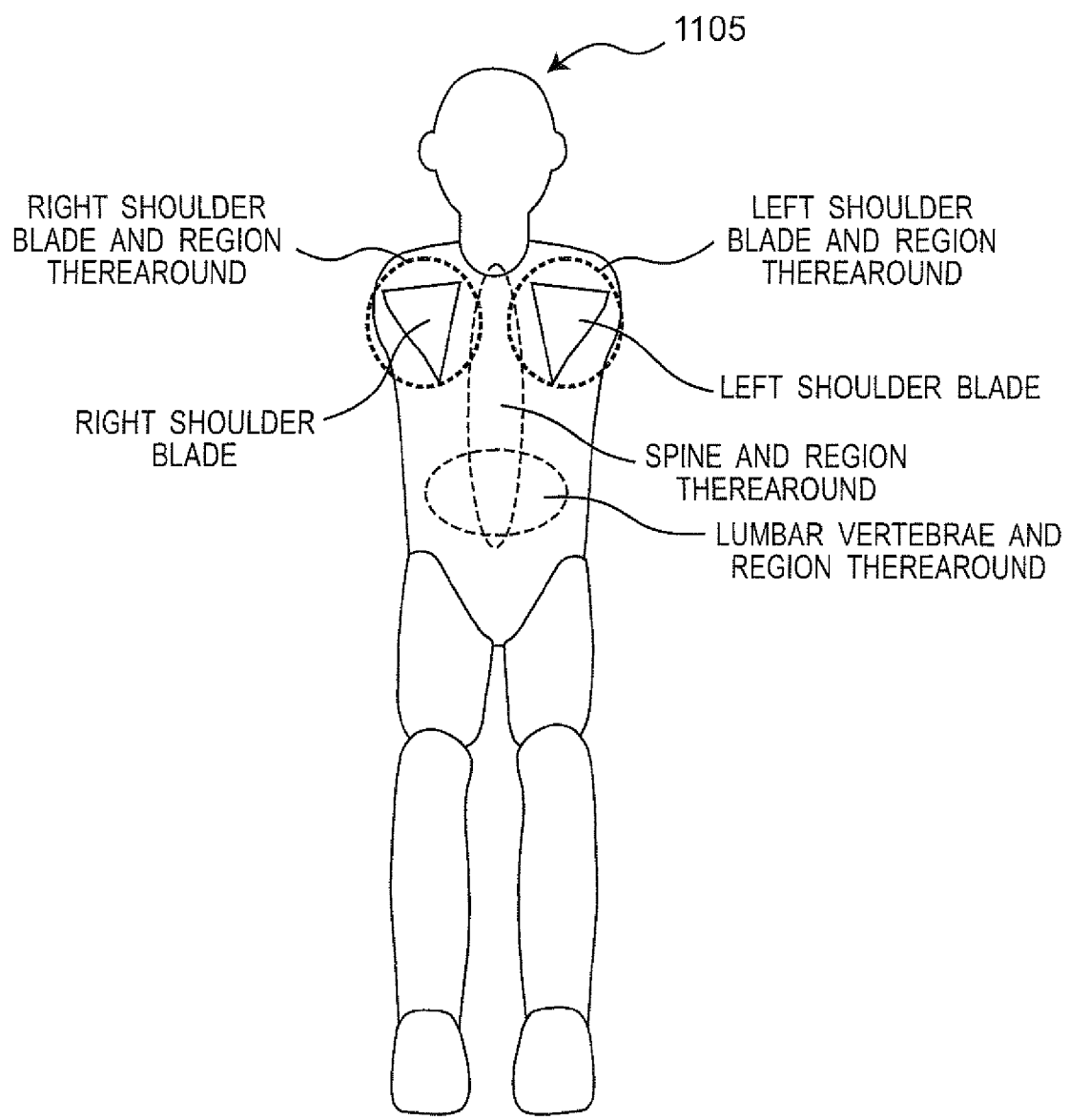
FIG. 29A is a view describing a positional relationship between the body parts of a rider and the standing position riding type vehicle of the fifth embodiment.
Figure 29B:
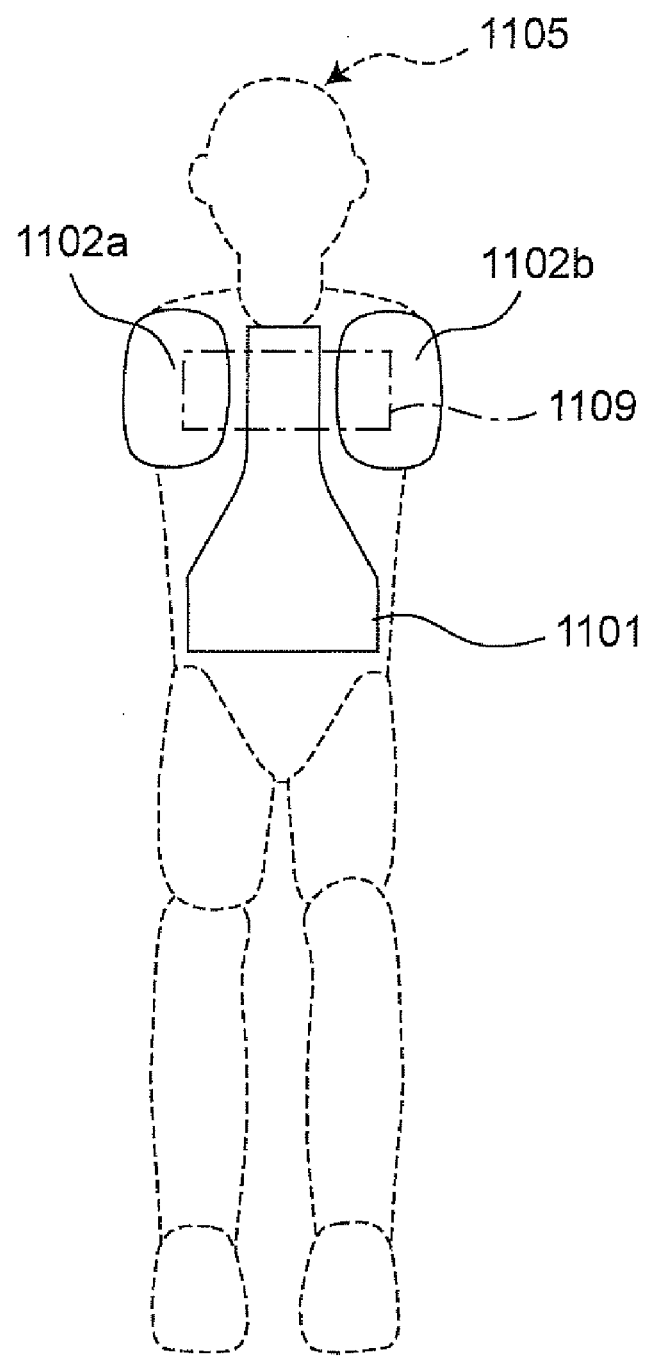
FIG. 29B is a view describing a positional relationship between the body parts of the rider and the standing position riding type vehicle of the fifth embodiment and the backrest portions.

A positional relationship between the body parts of the rider 1105 is shown in FIG. 29A and a positional relationship between the backrest portions 1053 and the parts of the rider 1105 is shown in FIG. 29B. Specifically, as is clear from FIGS. 29A and 29B, the fixed backrest portion 1101 mainly comes into contact with the lumbar vertebrae and a region therearound and the spine and a region therearound of the rider 1105, thereby holding the rider 1105. The first and second movable backrest portions 1102a and 1102b respectively come into contact with the right shoulder blade and a region therearound (the right shoulder portion 1105g) and the left shoulder blade and a region therearound (the left shoulder portion 1105h) of the rider 1105.

FIGS. 30A and 30B are schematic top views of a coupling structure between the backrest portions 1053 of the turning control apparatus of the standing position riding type vehicle 1100 in FIG. 26A and the main body unit 1100B of the standing position riding type vehicle, as viewed from the top. (1) of FIG. 30A is a schematic top view showing the turning control apparatus with springs 1108a and 1108b (described later) which are an example of an elastic material being in their natural length, when the rider 1105 does not ride in the standing position riding type vehicle 1100 (natural state). (2) of FIG. 30A is a schematic top view of the turning control apparatus in a state in which the springs 1108a and 1108b are compressed, when the standing position riding type vehicle 1100 goes in a straight line (normal state). (3) of FIG. 30A is a schematic top view of the turning control apparatus when the standing position riding type vehicle 1100 makes a turn.

As shown in (1) of FIG. 30A, the back of the fixed backrest portion 1101 is fixed to a plate-like support portion 1109. The support portion 1109 is fixed to the upper portion of the post for the seat 1074. The post for the seat 1074 is integrally formed with the chassis 1107, which in turn that the fixed backrest portion 1101 is integrally formed with the chassis 1107 (not shown). Note that the support portion 1109 may be fixed to the side of the post for the seat 1074.

The backs of the first and second movable backrest portions 1102a and 1102b are respectively coupled to one ends of the respective first and second springs 1108a and 1108b which are an example of an elastic material. Furthermore, each of the other ends of the respective first and second springs 1108a and 1108b is coupled to the plate-like support portion 1109 integrally formed with the fixed backrest portion 1101. Thus, while the fixed backrest portion 1101 is immovably fixed to the support portion 1109, the first and second movable backrest portions 1102a and 1102b are movably supported by the support portion 1109 by compression and extension of the first and second springs 1108a and 1108b, respectively. In this manner, the first and second movable backrest portions 1102a and 1102b movable with respect to the fixed backrest portion 1101 which is integrally formed with the chassis 1107 and is thereby fixed to the main body unit 11005 of the standing position riding type vehicle can be implemented. Moving states, in other words, the degrees of compression and extension (displacements), of the first and second movable backrest portions 1102a and 1102b are detected by displacement detection sensors 1115a and 1115b which will be described later, and a steering function is exerted based on the detection results.

(2) of FIG. 30A shows an example of the case in which in the coupling structure in (1) of FIG. 30A the rider 1105 leans against the backrest portions 1053 of the turning control apparatus uniformly to the left and right. The fixed backrest portion 1101 is disposed to come into contact with the body trunk 1105$f$, and the first and second movable backrest portions 1102a and 1102b are disposed to respectively come into contact with the sides of the body (shoulders), i.e., the right shoulder portion 1105$g$ and the left shoulder portion 1105$h$. As one example, it is possible that the fixed backrest portion 1101 and the first and second movable backrest portions 1102a and 1102b be provided such that their front side portions are in substantially the same plane (their front side portions fit the back of the rider 1105). Note that the "front side portions" refer to the surface of the fixed backrest portion 1101 that comes into contact with the body trunk 1105$f$ of the rider 1105 and the surfaces of the movable backrest portions 1102a and 1102b that come into contact with shoulder blades and regions therearound (the right shoulder portion 1105$g$ and the left shoulder portion 1105$h$). Note also that a plane S1 formed by the front side portions of the fixed backrest portion 1101 and the movable backrest portions 1102a and 1102b is defined as a plane formed to include the front side of the fixed backrest portion 1101 and the front sides of the movable backrest portions 1102a and 1102b. The plane 31 formed by the front side portions is not necessarily a plane with no distortion at all and also includes a slightly curved plane formed by a set of envelopes of the back shape of the rider 1105. A state of a plane that thus includes not only a plane with no distortion but also including a slightly curved plane is referred to as "substantially the same plane" or "same plane".

Note that to implement this, as one example, it is possible that, in a state (natural state) in which a human does not ride in the standing position riding type vehicle 1100 and nothing is in contact with the backrest portions 1053, the front side portions of the first and second movable backrest portions 1102a and 1102b slightly protrude more forward than the front side portion of the fixed backrest portion 1101. The configuration is to be such that the springs 1108a and 1108b in this natural state are implemented by the natural length of the springs 1108a and 1108b. By doing so, tension is always applied in advance to the springs 1108a and 1108b during a ride of the rider 1105. As a result, upon the rider 1105 twisting his/her body, a greater force needs to be applied when tension is applied in advance to the springs 1108a and 1108b than when the spring 1108a or the 1108b is compressed from the natural length to a length less than the natural length. Hence, abrupt steering can be prevented from being performed as a result of a minute change in the posture of the rider 1105. For example, when the rider 1105 slightly changes his/her posture without the intention of performing steering, the change can be avoided from being detected as steering operation. Furthermore, there is an advantage that, when the rider 1105 attempts to lean against the backrest portions 1053 for the first time after riding in the standing position riding type vehicle 1100, the movable backrest portions 1102a and 1102b act as cushions, which enables the body to smoothly come into contact with the fixed backrest portion 1101.

(3) of FIG. 30A shows a state in which the rider 1105 riding in the standing position riding type vehicle 1100 turns the body trunk 1105$f$ the right with the central axis of the body trunk 1105$f$ as the rotation axis and presses the first movable backrest portion 1102a with the right shoulder blade and a region therearound (the right shoulder portion 1105$g$) of the rider 1105. At this time, the spring 1108b on the side of the second movable backrest portion 1102b is in a state of extending to the extent of its natural length as the left shoulder blade and a region therearound (the left shoulder portion 1105$h$) of the rider 1105 try to move away from the second movable backrest portion 1102b.

(4) to (6) of FIG. 30B show examples of spring configurations different than that in FIG. 30A.

(4) of FIG. 30B is a schematic top view of the turning control apparatus in a state of achieving balance with the natural length, which is an exemplary configuration using springs 1108c when the rider 1105 does not ride in the standing position riding type vehicle 1100 (when no loading). Each of the first movable backrest portion 1102a and the second movable backrest portion 1102b is supported by a plate-like support portion 1109A by means of three springs 1108c of the same length and the same biasing force. Thus, as a method of achieving a natural state, by using the natural length of the springs 1108c as it is, the first movable backrest portion 1102a and the second movable backrest portion 1102b are coupled to the fixed backrest portion 1101 in a state in which the plurality of springs 1108c with the natural length achieve balance.

On the other hand, as shown in (5) of FIG. 30B, a method of achieving balance by combining compressed springs 1108d and an extended spring 1108e is considered. Specifically, (5) of FIG. 30B is a schematic top view of the turning control apparatus in a state of achieving balance with tension, which is an exemplary configuration using springs 1108d and 1108e when the rider 1105 does not ride in the standing position riding type vehicle 1100 (when no loading). Each of the first movable backrest portion 1102a and the second movable backrest portion 1102b is supported by a plate-like support portion 1109B by means of three springs 1108d, 1108e, and 1108d. While one spring 1108e which is the middle one of the three springs 1106d, 1108e, and 1108d is in an extended state, two springs 1108d disposed on both sides to sandwich the spring 1108e are mounted on projections 1109Bp of the support portion 1109B and are in a compressed state. Thus, the first movable backrest portion 1102a and the second movable backrest portion 1102b are coupled to the fixed backrest portion 1101 in a state in which one spring 1108e in an extended state and two springs 1108d in a compressed state achieve balance.

(6) of FIG. 30B shows another method of achieving balance by combining a compressed spring 1106g and extended springs 1108$f$, as in (5) of FIG. 30B. (6) of FIG. 30B is a schematic top view of the turning control apparatus in a state of achieving balance with tension, which is an exemplary configuration using springs 1108$f$, 1106g, and 1108$f$ when the rider 1105 does not ride in the standing position riding type vehicle 1100 (when no loading). Each of the first movable backrest portion 1102*a* and the second movable backrest portion 1102*b* is supported by a plate-like support portion 1109C by means of three springs 1108*f*, 1108*g*, and 1108*l*. While one spring 1108*g* which is the middle one of the three springs 1108*l*, 1108*g*, and 1108*l* is mounted on a projection 1109Cp of the support portion 1109C and is in a compressed state, two springs 1108*l* disposed on both sides to sandwich the spring 1108*g* are in an extended state. Thus, the first movable backrest portion 1102*a* and the second movable backrest portion 1102*b* are coupled to the fixed backrest portion 1101 in a state in which one spring 1108*g* in a compressed state and two springs 1108*f* in an extended state achieve balance.

In the movable backrest portions 1102*a* and 1102*b* achieving balance with springs having tension, as in (5) and (6) of FIG. 30B, a plane can be easily stabilized by increasing resistance, as compared to the movable backrest portions 1102*a* and 1102*b* achieving balance of springs uniformly with the natural length, as in (4) of FIG. 30B, and thus, abrupt steering can be prevented or posture can be prevented from being unbalanced.

In addition, by providing at least four springs to each of the movable backrest portions 1102*a* and 1102*b*, movement of the movable backrest portions 1102*a* and 1102*b* in up-down and left-right directions is reduced, improving plane stability. Provided that springs that are difficult to deform are used, each of the movable backrest portions 1102*a* and 1102*b* may be supported by a single spring.

Next, a variant of the fifth embodiment of the present invention is shown in FIG. 31A. Here, two movable backrest portions, i.e., first and second movable backrest portions 1102*a* and 1102*b*, and a support portion 1109O are integrally and movably disposed with respect to a fixed backrest portion 1101 directly fixed to a upper portion of a post for a seat 1074. (1) of FIG. 31A shows a state when not riding (springs are in a state of their natural length). (2) of FIG. 31A shows a state when going in a straight line (at normal traveling) (springs are in an extended state). (3) of FIG. 31A shows a state when making a turn (springs are in an extended state and a compressed state).

Specifically, as shown in (1) of FIG. 31A, springs 1108*i* and 1108*j* couple the fixed backrest portion 1101 to a central portion of the support portion 1109D. In addition, the configuration is different in that the first and second movable backrest portions 1102*a* and 1102*b* are disposed integrally with the support portion 1109D. Specifically, the first and second movable backrest portions 1102*a* and 1102*b* are configured to be fixed to the left and right edges of the support portion 1109O and to be movable in an integral manner with the support portion 1109D. Hence, the first and second movable backrest portions 1102*a* and 1102*b* and the support portion 1109D are movably coupled to the fixed backrest portion 1101 via the springs 1108*i* and 1108*j*. The fixed backrest portion 1101 is fixed to the upper portion of the post for the seat 1074.

Note that at this time, as shown in (2) of FIG. 31A, in a state in which a body trunk 1105*f* of a rider 1105 is in contact with the fixed backrest portion 1101, the front side portions of the fixed backrest portion 1101 and the first and second movable backrest portions 1102*a* and 1102*b* should be in substantially the same plane S2. For example, when the rider 1105 leans against the fixed backrest portion 1101, the springs 1108*i* and 1108*j* supporting the first and second movable backrest portions 1102*a* and 1102*b* are placed in a state of being slightly extended from their natural length. By doing so, at the moment at which the rider 1105 brings the body trunk 1105*f* into contact with the fixed backrest portion 1101 or conversely at the moment at which the rider 1105 moves the body trunk 1105*f* away from the fixed backrest portion 1101 or during a period during which the rider 1105 is twisting his/her body, both of the first and second movable backrest portions 1102*a* and 1102*b* can maintain a state of being in contact with the rider 1105.

As such, the first and second movable backrest portions 1102*a* and 1102*b* are coupled to the fixed backrest portion 1101 via the springs 1108*i* and 1108*j*. Hence, the first and second movable backrest portions 1102*a* and 1102*b* have a restoring force exerted by compression and extension of the springs 1108*i* and 1108*j*. For example, when, as shown in (3) of FIG. 31A, the rider 1105 changes his/her posture to twist his/her body to the right by moving his/her right shoulder blade (a right shoulder portion 1105*g*) backward, the right shoulder blade (the right shoulder portion 1105*g*) of the rider 1105 which is on the turning side greatly extends the spring 1108*i* on the side of the first movable backrest portion 1102*a*, generating a restoring force trying to return to its original slightly extended state from the greatly extended state. Since the rider 1105 receives a reaction force of the restoring force by the right shoulder blade (the right shoulder portion 1105*g*), the rider 1105 can stably maintain the posture while moderately receiving the reaction force. At this time, the left shoulder blade (a left shoulder portion 1105*h*) of the rider 1105 which is on the opposite side to the turning side moves forward and the spring 1108*j* on the side of the second movable backrest portion 1102*b* changes from its original slightly extended state to a compressed state, generating a restoring force trying to return to the original state.

FIG. 31B is a view showing configurations of springs in a natural state in another variant. (4) of FIG. 31B shows a state when not riding (a state in which springs achieve balance with their natural length when no loading). (5) of FIG. 31B shows a state when not riding (a state in which springs achieve balance with tension when no loading). (6) of FIG. 31B shows a state when not riding (a state in which springs achieve balance with tension when no loading).

A configuration of springs in a natural state in this another variant is shown in (4) of FIG. 31B. (4) of FIG. 31B is a schematic top view of a turning control apparatus in a state of achieving balance with a natural length, which is an exemplary configuration using springs 1108*k* when a rider 1105 does not ride in a standing position riding type vehicle 1100 (when no loading). A fixed backrest portion 1101 is supported by a central portion of a plate-like support portion 1109*b* by means of three springs 1108*k* of the same length and the same biasing force. A first movable backrest portion 1102*a* and a second movable backrest portion 1102*b* are fixed to the left and right edges of the support portion 1109E. Thus, as a method of achieving the natural state, by using the natural length of the springs 1108*k* as it is, the first movable backrest portion 1102*a* and the second movable backrest portion 1102*b* are coupled to the fixed backrest portion 1101 in a state in which the plurality of springs 1108*k* with the natural length achieve balance.

On the other hand, as shown in (5) of FIG. 31B, a method of achieving balance by combining compressed springs 1108*m* and an extended spring 1108*n* is considered. Specifically, (5) of FIG. 31B is a schematic top view of a turning control apparatus in a state of achieving balance with tension, which is an exemplary configuration using the springs 1108*m*, 1108*n*, and 1108*m* when a rider 1105 does not ride in a standing position riding type vehicle 1100 (when no loading). A fixed backrest portion 1101 is supported by a central portion of a plate-like support portion 1109F by means of the three springs 108*m*, 1108*n*, and 1108*m*. While one spring 1108*n* which is the middle one of the three springs 1108*m*, 1108*n*, and 1108*m* is in an extended state, two springs 1108*m* disposed on both sides to sandwich the spring 1108*n* are mounted on projections 1109Fp of the support portion 1109S and are in a compressed state. A first movable backrest portion 1102*a* and a second movable backrest portion 1102*b* are fixed to the left and right edges of the support portion 1109l. Thus, the first movable backrest portion 1102*a* and the second movable backrest portion 1102*b* are coupled to the fixed backrest portion 1101 in a state in which one spring 1108*n* in an extended state and two springs 1108*m* in a compressed state achieve balance.

(6) of FIG. 31B shows another method of achieving balance by combining a compressed spring 1108*q* and extended springs 1108*p*, as in (5) of FIG. 31B. (6) of FIG. 31B is a schematic top view of a turning control apparatus in a state of achieving balance with tension, which is an exemplary configuration using the springs 1108*p*, 1108*q*, and 1108*p* when a rider 1105 does not ride in a standing position riding type vehicle 1100 (when no loading). A fixed backrest portion 1101 is supported by a plate-like support portion 1109G by means of the three springs 1108*p*, 1108*q*, and 1108*p*. While one spring 1108*q* which is the middle one of the three springs 1108*p*, 1108*q*, and 1108*p* is mounted on a projection 1109Gp of the support portion 1109G and is in a compressed state, two springs 1108*p* disposed on both sides to sandwich the spring 1108*q* are in an extended state. A first movable backrest portion 1102*a* and a second movable backrest portion 1102*b* are fixed to the left and right edges of the support portion 1109G. Thus, the first movable backrest portion 1102*a* and the second movable backrest portion 1102*b* are coupled to the fixed backrest portion 1101 in a state in which one spring 1108*q* in a compressed state and two springs 1108*p* in an extended state achieve balance.

Figure 32A:
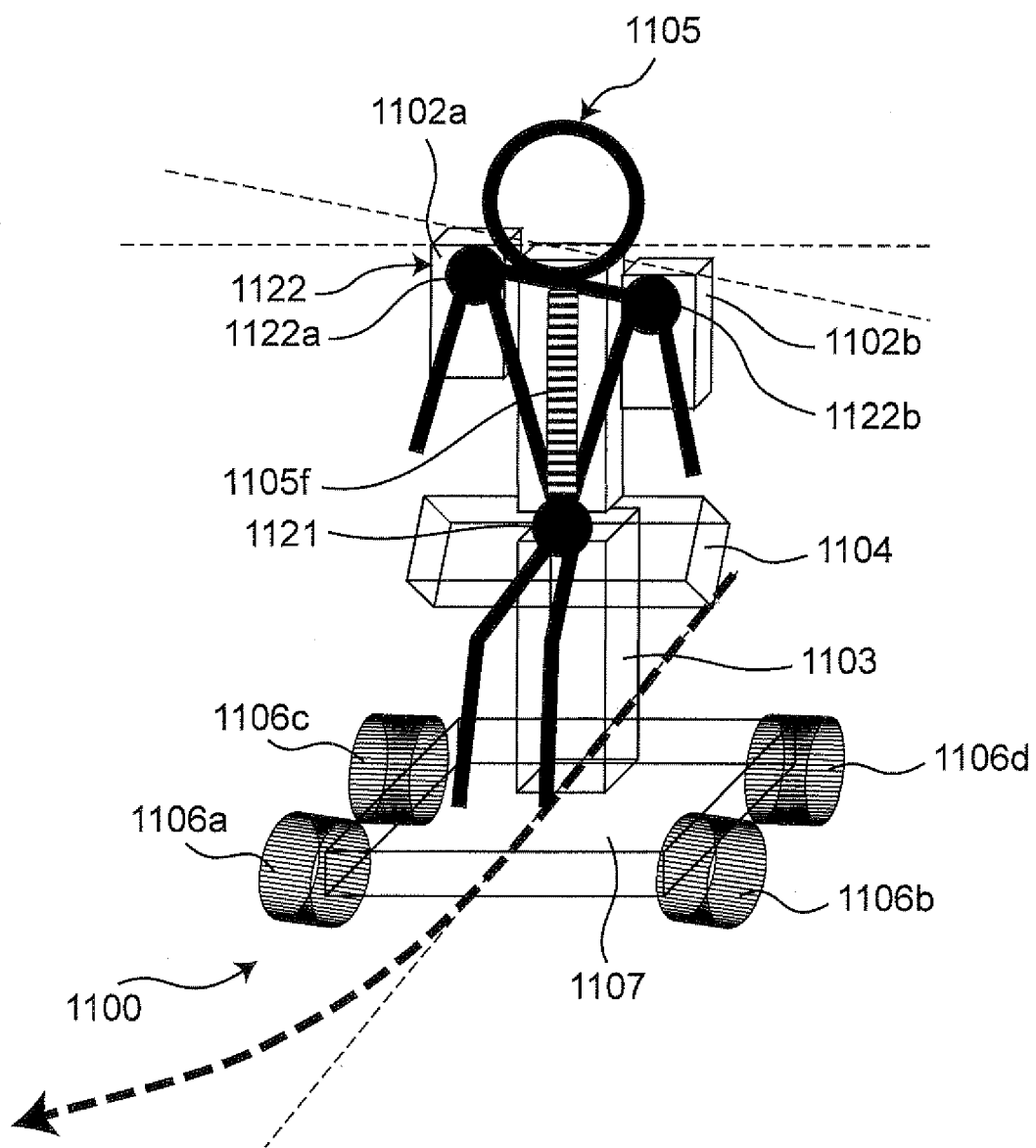
FIG. 32A is a schematic view describing operation in the fifth embodiment.
Figure 32B:
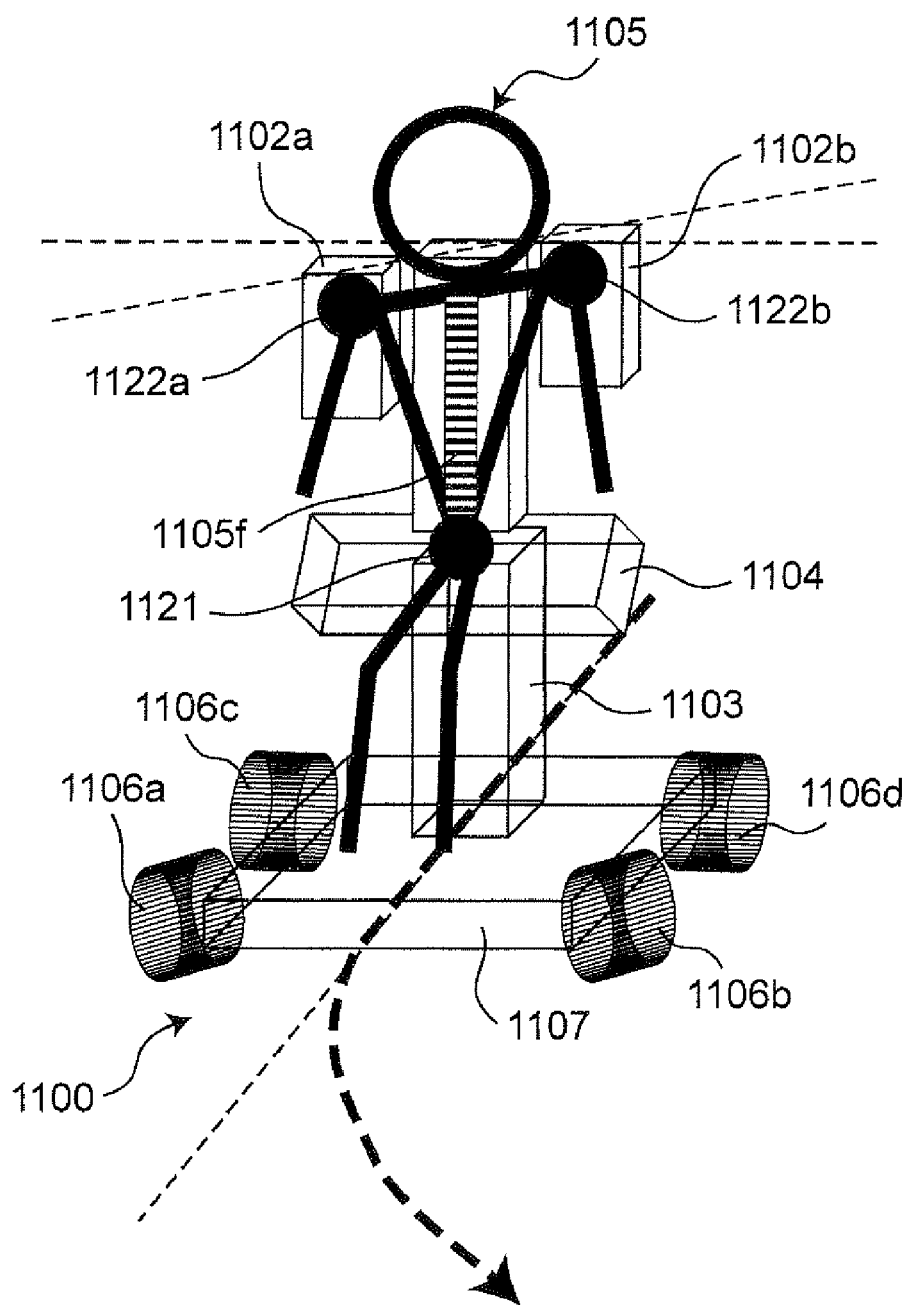
FIG. 32B is a schematic view describing operation in the fifth embodiment.

FIGS. 32A and 32B are views showing operation of the standing position riding type vehicle 1100 when making a turn.

FIGS. 32A and 32B respectively show states in which the standing position riding type vehicle 1100 makes a right turn and a left turn (referred to as "turning states") by the rider 1105 twisting his/her body to the right and left. In this case, the rider 1105 makes a motion of twisting his/her body using his/her upper body with the rider 1105 sitting in the seat portion 1104. When the rider 1105 twists his/her body by changing the posture of his/her upper body, the first and second movable backrest portions 1102*a* and 1102*b* are displaced from their normal states, following the upper body of the rider 1105. The amounts of displacement can be detected by, for example, measuring the distances or rotation angles of the first and second movable backrest portions 1102*a* and 1102*b* with reference to the fixed backrest portion 1101, by the displacement detection sensors 1115*a* and 1115*b*. By converting the amounts of displacement detected by the displacement detection sensors 1115*a* and 1115*b* into the amounts of rotation of the rear wheels 1106*c* and 1106*d* by the traveling control unit 1110, the amount of rotation and turning direction of the standing position riding type vehicle 1100 can be controlled.

In a state in which the rider 1105 sits in the seat portion 1104, the rider 1105 is in contact with the seat portion 1104. The point at which the rider 1105 is in contact with the seat portion 1104 is a seat portion fulcrum 1121. For example, since the rider 1105 and the seat portion 1104 are in contact with each other at a plane but not a point, the position of the center of gravity of the rider 1105 is the seat portion fulcrum 1121. Note that by the seat portion 1104 including a pressure sensor, the position of the center of gravity can be obtained from a pressure distribution by the weight of the rider 1105.

Even when the rider 1105 makes a motion to twist his/her body, since the motion of twisting the body is an upper body motion of the rider 1105, the position of the seat portion fulcrum 1121 that is in contact with the lower back of the rider 1105 does not significantly change. As one example, it is possible to use a material with a high friction coefficient for the seat portion 1104 in order to prevent the rider 1105 from unexpectedly slipping sideways on the seat surface PS3 due to an impact, etc., given to the standing position riding type vehicle 1100.

At the same time, the body trunk 1105*f* of the rider 1105 is in contact with the fixed backrest portion 1101. Therefore, a part of the rider 1105 from the body trunk 1105*f* to the seat portion fulcrum 1121 is stably held.

Meanwhile, to allow the standing position riding type vehicle 1100 to travel in a turning manner, the rider 1105 needs to be in contact with at least one of the two movable backrest portions, i.e., the first and second movable backrest portions 1102*a* and 1102*b*. A contact point between the right shoulder blade and a region therearound (the right shoulder portion 1105*g*) and the first movable backrest portion 1102*a* is a right shoulder contact point 1122*a*. A contact point between the left shoulder blade and a region therearound (the left shoulder portion 1105*h*) and the second movable backrest portion 1102*b* is a left shoulder contact point 1122*b*. The rider 1105 is in contact with the first and second movable backrest portions 1102*a* and 1102*b* at a plane but not a point. Thus, the centers of gravity of distributions of pressure generated by the rider 1105 leaning against the first and second movable backrest portions 1102*a* and 1102*b* are referred to as the right shoulder contact point 1122*a* and the left shoulder contact point 1122*b*. Note that the right shoulder contact point 1122*a* and the left shoulder contact point 1122*b* may be called a shoulder contact point 1122 with no distinction therebetween.

The right shoulder contact point 1122*a* or the left shoulder contact point 1122*b* is one of the parts of the entire back of the rider 1105 most distanced from the seat portion fulcrum 1121 or the body trunk 1105*f*, in a state of being viewed from above the rotation axis.

Thus, when the body is twisted with the seat portion fulcrum 1121 as a fulcrum (or with the entire body trunk 1105*f* as a pivot), the right shoulder contact point 1122*a* or the left shoulder contact point 1122*b* is the largest displacement part and thus is the point of action at which torque can be generated most efficiently. Namely, it indicates that the configuration is extremely efficient in terms of that the first and second movable backrest portions 1102*a* and 1102*b* are disposed to come into contact with the shoulders of the rider 1105, i.e., the right shoulder portion 1105*g* and the left shoulder portion 1105*h*, whereby his/her posture is changed. That is, the rider 1105 can most easily obtain the physical sensation of operation by performing operation of pressing the first and second movable backrest portions 1102*a* and 1102*b* by twisting his/her body.

Note that the term "physical sensation of operation" refers to operability where, for example, as in the case in which when a person tries to turn right during walking, he/she unconsciously makes a motion of twisting his/her body slightly to the right, the rider (operator) 1105 rides in the standing position riding type vehicle 1100 and twists his/her body, for example, to the right, whereby steering to turn the standing position riding type vehicle 1100 to the right can be achieved. Namely, it is operation that can be very naturally achieved by a human without the twisting motion involving any stress or load on the body or posture of the rider 1105. Furthermore, the "physical sensation of operation" also includes a state in which the rider 1105 can recognize that the standing position riding type vehicle 1100 is operating as intended by the rider 1105.

Figure 33:
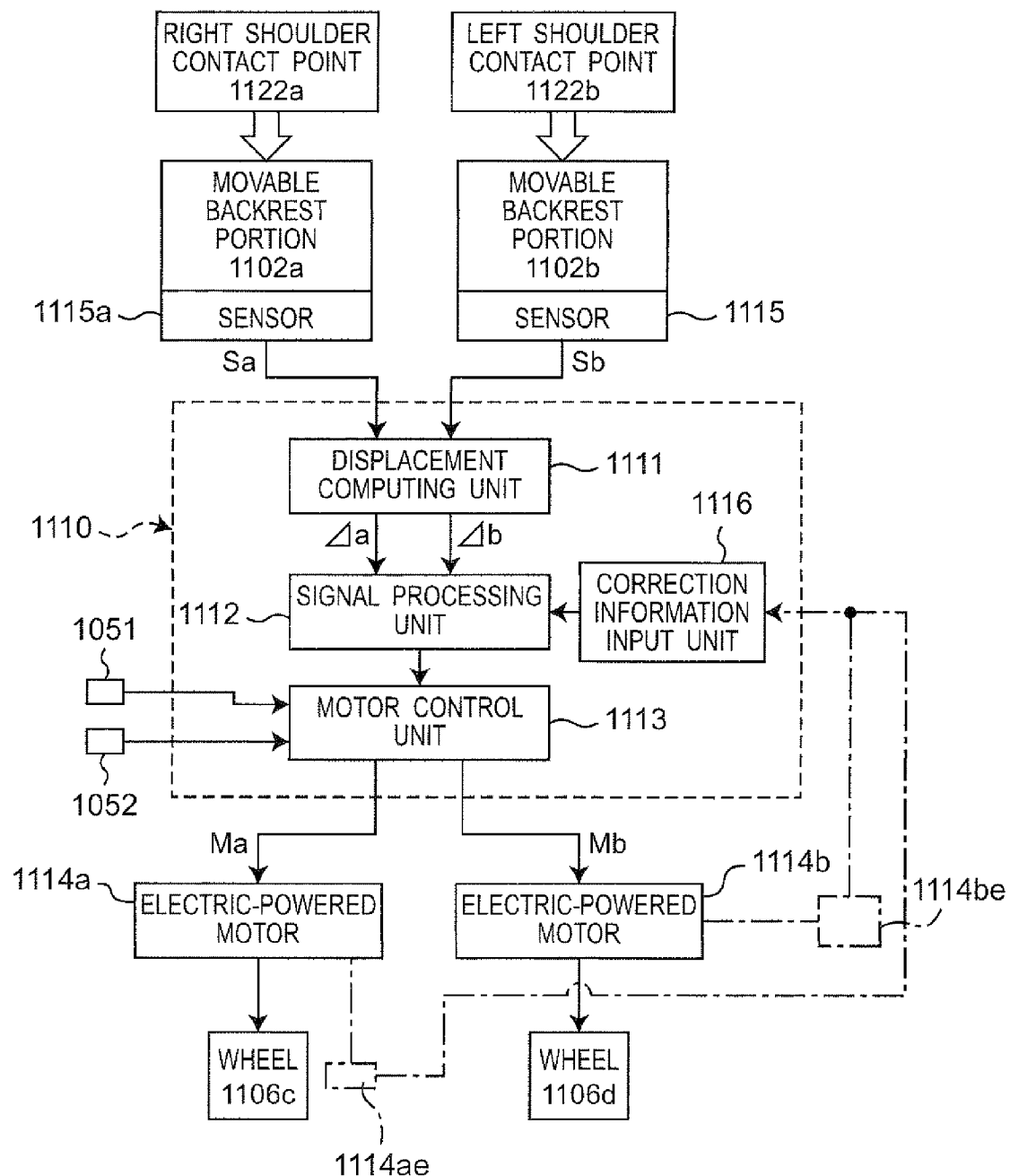
FIG. 33 is a block diagram showing a traveling control unit in the fifth embodiment.

FIG. 33 is a view showing a schematic configuration of the traveling control unit 1110 including a control computer and memory and stored in the control unit storage unit 1072 in the fifth embodiment.

As shown in FIG. 33, the traveling control unit 1110 includes a displacement computing unit 1111, a signal processing unit 1112, and a motor control unit 1113.

Displacements of the first and second movable backrest portions 1102a and 1102b are detected using the displacement detection sensors 1115a and 1115b, respectively. Outputs from the sensors 1115a and 1115b are represented as a sensor output signal Sa and a sensor output signal Sb, respectively. A method is considered in which, for means for detecting displacements, by using pressure sensors or amount-of-rotation detection sensors (encoders, etc.) which are examples of the displacement detection sensors 1115a and 1115b, pressures or amounts of rotation applied to the first and second movable backrest portions 1102a and 1102b are detected and the amounts of displacement of the first and second movable backrest portions 1102a and 1102b are indirectly estimated or calculated by the displacement computing unit 1111 from the detection results obtained by the displacement detection sensors 1115a and 1115b. Alternatively, a method is considered in which, for another means for detecting displacements, by using optical distance sensors as the displacement detection sensors 1115a and 1115b, distances are measured and the amounts of displacement of the first and second movable backrest portions 1102a and 1102b are directly calculated by the displacement computing unit 1111.

The sensor output signals Sa and Sb are inputted to the traveling control unit 1110 from the displacement detection sensors 1115a and 1115b and motor drive instructions Ma and Mb are outputted to electric-powered motors 1114a and 1114b.

Specifically, the displacement computing unit 1111 receives the sensor output signals Sa and Sb outputted from the displacement detection sensors 1115a and 1115b. The displacement computing unit 1111 converts the sensor output signals Sa and Sb into amounts of displacement $\Delta Sa$ and $\Delta Sb$, respectively. The amounts of displacement $\Delta Sa$ and $\Delta Sb$ are inputted to the signal processing unit 1112 from the displacement computing unit 1111. The signal processing unit 1112 performs numerical computation on the amounts of displacement $\Delta Sa$ and $\Delta Sb$ and thereafter outputs to the motor control unit 1113 an output instruction signal for allowing the electric-powered motors 1114a and 1114b to operate the standing position riding type vehicle 1100. Note that the number of input and output ports of each block in the traveling control unit 1110 has flexibility for signal handling; here, an implementable example is shown.

A more specific description is made below.

By a change in the posture of the rider 1105, an imbalance occurs in action force acting on the first and second movable backrest portions 1102a and 1102b from the right shoulder contact point 1122a and the left shoulder contact point 1122b, respectively. As a result, a difference occurs in the amounts of displacement of the front side portions of the first and second movable backrest portions 1102a and 1102b with respect to the front side portion of the fixed backrest portion 1101. The amounts of physical displacement of the first and second movable backrest portions 1102a and 1102b are $\Delta a$ and $\Delta b$, respectively. The amount of displacement is a signed variable quantity, and here the amount of displacement is a distance dimension. A displacement in the forward motion direction of the standing position riding type vehicle 1100 (the front side direction of the standing position riding type vehicle 1100) is defined as "positive" (plus).

Here, the first and second movable backrest portions 1102a and 1102b are disposed such that $+\Delta b = -\Delta a$, for example. In other words, the first and second movable backrest portions 1102a and 1102b are disposed such that the absolute value of the amount of displacement $|\Delta a|$ at a shoulder contact point on the action side is the same as the absolute value of the amount of displacement $|\Delta b|$ at a shoulder contact point on the opposite side. By such disposition, a pair of the movable backrest portions 1102a and 1102b operate in a unified manner to follow the rider 1105 with respect to a shoulder contact point on the opposite side (which is referred to as a "shoulder contact point on the opposite side to the action side") to a shoulder contact point on which the rider 1105 is acting with an intention (which is referred to as a "shoulder contact point on the action side"). Specifically, at a right turn, a pair of the movable backrest portions 1102a and 1102b operate in a unified manner to follow the rider 1105 with respect to a shoulder contact point on the opposite side (the left shoulder contact point 1122b) to a shoulder contact point on which the rider 1105 is acting with an intention. (the right shoulder contact point 1122a). At a left turn, a pair of the movable backrest portions 1102a and 1102b operate in a unified manner to follow the rider 1105 with respect to a shoulder contact point on the opposite side (the right shoulder contact point 1122a) to a shoulder contact point on which the rider 1105 is acting with an intention (the left shoulder contact point 1122b). By this, the first and second movable backrest portions 1102a and 1102b function to support both shoulders of the rider 1105, i.e., the right shoulder portion 1105g and the left shoulder portion 1105h, from behind and thus can be utilized to stably maintain the posture of the rider 1105.

In addition, $\Delta b$ can also be such that $\Delta b = -\Delta a$ ($k \neq 1$). By doing so, even when the absolute value of the amount of displacement $|\Delta a|$ at a shoulder contact point on the action side and the absolute value of the amount of displacement $|\Delta b|$ at a shoulder contact point on the opposite side are not the same, the fifth embodiment of the present invention can be applied. In such conditions, in many cases, k>1 due to a little change in the position of the fulcrum of the body trunk 1105f which is considered to be a single rotation axis (central axis) when the rider 1105 twists his/her body.

Of course, as describe above, instead of both of the amounts of displacement $\Delta a$ and $\Delta b$ being dependent on each other, there is no problem even if the amounts of displacement $\Delta a$ and $\Delta b$ are completely independent of each other such as $\Delta a \neq 0$ and $\Delta b = 0$, and the fact that the body (upper body) of the rider 1105 is supported by the fixed backrest portion 1101 is common therebetween.

In addition, at least one of the amounts of displacement $\Delta a$ and $\Delta b$ of the movable backrest portions 1102a and 1102b is negative and a displacement in the opposite direction to the forward motion direction of the standing position riding type vehicle 1100 (i.e., a backward displacement, a negative displacement) has meaning to the turning of the standing position riding type vehicle 1100. Here, this is represented as "significance". Namely, a variable with significance that mainly determines traveling control is one of $\Delta a$ and $\Delta b$ that has a maximum negative value.

By the displacement computing unit 1111 performing computation based on the detection results obtained by the displacement detection sensors 1115a and 1115b, the amounts of displacement of the front side portions of the first and second movable backrest portions 1102a and 1102b with respect to the front side portion of the fixed backrest portion 1101 are determined. For example, the displacement detection sensors 1115a and 1115b respectively measure the lengths of the springs 1108a and 1108b in the standing position riding type vehicle 1100 shown in FIG. 26A and, for example, FIG. 30A and the displacement computing unit 1111 determines the amounts of displacement thereof. Since the lengths of other springs 1108c, 1108d, 1108e, 1108f, 1108g, 1108h, 1108i, 1108j, 1108k, 1108m, 1108n, 1108p, and 1108q are also measured in the same manner, in the following description, the springs 1108a and 1108b will be described as a representative example.

As an example of the displacement detection sensors 1115a and 1115b, they can be configured by optical distance sensors that optically measure the lengths of the springs 1108a and 1108b in a noncontact manner, using a laser or infrared radiation. The displacement detection sensors 1115a and 1115b are fixedly disposed in the support portion 1109 (or in other examples, 1109A, 1109B, 1109C, 1109D, 1109E, 1109F, and 1109G) and the displacement detection sensors 1115a and 1115b respectively measure distances in a movable direction from the displacement detection sensors 1115a and 1115b to the back sides of the respective first and second movable backrest portions 1102a and 1102b.

In this case, a displacement is a change in distance (which is data equivalent to distance and has a positive value). When the distance for normal traveling (normal state) is $D_0$ and the distances for the first and second movable backrest portions 1102a and 1102b during turning are $D_a$ and $D_b$, respectively, sensor outputs for the first and second movable backrest portions 1102a and 1102b are Sa=$D_a$ and Sb=$D_b$ and the amounts of change in sensor output ΔSa and ΔSb for the first and second movable backrest portions 1102a and 1102b are ΔSa=$D_0$−$D_a$ and ΔSb=$D_0$−$D_b$.

As another example of the displacement detection sensors 1115a and 1115b, they can also be configured by force sensors that measure reaction forces exerted by the springs 1108a and 1108b. At this time, the sensors 1115a and 1115b are respectively mounted on the first and second movable backrest portions 1102a and 1102b. By the springs 1108a and 1108b being extended and compressed, the restoring forces of the springs 1108a and 1108b change and thus normal forces generated at the shoulder contact points 1122a and 1122b also change. The changes in normal force are detected by the force sensors. At this time, a method may be used in which a plurality of pressure sensors are used as a force sensor and the plurality of pressure sensors measure pressure equivalent to a value obtained by dividing a normal force by a contact area.

In this case, a directly measurable displacement is a change in force or pressure. In the normal state (go-straight state) of the standing position riding type vehicle 1100, when pressures applied to the first and second movable backrest portions 1102a and 1102b are Pa_0 and Pb_0, respectively, and pressures during steering for right and left turns are Pa_T and Pb_T, respectively, sensor outputs are defined as Sa=Pa_T and Sb=Pb_T and the amounts of change in sensor output ΔSa and ΔSb are defined as ΔSa=Pa_0−Pa_T and ΔSb=Pb_0−Pb_T, respectively. At this time, a variable that mainly determines traveling control is one of ΔSa and ΔSb that has a maximum negative value. By doing so, the same determination as that for the preceding example case where the amount of change in distance is the amount of displacement can be used and thus it is convenient.

Note that in order to accurately make a steering determination, as one example, it is possible to use not only a steady-state value of force or pressure but also an instantaneous value or time-series data and further an in-plane distribution, etc.

Inside the displacement computing unit 1111, the amounts of displacement of the first and second movable backrest portions 1102a and 1102b are determined using the amounts of change in sensor output ΔSa and ΔSb by, for example, performing computation as follows.

A function cony is defined with x and y as variables. The function cony (x, y) is a function for calculating an amount of displacement based on distance (an amount having a distance dimension) from the variable x according to the transform function y. The inside of the function cony or the transform function y of the second argument can contain sensitivity calibration curves of the sensors 1115a and 1115b, etc. The transform function is not necessarily a continuous function, and a process may be included in which a numerical table is provided and a transform result is referred to from the table and further interpolation is performed. The numerical table is a set of data obtained in advance by measurement or numerical computation and is a matrix of numerical values where inputs and outputs are associated with each other.

For example, when the transform function is a function Fd for determining an amount of displacement in distance from a difference in distance, the amounts of displacement Δa and Δb are expressed as follows:

$$\Delta a = conv(\Delta Sa, Fd)$$

$$\Delta b = conv(\Delta Sb, Fd) \quad \text{[Equation 1]}$$

In the case of Fd={X}, i.e., the first-order proportionality, the amounts of displacement Δa and Δb are as follows:

$$\Delta a = conv(\Delta Sa, \{X\}) = \Delta Sa$$

$$\Delta b = conv(\Delta Sb, \{X\}) = \Delta Sb \quad \text{[Equation 2]}$$

Note that the variable x of the first argument does not necessarily need to be the amount of change in sensor output. Only in this example, the foregoing equations are equivalent to those shown below.

$$\Delta a = conv(Da, \{D0-X\}) = \Delta Sa$$

$$\Delta b = conv(Db, \{D0-X\}) = \Delta Sb \quad \text{[Equation 3]}$$

When the transform function is provided from a numerical table Tp in which the amount of displacement in distance is referred to from the difference in pressure, the amounts of displacement Δa and Δb are expressed as follows:

$$\Delta a = conv(\Delta Sa, Tp)$$

$$\Delta b = conv(\Delta Sb, Tp) \quad \text{[Equation 4]}$$

At this time, pressure measurement data is converted into the amounts of physical displacement of the first and second movable backrest portions 1102a and 1102b.

Therefore, the transform function is to be appropriately set according to the type of the sensors 1115a and 1115b.

Note that, as one example, it is possible that the inputs to the displacement computing unit 1111 be A/D-converted.

The signal processing unit 1112 analyzes the amounts of displacement (magnitudes and signs) of the first and second variable backrest portions 1102a and 1102b calculated by the displacement computing unit 1111 and performs a computation process and thereby obtains information on the content of operation of the standing position riding type vehicle 1100 intended by the rider 1105. For example, the signal processing unit 1112 performs computation as follows. Two functions eval and trans are defined with x, y, and z as variables.

The function eval (x, y) is a function for evaluating significance of two amounts of displacement x and y of the first and second movable backrest portions 1102a and 1102b, and the result of significance determination is outputted as the amount of displacement z. The simplest example is a function that outputs the maximum negative value between x and y.

The function trans (z) is a function that translates the variable z and further converts the amount of displacement z into the amount of control. The output from the function trans is not limited to a single real number and may be a complex number, an array, or the like. The function trans may contain the function of adjusting sensitivity or response, the process of generating driving signals for the electric-powered motors 1114a and 1114b, etc.

Let the output from the signal processing unit 1112 be C. Then, for example, computation is performed as follows:

$$C = \text{trans}(\text{eval}(\Delta a, \Delta b)) \quad \text{[Equation 5]}$$

At this time, in the function eval, the amounts of displacement $\Delta a$ and $\Delta b$ of the first and second movable backrest portions 1102a and 1102b may be appropriately weighted and then a determination process may be performed by the signal processing unit 1112, or the difference therebetween ($\Delta a - \Delta b$) may be used as a variable and a process may be performed by the signal processing unit 1112. By using the difference, in general, an offset amount (e.g., an offset amount resulting from a deviation from a reference value such as Pa_0, Pb_0, or D0) included in the amount of displacement or common mode noise is cancelled out and thus it is convenient in many cases. For example, in the normal state, the rider 1105 is evenly in contact with the first and second movable backrest portions 1102a and 1102B and thus pressures Pa_0 and Pb_0 applied to the pressure sensors have substantially the same non-zero value. This is expressed with P_ofs as an offset as follows:

$$\Delta a - \Delta b = (P\_ofs - Pa\_T) - (P\_ofs - Pb\_T) \quad \text{[Equation 6]}$$
$$= Pb\_T - Pa\_T$$

Thus, the influence of offsets can be cancelled out.

Furthermore, by inputting correction information to the signal processing unit 1112 from a correction information input unit 1116, a bias in the tendency of individual riders to change their postures (right-handedness, left-handedness, etc.) or easiness of steering according to the operating state of the standing position riding type vehicle 1100 can be reflected. This can be implemented by changing the description of input arguments or processing content of the above-described function eval or function trans.

Correction information to be inputted to the signal processing unit 1112 from the correction information input unit 1116 includes preset data including rider information, etc., or real-time data such as the numbers of rotations of the electric-powered motors 1114a and 1114b and an output signal from an additional sensor such as an inertial sensor. Such correction information can be inputted to the signal processing unit 1112. The number of input ports from the correction information input unit 1116 to the signal processing unit 1112, etc., may be increased or reduced, if necessary.

An example is given in a simplified way. When the steering force of the right shoulder of the rider 1105, i.e., the right shoulder portion 1105g, is only 50% of the steering force of the left shoulder, i.e., the left shoulder portion 1105h, the left/right ratio "2.0" is provided to the correction information input unit 1116 as correction information and an output C from the signal processing unit 1112 is considered to be set such that:

$$C = \text{trans}(\text{eval}(2.0 * \Delta a, \Delta b)) \quad \text{[Equation 7]}$$

Namely, after information on the steering force of the right shoulder portion 1105g is increased by a factor of 2 by the correction information input unit 1116, the signal processing unit 1112 can perform a process. In other words, when there is a difference between the left and right steering forces, correction information that makes a correction to make the left and right steering forces equal can be inputted to the signal processing unit 1112 from the correction information input unit 1116.

As another example, it is also possible that the numbers of rotations of the electric-powered motors 1114a and 1114b are fed back and inputted to the correction information input unit 1116 from encoders 1114ae and 1114be that detect the numbers of rotations of the electric-powered motors 1114a and 1114b (see dash-dotted lines in FIG. 33).

The numbers of rotations of the respective electric-powered motors 1114a and 1114b which are detected by the encoders 1114ae and 1114be are Ra and Rb. If the difference between the numbers of rotations |Ra−Rb| increases, then as will be described later, there is a possibility that a large centrifugal force may act on the rider 1105 and thus an unintended steering result may occur. Hence, a function gain (which may be a numerical value table) that pre-defines the safety range of the number of rotations is defined by the correction information input unit 1116 and used by the correction information input unit 1116 and inputted to the signal processing unit 1112, whereby the sensitivity of the first and second movable backrest portions 1102a and 1102b can be forcefully changed.

Let x and y be variables. Then, the function gain (x, y) outputs a coefficient G of 1 or less. G is an array with a number of elements of 2 and Ga=G(1) and Gb=G(2).

$$G = \text{gain}(Ra, Rb) \quad \text{[Equation 8]}$$

For this, for example, by setting the output C from the signal processing unit 1112 such that $$C = \text{trans}(\text{eval}(Ga * \Delta a, Gb * \Delta b)) \quad \text{[Equation 9]}$$

the sensitivity can be modified by the correction information input unit 1116, according to the state of the number of rotations.

An output C from the signal processing unit 1112 is inputted to the motor control unit 1113. Based on the output C from the signal processing unit 1112, the motor control unit 1113 outputs drive instructions Ma and Mb conforming to the standard of the electric-powered motors 1114a and 1114b and thereby controls the electric-powered motors 1114a and 1114b. Namely, the motor control unit 1113 can change drive instructions according to the output C from the signal processing unit 1112 (according to the changes in the amounts of displacement of the first and second movable backrest portions 1102a and 1102b).

The electric-powered motors 1114a and 1114b respectively drive and rotate the rear wheels 1106c and 1106d and can thereby allow the standing position riding type vehicle 1100 to make a forward or backward motion, a right turn, or a left turn. Forward and backward motions are implemented as follows. For example, the foot switch for forward motion 1051 and the foot switch for backward motion 1052 are provided at the feet of the rider 1105. By the rider 1105 stepping on the foot switch 1051 or 1052, voltages are applied to the electric-powered motors 1114a and 1114b, whereby the electric-powered motors 1114a and 1114b rotate and the rotation is transmitted to the rear wheels 1106c and 1106d. When the rear wheels 1106c and 1106d rotate in synchronization, forward and backward drive is implemented. When there is a difference in the number of rotations between the rear wheels 1106c and 1106d, right turn drive or left turn drive can be implemented.

Note that for a wheel drive method, any of front-wheel drive, rear-wheel drive, and four-wheel drive may be employed.

Note also that although a control computer and memory which are included in the traveling control unit 1110 are disposed in the control unit storage unit 1072, the disposition location is not limited thereto and they may be provided in any location in the standing position riding type vehicle 1100.

Figure 34:
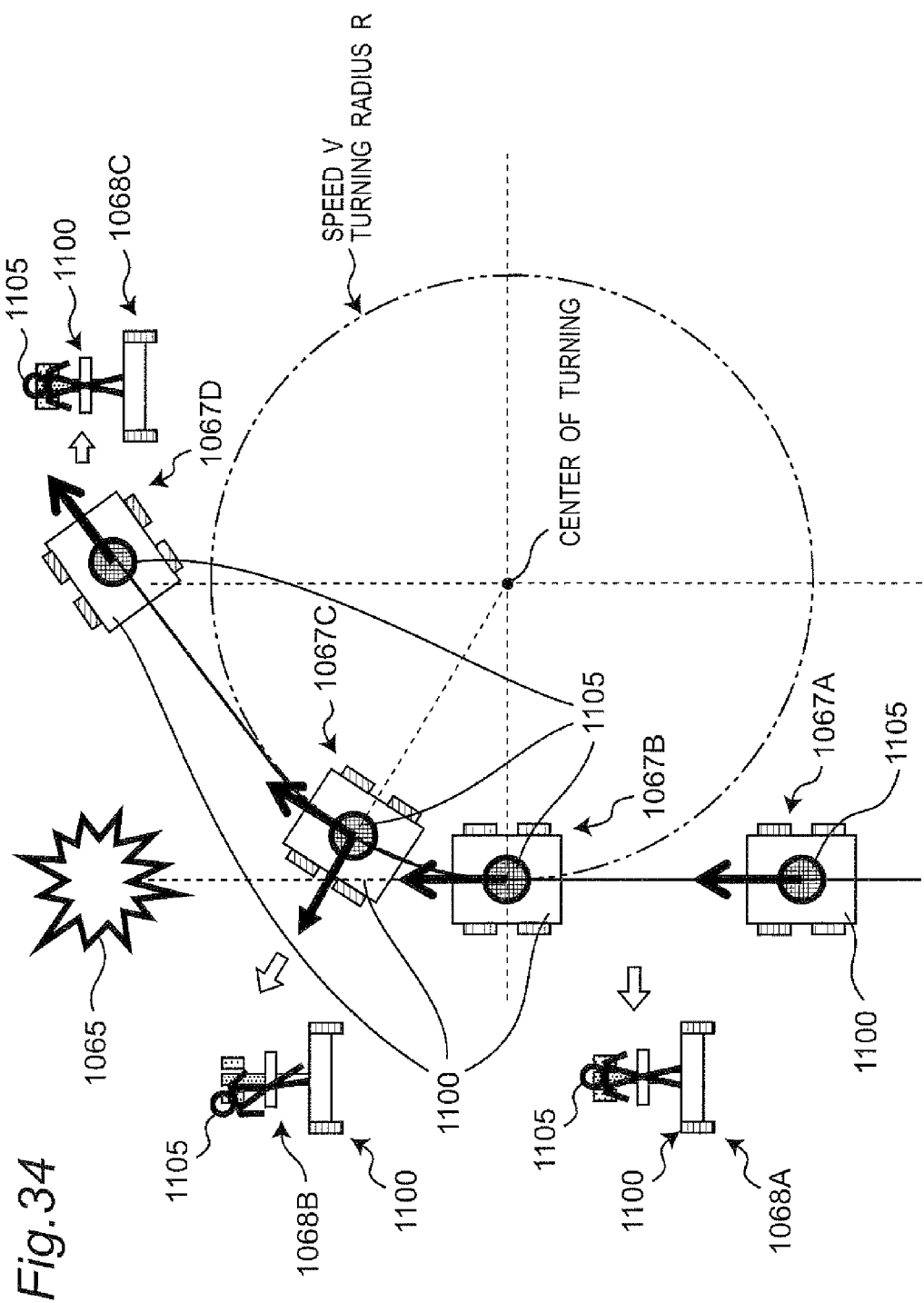
FIG. 34 is a top view describing a traveling path including a normal state and a turning state of the standing position riding type vehicle.

Using FIGS. 34 to 37, a state in which the standing position riding type vehicle 1100 of the fifth embodiment moves will be described in detail, and how the turning control apparatus of the standing position riding type vehicle 1100 according to the fifth embodiment of the present invention stably holds the rider 1105 in the standing position riding type vehicle 1100 in which the rider 1105 rides in a substantially standing posture will be described. FIG. 34 is a view simply showing a state of the standing position riding type vehicle 1100 when making a right turn.

In FIG. 34, it is assumed that the standing position riding type vehicle 1100 making a forward motion from a first location 1067A to a second location 1067B is present and there is an obstacle 1065 in the forward front of the standing position riding type vehicle 1100. In the state from the first location 1067A to the second location 1067B, the posture of the rider 1105 in the standing position riding type vehicle 1100 is the one indicated by reference numeral 1068A.

For example, by the rider 1105 twisting his/her body to the right in the second location 1067B (before an ultrasonic or radar obstacle detection sensor, etc., included in the standing position riding type vehicle 1100 and a safety device by an automatic braking system are activated) (taking a posture indicated by reference numeral 10685), the rider 1105 can allow the standing position riding type vehicle 1100 to pass through a third location 1067C from the second location 1067B and make a right turn toward a fourth location 1067D, enabling to avoid the obstacle 1065. The posture in the fourth location 10670 is the one indicated by reference numeral 1068C. Due to the specifications, the rider 1105 may perform steering close to limit value turning (minimum turning radius and maximum traveling speed). In this case, a large centrifugal force acts on the standing position riding type vehicle 1100 and the rider 1105.

To clarify the functions and effects of the present invention, a comparative example shown in FIGS. 35A and 35B will be described.

Figure 35A:
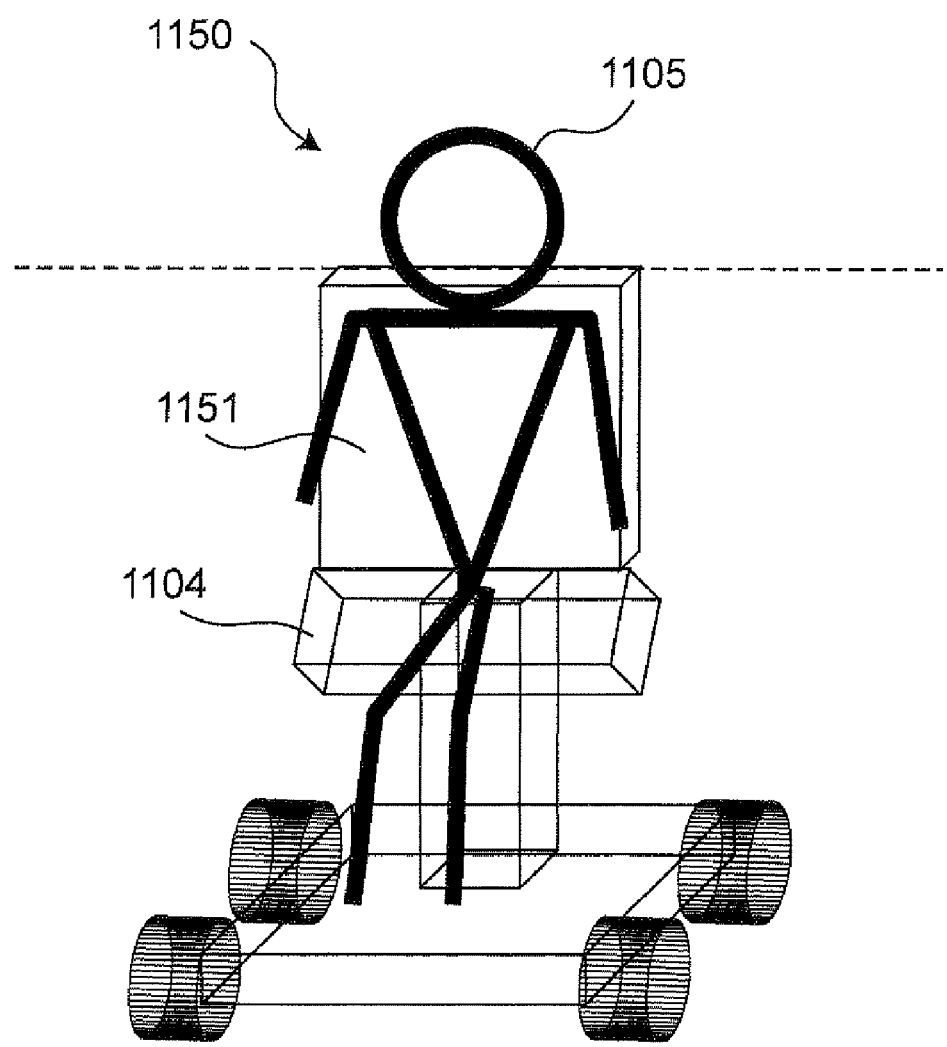
FIG. 35A is a view showing schematic steering of a rider in a substantially standing position in a standing position riding type vehicle having a backrest portion equivalent to one in a conventional example.
Figure 35B:
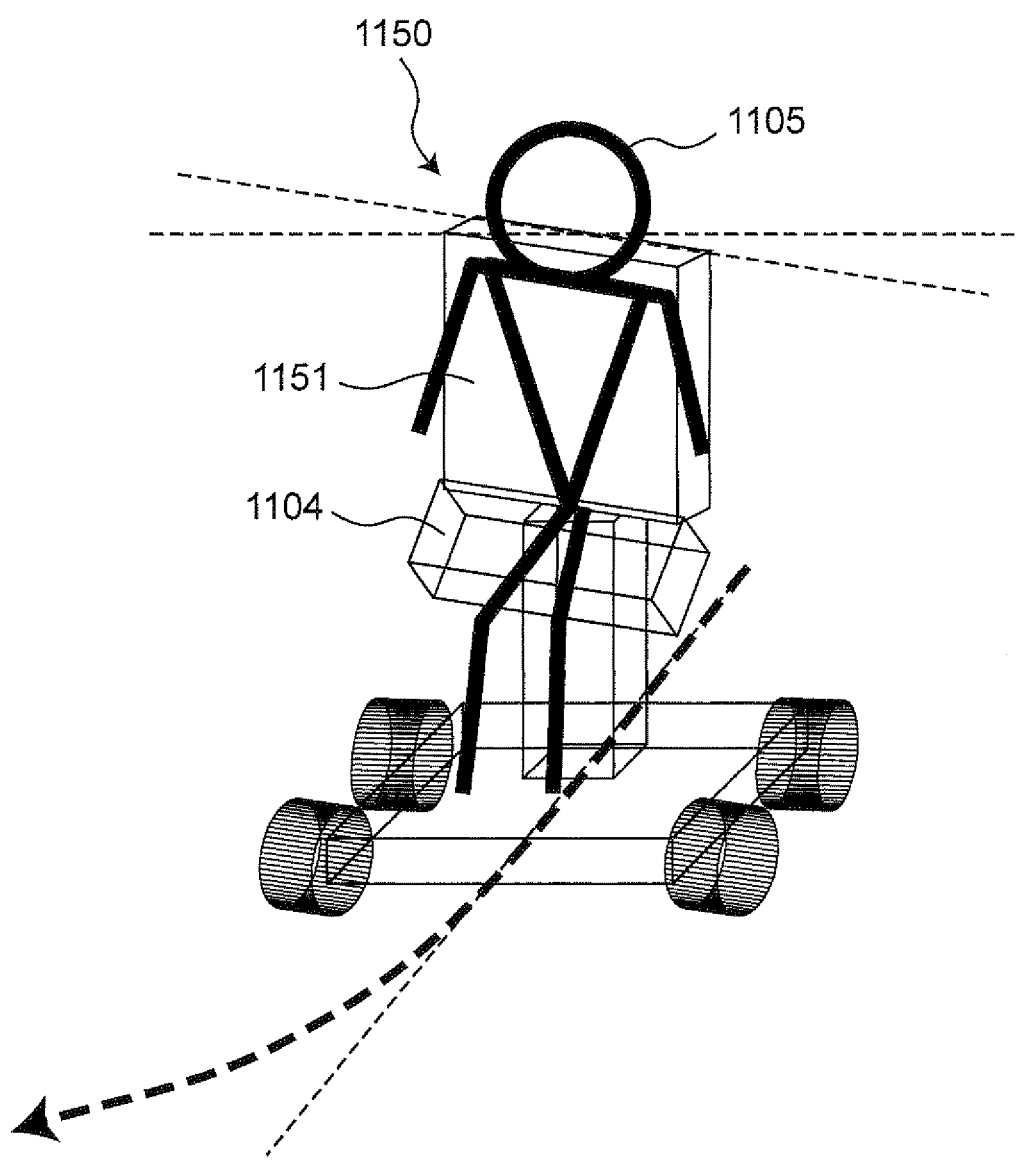
FIG. 35B is a view showing schematic steering of the rider in a substantially standing position in the standing position riding type vehicle having the backrest portion equivalent to one in the conventional example.

In FIG. 35A, greatly unlike the present invention, a standing position riding type vehicle 1150 having a single fixed backrest portion 1151 like one in a conventional example is assumed. FIG. 35B is a schematic view showing a state in which the standing position riding type vehicle 1150 makes a right turn. As shown in FIG. 35B, a rider 1105 steers the standing position riding type vehicle 1150 by bringing his/her upper body into contact with the entire surface of the backrest portion 1151.

Figure 36:
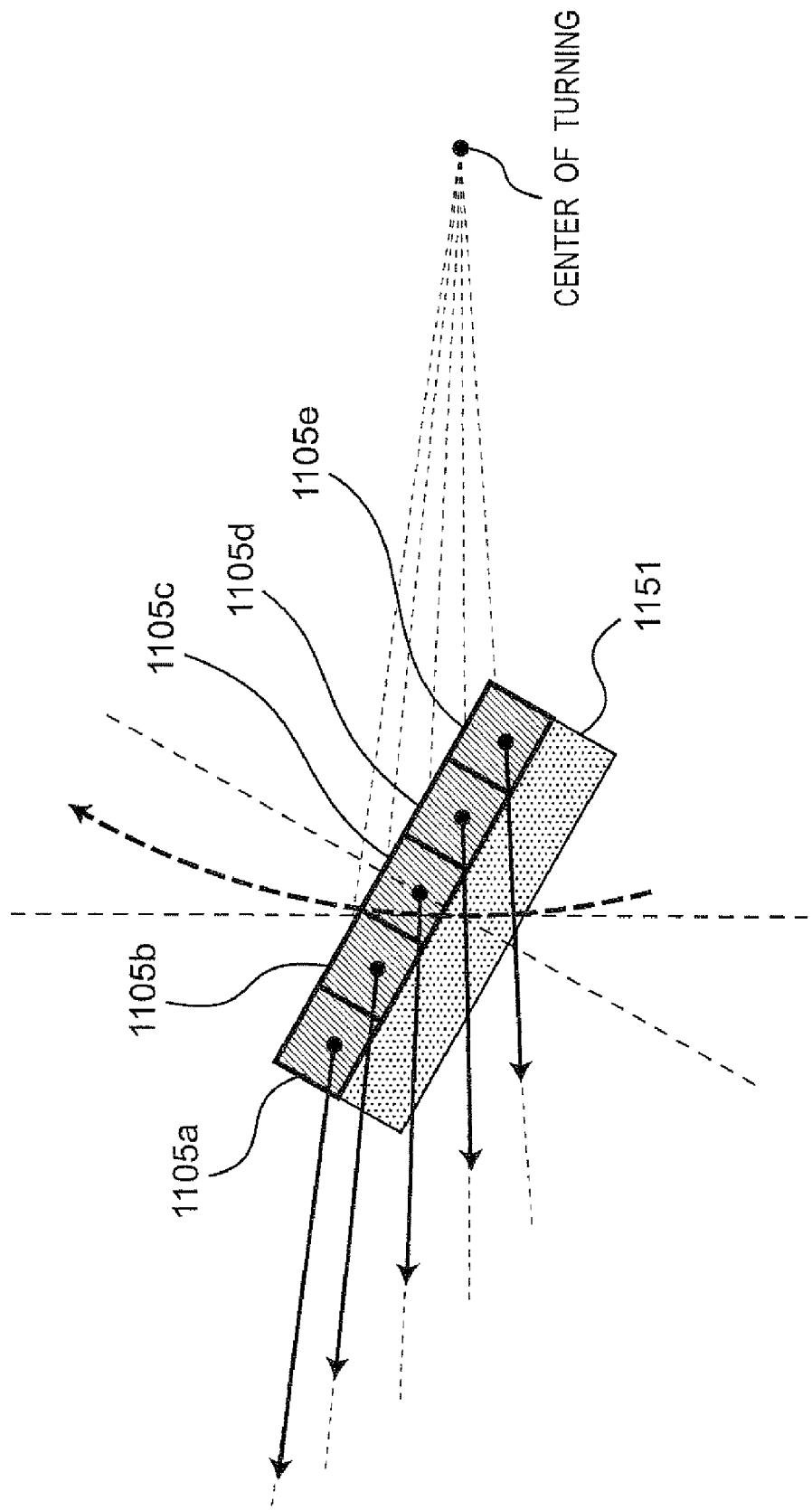
FIG. 36 is a schematic view showing a relationship between the rider and the backrest portion in the standing position riding type vehicle having the backrest portion equivalent to one in the conventional example.

FIG. 36 is a schematic view showing major force applied to the rider 1105 and the backrest portion 1151 in FIG. 35A. As far as the rider 1105 does not move (slide) away from the backrest 1151, they stably move as one unit and internal forces (a normal force and a static friction force) are not shown.

In FIG. 36, for simplification of description, the rider 1105 is depicted divided into five blocks (rider parts 1105a, 1105b, 1105c, 1105d, and 1105e). The blocks 1105a, 1105b, 1105c, 1105d, and 1105e have the same mass and also have the same angular velocity. In this case, a centrifugal force acting on each of the blocks 1105a, 1105b, 1105c, 1105d, and 1105e that make a turning movement around the center of turning is proportional to an object turning radius.

For example, when the turning radius of the standing position riding type vehicle 1150 is small (e.g., 2 m) and the shoulder width of the rider 1105 is not negligible for the turning radius (e.g., 0.4 m), it is computed that a centrifugal force applied to each of the blocks 1105a, 1105b, 1105c, 1105d, and 1105e of the rider 1105 differs by about 10% between the right and left shoulders of the rider 1105. As a result, there arises a case (a) in which the rider 1105 needs to maintain a posture where, while the left shoulder (left shoulder contact point) in particular is largely pulled outward and backward, the upper part of the body is twisted in the right direction so as to go against it.

In addition, the backrest portion 1151 of the standing position riding type vehicle 1150 is in a right-turn steering state and thus has a negative off-angle of a few degrees in a circumferential direction (movement direction). When the friction force (static friction) between the backrest portion 1151 and the back of the rider 1105 is large, they try to make a movement as one unit. Thus, depending on the position of the pivot axis of the backrest portion 1151 or the mass of the backrest portion 1151, there may arise a case (b) in which the right turn state of the backrest portion 1151 is locked and thus unless the speed of the standing position riding type vehicle 1150 is reduced, the turning cannot be stopped.

In both of the above-described cases (a) and (b), the rider 1105 is pushed against the backrest portion 1151 and thus feels that steerability is taken away by the backrest portion 1151 due to the influence of the movement as one unit.

Figure 37:
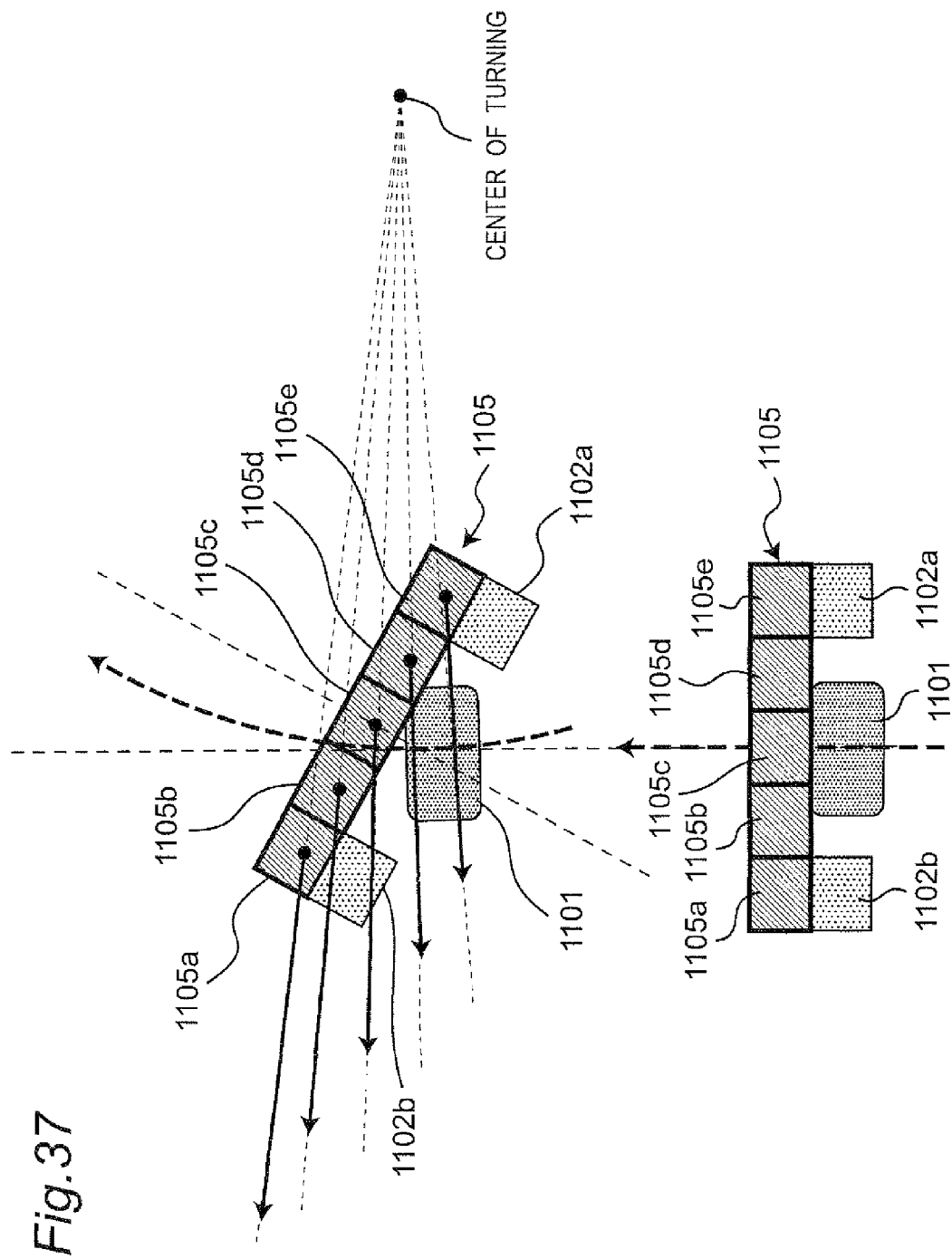
FIG. 37 is a schematic view showing a relationship between a rider and backrest portions (a relationship in a state changing from a go-straight state to a right turn state) in the fifth embodiment.

On the other hand, FIG. 37 is a schematic view showing a state of the standing position riding type vehicle 1100 according to the fifth embodiment of the present invention, for comparison with FIG. 36. In FIG. 37, a centrifugal force applied to each of blocks 1105a, 1105b, 1105c, 1105d, and 1105e of the rider 1105 is the same as that in the case of FIG. 36 and a normal force and a static friction force are not shown. In this case, the rider 1105 and the first and second movable backrest portions 1102a and 1102b make a movement as one unit in the same manner as in the case of (1) to (3) of FIG. 31A to FIG. 31C, but the rider 1105 can make a movement independent of the fixed backrest portion 1101. Hence, the rider 1105 can change his/her posture using the fixed backrest portion 1101 (a kinetic friction force acts between the rider 1105 and the fixed backrest portion 1101). Therefore, the rider 1105 can maintain the posture as it is or can also bring (the steering of) the standing position riding type vehicle 1100 back to a go-straight state by changing the posture to an upright posture by moving his/her body to come into close contact with the fixed backrest portion 1101.

FIGS. 38A and 38B are views showing examples of the shape of the fixed backrest portion 1101 suitable for achieving such operability.

(1), (2), and (3) of FIG. 38A respectively show shapes in which the cross-sectional shapes in a roughly horizontal direction of fixed backrest portions 1101 are rectangular, trapezoidal, and rectangular with a small projection at the center of a front side portion of a rider 1105. Namely, the fixed backrest portions 1101 shown in (1), (2), and (3) of FIG. 38A are all designed such that a portion of the fixed backrest portions 1101 on the side of the front side portion of the rider 1105 has a surface with a small curvature and in a state in which the rider 1105 twists his/her body the contact area between the rider 1105 and the fixed backrest portion 1101 is reduced. By doing so, in a state in which the upper body (in particular, a body trunk 1105f) of the rider 1105 is away from the fixed backrest portion 1101, i.e., during turning traveling, it becomes easy for the rider 1105 to bring his/her posture back to its original state. Namely, by the rider 1105 placing his/her body along the fixed backrest portion 1101 so as to increase the contact area of the upper body, the rider 1105 can bring his/her posture back to a stable posture. In other words, it can also be said that the fixed backrest portions 1101 in these examples have the effect of restoring the posture to a steady posture. Hence, in these examples, first and second movable backrest portions 1102a and 1102b with no restoration mechanism can also be used.

(4), (5), and (6) of FIG. 38B respectively show shapes in which the cross-sectional shapes in a roughly horizontal direction of fixed backrest portions 1101 are rectangular with an arc shape on the side of a front side portion of a rider 1105, circular, and elliptical. Namely, the fixed backrest portions 1101 shown in (4), (5), and (6) of FIG. 38B are all designed such that a portion of the fixed backrest portions 1101 on the side of the front side portion of the rider 1105 has a surface with a large curvature and even in a state in which the rider 1105 twists his/her body the contact area between the rider 1105 and the fixed backrest portion 1101 is less likely to change. By doing so, the rider 1105 twisting his/her body can easily maintain the posture as it is. In addition, when bringing the posture to its original state, too, the rider 1105 only needs to move his/her upper body along the surface of the fixed backrest portion 1101 being fixed. Thus, since the fixed backrest portion 1101 does not move as one unit with the rider 1105 him/herself, it can be recognized that the rider 1105 is trying to change steering. In other words, it can also be said that the fixed backrest portions 1101 in these examples have the effect of maintaining an unsteady posture and have little effect of restoring the posture to a steady posture. Hence, in these examples, it is possible to use first and second movable backrest portions 1102a and 1102b with a restoration mechanism.

Note that in the fifth embodiment although springs (coil springs in the drawings) are used to implement the first and second movable backrest portions 1102a and 1102b, air springs, etc., may also be used.

According to the standing position riding type vehicle 1100 of the fifth embodiment, while stably maintaining the posture of the rider 1105 riding in a substantially standing position, steering intended by the rider 1105 (steering with a physical sensation) can be implemented by detecting a change in the posture of the rider 1105 in the substantially standing position.

Sixth Embodiment

In a sixth embodiment of the present invention, although a configuration of a standing position riding type vehicle 1100 is roughly the same as the configuration in FIG. 27 showing the fifth embodiment, since a structure of backrest portions is different, the sixth embodiment, mainly different points, will be described using FIGS. 39A and 39B.

Figure 39A:
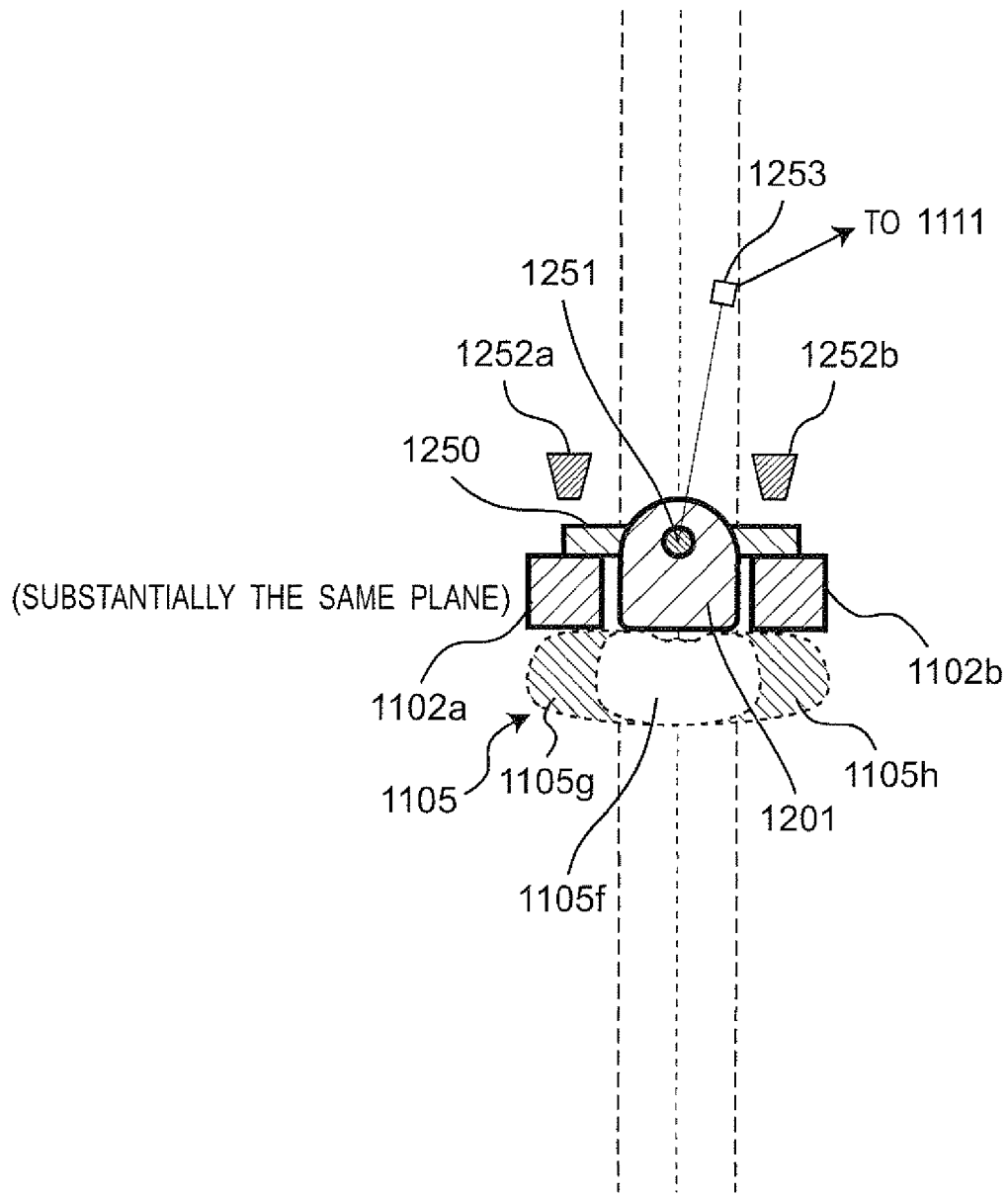
FIG. 39A is a view showing the schematic configuration and operations of backrest portions in a sixth embodiment of the present invention.
Figure 39B:
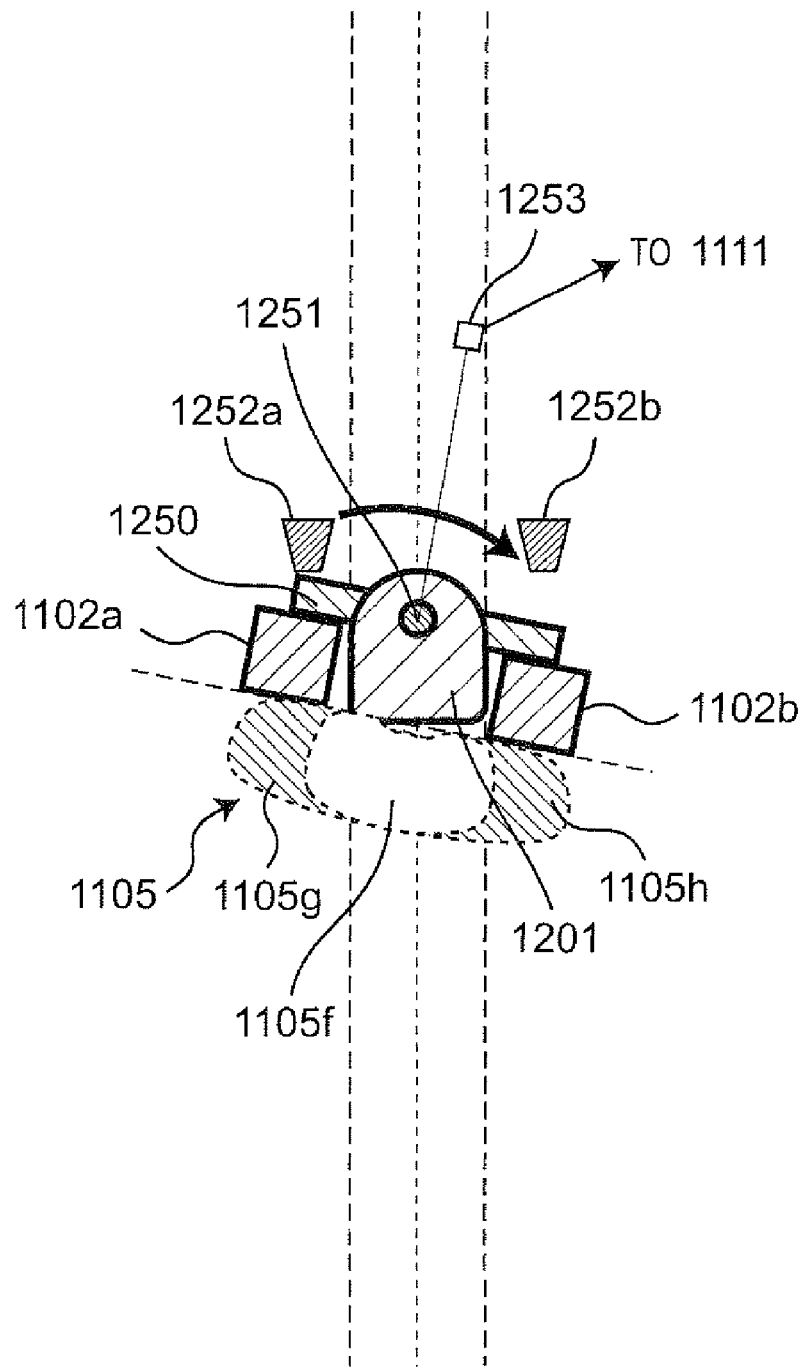
FIG. 39B is a view showing the schematic configuration and operations of the backrest portions in the sixth embodiment of the present invention.

FIG. 39A is a view showing a configuration of first and second movable backrest portions 1102a and 1102b of a turning control apparatus of the standing position riding type vehicle 1100 of the sixth embodiment. In FIG. 39A, the same components as those in the fifth embodiment use the same reference numerals and description thereof is omitted.

In FIG. 39A, the first and second movable backrest portions 1102a and 1102b are mounted on both right and left edges of a rotation support plate 1250. The rotation support plate 1250 has a rotating shaft 1251 at a central portion thereof. A bearing of the rotating shaft 1251 is provided on a fixed backrest portion 1201. Thus, the first and second movable backrest portions 1102a and 1102b are disposed rotatably with respect to the fixed backrest portion 1201, by the rotation support plate 1250 and the rotating shaft 1251. Stoppers 1252a and 1252b are disposed at a predetermined distance apart at the rear of both right and left edges of the rotation support plate 1250, whereby rotation is controlled such that the rotation support plate 1250 does not rotate a predetermined angle or more. Note that the bearing does not necessarily need to be provided on the fixed backrest portion 1201 and may be provided in a state of being fixed to a chassis 1107 or a support stand 1103 such as a post for a seat 1074.

By this configuration, the first and second movable backrest portions 1102a and 1102b can pivot in a plane perpendicular to the rotating shaft 1251, and a rotation angle of the rotation support plate 1250 is detected using a rotary encoder 1253 as another example of a displacement detection sensor, whereby displacements of the first and second movable backrest portions 1102a and 1102b can be detected. Namely, when going in a straight line, the body of a rider 1105 does not turn to either left or right and thus the first and second movable backrest portions 1102a and 1102b with which a right shoulder portion 1105g and a left shoulder portion 1105h come into contact and the fixed backrest portion 1201 form roughly the same plane.

Next, the case of turning the standing position riding type vehicle to the left or right, e.g., to the right in a clockwise direction, will be described. As shown in FIG. 39B, when the rider 1105 twists his/her body to turn to the right in the clockwise direction and pushes the first movable backrest portion 1102a with the right shoulder portion 1105g, the rotation support plate 1250 also likewise rotates around the rotating shaft 1251 to the right in the clockwise direction. At this time, the rotary encoder 1253 detects a rotation angle of the rotation support plate 1250 and outputs the rotation angle to a displacement computing unit 1111, and the displacement computing unit 1111 calculates the amount of displacement of the first movable backrest portion 1102a. Note that differences between encoder outputs from the rotary encoder 1253 in a normal state of the standing position riding type vehicle and encoder outputs from the rotary encoder 1253 in a turning state correspond to the aforementioned amounts of physical displacement Δa and Δb of the first and second movable backrest portions 1102a and 1102b.

Figure 39C:
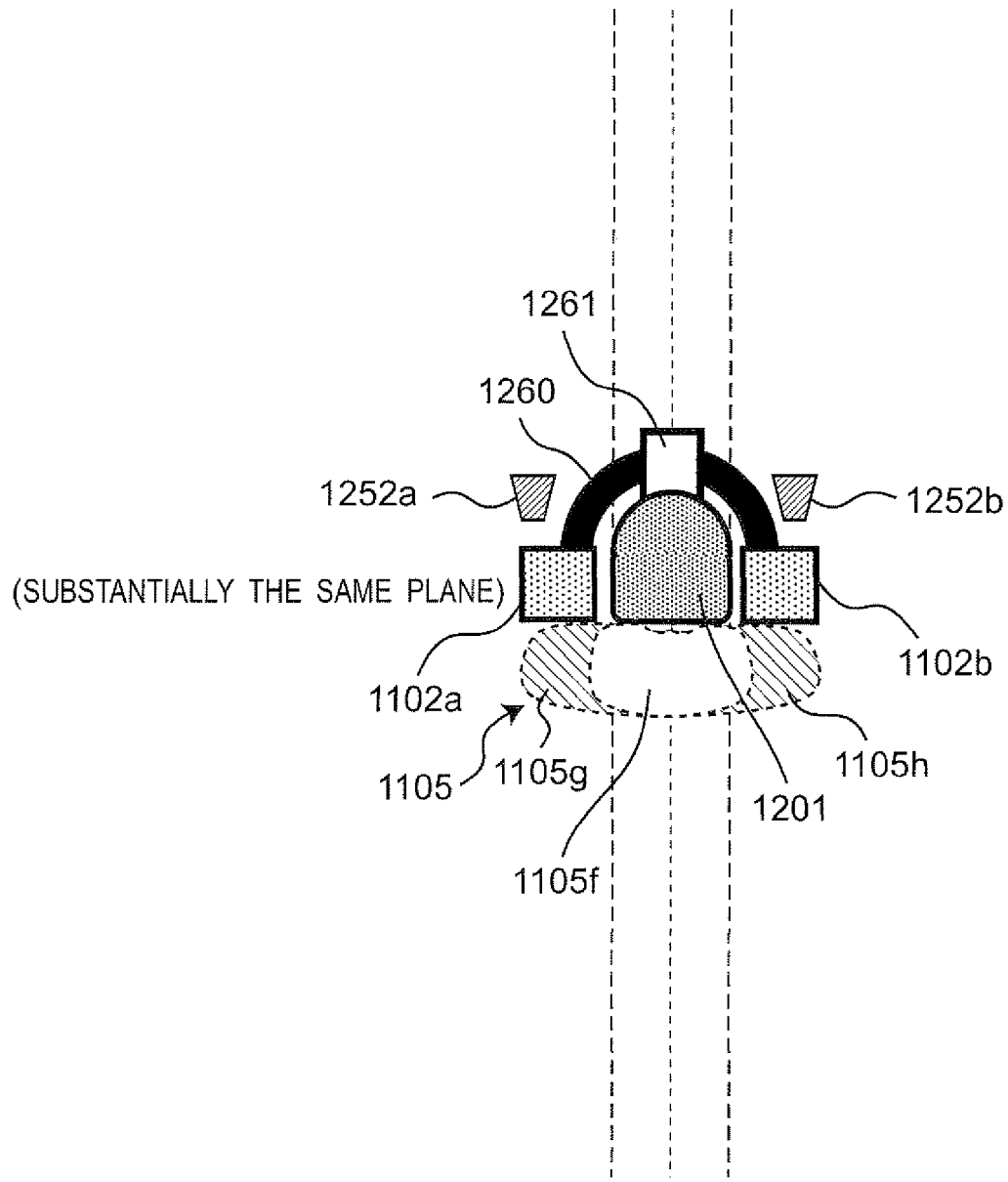
FIG. 39C is a view showing the schematic configuration and operations of the backrest portions in the sixth embodiment of the present invention.
Figure 39D:
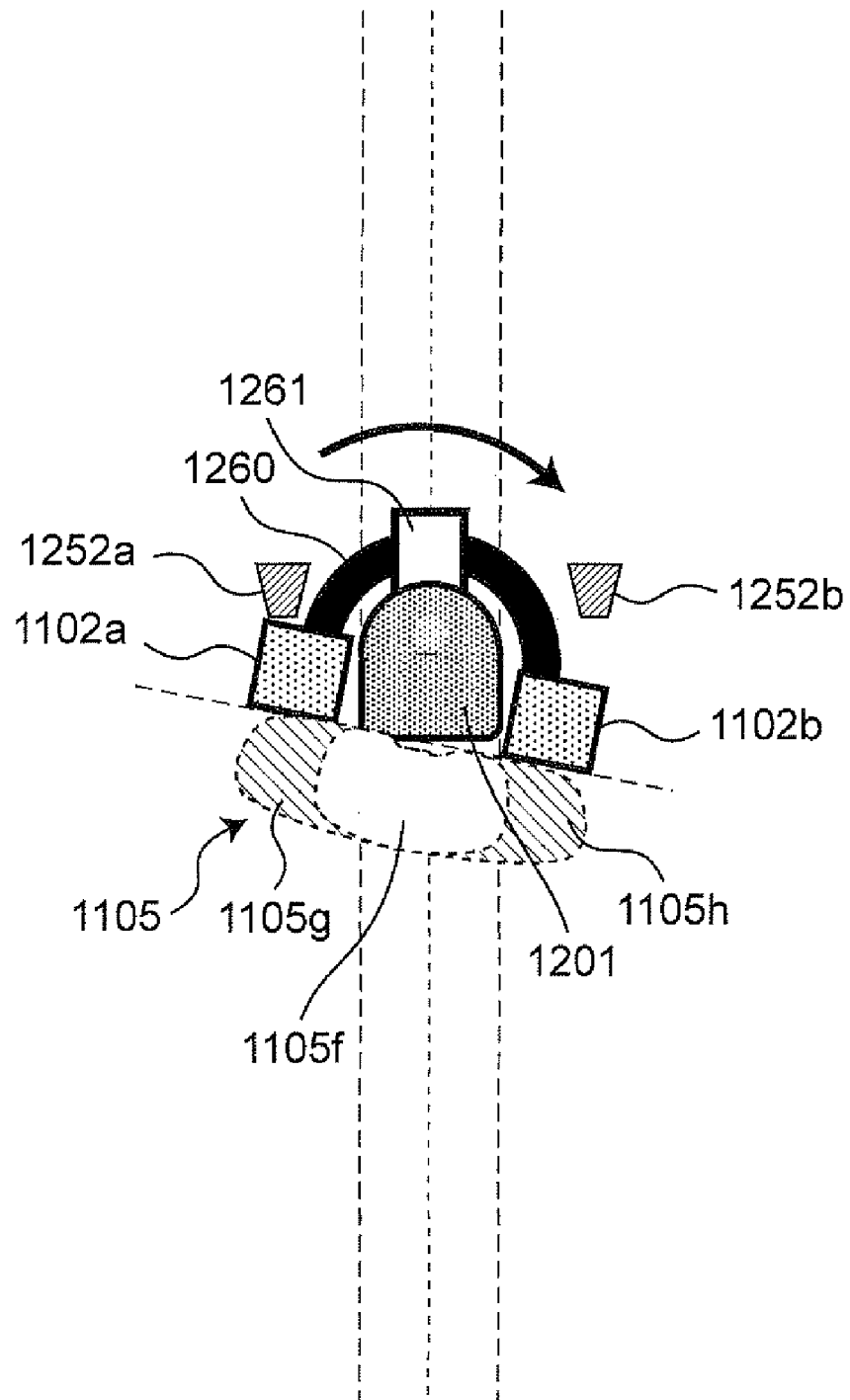
FIG. 39D is a view showing the schematic configuration and operations of the backrest portions in the sixth embodiment of the present invention.

FIGS. 39C and 39D are views showing one variant of the sixth embodiment.

In FIGS. 39C and 39D, first and second movable backrest portions 1102a and 1102b are mounted on a rotation bow portion 1260. The rotation bow portion 1260 has the first and second movable backrest portions 1102a and 1102b fixed at both ends of its arc-shaped member, and a central portion of the arc-shaped member is supported by a rotation bow portion support portion 1261 such as a bearing. The rotation bow portion support portion 1261 is fixed to a fixed backrest portion 1201. Thus, by pressing the first or second movable backrest portion 1102a or 1102b, the rotation bow portion 1260 is supported by the fixed backrest portion 1201 via the rotation bow portion support portion 1261 so as to be movable around the fixed backrest portion 1201. Stoppers 1252a and 1252b are disposed at a predetermined distance apart at the rear of both right and left ends of the rotation bow portion 1260, whereby rotation is controlled such that the rotation bow portion 1260 does not rotate a predetermined angle or more.

By this configuration, a rotation angle of the rotation bow portion 1260 is detected using optical distance sensors as another example of a displacement detection sensor, whereby displacements of the first and second movable backrest portions 1102a and 1102b can be detected. For example, optical distance sensors are provided in the stoppers 1252a and 1252b, respectively. The optical axis of each optical distance sensor is fixed so as to be perpendicular to the aforementioned "same plane" when the standing position riding type vehicle 1100 goes in a straight line, and the optical distance sensors respectively measure distances between the optical distance sensors and the movable backrest portions 1102a and 1102b. By associating the ratios between the distances with rotation angles in advance, a rotation angle of the rotation bow portion 1260 can be calculated from distance measurement values. Namely, when the standing position riding type vehicle 1100 goes in a straight line, the body of a rider 1105 does not turn to either left or right and thus the first and second movable backrest portions 1102a and 1102b with which a right shoulder portion 1105g and a left shoulder portion 1105h come into contact and the fixed backrest portion 1201 form roughly the same plane.

Next, the case of turning the standing position riding type vehicle 1100 to the left or right, e.g., to the right in a clockwise direction, will be described. As shown in FIG. 39D, when the rider 1105 twists his/her body to turn to the right in the clockwise direction and pushes the first movable backrest portion 1102a with the right shoulder portion 1105g, the rotation bow portion 1260 also likewise rotates to the right in the clockwise direction. At this time, the optical distance sensors detect a rotation angle of the rotation bow portion 1260 and outputs the rotation angle to a displacement computing unit 1111, and the displacement computing unit 1111 calculates the amount of displacement of the first movable backrest portion 1102a. Note that differences between encoder outputs from the optical distance sensors in a normal state of the standing position riding type vehicle and encoder outputs from the optical distance sensors in a turning state correspond to the aforementioned amounts of physical displacement Δa and Δb of the first and second movable backrest portions 1102a and 1102b.

According to the configurations of the sixth embodiment and variant thereof, since a self restoration function of the posture of the rider 1105 is not provided, a turning control apparatus with higher operation sensitivity than that in the fifth embodiment can be implemented.

Seventh Embodiment

In a seventh embodiment of the present invention, although a configuration of a standing position riding type vehicle 1100 is the same as the configuration in FIG. 27 showing the fifth embodiment, since a structure of backrest portions is different, the seventh embodiment will be described using FIGS. 40A to 40C.

Figure 40A:
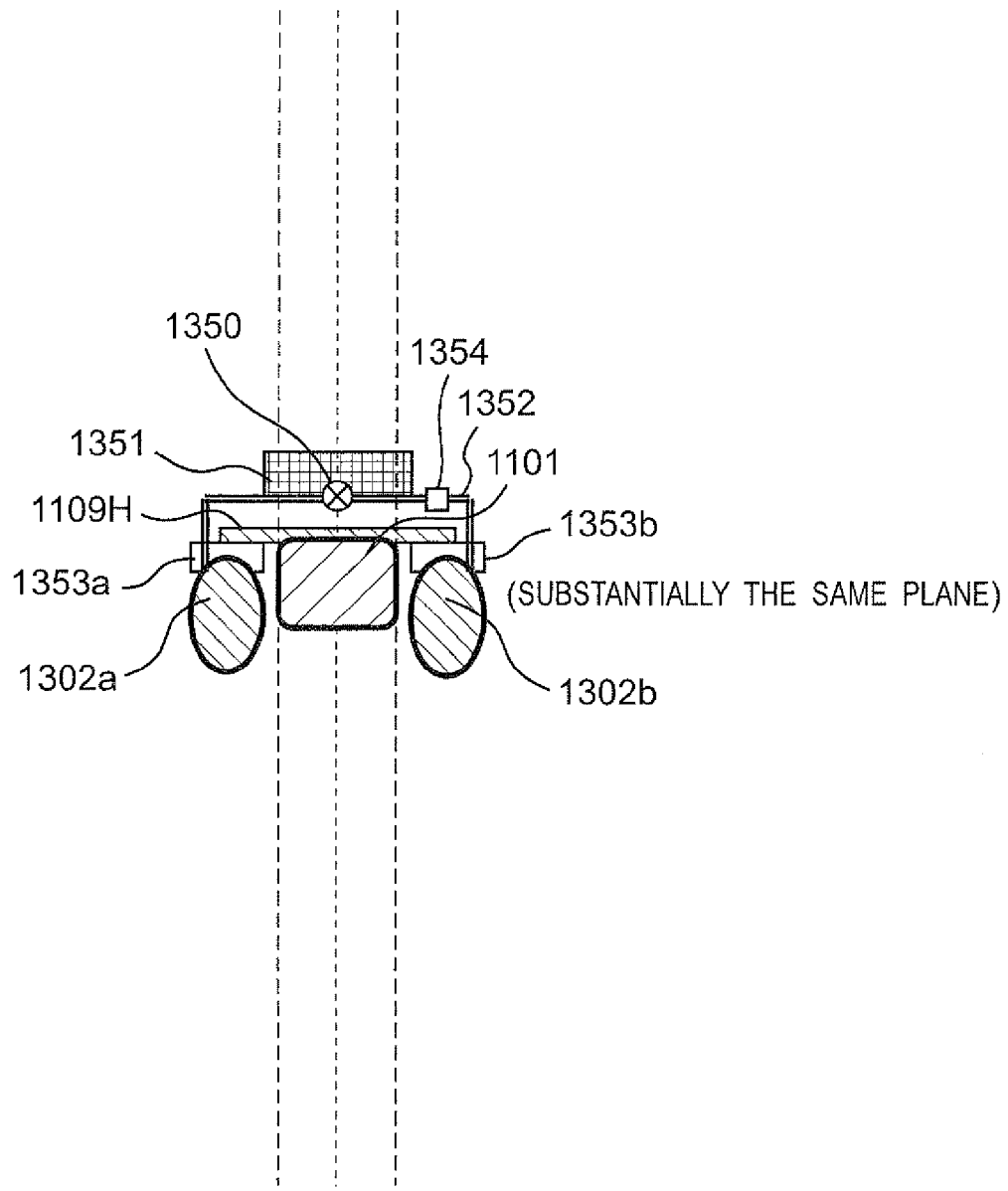
FIG. 40A is a view showing the schematic configuration and operations of backrest portions in a seventh embodiment of the present invention.
Figure 40B:
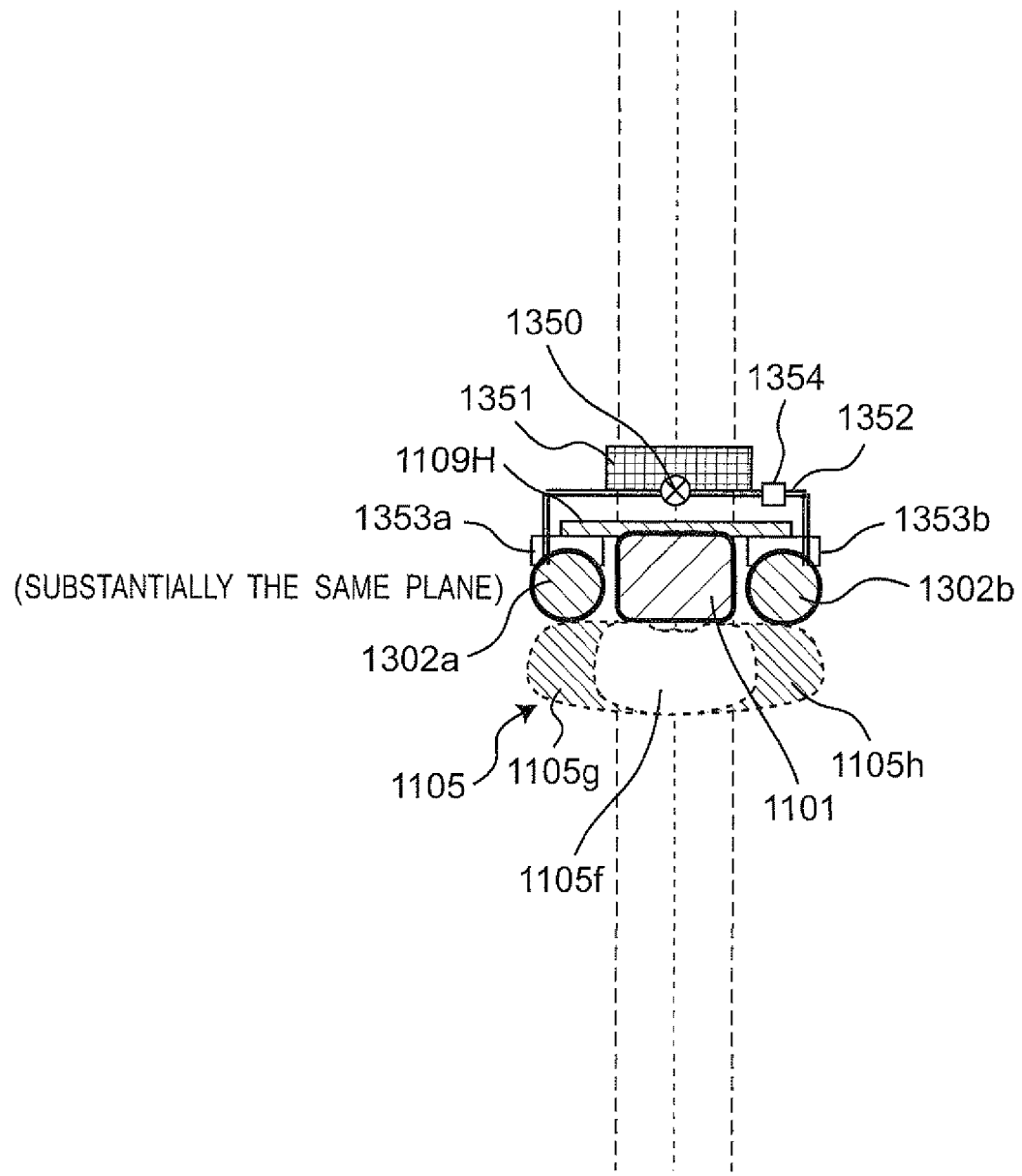
FIG. 40B is a view showing the schematic configuration and operations of the backrest portions in the seventh embodiment of the present invention.
Figure 40C:
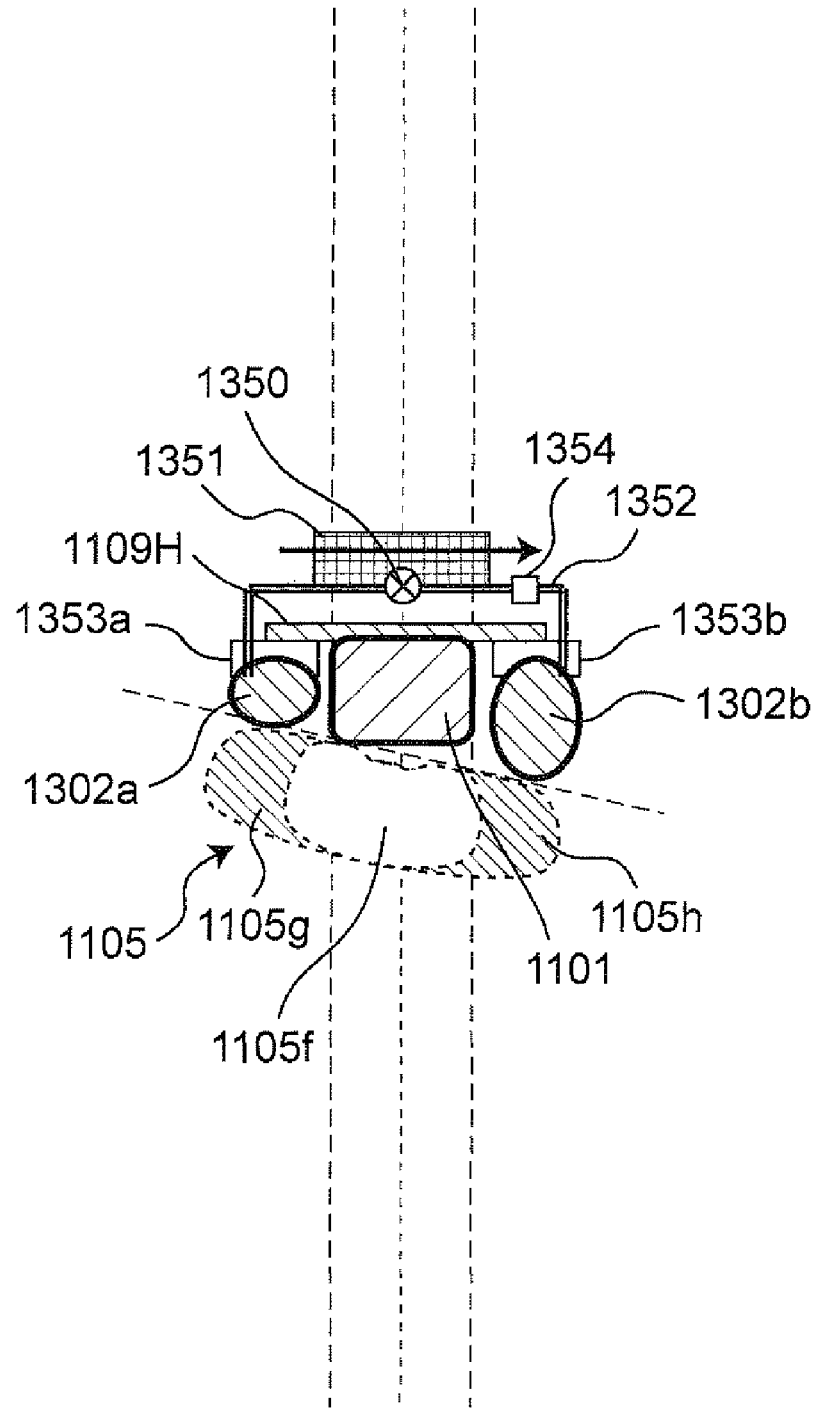
FIG. 40C is a view showing the schematic configuration and operations of the backrest portions in the seventh embodiment of the present invention.

FIG. 40A is a view showing a configuration of movable backrest portions of a turning control apparatus of the standing position riding type vehicle 1100 of the seventh embodiment of the present invention. In FIG. 40A, the same components as those in the first and sixth embodiments use the same reference numerals and description thereof is omitted.

First and second movable backrest portions 1302a and 1302b are stretchable, elastic bags and correspond to first and second movable backrest portions 1102a and 1102b of the sixth embodiment. For elastic bags, as one example, it is possible to use a material that acts to restore to a state where tension is zero, such as rubber balloons. In addition, a fluid (e.g., air, water, oil, etc.) is filled in the first and second movable backrest portions 1302a and 1302b. First and second movable backrest portion support portions 1353a and 1353b that support the first and second movable backrest portions 1302a and 1302b are fixed to both edges of a plate-like support portion 1109H. A fixed backrest portion 1101 is fixed to a central portion of the plate-like support portion 1109H. The first and second movable backrest portions 1302a and 1302b are interconnected by a fluid flow tube 1352 via a flow control valve 1350, whereby the fluid flow can be regulated. In addition, by connecting the fluid flow tube 1352 to a reserve tank 1351 via a valve (not shown), the elasticity of the movable backrest portions 1302a and 1302b can be adjusted. For example, in a natural state in FIG. 40A, the valve (not shown) of the reserve tank 1351 is opened to fill a fluid in the first and second movable backrest portions 1302a and 1302b from the reserve tank 1351 through the fluid flow tube 1352. A rider 1105 rides in the vehicle 1100 with the valve of the reserve tank 1351 turned down to some extent and leans against the first and second movable backrest portions 1302a and 1302b and the fixed backrest portion 1101, whereby excess fluid in the first and second movable backrest portions 1302a and 1302b is slowly collected by the reserve tank 1351 (see FIG. 40B). The valve is completely closed at the stage where the fluid flow through the valve of the reserve tank 1351 reaches less than or equal to a threshold value. As one example, it is possible to predetermine the threshold value for the fluid flow at which the valve is completely closed. By doing so, the first and second movable backrest portions 1302a and 1302b that fit the body shape of the rider 1105 can be implemented.

Then, when the rider 1105 twists his/her body to turn to the right in a clockwise direction and presses the first movable backrest portion 1302a with a right shoulder portion 1105g, fluid in the first movable backrest portion 1302a flows into the second movable backrest portion 1302b through the fluid flow tube 1352. A fluid flow measurement apparatus 1354 detects an amount of movement (flow) of the fluid and outputs the amount of movement of the fluid to a displacement computing unit 1111, and the displacement computing unit 1111 calculates the amount of displacement of the first movable backrest portion 1102a.

According to the configuration of the seventh embodiment, since a mechanical mechanism for implementing the first and second movable, backrest portions 1302a and 1302b is not required, the design simplification and weight reduction of the standing position riding type vehicle 1100 can be achieved. In addition, since a fluid is used as a medium, by adjusting steering response time by the flow control valve 1350 or by filling a fluid with high viscosity, for example, the response time can be made slow. Thus, a turning control apparatus with low operation sensitivity to avoid inappropriate steering, such as abrupt steering and zigzag traveling, can be implemented. Note that the same operability can also be achieved in the case of using air cylinders, etc., instead of springs in the fifth embodiments.

Eighth Embodiment

An eighth embodiment of the present invention differs from the fifth embodiment in the disposition of movable backrest portions and a fixed backrest portion. The differences in disposition will be described using FIGS. 41A and 41B.

Figure 41A:
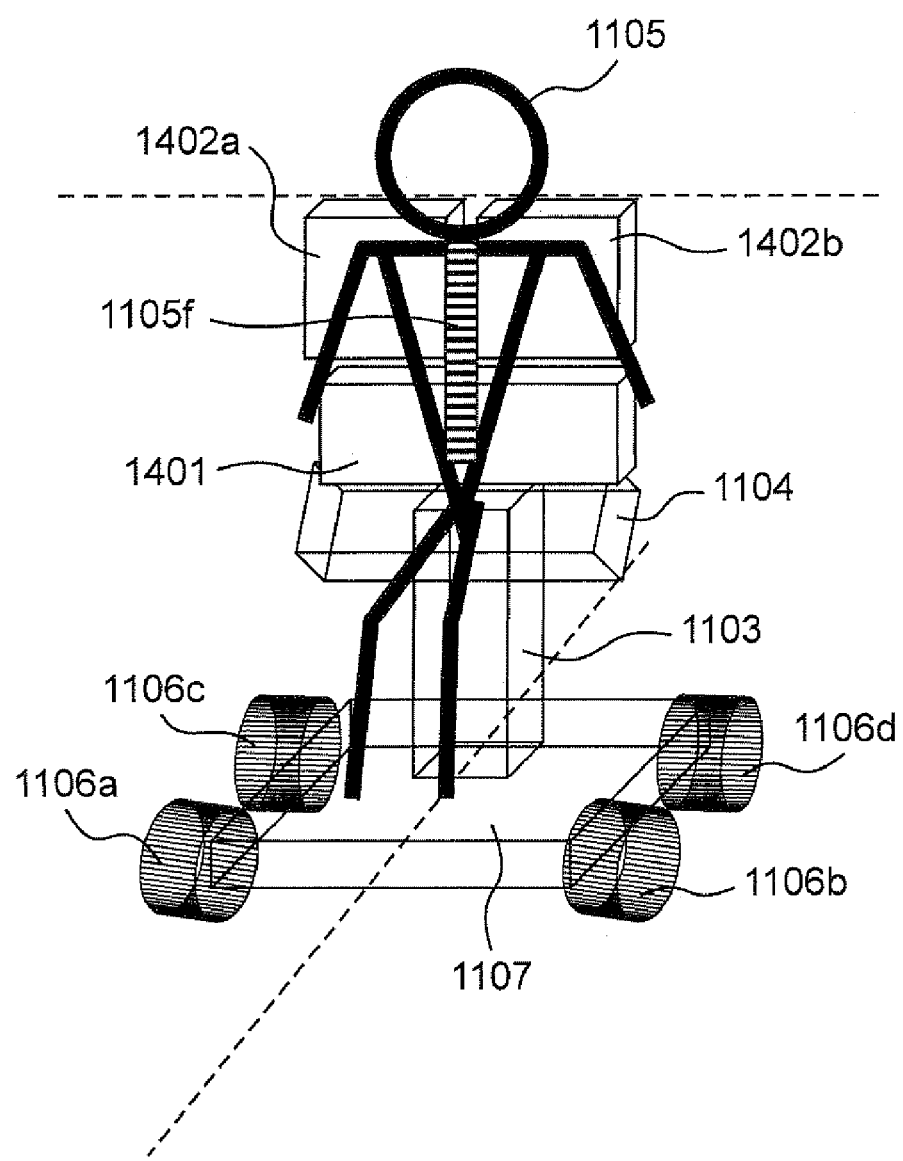
FIG. 41A is a bird's-eye view showing a schematic representation of a standing position riding type vehicle of an eighth embodiment of the present invention.
Figure 41B:
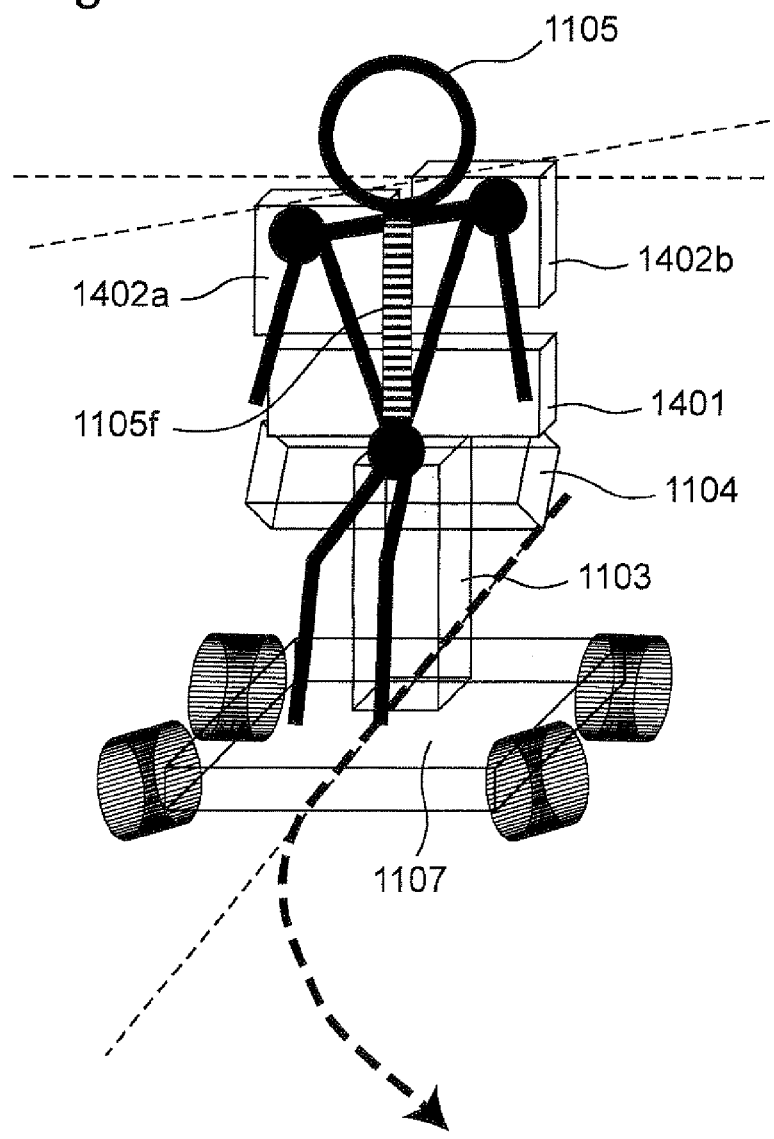
FIG. 41B is a bird's-eye view showing a schematic representation of the standing position riding type vehicle of the eighth embodiment.

FIGS. 41A and 41B are schematic bird's-eye views showing a standing position riding type vehicle 1100 of the eighth embodiment of the present invention and a turning control apparatus thereof.

In FIGS. 41A and 41B, first and second movable backrest portions 1402a and 1402b are disposed above a fixed backrest portion 1401 so as to be adjacent to each other, and are disposed left-right symmetrically as viewed from the fixed backrest portion 1401. In other words, the fixed backrest portion 1401 is not disposed between the first and second movable backrest portions 1402a and 1402b.

For a method of moving the first and second movable backrest portions 1402a and 1402b or a configuration implementing the method, a coupling or support structure between the first and second movable backrest portions 1402a and 1402b and the fixed backrest portion 1401 in any of the first to seventh embodiments may be adopted.

According to the eighth embodiment, the posture of a rider 1105 can be stably maintained by supporting, in particular, a region around the lumbar vertebrae of a body trunk 1105f. According to this configuration, an object that comes between the first and second movable backrest portions 1402a and 1402b (corresponding to a fixed backrest portion 1101 in the fifth embodiment) is not present and thus the rider 1105 can move his/her upper body more smoothly.

In the fifth embodiment, the stability of a rider 1105 is ensured by the presence of a fixed backrest portion 1101 between first and second movable backrest portions 1102a and 1102b. However, by the configuration of the eighth embodiment, too, the other movable backrest portion (e.g., 1402b) with respect to one movable backrest portion (e.g., 1402a) plays the same role and thus stabilization of the posture of the rider 1105 can be achieved.

Figure 42A:
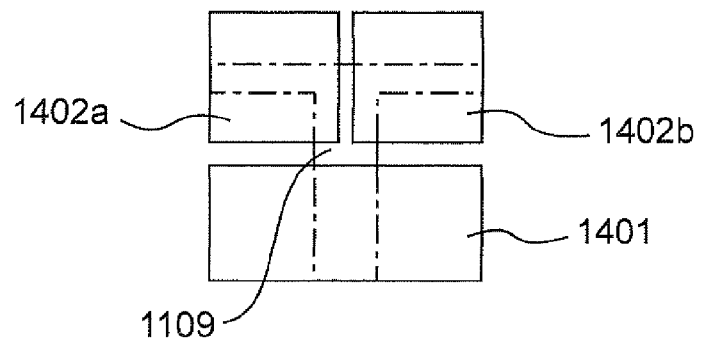
FIG. 42A is a view describing the shapes of backrest portions in the eighth embodiment.

Note that although in FIGS. 41A and 41B the shapes of backrest portions (the first and second movable backrest portions 1402a and 1402b and the fixed backrest portion 1401) 1053a are shown as rectangular parallelepipeds, as shown in FIG. 42A, as one example, it is possible that, as shown in FIG. 42B, the front shapes of the first and second movable backrest portions 1402a and 1402b be quadrangular with rounded corners and the front shape of the fixed backrest portion 1401 be a triangular with rounded corners so that they fit the body shape of the rider 1105 and do not inhibit postural change. A standing position riding type vehicle in FIG. 43 adopts the shapes of the backrest portions 1053a in FIG. 42B.

Figure 44A:
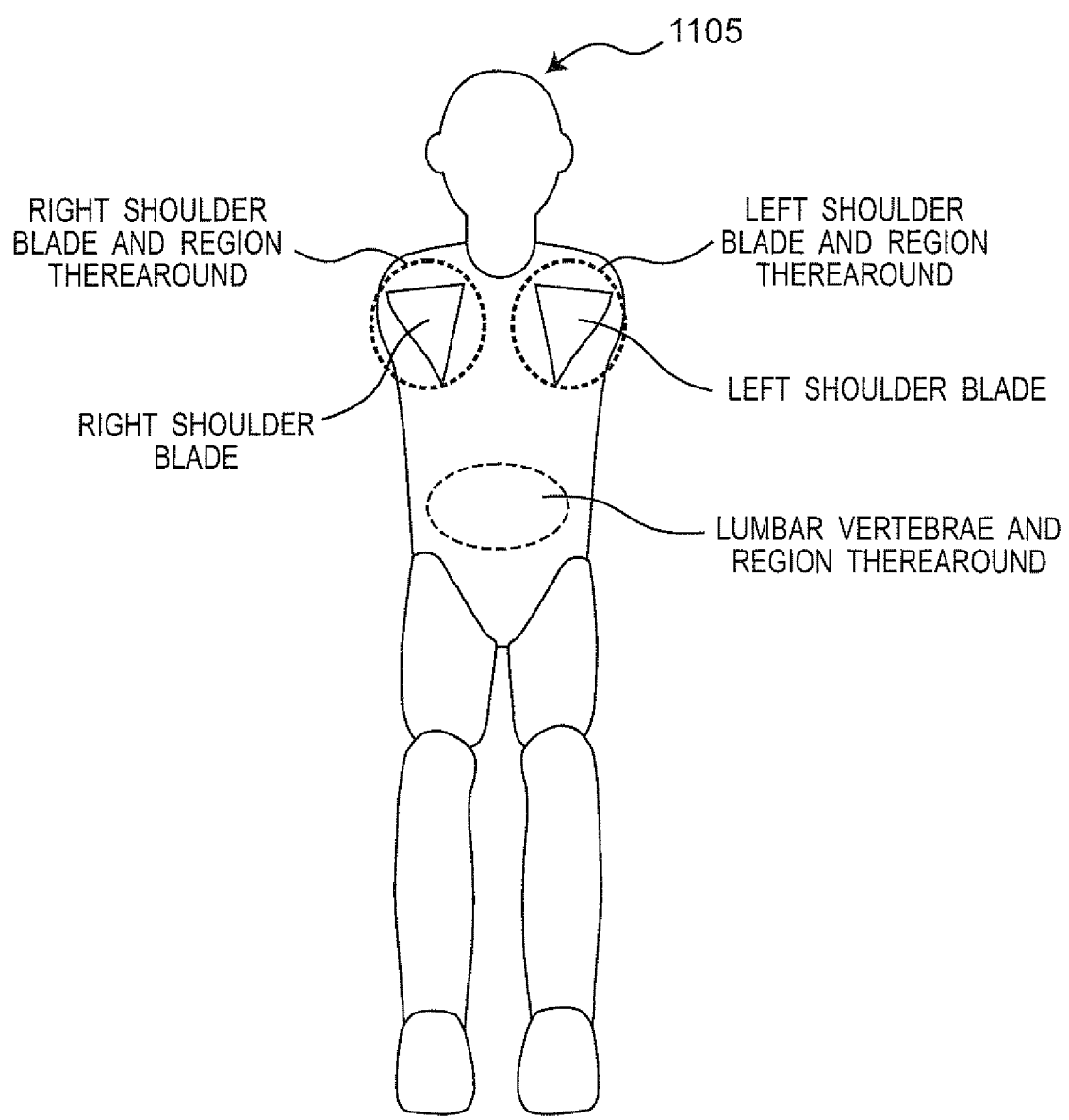
FIG. 44A is a view describing a positional relationship between the body parts of a rider and the backrest portions in the eighth embodiment.
Figure 44B:
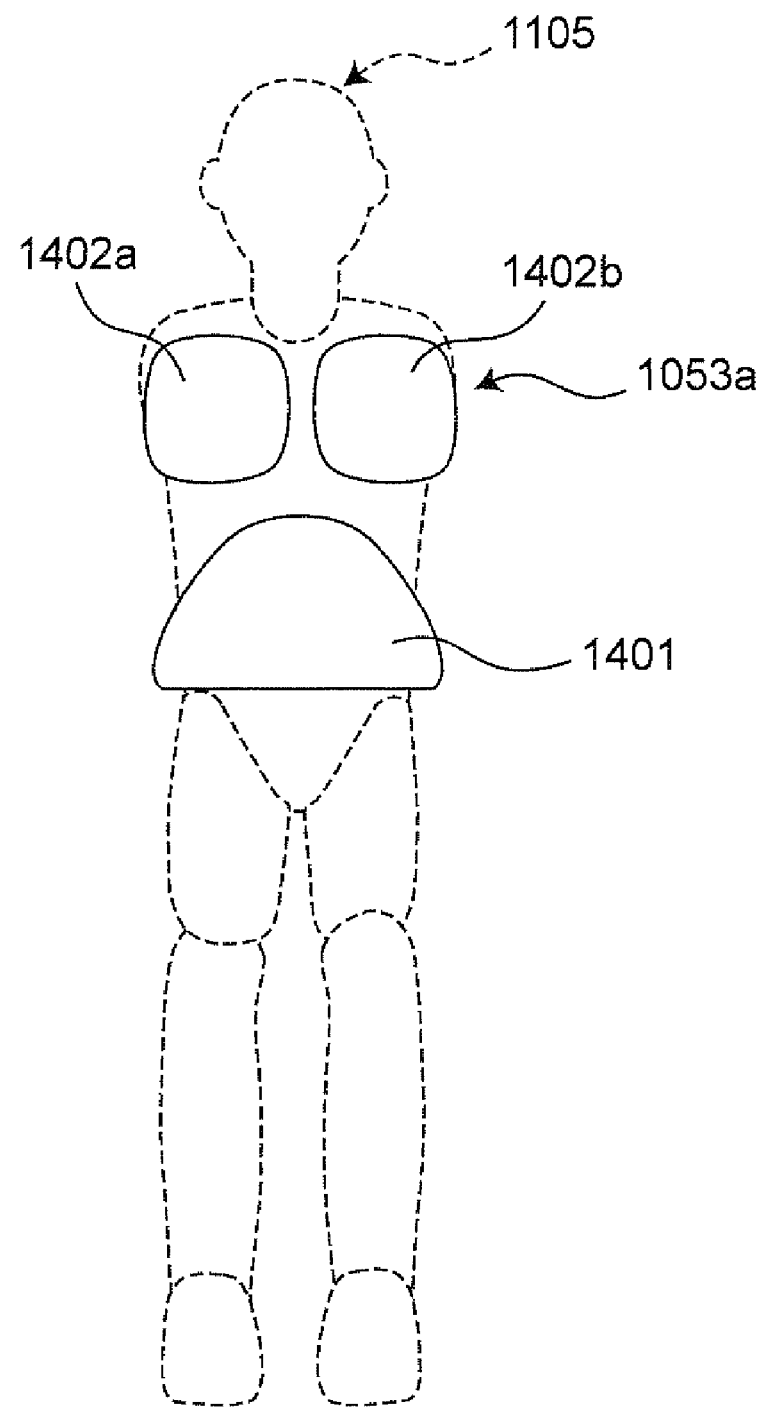
FIG. 44B is a view describing a positional relationship between the body parts of the rider and the backrest portions in the eighth embodiment.

A positional relationship between the backrest portions 1053a and the parts of the rider 1105 is shown in FIGS. 44A and 44B. The fixed backrest portion 1401 mainly comes into contact with the lumbar vertebrae and a region therearound, thereby holding the rider 1105. The first and second movable backrest portions 1402a and 1402b respectively come into contact with the right shoulder blade and a region therearound and the left shoulder blade and a region therearound of the rider 1105.

In the above-described various embodiments, the configuration is such that the directions in which the first movable backrest portion and the second movable backrest portion are displaced are roughly parallel to the normal to a plane formed by the front side of the fixed backrest portion. Namely, even when the movable backrest portions make a linear movement with respect to the support portion of the fixed backrest portion or when make an arc movement, before and after passing through a plane formed by the front side of the fixed backrest portion, the movement directions of the movable backrest portions are parallel to the direction of the normal to the plane. Hence, in the present invention, this displacement direction is defined as a "main displacement direction". Therefore, the main displacement direction is substantially perpendicular (approximately 90 degrees) to the same plane formed by the movable backrest portions and the fixed backrest portion.

A standing position riding type vehicle, a method of controlling the turning of a standing position riding type vehicle, and a program for controlling the turning a standing position riding type vehicle of the present invention have the function of allowing a rider to achieve steering with a physical sensation, and are useful as a standing position riding type vehicle, a method of controlling the turning of a standing position riding type vehicle, and a program for controlling the turning of a standing position riding type vehicle for personal use. In addition, a turning control apparatus portion of a standing position riding type vehicle can also be applied to applications such as a command interface using a human body.

Ninth Embodiment

A ninth embodiment of the present invention will be described in detail below based on the drawings. The ninth embodiment pertains to a seat that can be applied standing position riding type vehicles of the first to eighth embodiments.

Before describing the ninth embodiment of the present invention in detail below with reference to the drawings, related conventional art will be described first.

The ninth embodiment of the present invention pertains to a standing position riding type vehicle in which a user rides in a neutral position and sits maintaining a standing position.

The heights, etc., of fittings such as doors present in people's living environment, counters in stores or hotels, store shelves, etc., are designed with reference to a standing position. Here, the "standing position" refers to a state in which a person is standing supporting his/her weight on his/her legs and feet with his/her knee joints and hip joint extended and further his/her lower back extended.

In such living environment where objects are designed with reference to the standing position, a person who does not move in the standing position, e.g., a person who moves using a wheelchair, has difficulty in opening and closing a door, handling products placed on a store shelf, writing on a document on a counter, etc.

Figure 59:
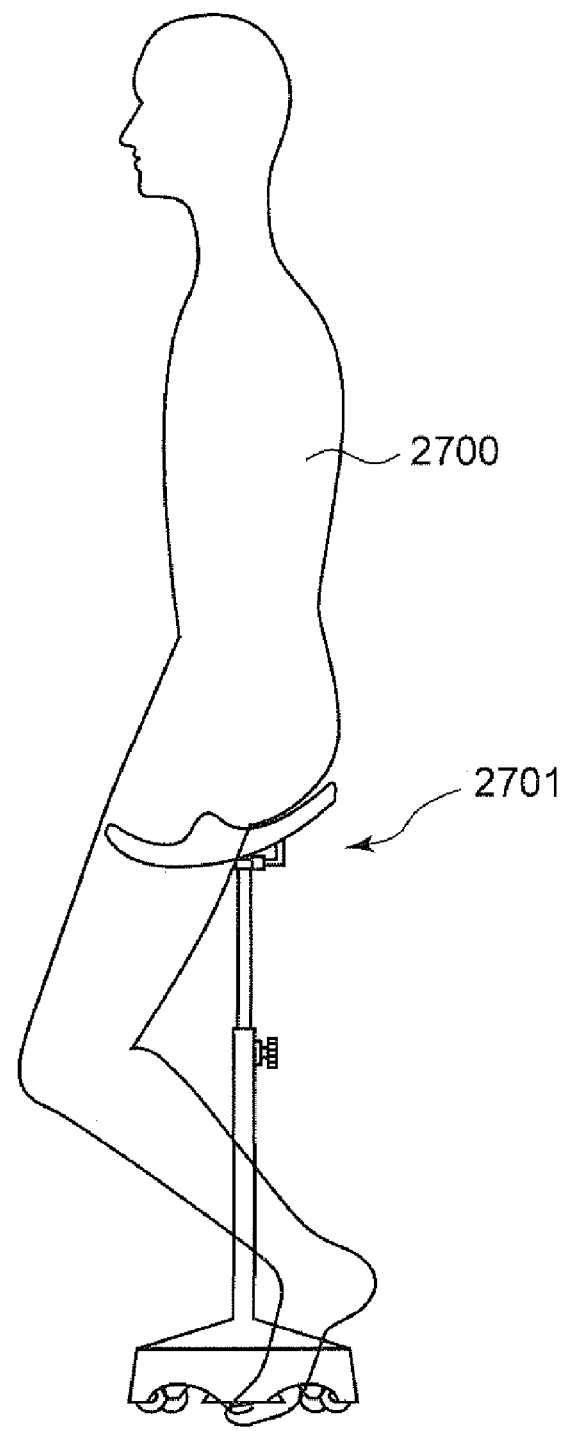

There is a conventional work chair that maintains flexibility in living activities in a standing position. FIG. 59 is a view showing a basic posture taken when a user 2700 uses a work chair 2701 described in Patent Literature 4 (Japanese Utility Model Application Laid-Open No. 5-076365).

The work chair 2701 is a chair for maintaining posture such that weight is distributed on a part other than the legs while maintaining the head position of the user 2700 in a standing position and flexibility in upper body. The both feet can touch the ground and the position of the lower back can be fixed by the legs. As such, there is a chair such as the one described in Patent Literature 4 for reducing the load on the lower limbs at standing work and ensuring workability equivalent to that for a standing position.

When a person sits in a normal chair where a seat surface and a backrest form an angle of approximately 90 degrees, with his/her knees and hip joint bent at substantially right angles and does work with his/her arms and hands, so-called desk work, since he/she sits in the chair for a long period of time with his/her upper body extended up and upright, a load is applied to his/her lower back. The reason that the load is applied is due to the fact that the angle formed by the pelvis and spine at a seating posture is an angle at which a natural lumbar curvature cannot be maintained. To avoid the load on the lower back, an angle that is considered to provide the least load on the spine is studied (e.g., "Alternations of the lumbar curve related to posture and seating" by J. Jay Keegan, Journal of Bone And Joint Surgery, 1953, Vol. 35 (pp. 589-603)).

Figure 60:
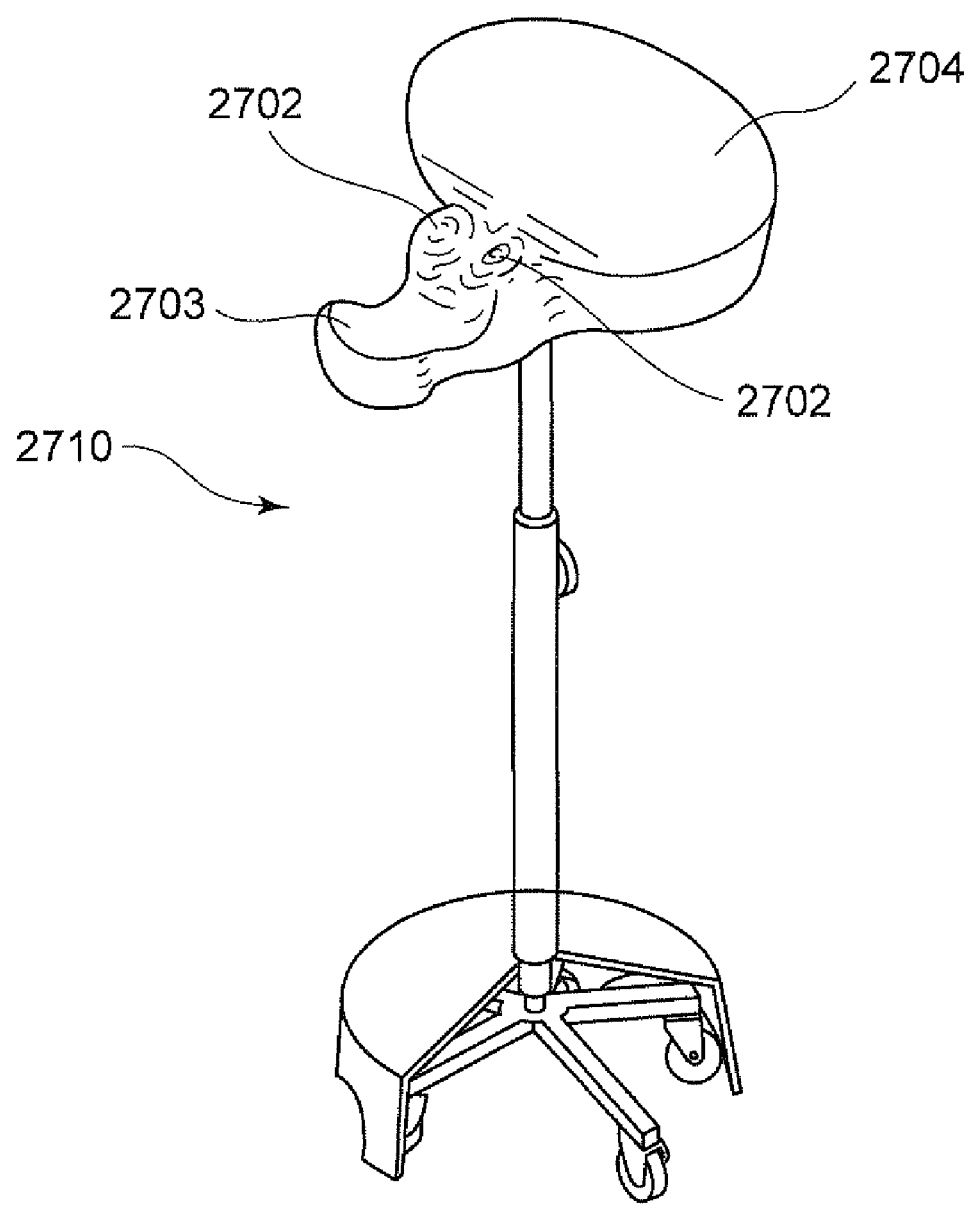

FIG. 60 is a view showing a work chair 2701 described in Patent Literature 4. The work chair 2701 is designed to allow the user's upper body to be extended up and kept upright and maintain hip joint angle in order to reduce the load at standing work and ensure workability equivalent to that for a standing position. In the work chair 2701, dome-shaped cushions 2702 which are protrusions supporting the ischial bone are provided between a portion 2704 supporting the gluteal region and a thin portion 2703 to be straddled by the femora. The dome-shaped cushions 2702 prevent the upper body of the user sitting on the work chair 2701 from sliding off and reduce the load applied to the legs and feet when doing work continuously in standing position.

Figure 61:
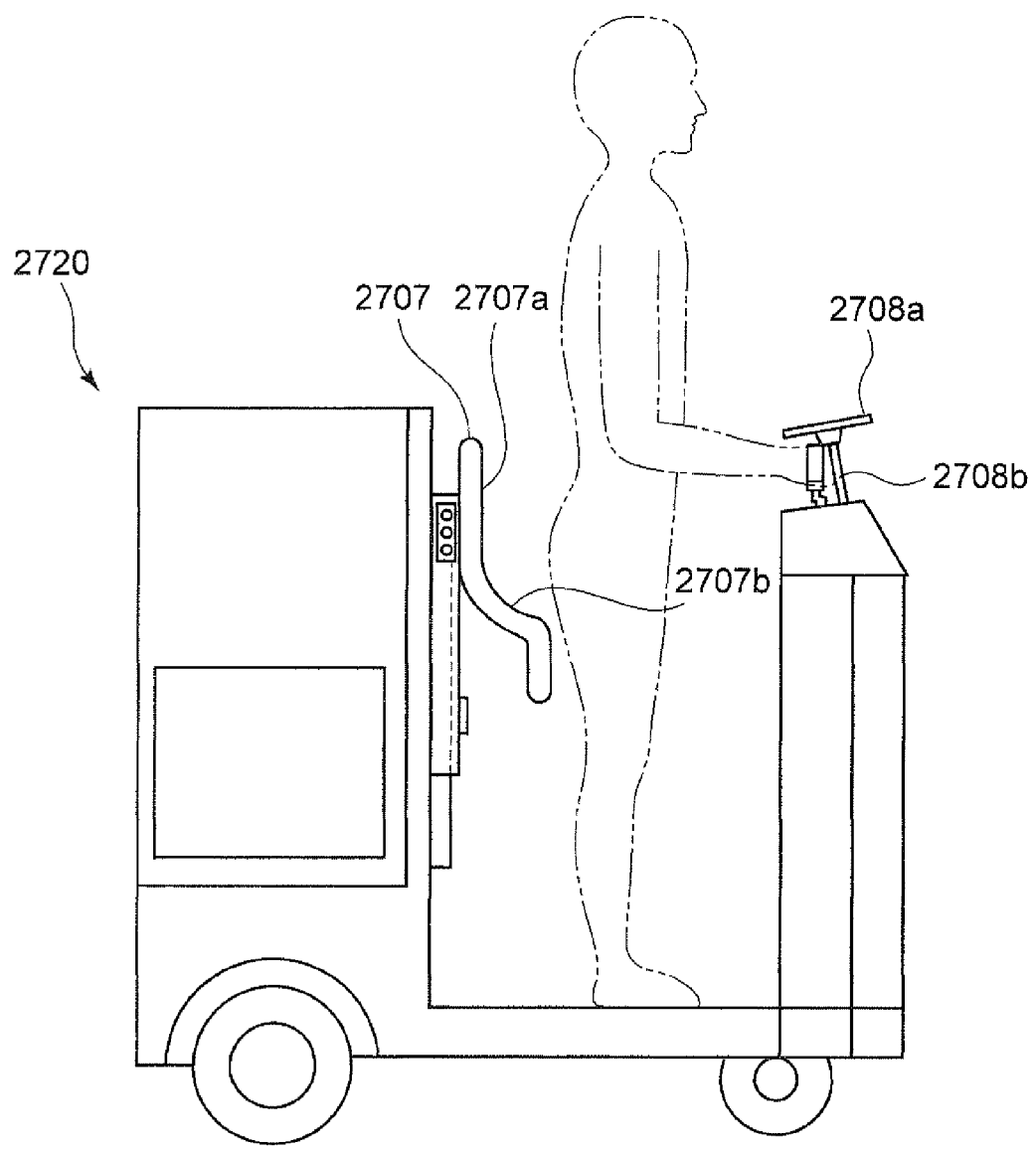

Meanwhile, there is a pad for leaning which is provided on a vehicle for industrial use in which a person rides in a standing position, and which is intended to reduce a weight load on the legs with the head position a standing position and an equipment operable state maintained (see, for example, Patent Literature 5 (Japanese Patent Application Laid-Open No. 2005-132525)). FIG. 61 is a side view of a conventional vehicle for industrial use 2720 described in Patent Literature 5.

A pad for leaning 2707 not only has a backrest 2707a but also has a cylindrical or slanted overhang 2707b on which a person can lightly sit with his/her gluteal region supported thereby.

By the backrest 2707a and the overhang 2707b supporting the gluteal region, the height of the upper body that allows to perform operation of, for example, a lever 2708b or a steering 2708a for vehicle operation can be stably maintained and the load applied to the legs due to long hours of work in a standing position can be reduced.

In addition, when a person who lives in a seated position which is a state of bending his/her lower back and knees as in the case of a wheelchair has a conversation with another person in a standing position at a store, a public institution, etc., the person talks with him/her looking up at him/her, which imposes a great mental load on the person.

Figure 63:
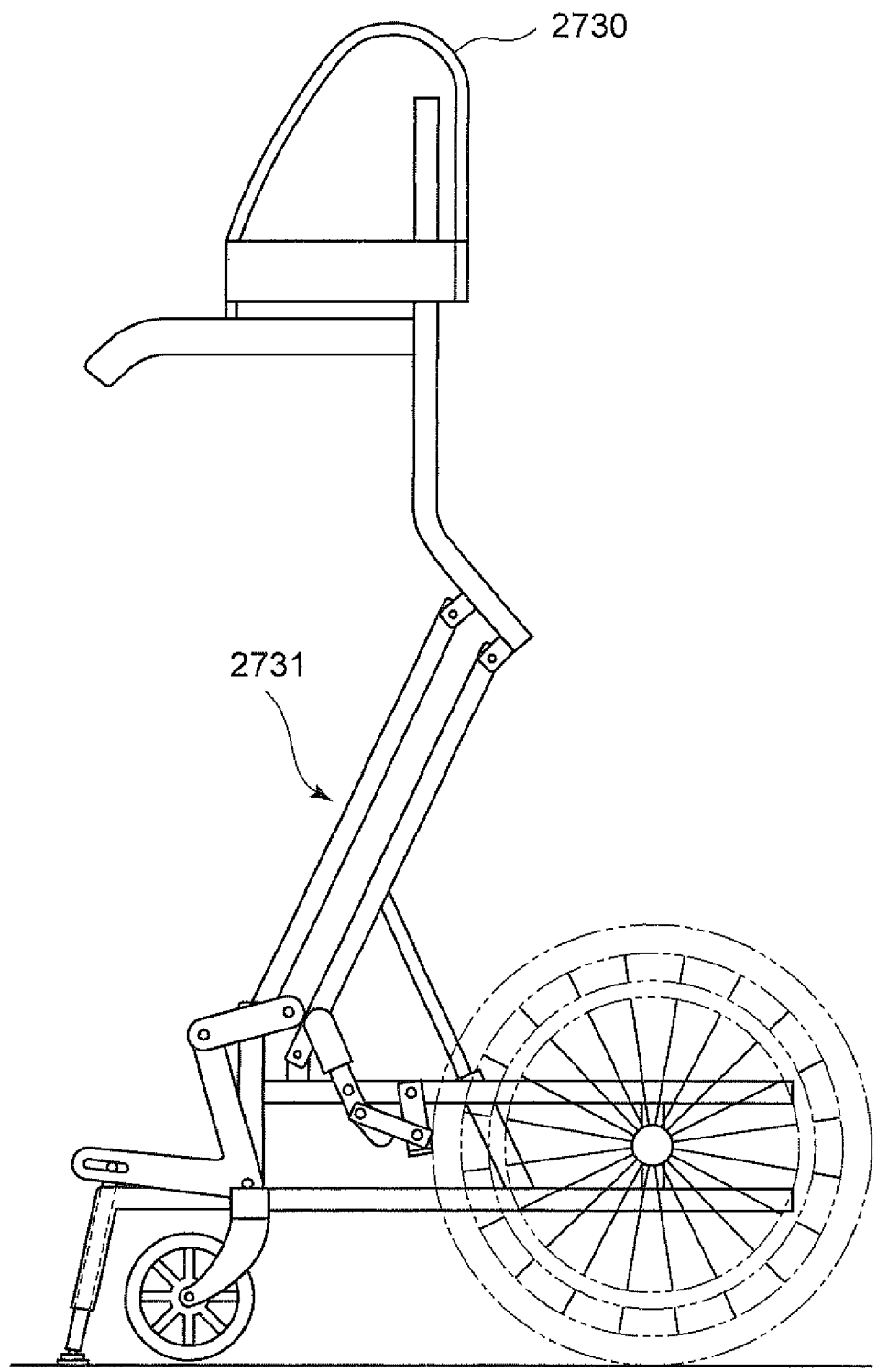

Hence, in some wheelchairs, the position of a chair is made higher for the purpose of aligning the head position with that of a person in a standing position, or changing posture. FIG. 63 is a view showing a wheelchair described in Patent Literature 6 (Japanese Utility Model Registration No 3029566). Instead of making the position of a chair higher, in the wheelchair shown in FIG. 63, a seat surface and a backrest are coupled together to extend them in a form like a single plate-like sheet 2731, and the knees, lower back, and chest are fixed, by a belt 2730, onto the sheet 2731 for the seat surface and the backrest which is formed in a plate-like shape, whereby a standing position is maintained. However, they are made for those users who have disability in their lower limbs, etc., and cannot take a standing position on their own. Thus, the load on the lower back or spine of the users, etc., are not considered.

Note that although the head position of a user who rides in a wheelchair where the height of a chair is increased is the same as that of a person in a standing position, since the user's legs come more forward than his/her body, the user cannot get sufficiently close to a store shelf, a counter, or a doorknob and thus it is inconvenient.

For a wheelchair in which a user is fixed in a standing posture such as that described in Patent Literature 6, too, the user cannot freely move his/her upper body due to the fixation and thus it is inconvenient in terms of accessing a store shelf or counter. For those who can maintain a standing position on their own but easily get tired and thus have difficulty in maintaining a standing position for a long period of time or in walking for a long period of time, such as elderly people or people having weak legs, too, there are inconveniences such as instability and a sense of fear caused by sitting in a high position and tightness caused by the fixation of the body. Thus, flexibility in living activities expected in a standing position cannot be sufficiently obtained.

The work chair 2701 in Patent Literature 4 increases flexibility in upper body motion by supporting the weight of the upper body only on the ischial bone, as shown in FIG. 59. Hence, when a user moves on the work chair 2701, the user him/herself moves the position of the chair 2701 with his/her legs. Namely, the user moves with the most of the weight of his/her upper body supported on his/her legs. When the user performs acceleration or deceleration in a front-back direction and makes a left or right turn with the weight of his/her upper body supported on one point of the ischial bone by the work chair 2701, his/her upper body is swung around by the work chair 2701, becoming unstable. Thus, using such a work chair 2701 as a vehicle as it is has a safety problem.

Figure 62A:
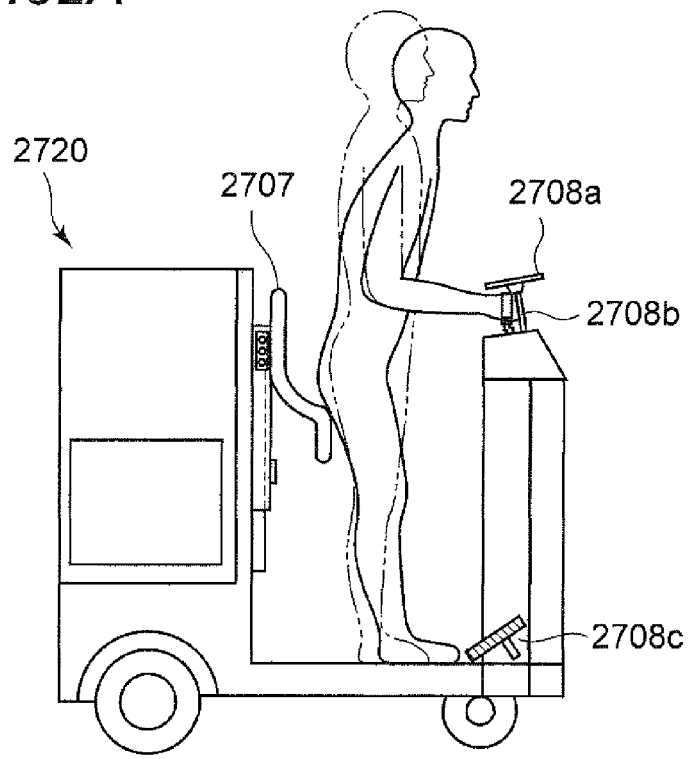
Figure 62B:
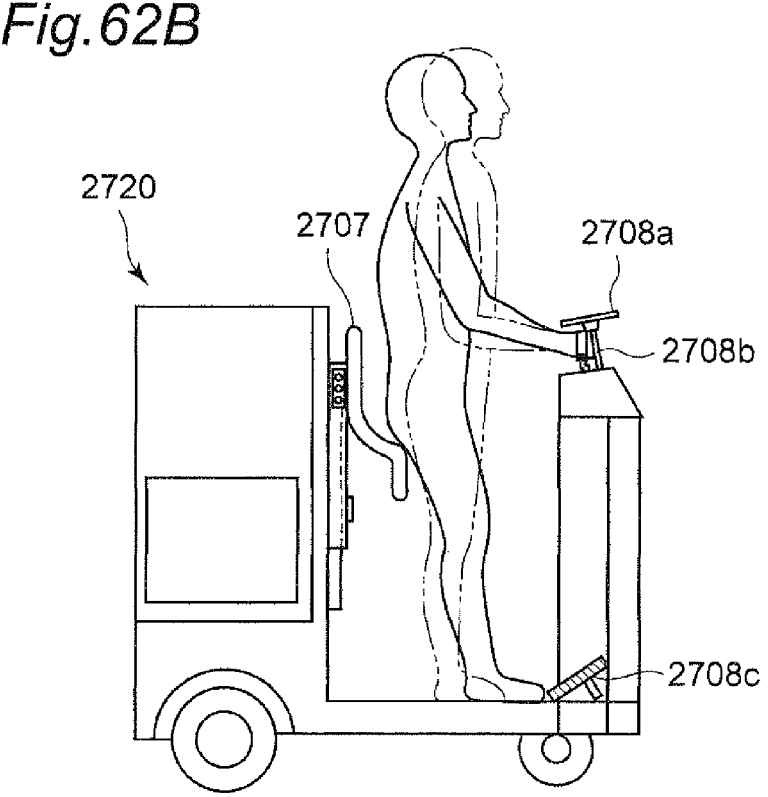

On the other hand, in the vehicle for industrial use 2720 in which a user rides in a standing position described in Patent Literature 5, the user operates the lever 2708b, the steering 2708a, and a pedal 2708c in a standing position to move the vehicle for industrial use 2720. Therefore, when the user sits on the pad for leaning 2707 of the vehicle for industrial use 2720, as shown in FIGS. 62A and 62B, the user operates the lever 2708b and the steering 2708a with his/her upper body taking a forward leaning posture and his/her limbs extended. Thus, by taking a forward leaning posture, a load on the lower back or arms occurs.

In addition, in the case in which the user sits on the pad for leaning 2707 of the vehicle for industrial use 2720, as shown in FIGS. 62A and 62B, when the user moves forward, only his/her lower back moves back with respect to a movement direction, as shown by a solid line in FIG. 62A, from a standing state, or his/her upper body above the lower back moves back with respect to the movement direction, as shown by a solid line in FIG. 62B. As a result, in both of the case in which only the lower back moves back and the case in which the upper body above the lower back moves back, since the user supports his/her weight by friction on the soles of the feet in a standing state with his/her legs propped up diagonally on a floor, a weight load is applied to the toes of the feet and thus there is a problem of causing pain in the case of long hour sitting.

In general, many vehicles and single-seat vehicles including those for industrial use are driven by a user stepping on or off a pedal. For example, as indicated by reference numeral 2708c in FIGS. 62A and 62B, an operation pedal is disposed slightly forward of a user's foot positioned when the user operates the vehicle for industrial use in a standing position, as shown by dash-dotted lines. In a state of a high weight load on the toes as in the case of the pad for leaning 2707 of the above-described vehicle for industrial use, there is a problem that a user has difficulty in performing operation of the pedal 2708c which is operated by his/her toe with his/her heel placed on a floor.

An object of the ninth embodiment of the present invention is to solve the above-described conventional problems, and to provide a standing position riding type vehicle that can allow a user to stably maintain his/her posture even at acceleration and deceleration or turning upon movement, with the head position in a standing position and flexibility in upper body motion maintained and without a weight load applied to his/her feet or legs.

Various aspects of the ninth embodiment of the present invention will be described below.

According to a first aspect of the present invention, there is provided a standing position riding type vehicle in which a user sits and rides with the user maintaining a head position for a standing position, the vehicle including:

a vehicle main body;

a backrest supported above the vehicle main body and having a backrest surface capable of supporting a back of the user;

a gluteal region support portion supported above the vehicle main body, disposed below the backrest so as to be connected to the backrest, and having a seat surface capable of supporting a gluteal region of the user;

an ischial bone support plate supported by the vehicle main body, disposed below the gluteal region support portion so as to be connected to the gluteal region support portion, and capable of supporting an ischial bone of the user; and a footrest supported at a front portion of the vehicle main body and having a footrest surface capable of supporting soles of feet of the user, in which in a state as viewed from a side with respect to a movement direction of the vehicle main body which is orthogonal to the backrest surface, the backrest surface of the backrest is tilted backward, an angle of the tilt with respect to a vertical plane is 10 degrees, the footrest surface of the footrest is tilted backward, an angle thereof with respect to a horizontal plane is 10 degrees, an angle formed by the backrest surface of the backrest and the footrest surface of the footrest is 90 degrees, and an angle formed by the backrest and the seat surface of the gluteal region support portion is 135 degrees.

By this configuration, when the user sits with the head position for a standing position maintained, the angle of the hip joint of the user can be kept at about 135 degrees. Namely, the angle formed by the line of gravity from the spine to pelvis of the user and the femora can be kept at about 135 degrees. Thus, the weight of the user can be supported so as to be distributed on the backrest, the seat portion, and the footrest. With the head position equivalent to that for a standing position maintained, while maintaining an angle that is considered to provide the least load on the lower back or spine, the load on the legs and feet of the user can be reduced. Furthermore, by keeping the angle of the ankles at about 90 degrees, the user can support his/her weight at a natural joint angle which is the same as that for a normal standing position. This facilitates motion such as raising the leg to operate a pedal or foot switch with the sole of the foot. Furthermore, by the provision of the gluteal region support portion, the gluteal maximus muscle of the user is supported further back than the ischial bone support plate of the seat portion, enabling to maintain the angle of the pelvis. By this configuration, pain or fatigue caused by load concentration on the ischial bone when sitting with the head position for a standing position maintained is prevented and a fear of sliding off of a forward-tilted seat portion is eliminated and actual sliding off can be prevented. Here, the term "maintain the head position for a standing position" or "maintain the head position equivalent to that for a standing position" refers to that the head position relative to the head position for a normal standing position where the user stands up with his/her knees extended is within a range of the order of about 15% of his/her height.

According to a second aspect of the present invention, the standing position riding type vehicle according to the first aspect is provided further including:

a plurality of drive wheels rotatably supported at a lower portion of the vehicle main body; and a drive apparatus disposed at the lower portion of the vehicle main body and driving the plurality of drive wheels to allow the standing position riding type vehicle to make a forward motion, a backward motion, or a turn, in which in a state as viewed from a side with respect to a movement direction of the standing position riding type vehicle, a central axis of the standing position riding type vehicle for turning is disposed between an intersection point of the backrest surface of the backrest and the seat surface of the gluteal region support portion and a point (boundary point) where the ischial bone support plate comes into contact with the gluteal region support portion.

By such a configuration, when the user sits in the seat in a neutral position, the head of the user is naturally located substantially on the rotation axis of the standing position riding type vehicle for turning. Accordingly, the body of the user is not swung around by centrifugal force occurring at turning of the standing position riding type vehicle. In addition, when the user is driving the standing position riding type vehicle, it does not become difficult for him/her to grasp the driving direction of the standing position riding type vehicle or a path through which the standing position riding type vehicle passes. In addition, the body of the user is not moved irrespective of his/her intention, and thus, the cause of motion sickness is also eliminated.

According to a third aspect of the present invention, the standing position riding type vehicle according to the first or second aspect is provided further including:

first operation input means disposed on the footrest and capable of allowing the standing position riding type vehicle to perform forward motion, backward motion, or stop operation, by being stepped on with a foot of the user; and second operation input means disposed on the backrest surface and the seat surface and capable of allowing the standing position riding type vehicle to perform turning operation, by a back portion of a body of the user coming into contact therewith or applying pressure thereto.

By this configuration, without changing the posture such as changing the posture from one where the user is seated with the head position for a standing position maintained to one where the user moves his/her back away from the backrest or leans forward, the user can perform operation of the vehicle using the first and second operation input means, with the user remaining seated and the head position for a standing position maintained.

According to a fourth aspect of the present invention, the standing position riding type vehicle according to the third aspect is provided in which the second operation input means is a pressure sensor sheet.

By this configuration, without changing the posture such as changing the posture from one where the user is seated with the head position for a standing position maintained to one where the user moves his/her back away from the backrest or leans forward, the user can perform operation of the standing position riding type vehicle by applying pressure to the pressure sensor sheet by a simple method such as swinging the body.

According to the standing position riding type vehicle of the present invention, the user can ride in the vehicle maintaining a natural posture with very little load, with the head position for a normal standing position and workability ensured, and can perform operation using the operation input means mounted on the back side of the user, with a natural riding posture maintained. Furthermore, since the angle of the ankles is kept at about 90 degrees, the soles of the feet easily support load and thus operation inputs by the soles of the feet can be stably performed. Furthermore, for forward and backward acceleration occurring at traveling, too, the user can stably support load and maintain his/her posture. Hence, even without a handle, a handrail, or the like, in front of the user, it is safe and the user can be provided with a sense of openness while ensuring his/her upper body's workability.

The ninth embodiment of the present invention will be described below with reference to the drawings. Note that the reference numerals used in the drawings are all numbered in the 2000s in order to clearly distinguish from other embodiments.

Figure 46:
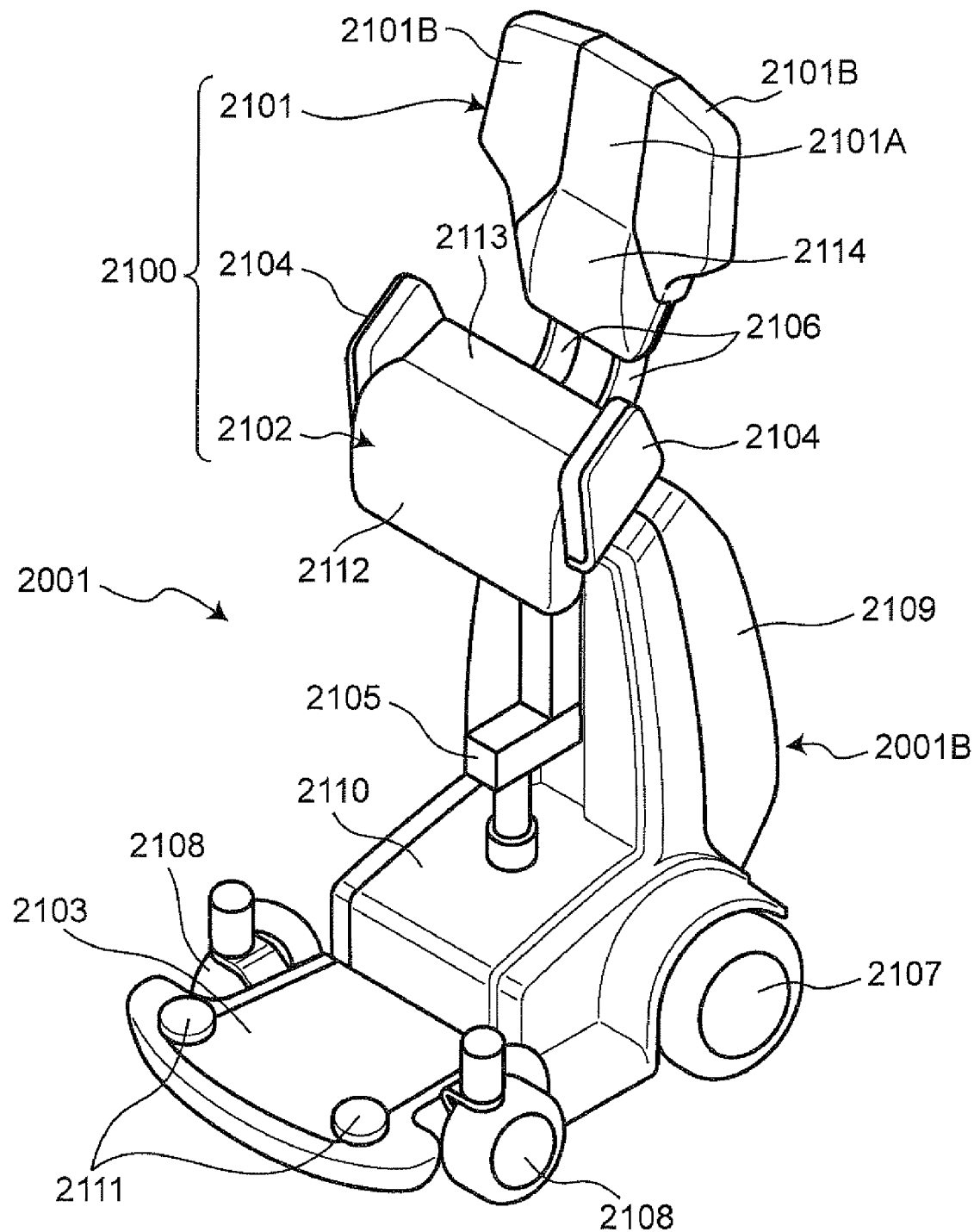
FIG. 46 is a perspective view of the whole standing position riding type vehicle according to a ninth embodiment of the present invention.
Figure 47:
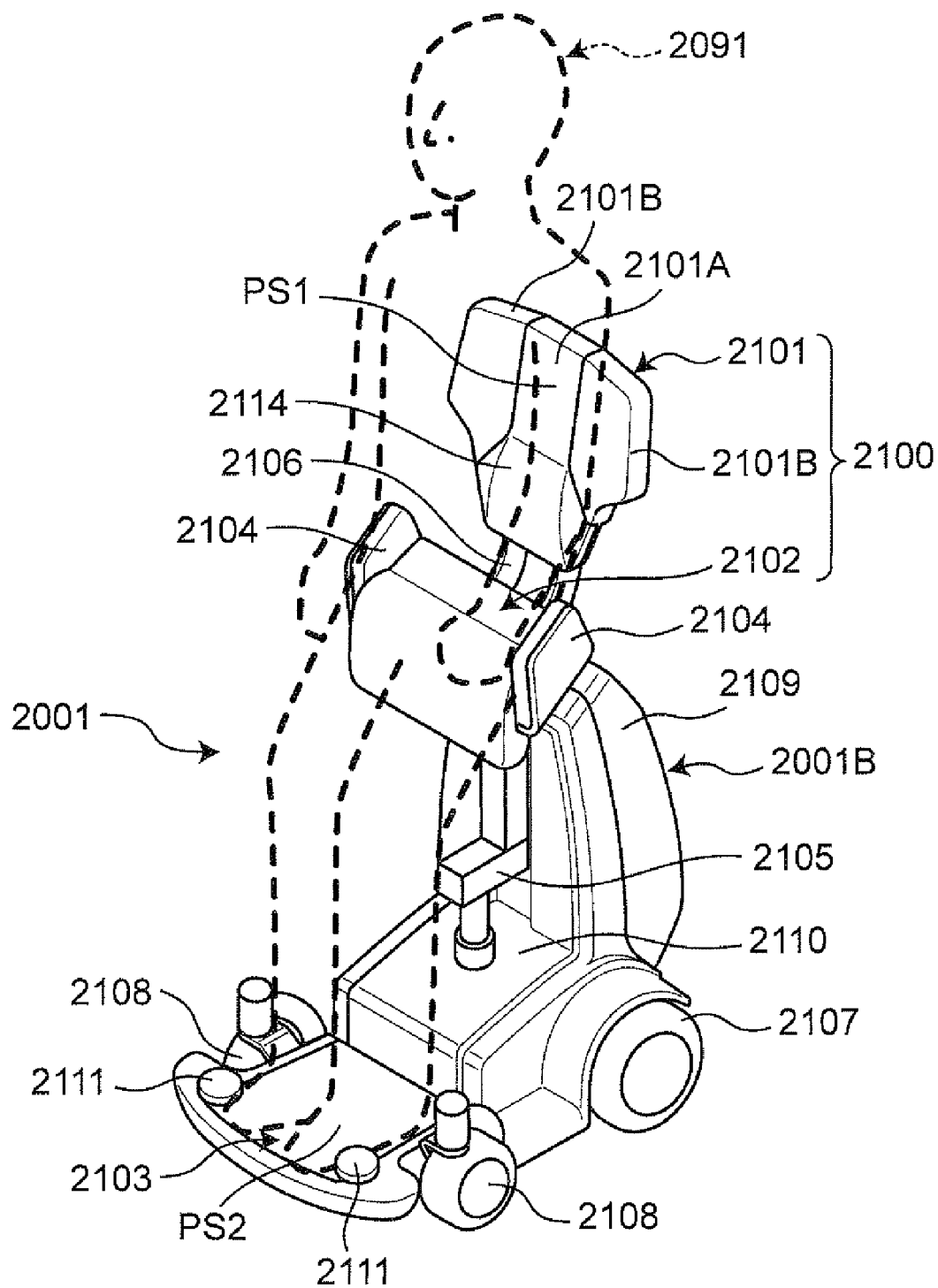
FIG. 47 is a perspective view of a riding posture in the standing position riding type vehicle according to the ninth embodiment of the present invention.
Figure 58A:
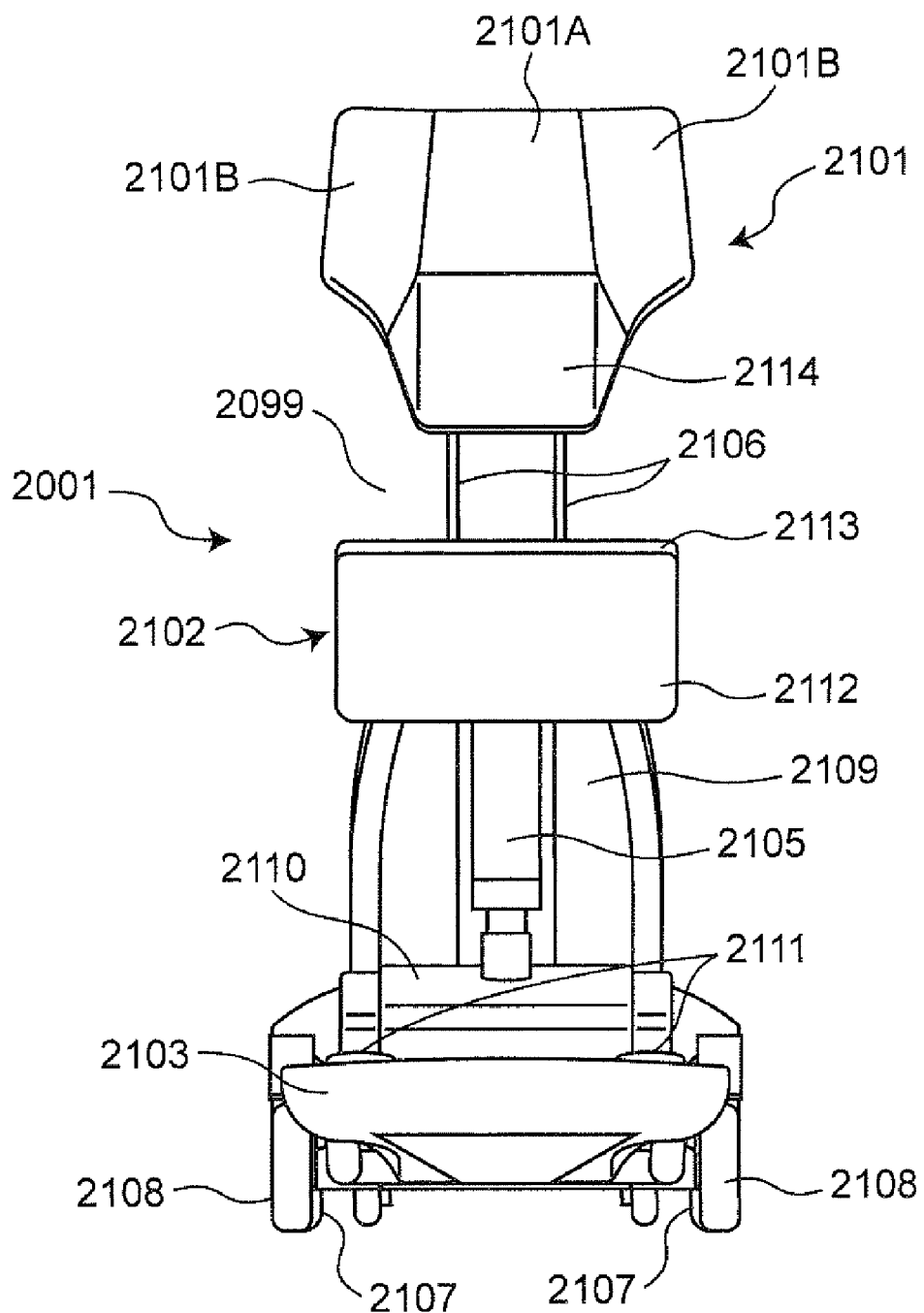
FIG. 58A is a front view of the standing position riding type vehicle according to the ninth embodiment of the present invention.
Figure 58B:
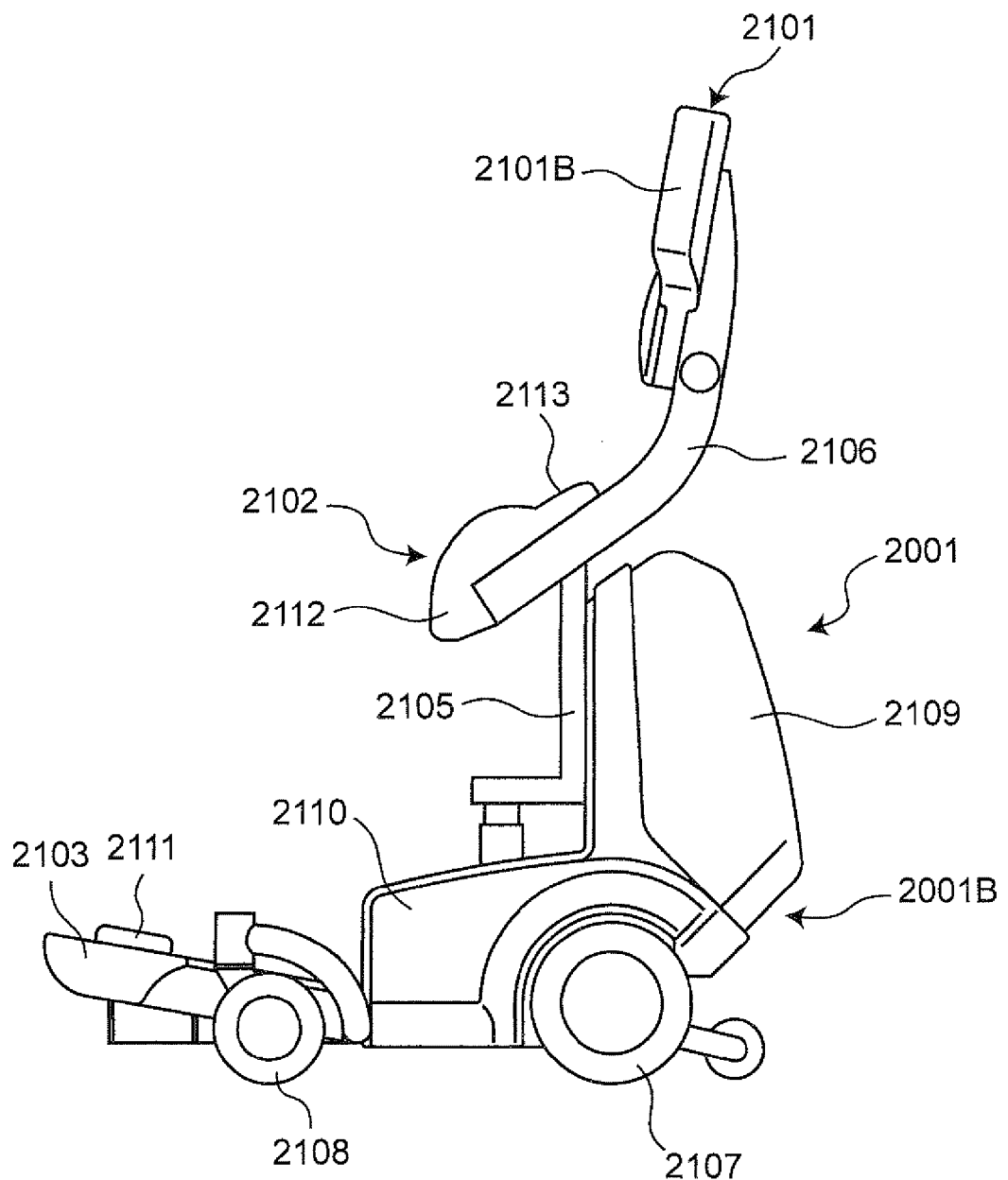
FIG. 58B is a right side view of the standing position riding type vehicle according to the ninth embodiment of the present invention.
Figure 58C:
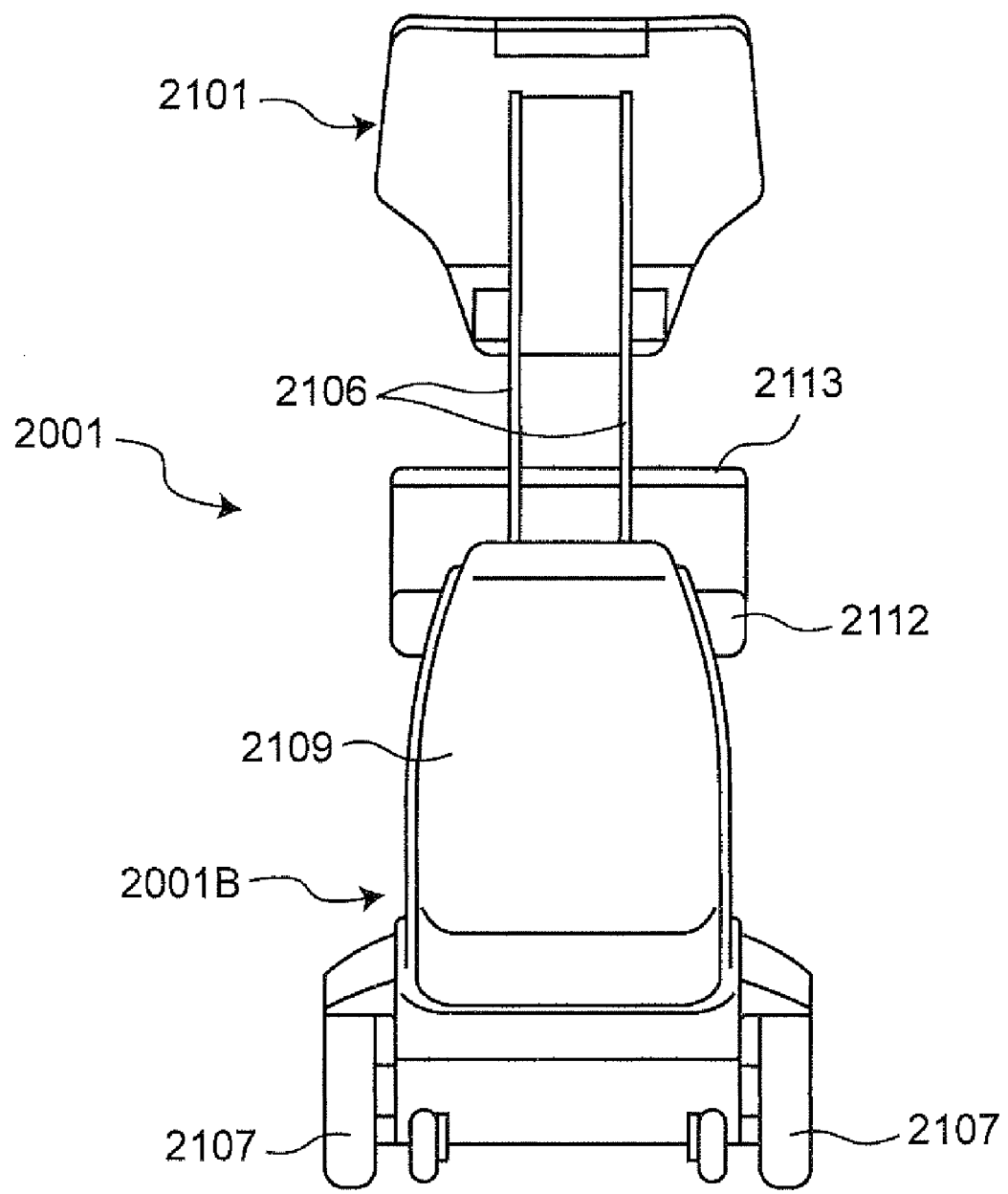
FIG. 58C is a rear view of the standing position riding type vehicle according to the ninth embodiment of the present invention.
Figure 58D:
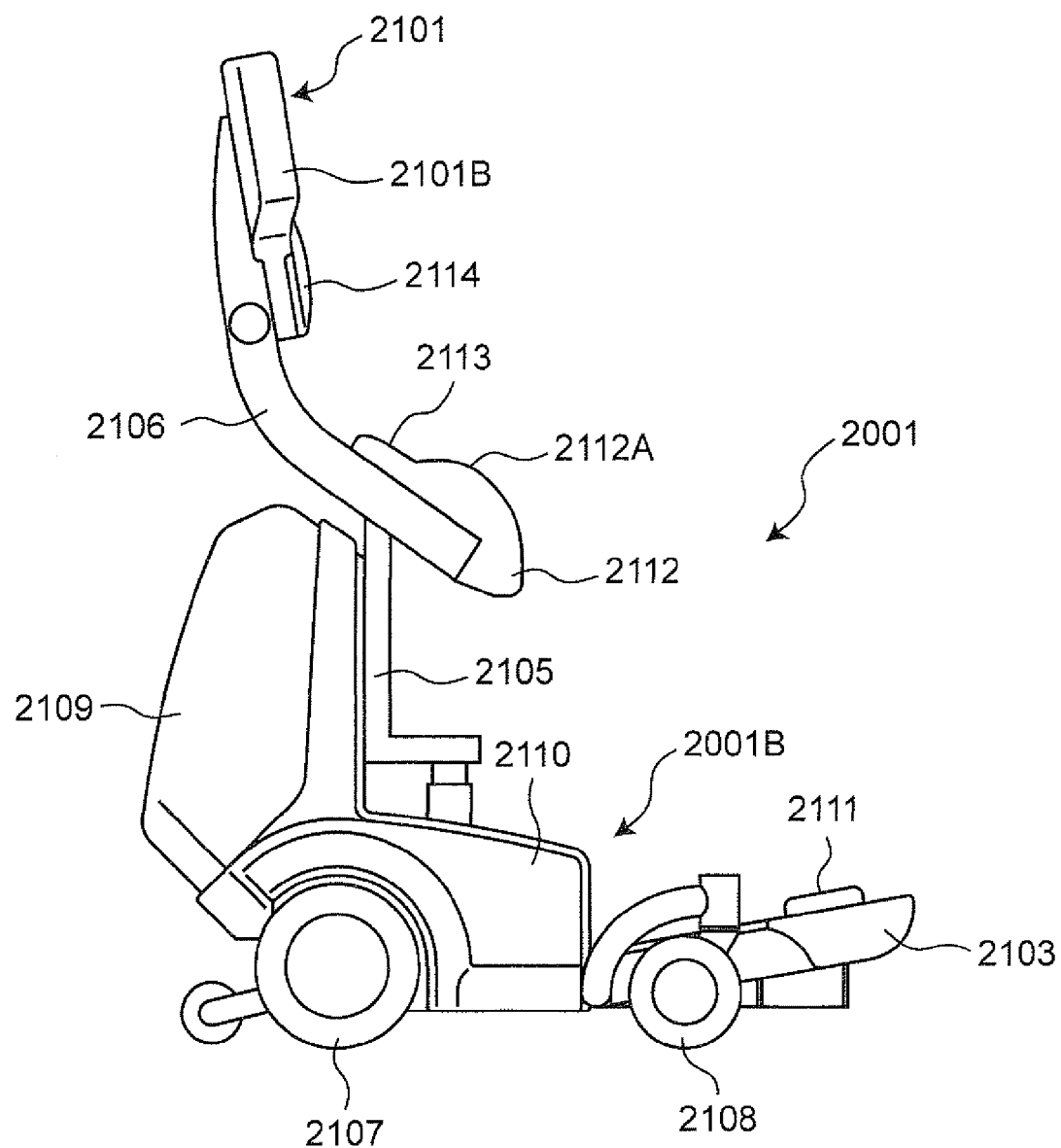
FIG. 58D is a left side view of the standing position riding type vehicle according to the ninth embodiment of the present invention.
Figure 58E:
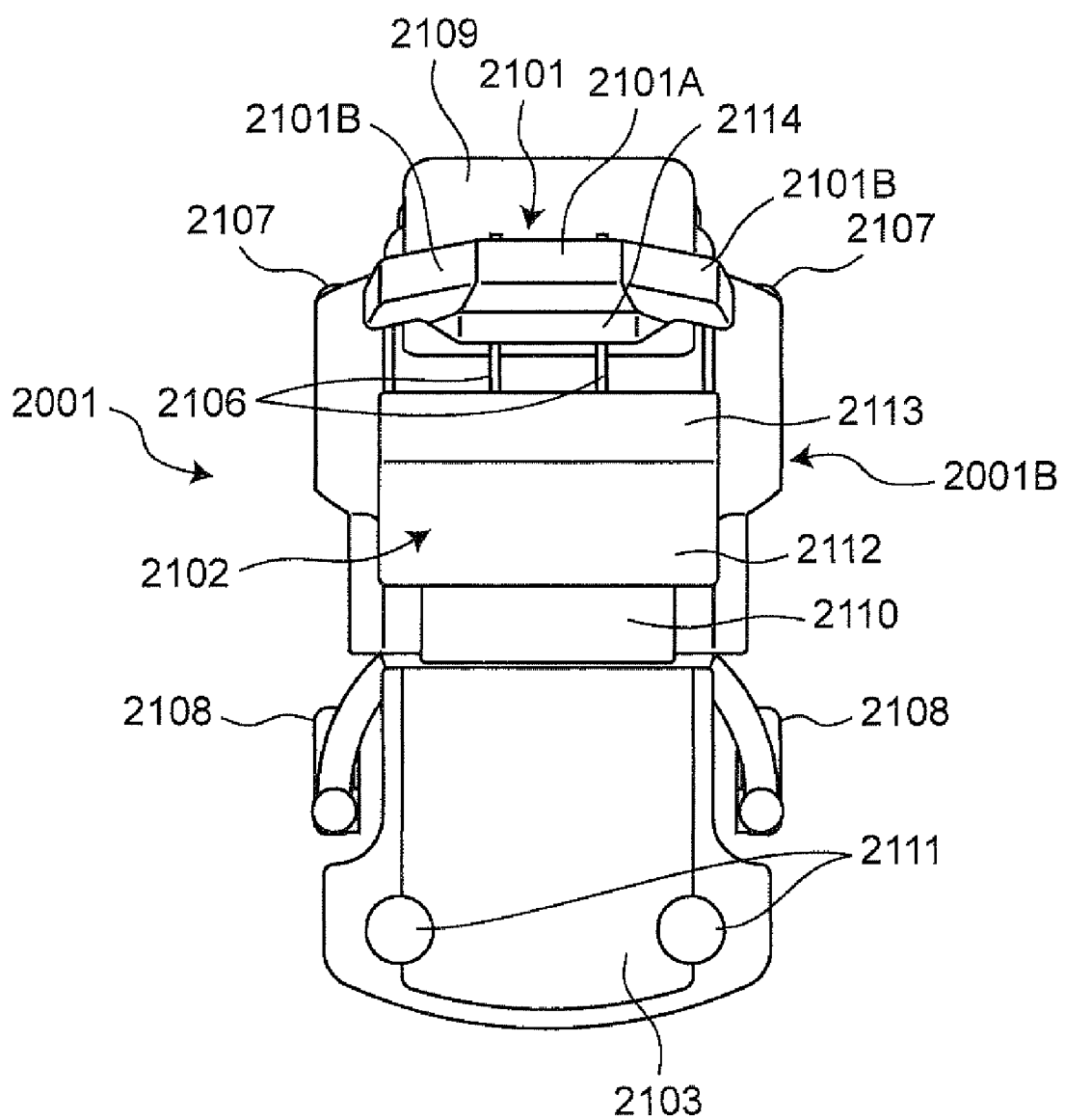
FIG. 58E is a top view of the standing position riding type vehicle according to the ninth embodiment of the present invention.
Figure 58F:
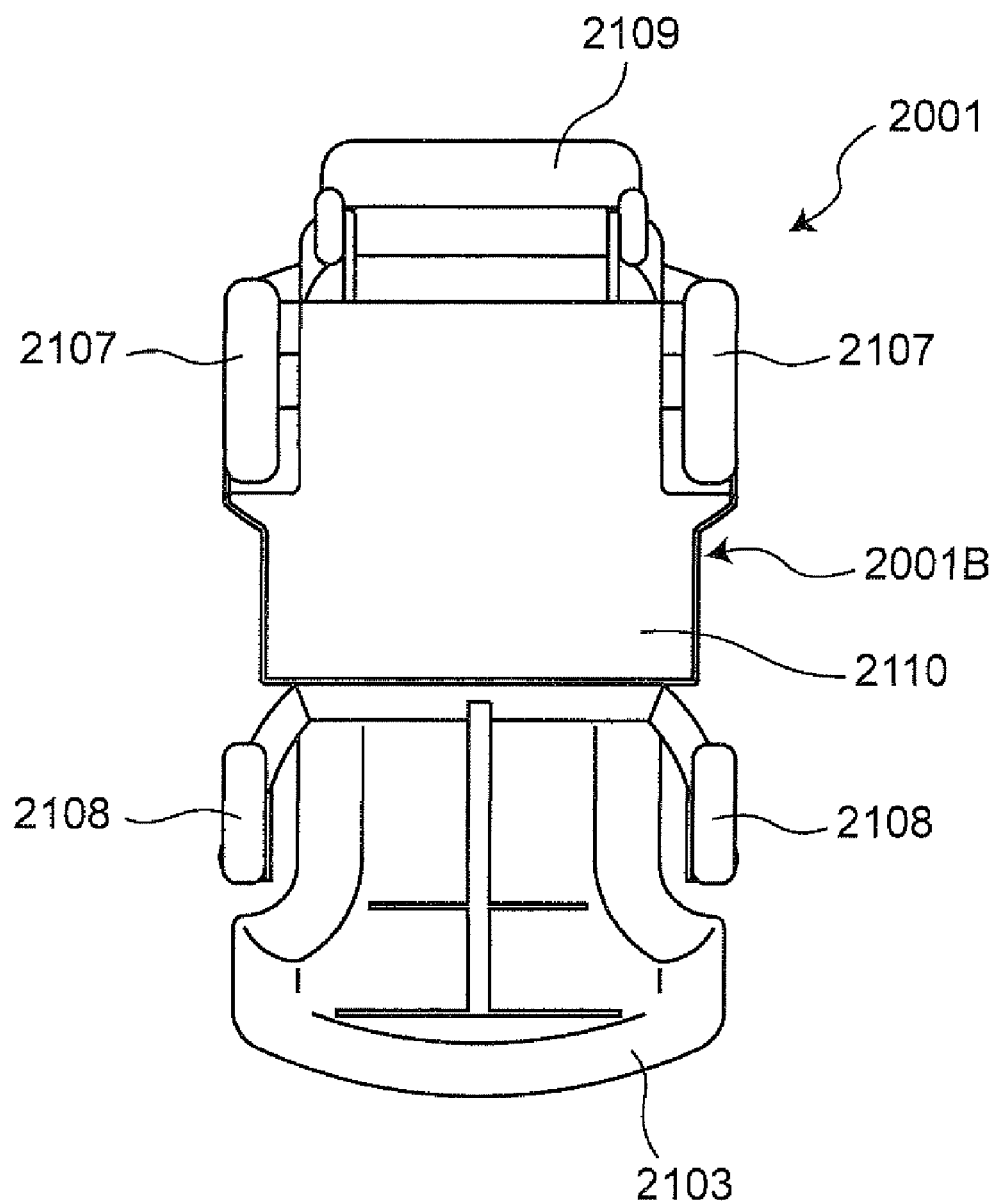
FIG. 58F is a bottom view of the standing position riding type vehicle according to the ninth embodiment of the present invention.
Figure 58G:
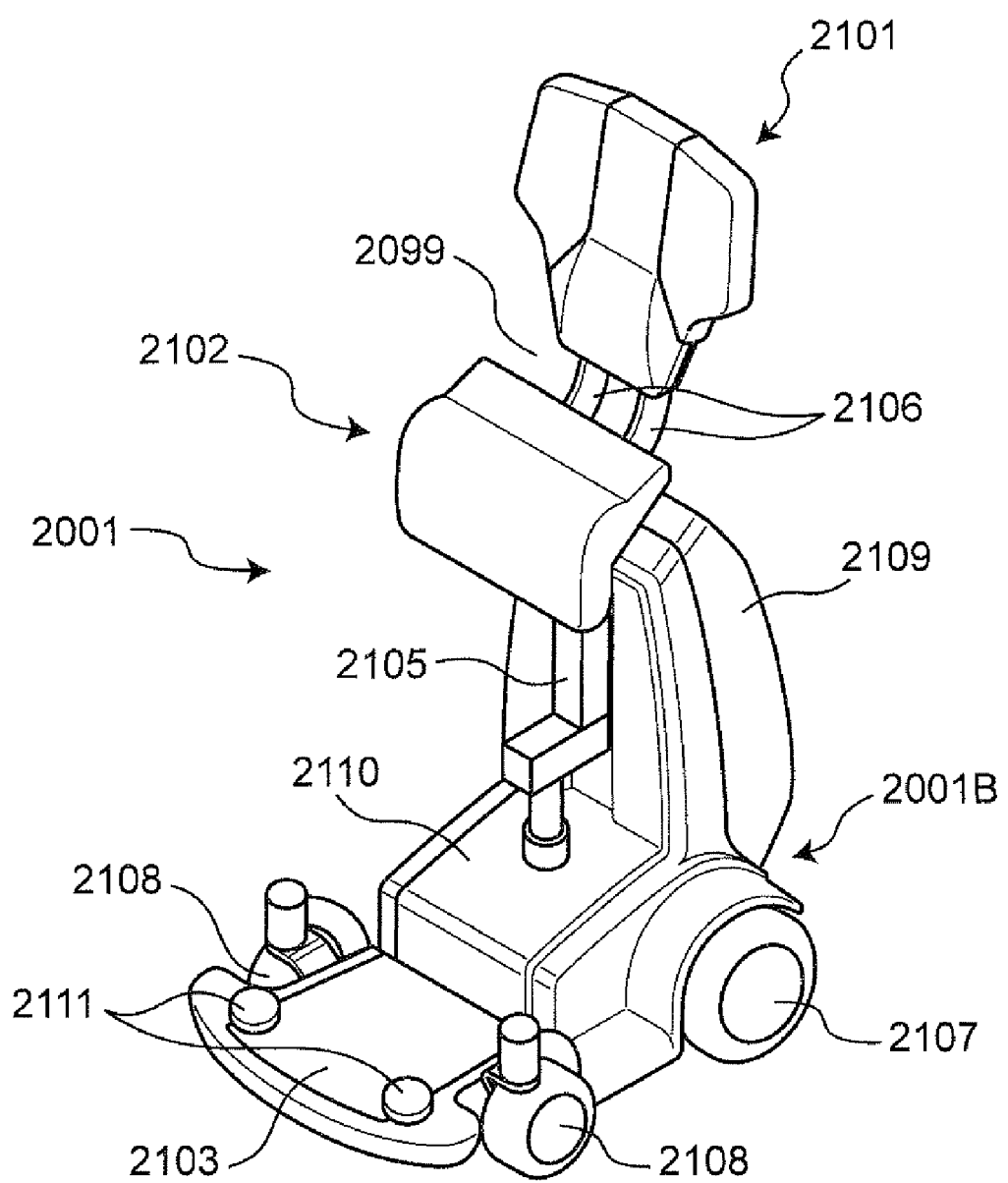
Figure 58H:
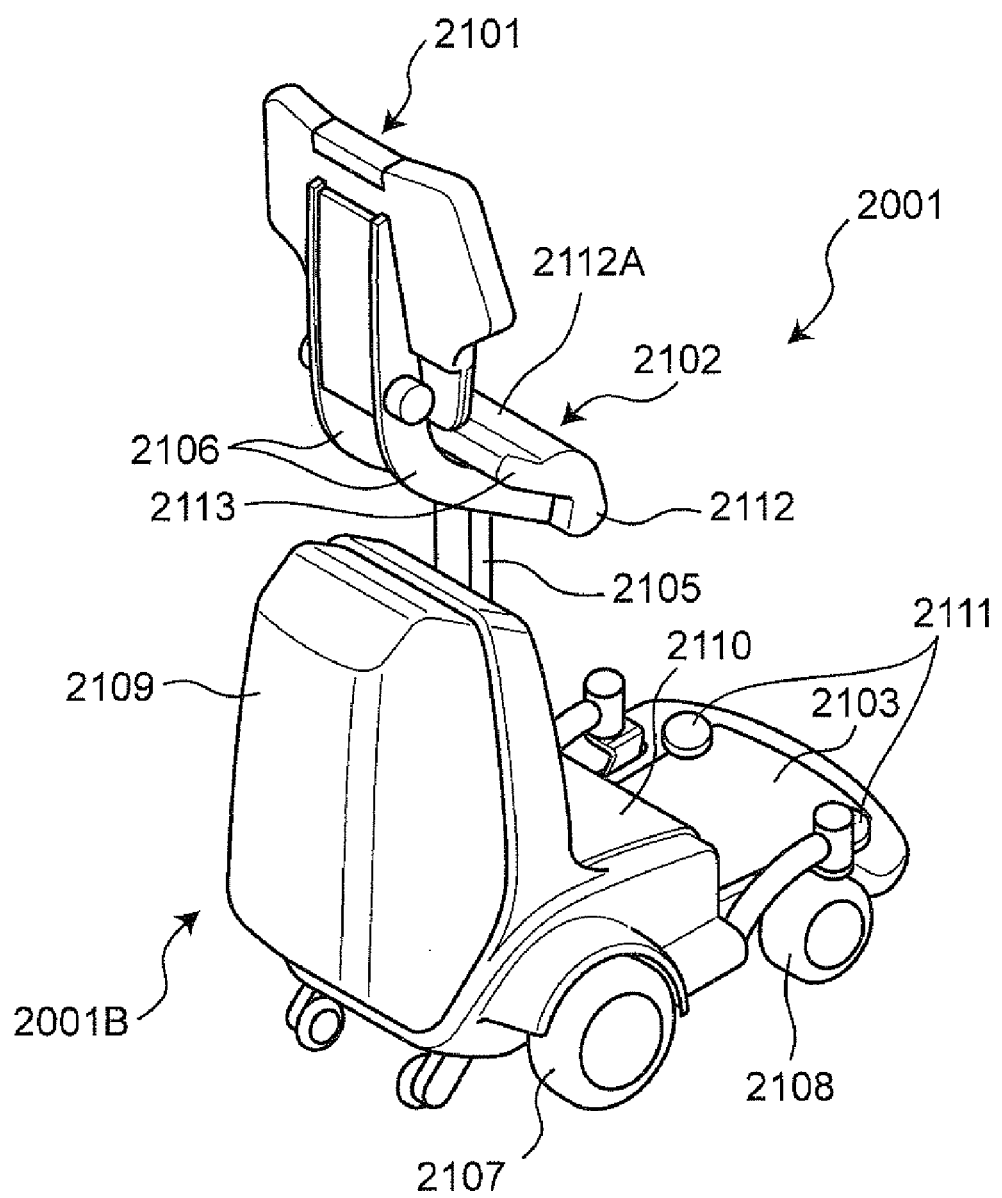

FIG. 46 is a perspective view of a standing position riding type vehicle according to the ninth embodiment of the present invention. FIG. 47 is a view showing a state in which a user 2091 rides in a standing position riding type vehicle 2001 shown in FIG. 46, as shown by a dashed line: FIGS. 58A to 58F are six views of the standing position riding type vehicle 2001, FIG. 58G is a bird's-eye front view of the standing position riding type vehicle 2001, and FIG. 58H is a bird's-eye rear view of the standing position riding type vehicle 2001. Note, however, that depiction of side guards 2104 is omitted in FIGS. 58A to 58H.

The standing position riding type vehicle 2001 shown in FIGS. 46 and 47 includes at least a seat 2100 including a backrest 2101 having a backrest surface PS1 that supports a part of the user 2091 riding in the standing position riding type vehicle 2001, from the lower back to back, and a seat portion 2102 having a seat surface PS3 that supports the gluteal region and ischial bone of the user 2091 riding in the standing position riding type vehicle 2001; and a plate-like footrest 2103 having footrest surface PS2 that supports the soles of the feet of the user 2091 riding in the standing position riding type vehicle 2001. More specifically, the standing position riding type vehicle 2001 has a vehicle main body 2001B, the seat 2100, and the footrest 2103. The vehicle main body 2001B has a control apparatus storage unit 2109 disposed at a rear portion thereof and has a battery and motor storage unit 2110 disposed at a lower portion thereof. The seat 2100 is disposed on the upper portion side of the standing position riding type vehicle 2001 such that the position thereof can be adjusted in an up-down direction from the lower portion of the vehicle main body 2001B via a post 2105. The footrest 2103 is fixed to the front portion side of the lower portion of the vehicle main body 2001B. At the lower portion of the vehicle main body 2001B there are rotatably disposed four wheels 2108, 2108, 2107, and 2107 in total, for example, on both sides thereof so that the standing position riding type vehicle 2001 can move forward and backward and make a turn with the four wheels 2108, 2108, 2107, and 2107. The seat portion 2102 of the seat 2100 is disposed such that the position hereof can be adjusted in the up-down direction from the lower portion of the vehicle main body 2001B via the post 2105. Above the seat 2100 there is fixedly disposed the backrest 2101 via a pair of posts 2106.

A state in which, as shown in FIG. 47, the body of the user 2091 (in the following description, when referring to the "user 2091" it, in principle, indicates the "user 2091 riding in the standing position riding type vehicle 2001") is supported in a posture where the head position equivalent to that for a standing position is maintained with the user 2091 placing his/her feet on the footrest 2103, leaning his/her back on the backrest 2101, and placing his/her gluteal region on the seat surface PS3 of the seat portion 2102 is referred to as a "ride in a neutral position". The posture of the user 2091 at this time is referred to as a "neutral position". In addition, placing the gluteal region of the user 2091 on the seat surface PS3 of the seat portion 2102 regardless of whether there is contact with the backrest 2101 is referred to as "sitting in the seat portion 2102".

The backrest 2101 can support a part of the user 2091 from the lower back to back so that the user 2091 can easily maintain a neutral position and can keep his/her head vertical without any load on his/her neck. The backrest 2101 has a backrest angle at which a part of the user 2091 from the lower back to back can be supported (an angle tilted about 10 degrees backward) with respect to the seat surface PS3 of the seat portion 2102 and the footrest surface PS2 of the footrest 2103.

Figure 48A:
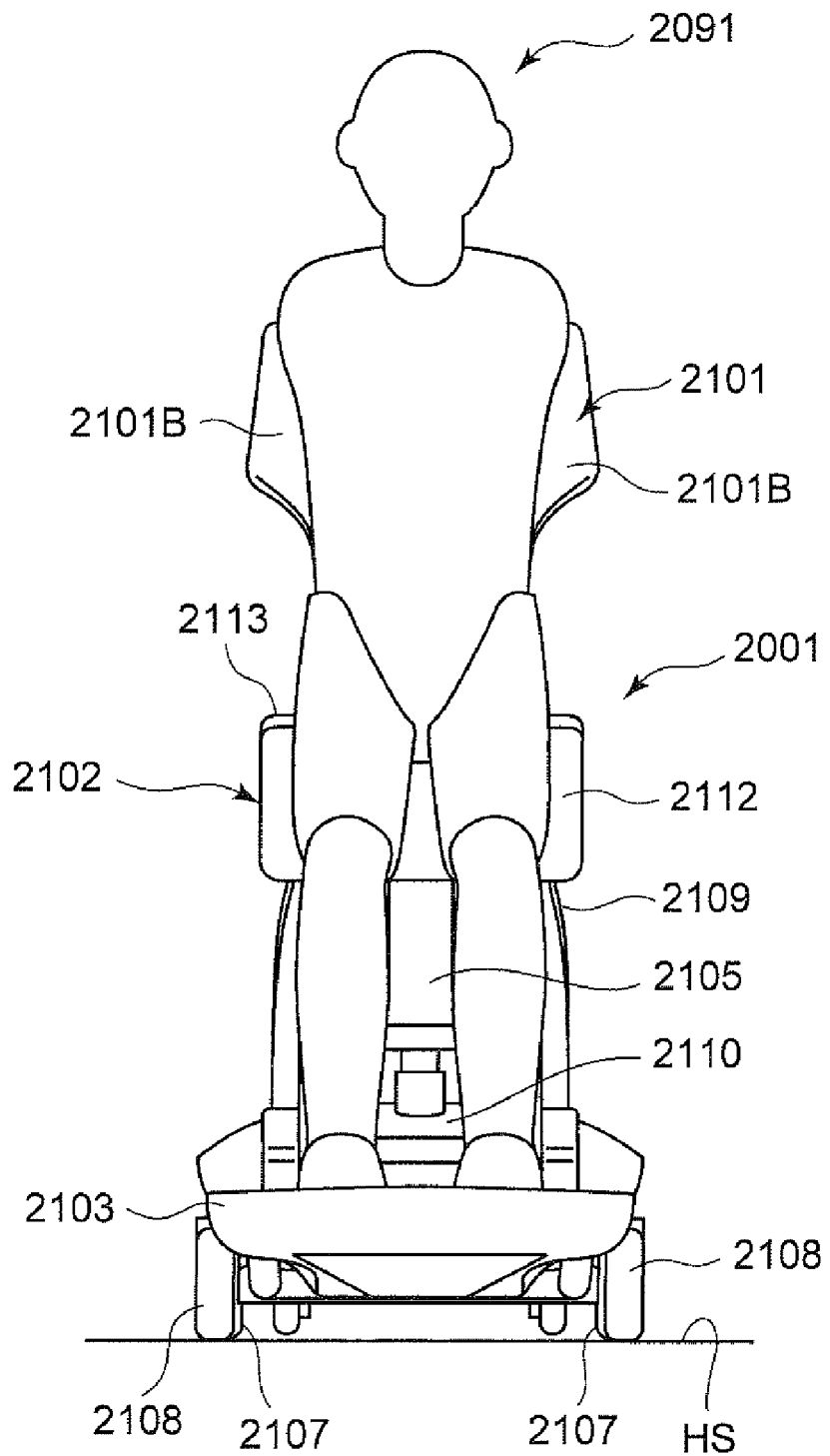
FIG. 48A is a front view of a riding posture in the standing position riding type vehicle according to the ninth embodiment of the present invention.
Figure 48B:
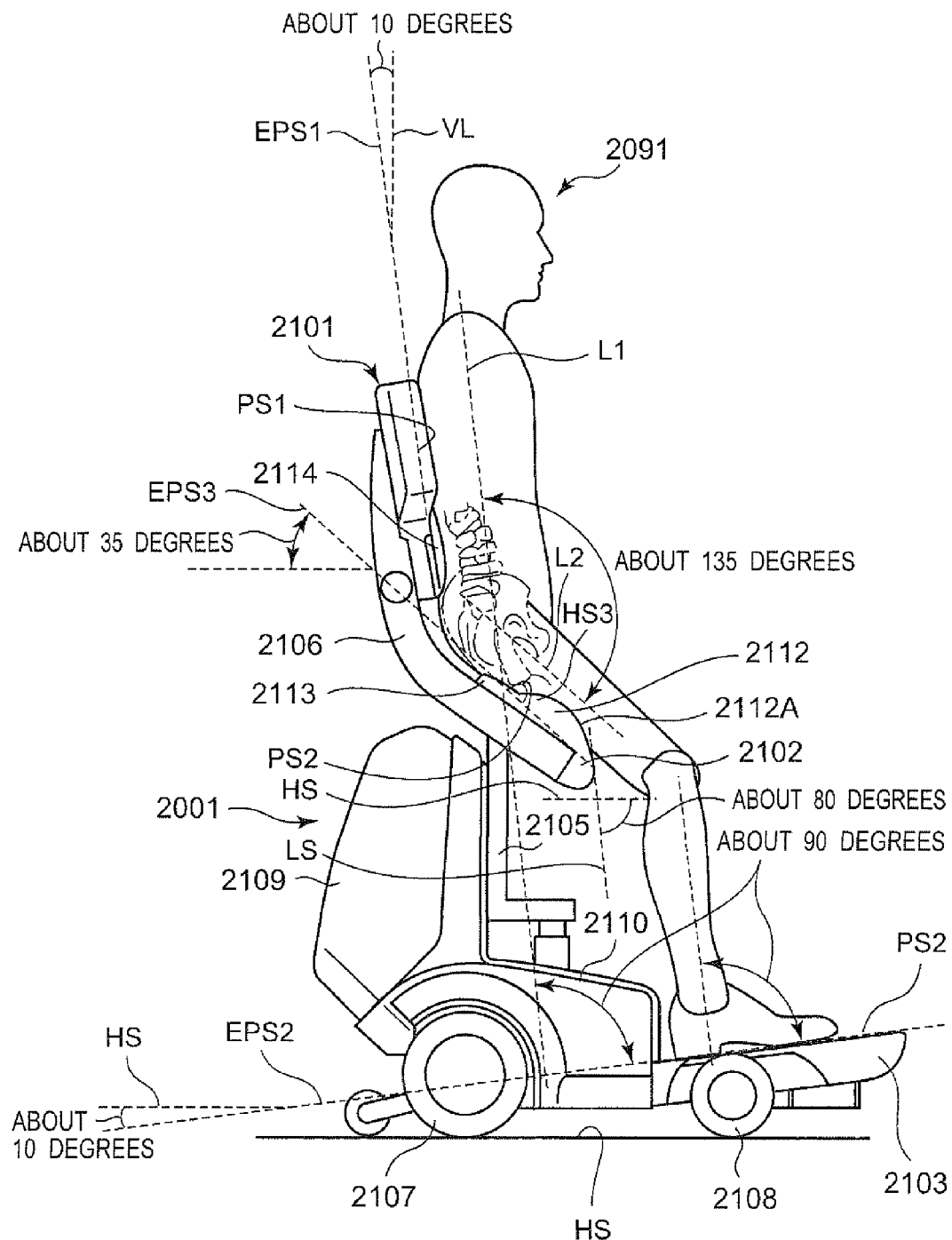
FIG. 48B is a side view of the riding posture in the standing position riding type vehicle according to the ninth embodiment of the present invention.

FIGS. 48A and 48B are a front view and a side view showing a state in which the user 2091 rides in the standing position riding type vehicle 2001 of the ninth embodiment in a neutral position. In the following, angles described are those as viewed from the side shown in FIG. 48B. The side shown in FIG. 48B is, for example, a side as viewed from a direction having an angle of 90 degrees along a horizontal plane with respect to a movement direction of the standing position riding type vehicle 2001.

Note that in each angle an angle shift on the order of 5 degrees is within a range where the angle is changed depending on how the body comes into contact with the seat 2100 and the footrest 2103. Angles formed by the portions of the standing position riding type vehicle and body angles in the ninth embodiment and FIGS. 48A and 48B are ideal angles to stably maintain a neutral posture but have an allowance of the order of ±5 degrees.

In FIGS. 48A and 48B, a plane with which the standing position riding type vehicle 2001 comes into contact is referred to as a "horizontal plane" HS. The normal to the horizontal plane HS is referred to as a vertical line VL and the direction parallel to the vertical line VL is referred to as a vertical direction.

The backrest surface PS1 of the backrest 2101 and the seat surface PS3 of the seat portion 2102 (see an extended plane EPS3 of the seat surface PS3 in FIG. 48B) are disposed in a position where the angle formed by a line of gravity L1 from the spine to pelvis of the user 2091 and a center line L2 of the femora is about 135 degrees, and at a upper portion of the vehicle main body 2001B by the posts 2105 and 2106.

The angle formed by the line of gravity L1 from the spine to pelvis and the center line L2 of the femora is an angle as viewed from the side of the user 2091 when the user 2091 rides in the standing position riding type vehicle 2001 in a neutral position with the user 2091 leaning against the backrest 2101 and sitting in the seat portion 2102 (as viewed from the side with respect to the movement direction of the vehicle 2001 which is orthogonal to the backrest surface PS1).

Furthermore, the footrest 2103 is fixedly disposed in a position where the angle formed by the line of gravity L1 from the spine to pelvis of the user 2091 and a straight line passing through the soles of the feet is about 90 degrees so as to keep the angle of the ankles of the user 2091 at 90 degrees, and on the front side of the lower portion of the vehicle main body 2001B so as to be slightly tilted upward toward the front.

The backrest 2101 is mounted on the seat portion 2102 by the pair of posts 2106 in a position where the backrest surface PS1 is tilted backward such that the line of gravity L1 from the spine to pelvis is tilted about 10 degrees backward when the user 2091 rides in a neutral position. A central portion of the backrest 2101 has a backrest upper central portion 2101A whose surface is planar and which is the backrest surface PS1.

The seat portion 2102 is mounted in a position where the seat surface PS3 thereof is tilted forward such that the angle formed by the line of gravity L1 from the spine to pelvis of the user 2091 and the center line L2 of the femora is about 135 degrees, and such that the position thereof can be adjusted in the up-down direction from the lower portion of the vehicle main body 2001B by means of the post 2105. When the user 2091 leans against the backrest 2101, the plane (backrest surface) PS1 of the backrest upper central portion 2101A which is a plane supporting the upper spine which is the center of the back of the user 2091 and mainly consists of the thoracic vertebrae (see an extended plane EPS1 of the backrest surface PS1 in FIG. 48B) is tilted about 10 degrees from the vertical line VL toward the back side in the orientation of the body for when the user 2091 rides in the vehicle 2001 in a neutral position. By this, the line of gravity L1 from the spine to pelvis of the user 2091 when the user 2091 rides in a neutral position is tilted about 10 degrees toward the back side. This indicates that the user 2091 is tilted 10 degrees backward with respect to the movement direction in a state in which the user 2091 rides in a neutral position. The significance of the fact that the backrest surface PS1 of the backrest upper central portion 2101A is tilted 10 degrees backward with respect to the movement direction is as follows.

"Design and Development for Working Chair for the Aged" by Akiko Moto and Noriyuki Tomonobu, Fukuoka Industrial Technology Center Annual Report 2001 suggests a working chair that maintains a neutral position in the neighborhood of 60 cm as a seat surface that allows elderly people to stand up easily and to do activities easily. It indicates that when an elderly person sits on this seat surface and maintains a neutral position, he/she takes a posture where the line of gravity from the spine to pelvis is tilted about 10 degrees backward. For those users having weakened muscular strength, the posture where the line of gravity from the spine to pelvis is tilted about 10 degrees backward in a neutral position is natural and the angle thereof is an angle that makes it easier for the users to make a motion of doing activities in a forward leaning position or a stand-up motion.

Thus, a posture where the user 2091 is tilted 10 degrees backward with respect to the movement direction with the user 2091 riding in the standing position riding type vehicle 2001 in a neutral position is a natural posture for the user 2091, making it easier to make a motion of doing activities in a forward leaning position or a stand-up motion.

On the other hand, in the footrest 2103, the footrest surface PS2 thereof (see an extended plane EPS2 of the footrest surface PS2 in FIG. 48B) is tilted 10 degrees backward with respect to a horizontal plane HS. The significance of "10-degree backward tilt" will be described below. In FIGS. 48A and 48B, the direction in which the face of the user 2091 is oriented is a movement direction. At this time, a front portion in the movement direction of the standing position riding type vehicle 2001 of the footrest surface PS2 of the footrest 2103 is higher in position than a rear portion thereof, and a plane from a heel position to a toe position of the feet of the user 2091 placed on the footrest surface PS2 of the footrest 2103 (a plane in contact with the soles of the feet) (footrest surface) PS2 is tilted about 10 degrees with respect to the horizontal plane HS and the toes are higher in position than the heels.

By this, the plane (backrest surface) PS1 where the backrest upper central portion 2101A is tilted 10 degrees with respect to the vertical line VL toward the back side and the plane (footrest surface) PS2 of the footrest 2103 form an angle of 90 degrees. By the backrest surface PS1 of the backrest upper central portion 2101A and the footrest surface PS2 of the footrest 2103 forming an angle of 90 degrees, the line of gravity L1 from the spine to pelvis of the user 2091 riding in a neutral position and the straight line passing through the soles of the feet form an angle of about 90 degrees.

In a neutral position, the user 2091 supports his/her body such that his/her legs are extended diagonally forward from the position of the pelvis being in contact with the seat portion 2102 and his/her weight is distributed on the lower back being in contact with the seat portion 2102 and the soles of the feet being in contact with the footrest 2103. At this time, by lightly bending the knees to keep ankle angle at about 90 degrees, the user 2091 can support a weight load applied in a direction in which the legs are extended, on the entire soles of the feet by a force in the direction in which the legs are extended. A state in which the weight applied in the direction in which the legs are extended is supported on the entire soles of the feet by the force in the direction in which the legs are extended is the same as a normal standing state where the user stands up on his/her legs with his/her knees extended, and is the most natural state for the legs to support load. Hence, the user can freely move his/her feet and thus can easily perform an operation input by the feet on foot switches 2111 which are disposed on the footrest 2103 and will be described later.

When the standing position riding type vehicle 2001 stops from a state of moving in the movement direction, an inertial force acts on the user 2091 in the movement direction. The user 2091 needs to support him/herself against the inertial force so as not to fall off the standing position riding type vehicle 2001. In the standing position riding type vehicle 2001 of the ninth embodiment, the footrest 2103 is disposed in a position where the line of gravity L1 from the spine to pelvis at which the user 2091 can exert the greatest support force and the straight line passing through the soles of the feet form an angle of about 90 degrees. By this, at a low speed equivalent to a walk, there is no need of a member that ties around the body such as a belt for preventing a forward fail or a member to be held on by the user 2091 in front of his/her body such as a handle bar for preventing a forward fall. Namely, there is no need to mount any member that hinders motion of the user 2091 in front of the body of the user 2091 and thus space can be provided in front of the body of the user 2091, which makes it easier for the user 2091 to make a motion of doing activities in a forward leaning position or a stand-up motion. Accordingly, the workability of the user 2091 riding in a neutral position is not impaired.

Each configuration of the standing position riding type vehicle 2001 in FIG. 46 will be described in more detail below.

As described previously, the standing position riding type vehicle 2001 shown in FIG. 46 includes the seat 2100 including the backrest 2101 having the backrest surface that supports a part of the user 2091 from the lower back to back and the seat portion 2102 having the seat surface that supports the gluteal region and ischial bone of the user 2091; and the footrest 2103 having the footrest surface that supports the soles of the feet of the user 2091.

Figure 49:
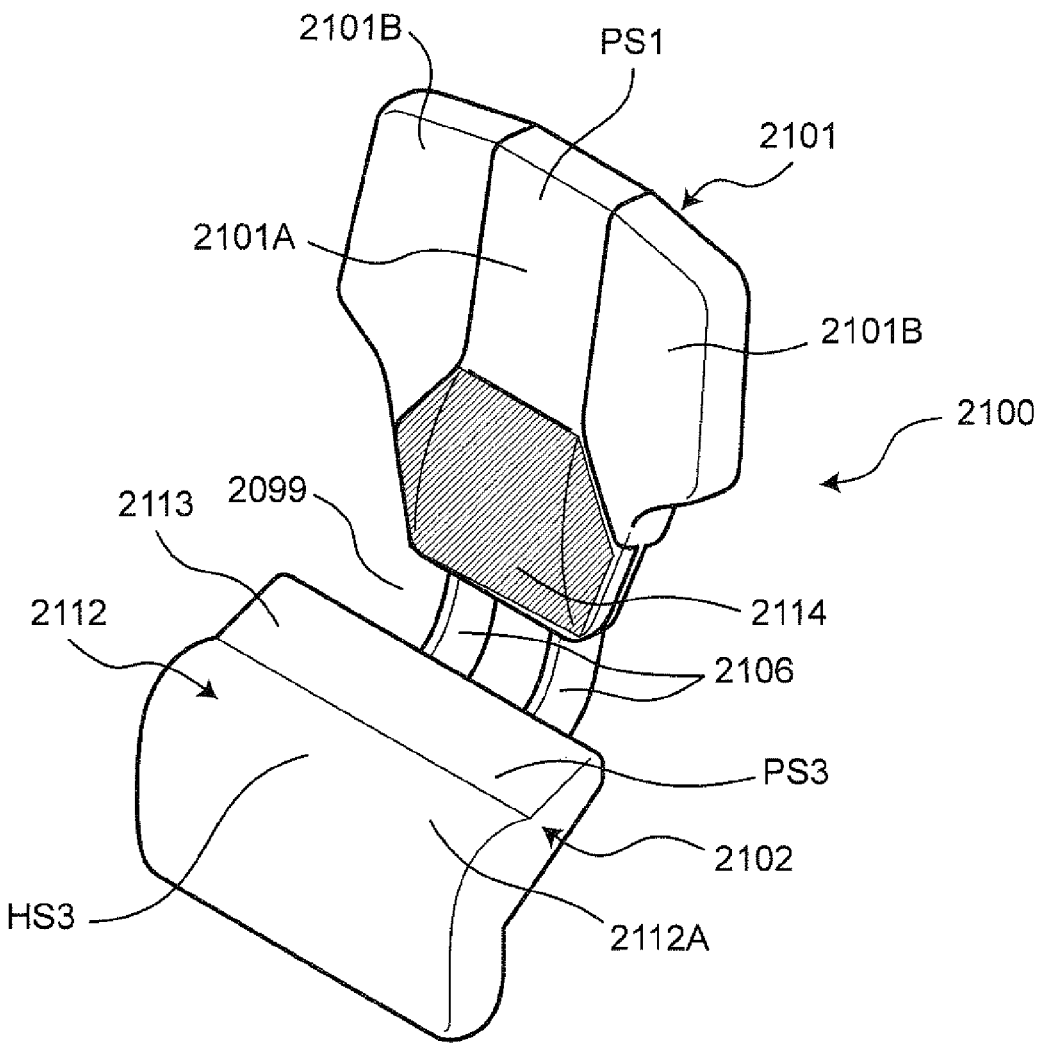
FIG. 49 is a perspective view of a portion of the standing position riding type vehicle according to the ninth embodiment of the present invention.

FIG. 49 is an enlarged view of the backrest 2101, the seat portion 2102, etc., of the standing position riding type vehicle 2001 of the ninth embodiment.

The backrest 2101 includes the backrest upper central portion 2101A, backrest side portions 21015 on both sides thereof, and a lumbar support 2114 (see a shaded portion in FIG. 49).

The backrest upper central portion 2101A is an upper flat portion of a portion of the backrest 2101 that supports the spine of the user 2091. The backrest upper central portion 2101A indicates a central portion of the backrest 2101 having a width of the order of about one-third in a left-right width direction of the backrest 2101.

The backrest side portions 21015 are flat portions of upper side portions of portions of the backrest 2101 that are coupled to the backrest upper central portion 2101A so as to be disposed on both sides of the backrest upper central portion 2101A and that support both side portions of the spine of the user 2091. Each backrest side portion 21015 indicates a portion of the backrest 2101 having a width of the order of about one-third in the left-right width direction of the backrest 2101.

The lumbar support 2114 is a swelling portion at a lower portion of the backrest 2101 that is coupled to the backrest upper central portion 2101A so as to be disposed below the backrest upper central portion 2101A and that supports the curvature of the lumbar vertebrae when the user 2091 is seated. A cross-sectional shape of the swelling is such that the swelling forms an arc in the up-down direction so as to bulge on the side of the user 2091 and fits along a backward curve of the lumbar vertebrae, i.e., a ventrally convex curvature. The lumbar support 2114 is a central portion in the left-right width direction of the backrest 2101 and is connected to a lower portion of the backrest upper central portion 2101A.

As one example, a boundary between the backrest upper central portion 2101A and the lumbar support 2114 may be located at the height of the 12th thoracic vertebra of the user 2091. By supporting the back from the lower border of the ribs, the head position of the user 2091 riding in a neutral position can be stabilized.

The seat portion 2102 includes a gluteal region support portion 2113 that supports a muscle group of the gluteal region of the user 2091 in a neutral position and thereby maintains his/her posture; an ischial bone support plate 2112 that is disposed on the front side of the gluteal region support portion 2113 and supports the ischial bone which is the lower end of the pelvis of the user 2091 in a neutral position and thereby maintains the pelvis position; and the side guards 2104 disposed on both sides of the gluteal region support portion 2113 and the ischial bone support plate 2112.

The gluteal region support portion 2113 is disposed below the lumbar support 2114 and is a flat portion whose upper surface is planar.

The ischial bone support plate 2112 is disposed to be coupled below the gluteal region support portion 2113. A portion of the ischial bone support plate 2112 near the gluteal region support portion 2113 is curved and protrudes upward with respect to the gluteal region support portion 2113.

The side guards 2104 are disposed on both sides of the seat portion 2102 and form surfaces in the vertical direction. The side guards 2104 prevent the body position from being shifted in a lateral direction relative to the ischial bone support plate 2112 when the user 2091 rides in a neutral position.

As shown in FIGS. 48A and 48B, a surface (seat surface) PS3 of the gluteal region support portion 2113 that comes into contact with the body of the user 2091 is tilted about 35 degrees forward from the horizontal plane HS. Namely, the feet side when the user 2091 rides in a neutral position lower in position than the back side, and this tilt forms an angle of 35 degrees with respect to the horizontal plane HS. By this, together with the angle of the backrest 2101 tilted 10 degrees backward, the angle formed by the line of gravity L1 from the spine to pelvis of the user 2091 and the center line L2 of the femora when the user 2091 sits in the seat portion 2102 leaning against the backrest 2101 becomes about 135 degrees.

When the seat portion 2102 is formed of a flat plate and a plane of the flat plate is tilted 35 degrees forward from the horizontal plane HS, there is a possibility that the user 2091 may not be able to sit in the seat portion 2102 and may slide off of the seat portion 2102. On the other hand, in FIGS. 48A and 48B, the surface of the ischial bone support plate 2112 has a swelling portion 2112A on the feet side of the seat portion 2102 with respect to the gluteal region support portion 2113. A side shape of the swelling portion 2112A is such that the swelling portion 2112A forms an arc in a front-back direction (see FIG. 48B) and has a shape where a semicircular column is laid down on its side. By the swelling portion 2112A, the function of supporting the ischial bone by a horizontal plane HS3 whose upper surface in the vertical direction is substantially along the horizontal direction and thereby preventing the pelvis from sliding off is provided. That is, the ischial bone support plate 2112 has the horizontal plane HS3 to support the ischial bone and thereby prevent the pelvis from sliding off. The ischial bone support plate 2112 may be tilted backward (e.g., 10 degrees) with respect to the horizontal plane HS3 at a connecting portion between the ischial bone support plate 2112 and the gluteal region support portion 2113. By this, sliding of the ischial bone in the movement direction is prevented, enabling to prevent the pelvis from sliding off against acceleration in the front-back direction.

A depression between a muscle group of the gluteal region and a muscle group of the dorsal femora of the user 2091 riding in a neural position touches the swelling portion 2112A of the ischial bone support plate 2112, and the ischial bone located on the back side of the depression between the muscle group of the gluteal region and the muscle group of the dorsal femora rides on the substantially horizontal portion HS3 at an upper portion of the ischial bone support plate 2112. By this, upper body weight is supported on the ischial bone and thus the user 2091 can sit in the seat portion 2102 without sliding off thereof.

The seat portion 2102 is configured to stabilize the pelvis to prevent the user 2091 from sliding off in the above-described manner. By further allowing the gluteal region support portion 2113 and the ischial bone support plate 2112 to have cushioning properties and using surface materials that are difficult to slide, the gluteal region support portion 2113 and the ischial bone support plate 2112 can be made more difficult to slide. For the cushion of the ischial bone support plate 2112, materials are used having such hardness that they do not sink by a push with hand force but sink by application of weight. For the cushion of the gluteal region support portion 2113, materials are used that are a bit softer than the ischial bone support plate 2112 and are easy to sink. Cushion materials of the gluteal region support portion 2113 include, for example, polyethylene foams and natural rubber-based sponge rubbers. Cushion materials of the ischial bone support plate 2112 include, for example, low-foamed polyethylene foams with a 25% compression hardness of the order of 0.04 MPa. A surface of the gluteal region support portion 2113 is covered by, as an example, a fabric having a bit thick yarns and capable of increasing friction with other fabrics. Fabrics for the surface include, for example, polyester plain-woven fabrics and jersey knits.

The seat portion 2102 is configured not to compress the muscle of the dorsal femora extended diagonally downward from the ischial bone support plate 2112 by, for example, forming a downward angle from the horizontal plane HS (an angle formed by the horizontal plane HS and a downward plane LS of the seat portion 2102) to be about 80 degrees in an area from the semicircular column-shaped swelling portion 2112A of the ischial bone support plate 2112 which supports the ischial bone to the feet side. That is, in order not to compress the muscle of the dorsal femora extended diagonally downward, the ischial bone support plate 2112 has a portion that comes into contact with the user 2091 in the range in which the portion is shorter than the length to the base of the legs.

The gluteal region support portion 2113 is a flat portion of the seat portion 2102 close to the backrest. The gluteal region support portion 2113 is located relatively downward with respect to the ischial bone support plate 2112 in order to hold the muscle group of the gluteal region that protrudes toward the back side of the user 2091 when taking a neutral position such that the angle formed by the line of gravity L1 from the spine to pelvis of the user 2091 and the center line L2 of the femora is about 135 degrees. Furthermore, in the ninth embodiment, as an example of a method of holding the muscle group of the gluteal region, it is configured such that clearance 2099 is provided between the backrest 2101 and the seat portion 2102 so that the case in which the position or size of the muscle group of the gluteal region vary by build or seating location can be handled. A line in which the plane PS1 of the backrest upper central portion 2101A and the plane PS3 of the gluteal region support portion 2113 intersect is referred to as an intersection line of the backrest 2101 and the seat portion 2102. By setting the ratio of a distance from the intersection line to the lower edge of the backrest upper central portion 2101A to a distance from the intersection line of the backrest 2101 and the seat portion 2102 to a boundary between the ischial bone support plate 2112 and the gluteal region support portion 2113 to approximately 5:2, a configuration is obtained in which the ischial bone is supported to stabilize the pelvis position and the thoracic vertebrae are supported to stabilize the head position.

The post 2105 is a post that extends in the vertical direction from the lower portion of the vehicle main body 2001B to the upper portion side of the standing position riding type vehicle 2001 and thereby supports the seat 2100. The post 2105 supports the seat 2100 by a known position adjustment mechanism such that the position of the seat 2100 can be adjusted in the up-down direction.

The posts 2106 of a pair are disposed parallel to each other, and connect the seat portion 2102 the backrest 2101 and maintain the angle formed by the seat portion 2102 and the backrest 2101 and thereby support the backrest 2101.

The rear wheels 2107 are disposed at a rear portion on both sides of the lower portion of the vehicle main body 2001B so as to be rotatable forward and reversely. The rear wheels 2107 are the drive wheels of the standing position riding type vehicle 2001 and make a left and right pair. The left and right axles of the rear wheels 2107 function as an example of a drive apparatus and are respectively connected to different motors 2137L and 2137R which will be described later, and rotation of the left and right axles is controlled independently of each other by a motor control unit 2136.

The front wheels 2108 with a smaller diameter than the rear wheels 2107 are disposed at a front portion on both sides of the lower portion of the vehicle main body 2001B so as to be rotatable forward and reversely. The front wheels 2108 are the front wheels of the standing position riding type vehicle 2001 and make a left and right pair. Each front wheel 2108 has the same structure as a caster that rotatably supports a wheel by a swivel. Since the left and right front wheels 2108 change their directions in 360 degrees by their respective swivels, they can move in all directions according to the drive of the pair of rear wheels 2107.

The control apparatus storage unit 2109 stores therein a control computer and memory 2130, which will be described later. The motor control unit 2136 in the control computer and memory 2130 performs drive control of the left and right motors 2137L and 2137R independently of each other to rotate the axles of the left and right rear wheels 2107 forward and reversely. Specifically, the motor control unit 2136 determines operations of the standing position riding type vehicle 2001 such as forward motion, backward motion, left and right turns, and stop, according to an instruction input from the user 2091 and controls the rotation directions (forward rotation, backward rotation, opposite rotation between left and right, and stop of rotation) and rotation speeds of the rear wheels 2107 which are drive wheels.

The battery and motor storage unit 2110 disposed at the lower portion of the vehicle main body 2001B stores therein a battery (not shown) that supplies power required for operations of the standing position riding type vehicle 2001; and the left and right motors 2137L and 2137R respectively connected to the axles of the left and right rear wheels 2107. The battery supplies power required for Operations to the control computer and memory 2130 stored in the control apparatus storage unit 2109, the left and right motors 2137L and 2137R that are stored in the battery and motor storage unit 2110 and allow the left and right rear wheels 2107 to rotate, and operation input means described below.

The pair of foot switches 2111 are disposed at a front edge of the footrest 2103. The pair of foot switches 2111 are an example of operation input means used by the user 2091 to perform operation of the standing position riding type vehicle 2001. In the example of the ninth embodiment, the foot switches 2111 are disposed in a left and right pair. For example, the right foot switch 2111 (2111R) is a switch that inputs a forward motion instruction by stepping on the switch, and the left foot switch 2111 (2111L) is a switch that inputs a backward motion instruction by stepping on the switch.

Figure 50A:
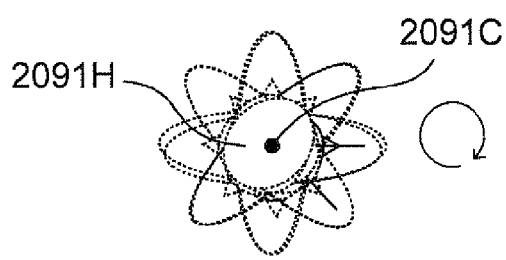
FIG. 50A is an illustrative view showing movement of the head of a user as viewed from the top of the standing position riding type vehicle according to the ninth embodiment of the present invention when making a turning operation.
Figure 50B:
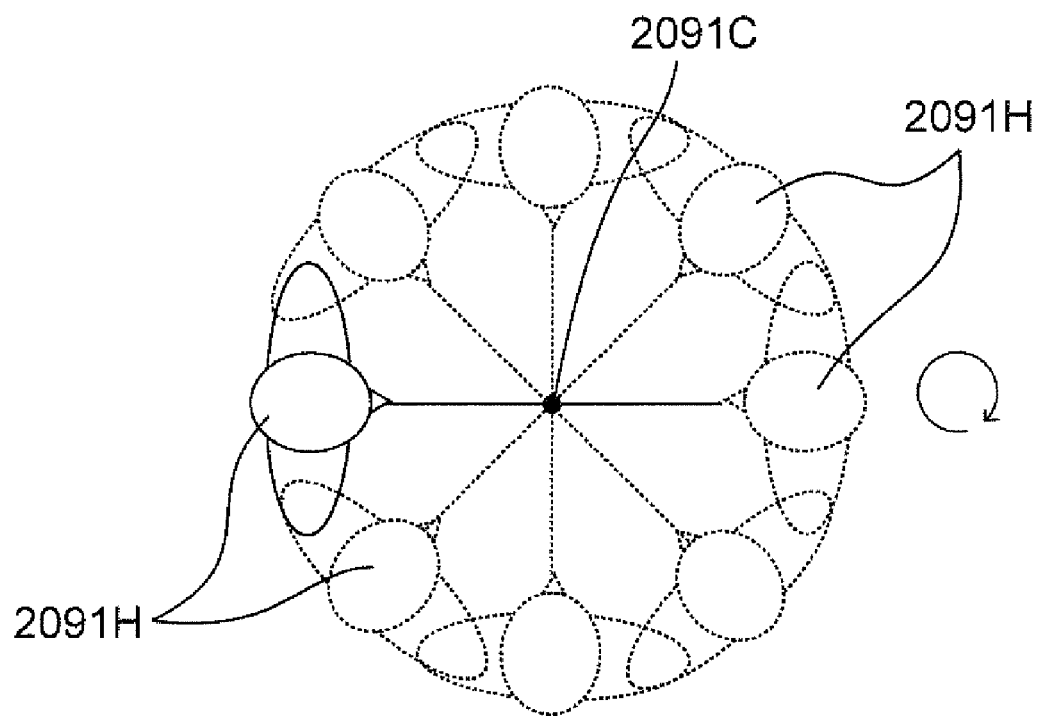
FIG. 50B is an illustrative view showing movement of the head of the user as viewed from the top of the standing position riding type vehicle according to the ninth embodiment of the present invention when making a turning operation.

The standing position riding type vehicle 2001 performs not only forward and backward movement operations but also turning motion. FIGS. 50A and 50B show movement of a head 2091H of the user 2091 as viewed from the top of the standing position riding type vehicle 2001, when the standing position riding type vehicle 2001 performs turning motion. Here, for description, the case 360-degree turning is shown. In FIG. 50A, a central axis 2091C of movement of the head 2091H is a rotation central axis (hereinafter, also referred to as a "rotation axis") at turning of the standing position riding type vehicle 2001.

As shown in FIG. 50B, when the position (at the center) of the head 2091H of the user 2091 riding in the standing position riding type vehicle 2001 is off the turning central axis 2091C, his/her body is swung around due to centrifugal force thereof. In such a case, when the user 2091 is driving the standing position riding type vehicle 2001, it becomes difficult for him/her to grasp the driving direction of the standing position riding type vehicle 2001 or a path through which the standing position riding type vehicle 2001 passes, making it difficult to perform a driving operation. In addition, the body of the user 2091 is moved irrespective of his/her intention, which may cause motion sickness. Due to this, the user 2091 feels discomfort. Hence, in order to perform more natural turning, as one example, it is possible that, as shown in FIG. 50A, the head 2091H of the user 2091 be on the turning rotation axis 2091C.

The inventors of the present invention have found that by establishing a predetermining positional relationship between the backrest 2101 and the seat portion 2102, as shown in FIG. 50A, the head 2091H of the user 2091 riding in a neutral position can be located on the rotation axis 2091C of the standing position riding type vehicle 2001 for turning.

The predetermined positional relationship between the backrest 2101 and the seat portion 2102 will be described below using FIG. 51 which is an enlarged view of the backrest 2101 and the seat portion 2102 of the standing position riding type vehicle 2001, as viewed from a direction parallel to the horizontal plane HS (in a state of being viewed from the side with respect to the movement direction of the standing position riding type vehicle 2001 orthogonal to the backrest surface PS1).

Figure 51:
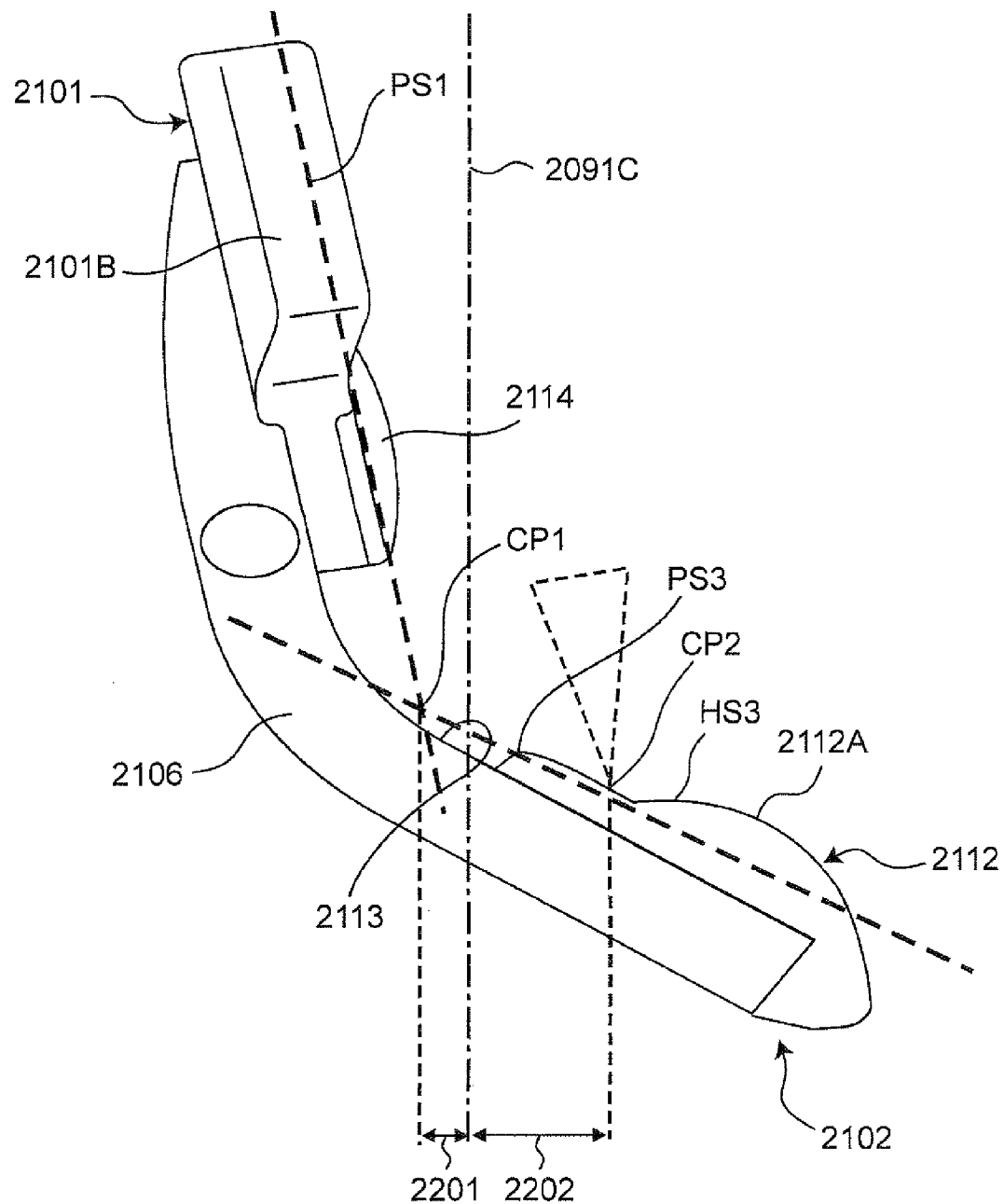
FIG. 51 is an enlarged view of a backrest and a seat portion of the standing position riding type vehicle according to the ninth embodiment of the present invention, as viewed from a direction parallel to a horizontal plane, for describing a predetermined positional relationship between the backrest and the seat portion.

As shown in FIG. 51, specifically, the central axis 2091C of the standing position riding type vehicle 2001 for turning is disposed between an intersection point CP1 of the backrest surface PS1 of the backrest 2101 and the seat surface PS3 of the seat portion 2102 and a point (boundary point) CP2 where the ischial bone support plate 2112 comes into contact with the gluteal region support portion 2113. As used herein, the term "intersection point CP1 of the backrest surface PS1 of the backrest 2101 and the seat surface PS3 of the seat portion 2102" indicates an intersection point of a straight line (an extended plane of the backrest surface PS1) EPS1 passing through a surface (backrest surface) PS1 of a portion against which the user 2091 leans his/her back (e.g., the backrest upper central portion 2101A) and a straight line (an extended plane of the seat surface PS3) EPS3 passing through a surface (seat surface) PS3 of the gluteal region support portion 2113. By thus disposing the central axis 20910 for turning between the intersection point CP1 and the boundary point CP2, when the user 2091 sits in the seat 2100 in a neutral position, the head 2091H of the user 2091 is naturally located substantially on the rotation axis 2091C of the standing position riding type vehicle 2001 for turning. Accordingly, problems such as those described above can be solved. Specifically, since the position of the head 2091H the user 2091 riding in the standing position riding type vehicle 2001 is located on the turning central axis 2091C, his/her body is not swung around by centrifugal force occurring at turning of the standing position riding type vehicle 2001. In addition, when the user 2091 is driving the standing position riding type vehicle 2001, it does not become difficult for him/her to grasp the driving direction of the standing position riding type vehicle 2001 or a path through which the standing position riding type vehicle 2001 passes. In addition, the body of the user 2091 is not moved irrespective of his/her intention, and thus, the cause of motion sickness is also eliminated.

As one example, between the intersection point CP1 of the backrest 2101 and the seat portion 2102 and the boundary point CP2 between the ischial bone support plate 2112 and the gluteal region support portion 2113, the central axis 2091C for turning is disposed a location 20% to 40% of the distance between the intersection point CP1 and the boundary point CP2 away from the intersection point CP1 of the backrest 2101 and the seat portion 2102. That is, the ratio of a distance from the intersection point CP1 of the backrest 2101 and the seat portion 2102 to the rotation central axis 2091C of the standing position riding type vehicle 2001 for turning (2201 in FIG. 51) to a distance from the rotation central axis 2091C to the boundary point CP2 between the ischial bone support plate 2112 and the gluteal region support portion 2113 (2202 in FIG. 51) is from 1:1.5 to 1:4. In addition to the rotation central axis 2091C satisfying the above-described ratio, the rotation central axis 2091C is located at the center between the left and right edges of the seat 2100 when viewed from the top of the standing position riding type vehicle 2001. Note that due to the disposition state of the previously described left and right rear wheels 2107 which are drive wheels, the rotation central axis 2091C is also located at the center between the left and right rear wheels 2107. By doing so, the distance between the center of the head 2091H of the user 2091 and the rotation axis 2091C of the standing position riding type vehicle 2001 for turning can be further reduced. Thus, as shown in FIG. 50A, the head 2091H of the user 2091 can be located on the rotation axis 2091C for turning, enabling to more securely solve the above-described problems.

As one specific example, experimentally, it has been found that by setting the distance from the intersection point C91 of the backrest surface PS1 of the backrest 2101 and the seat surface PS3 of the seat portion 2102 to the rotation central axis 2091C of the standing position riding type vehicle 2001 for turning to 2 cm, the position of the head 2091H of the user 2091 riding in the standing position riding type vehicle 2001 can be located on the rotation central axis 2091C for turning.

It is found that the length of the head 2091H of an adult female assumed to be the user 2091, as viewed from the top thereof about 18 cm. Here, when a central portion of the head portion 2091H, excluding the front and rear quarters (the quarter portions are not included) is allowed to be located on the rotation central axis 2091C for turning, it can be seen that a change can be made in the range of 9 cm, excluding the front and rear quarters (i.e., 4.5 cm each) from 18 cm. For an adult male, the length of the head 2091H as viewed from the top thereof is about 19 cm and the change range is 9.5 cm.

When it has been found, as the above-described specific example, by experiment that the distance from the intersection point CP1 to the rotation central axis 2091C for turning is 2 cm, the rotation central axis 2091C is located at the rear quarter portion of the head 2091H. Therefore, by setting the distance from the intersection point C21 of the backrest surface PS1 of the backrest 2101 and the seat surface PS3 of the seat portion 2102 to the rotation central axis 2091C of the standing position riding type vehicle 2001 for turning, to a value between 2 cm and 11 cm or 11.5 cm, inclusive, which is 2 cm± (9 cm to 9.5 cm), the position of the head 2091H of the user 2091 riding in the standing position riding type vehicle 2001 can be located on the rotation central axis 2091C for turning.

Figure 52A:
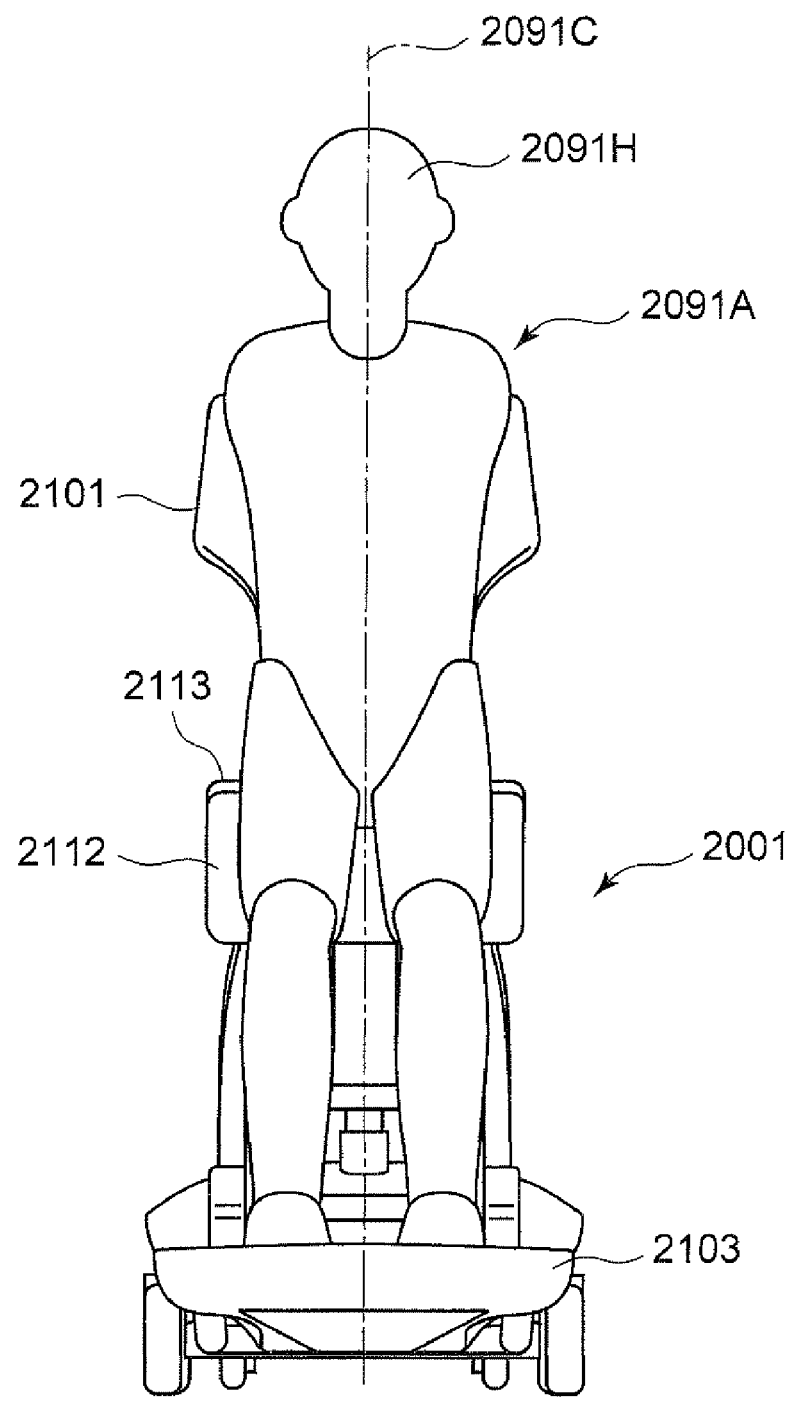
FIG. 52A is a front view of a riding posture for showing a relationship between the position of the head of the user riding in the standing position riding type vehicle according to the ninth embodiment of the present invention and the center of rotation at turning.

By this offset, by backward leaning of the backrest 2101, a balance is achieved between the amount of forward and backward movement of the head position which varies by the sitting height of the user 2091 and the amount of forward and backward movement of the head position which varies by the body thickness of the user 2091. Thus, as shown in FIGS. 52A and 52B, the position of the head 2091H is not largely shifted.

Figure 52B:
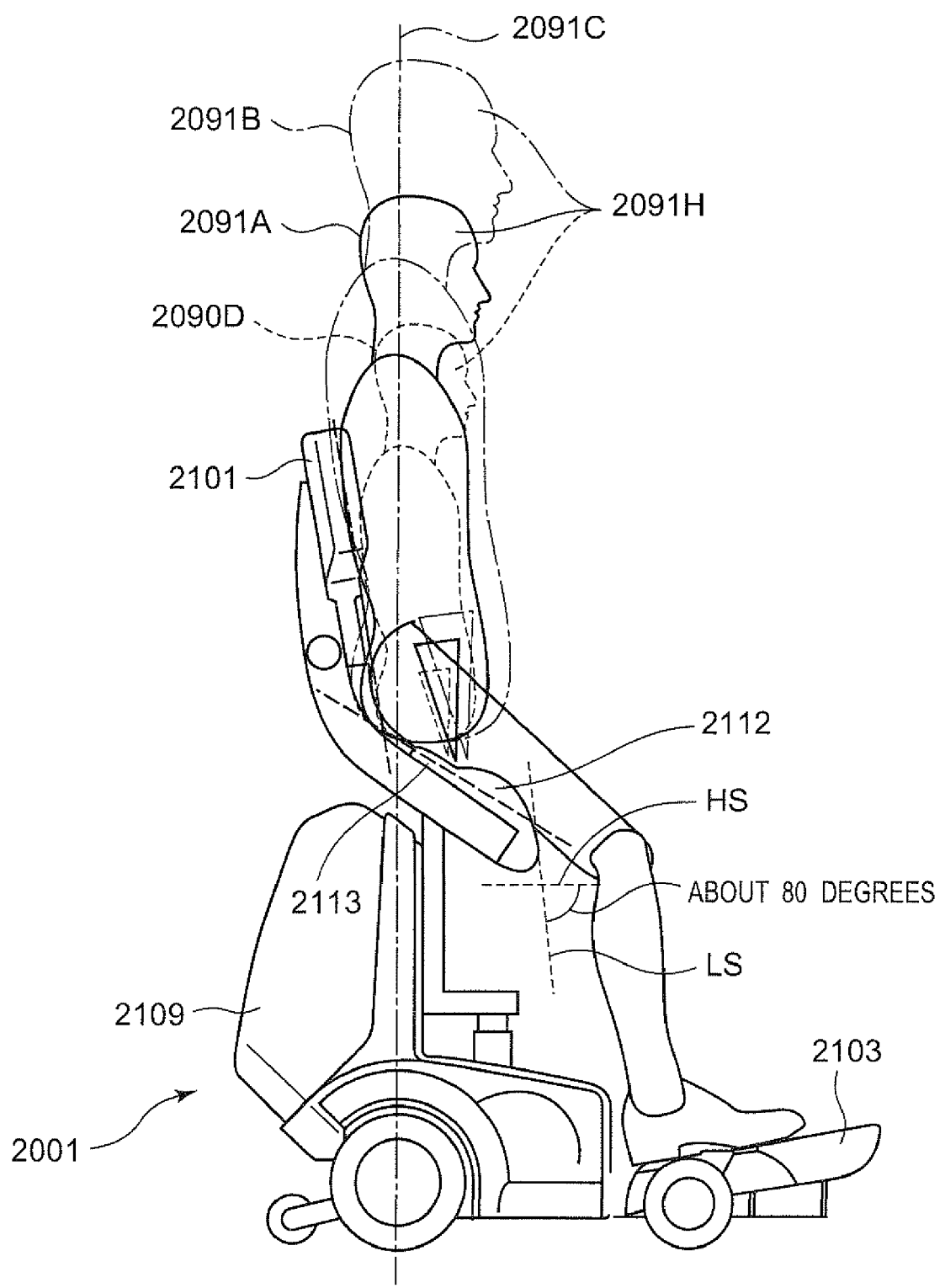
FIG. 52B is a side view of the riding posture for showing a relationship between the position of the head the user riding in the standing position riding type vehicle according to the ninth embodiment of the present invention and the center of rotation at turning.

A contour of a human 2091A represented by a solid line in FIG. 52B is a standard and the height is about 160 cm. A downward triangle indicates a pelvis position. A contour of a human 2091B whose body trunk, head 2091H, and pelvis are enlarged by a factor of 1.3 and whose height is made to be about 2 m is represented by a dash-dotted line. A contour of a human 2091D whose body trunk, head 2091H, and pelvis are reduced by a factor of 0.7 and whose height is made to be about 110 cm is represented by a dashed line. To compare between the head positions, body parts below the femora are omitted. It can be seen from FIG. 52B that, as indicated by the humans 2091A, 2091B, and 2091D, even if the height is greatly changed, the position of the head 2091H is not largely deviated from the rotation central axis 2091C of the standing position riding type vehicle 2001 for turning.

Figure 53:
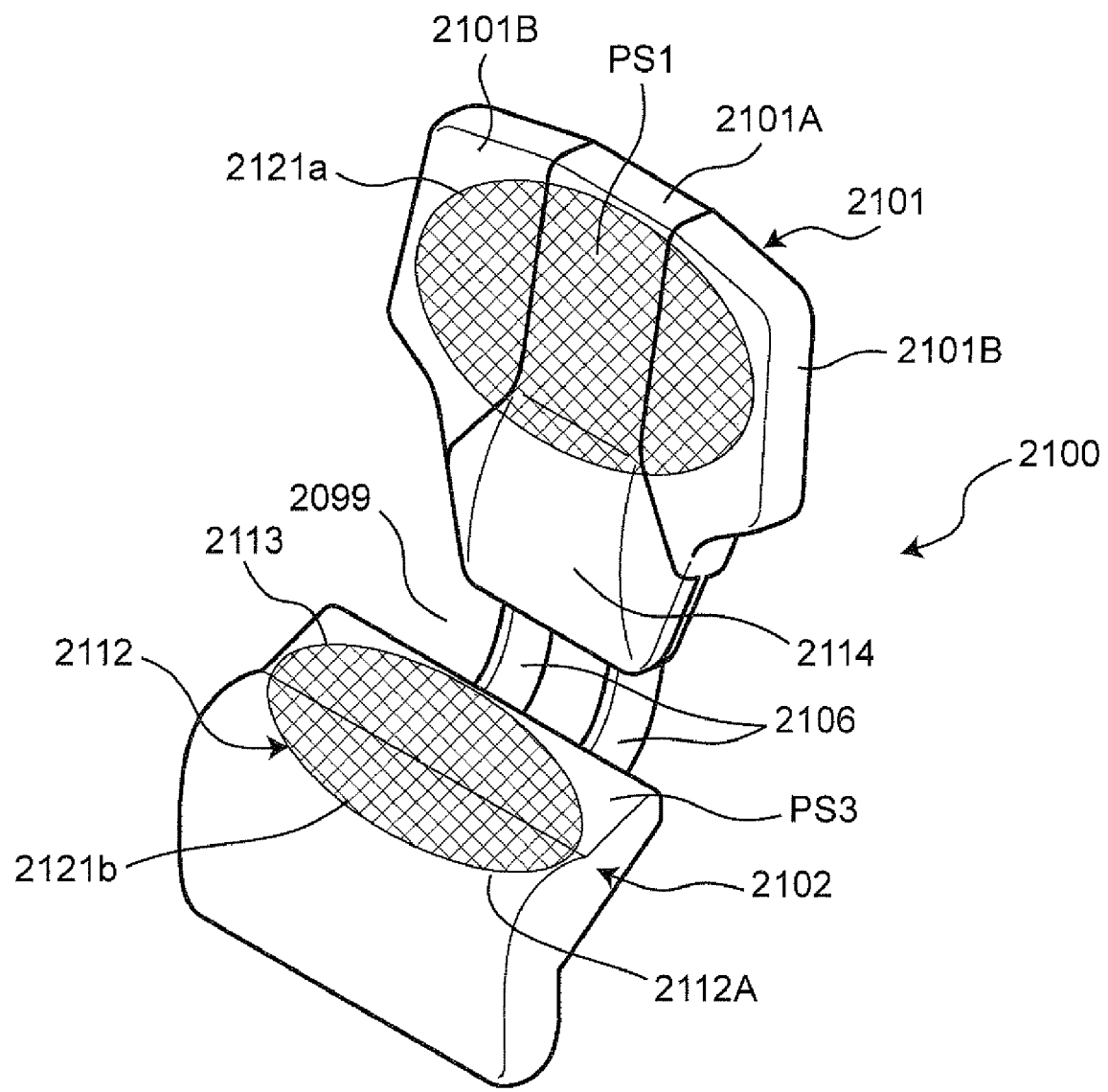
FIG. 53 is a view showing disposition of pressure sensor sheets of the standing position riding type vehicle according to the ninth embodiment of the present invention.

FIG. 53 is a view showing disposition of pressure sensor sheets 2121a and 2121b included in the seat 2100 of the standing position riding type vehicle 2001 of the ninth embodiment.

The pressure sensor sheets 2121a and 2121b are an example of operation input means of the standing position riding type vehicle 2001. One pressure sensor sheet (backrest pressure sensor sheet) 2121a is disposed, for example, in an upper portion of the backrest 2101 with which the positions of the left and right shoulder blades and spine of the back of a user 2091 come into contact, specifically, in a portion covering the backrest upper central portion 2101A and upper portions of the backrest side portions 2101B (see a cross-hatched portion in FIG. 53). The other pressure sensor sheet (seat portion pressure sensor sheet) 2121b is disposed, for example, in a portion of the seat portion 2102 on the side close to the backrest 2101, with which the positions of the gluteal region and ischial bone of the user 2091 come into contact, specifically, in a portion covering the gluteal region support portion 2113 and a portion of the ischial bone support plate 2112 close to the gluteal region support portion 2113 (see a cross-hatched portion in FIG. 53). The backrest pressure sensor sheet 2121a measures the pressure of contact of the back of the user 2091 with the backrest 2101 and a change in the pressure. The seat portion pressure sensor sheet 2121b measures the pressure of contact of the gluteal region and ischial bone positions of the user 2091 with the seat portion 2102 and a change in the pressure. In the example of the ninth embodiment, left and right turns are controlled by a bias between left and right pressures measured by the pressure sensor sheet 2121a and the pressure sensor sheet 2121b. Namely, the user 2091 can input left or right turn operation by the user 2091 applying his/her weight to either the left or right part of the seat 2100 with the user 2091 riding in a neutral position. An operation input and turning control will be described later.

Figure 54:
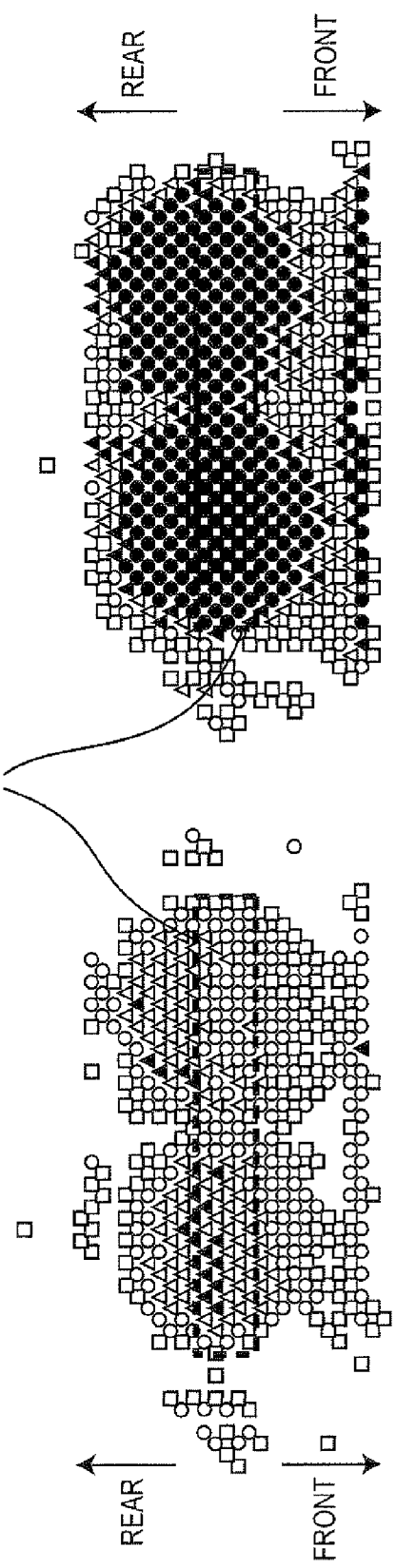
FIG. 54 is a view showing a comparison of pressure distributions of a seat portion between the ninth embodiment of the present invention and a conventional chair with a tilted seat portion.

FIG. 54 is a view showing a distribution of pressure applied to the seat portion 2102 (pressure detected by the pressure sensor sheet 2121b) when the user 2091 sits in the seat portion 2102 in the ninth embodiment.

In FIG. 54, disposition is such that the top indicates the rear of the seat portion 2102 and the bottom indicates the front of the seat portion 2102, and the left side in FIG. 54 indicates the right side of the user 2091. (a) of FIG. 54 shows pressure applied to the seat portion 2102 when the user 2091 rides in the standing position riding type vehicle 2001 of the ninth embodiment in a neutral position. (b) of FIG. 54 shows pressure applied to the seat portion 2102 when the user 2091 sits in the seat portion 2102 of the standing position riding type vehicle 2001 of the ninth embodiment and maintains a posture where the user 2091 supports his/her upper body weight on the ischial bone, his/her upper body is kept upright upward, and his/her knees are bent and his/her feet are allowed to lightly touch the ground immediately below the center of gravity of the upper body, as in the case of using the conventional work chair in FIG. 60.

As shown in FIGS. 48A and 48B, when the user 2091 rides in the standing position riding type vehicle 2001 of the ninth embodiment in a neutral position, the weight of the user 2091 is supported so as to be distributed not only on the seat portion 2102 but also on portions including the backrest 2101 and the footrest 2103. Hence, as shown in (a) of FIG. 54, for the pressure on the seat portion 2102, pressure up to the order of 40 grams per square centimeter is spread in a wide range and a concentration of pressure on the ischial bone support plate 2112 is not observed.

On the other hand, when the user 2091 sits in the seat portion 2102 in the same posture as that for when using the conventional work chair shown in FIG. 60, as shown in (b) of FIG. 54, pressure exceeding 90 grams per square centimeter is applied onto the ischial bone support plate 2112.

In the same posture as that for the conventional work chair, pressure is applied only to a small area of the ischial bone. Thus, although the force in the vertical direction that supports the weight of the user 2091 is stable, when a force in the horizontal direction from the front, back, left, or right side is applied such as at acceleration or deceleration or at turning of the vehicle 2001, such a force cannot be supported only on a small area around the ischial bone, becoming unstable.

On the other hand, when the user 2091 rides in the standing position riding type vehicle 2001 of the ninth embodiment in a neutral position, as shown in (a) of FIG. 54, the backrest surface PS1 of the backrest 2101 is tilted 10 degrees backward with respect to the vertical line and the footrest surface PS2 of the footrest 2103 is tilted 10 degrees backward with respect to the horizontal plane HS. By such a configuration, the weight of the user 2091 is not only supported in the vertical direction, and gravitational acceleration applied in the vertical direction is supported in a front-back direction by the backrest 2101, the seat portion 2102, and the footrest 2103. By this, the force in the horizontal direction from the front, back, left, or right side applied at acceleration or deceleration or turning of the vehicle 2001 can be supported. Thus, the user 2091 not only can maintain a stable posture at rest but can also stably maintain a neutral posture at the operation of the vehicle 2001.

Furthermore, in the ninth embodiment, the backrest surface PS1 of the backrest 2101 and the footrest surface PS2 of the footrest 2103 (see the extended plane EPS2 of the footrest surface PS2 in FIG. 48B) are mounted such that the line of gravity L1 from the spine to pelvis of the user 2091 and the soles of the feet form an angle of about 90 degrees. Thus, when the user 2091 rides in a neutral position, he/she can keep the angle of his/her ankles at about 90 degrees which is the same as at standing upright, with his/her knees lightly bent and his/her shins parallel to the line of gravity L1 from his/her spine to pelvis. By this, while the load support on the soles of the feet takes a natural posture which is the same as that at standing upright, the weight of the user 2091 is supported so as to be distributed on the backrest 2101, the seat portion 2102, and the footrest 2103. As compared to the state shown in (b) of FIG. 54 where the upper body load is supported only on the ischial bone, a ride in a neutral position in the ninth embodiment does not have any local compression, and thus, even on a long hour ride it is less likely to cause pain. Furthermore, the force applied in the horizontal direction can also be supported in a natural posture which is the same as a normal standing posture, enabling to reduce fatigue caused by a ride.

Figure 55:
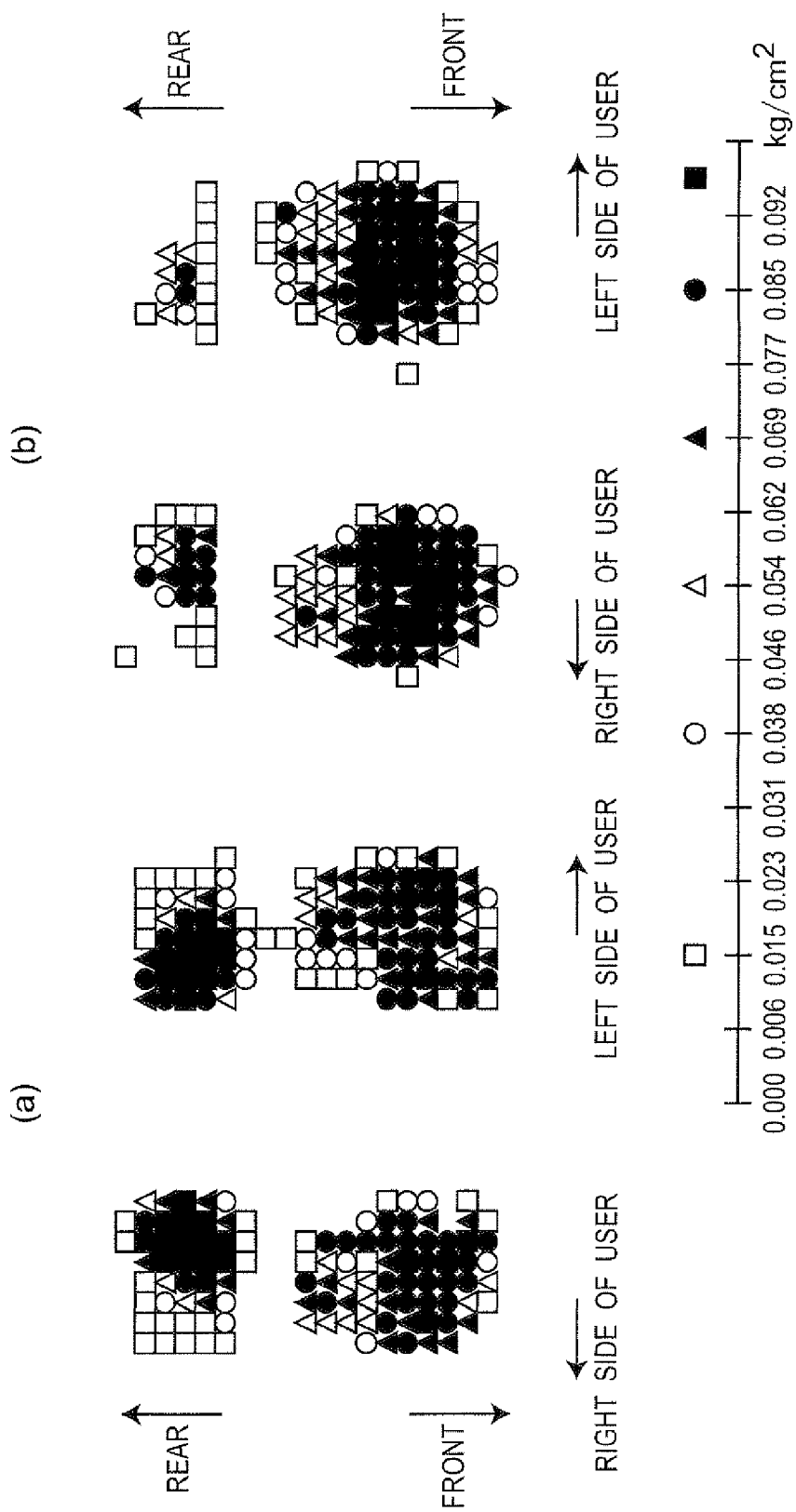
FIG. 55 is a view showing a comparison of pressure distributions of the soles of feet between when the ninth embodiment of the present invention is used and when a backrest pad of a conventional vehicle for industrial use is used.

FIG. 55 is a view showing a distribution of pressure applied to the footrest 2103 (pressure detected by the pressure sensor sheet 2121a) when the user 2091 sits in the seat portion 2102 of the standing position riding type vehicle 2001. The top in FIG. 55 indicates the rear, i.e., the back side of the user 2091, and the bottom indicates the front, i.e., the abdominal side of the user 2091. Disposition is such that the left side in FIG. 55 indicates the right side of the user 2091. (a) of FIG. 55 shows pressure applied to the footrest 2103 when the user 2091 rides in a neutral position such as that shown in FIGS. 48A and 48B and the angle of the ankles of the user 2091 is about 90 degrees. (b) of FIG. 55 shows pressure applied to the footrest 2103 when the footrest 2103 is not tilted backward and thus is parallel to the horizontal plane and the ankles have an obtuse angle of about 100 degrees. A state of the ankles having an obtuse angle corresponds to a posture taken when the weight of a user is supported by friction between the parallel floor of the conventional vehicle for industrial use shown in FIGS. 62A and 62B and the soles of the feet, with the user sitting on the backrest pad of the vehicle for industrial use and his/her legs extended forward.

When the footrest 2103 is tilted 10 degrees backward, the angle of the ankles is about 90 degrees and, as shown in (a) of FIG. 55, load is distributed on the toes and heels as in the case of standing upright. This way of applying pressure involves application of a large load to the heels and is close to that when standing upright naturally. When the footrest 2103 is parallel to the horizontal plane, the force of the body sliding out forward due to the tilt of the backrest 2101 and the seat portion 2102 is supported by friction on the soles of the feet by propping up the legs diagonally. In this state, as shown in (b) of FIG. 55, the load on the toe side becomes large and thus the direction of force supporting weight is unnatural. Namely, since the load on the toes is large, there is a possibility of causing pain in the case of sharp-toe shoes. Since the pressure on the heels that are originally supposed to support weight is low and weight is diagonally supported by the toe side, force is put in a diagonal direction, increasing the load on not only the soles of the feet but also the shins and calves.

On the other hand, in the ninth embodiment, by tilting the footrest surface PS2 of the footrest 2103 10 degrees backward, even when riding in a neutral position, the load on the soles of the feet is applied in a direction parallel to the shins as in the case of a normal standing position, and thus, the load can be supported in a natural way of applying force without applying excess force to the toes, enabling to reduce fatigue.

Furthermore, in the ninth embodiment, the lumbar support 2114 supporting the curvature portion of the lumbar vertebrae of the user 2091 is provided in the lower portion of the backrest 2101, whereby a natural curvature of the spine of the user 2091 is maintained by the lumbar support 2114. A headrest (not shown) that supports the head 2091H may be further provided on top of the backrest 2101.

Next, a method of operating the standing position riding type vehicle 2001 of the ninth embodiment will be described based on FIGS. 53, 56, and 57.

In order to operate the vehicle such that workability is maintained and a posture with no load on the spine is maintained without limiting the movable range of the upper body of the user 2091, in the standing position riding type vehicle 2001 of the ninth embodiment, operation input means for operation is not mounted in front of the user 2091 riding in a neutral position. An operation input for movement of the standing position riding type vehicle 2001 is performed by, for example, a depression operation the foot switches 2111 disposed on the footrest 2103 which is performed by the user 2091, and body motion such as a weight shift to change pressure distributions measured by the backrest pressure sensor sheet 2121*a* disposed on the back side of the user 2091 and the seat portion pressure sensor sheet 2121*b*.

FIG. 56 is a functional block diagram pertaining to the movement operation of the standing position riding type vehicle 2001 of the ninth embodiment and control performed for the operation. The control computer and memory 2130 which is a functional block pertaining to this control include a switch depression detecting unit 2131, a pressure detecting unit 2132, an initial value holding unit 2133, a center-of-gravity change detecting unit 2134, an integrating unit 2135, and the motor control unit 2136.

The right and left foot switches 2111R and 2111L are connected to the switch depression detecting unit 2131. The backrest pressure sensor sheet 2121*a* and the seat portion pressure sensor sheet 2121*b* are connected to the pressure detecting unit 2132. The pressure detecting unit 2132 is connected to the initial value holding unit 2133 and the center-of-gravity change detecting unit 2134. The initial value holding unit 2133 is connected to the center-of-gravity change detecting unit 2134. The switch depression detecting unit 2131 and the center-of-gravity change detecting unit 2134 are connected to the integrating unit 2135. The integrating unit 2135 is connected to the motor control unit 2136. The motor control unit 2136 is connected to the motors 2137L and 2137R.

The left and right foot switches 2111L and 2111R in FIG. 56 are foot switches disposed on the left and right sides on the front edge of the footrest 2103. The left foot switch 2111L is located on the left side of the user 2091 riding in a neutral position. In the ninth embodiment, the left foot switch 2111L is to input backward motion operation of the standing position riding type vehicle 2001 by the user 2091 stepping on and depressing the left foot switch 2111L. The right foot switch 2111R is located on the right side of the user 2091 riding in a neutral position. In the ninth embodiment, the right foot switch 2111R is to input forward motion operation of the standing position riding type vehicle 2001 by the user 2091 stepping on and depressing the right foot switch 2111R.

As described above, the backrest pressure sensor sheet 2121*a* is mounted on the backrest 2101 and measures a distribution of pressure applied to the backrest 2101. The seat portion pressure sensor sheet 2121*b* is mounted on the seat portion 2102 and measures a distribution of pressure applied to the seat portion 2102. In the ninth embodiment, when the user 2091 riding in a neutral position applies pressure biased to the right side of the user 2091 to the backrest 2101 and the seat portion 2102, rightward turning operation is inputted by pressure distributions respectively measured by the backrest pressure sensor sheet 2121*a* and the seat portion pressure sensor sheet 2121*b*. Likewise, when the user 2091 riding in a neutral position applies pressure biased to the left side of the user 2091 to the backrest 2101 and the seat portion 2102, leftward turning operation is inputted by pressure distributions respectively measured by the backrest pressure sensor sheet 2121*a* and the seat portion pressure sensor sheet 2121*b*. The pressure distributions measured by the backrest pressure sensor sheet 2121*a* and the seat portion pressure sensor sheet 2121*b* are inputted to the pressure detecting unit 2132.

The pressure detecting unit 2132 detects pressure distributions measured by the backrest pressure sensor sheet 2121*a* and the seat portion pressure sensor sheet 2121*b*, and the function thereof is implemented by the control computer. An output from the pressure detecting unit 2132 is inputted to each of the initial value holding unit 2133 and the center-of-gravity change detecting unit 2134. The pressure detecting unit 2132 checks whether initial values are stored in the initial value holding unit 2133 (see step S2130 in FIG. 57 which will be described later). If the initial value holding unit 2133 does not hold initial values, then, the inputted values are held as initial values (see step S2140 in FIG. 57 which will be described later).

The switch depression detecting unit 2131 detects depression of the left foot switch 2111L and the right foot switch 2111R, and the function thereof is implemented by the control computer included in the control apparatus storage unit 2109. Specifically, the switch depression detecting unit 2131 detects whether only the left foot switch 2111L is stepped on and depressed or the right foot switch 2111R is stepped on and depressed or both of the foot switches 2111L and 2111R are stepped on and depressed or both of the foot switches 2111L and 2111R are not stepped on. The detected information is outputted to the integrating unit 2135 from the switch depression detecting unit 2131.

The initial value holding unit 2133 stores initial values serving as reference values for determining left and right biases in pressure distributions respectively measured by the backrest pressure sensor sheet 2121*a* and the seat portion pressure sensor sheet 2121*b*, and the function thereof is implemented by the control computer and memory 2130 included in the control apparatus storage unit 2109. Specifically, as described at step S2110 in FIG. 57 which will be described later, if a state in which no one (user) 2091 rides in the standing position riding type vehicle 2001 is detected, then initial values are deleted at step S2120. Thereafter, when a ride of a person 2091 in the standing position riding type vehicle 2001 is confirmed for the first time, since the initial value holding unit 2133 has no initial values, initial values are saved (see step S2140). Namely, immediately after a ride of the user (person) 2091, initial values are always reset.

The center-of-gravity change detecting unit 2134 compares pressure applied to the backrest 2101 and the seat portion 2102 and detected by the pressure detecting unit 2132 with initial values stored in the initial value holding unit 2133, to determine whether there is a left or right bias pressure, and the function thereof is implemented by the control computer included in the control apparatus storage unit 2109. More specifically, the center-of-gravity change detecting unit 2134 detects a pressure point greater than or equal to an initial value stared in the initial value holding unit 2133 and detects a pressure distribution and thereby determines whether there is a left or right bias in pressure. A specific process of determining, by the center-of-gravity change detecting unit 2134, whether there is a left or right bias in pressure in a pressure distribution using initial values will be described later.

The integrating unit 2135 integrates information on the depression states of the left foot switch 2111L and the right foot switch 2111R detected by the switch depression detecting unit 2131 and information on the left or right bias in pressure applied to the backrest 2101 and the seat portion 2102 which is determined by the center-of-gravity change detecting unit 2134, and the function thereof is implemented by the control computer included in the control apparatus storage unit 2109.

Before integrating two information, the integrating unit 2135 determines information on the left or right bias in pressure applied to the backrest 2101 and the seat portion 2102 which is determined by the center-of-gravity change detecting unit 2134, as follows.

When the center-of-gravity change detecting unit 2134 detects that there is no left or right bias in both of a pressure distribution detected by the pressure sensor sheet 2121a and a pressure distribution detected by the seat portion pressure sensor sheet 2121b and inputs information on the detection to the integrating unit 2135, the integrating unit 2135 determines that turning operation is not required. When the center-of-gravity change detecting unit 2134 detects that there is a left or right bias in only one of a pressure distribution detected by the pressure sensor sheet 2121a and a pressure distribution detected by the seat portion pressure sensor sheet 2121b and there is no left or right bias in the other pressure distribution, and inputs information on the detection to the integrating unit 2135, too, the integrating unit 2135 determines that turning operation is not required. When the center-of-gravity change detecting unit 2134 detects that there is a left or right bias in both of a pressure distribution detected by the pressure sensor sheet 2121a and a pressure distribution detected by the seat portion pressure sensor sheet 2121b and the two pressure distributions have different left or right biases, and inputs information on the detection to the integrating unit 2135, too, the integrating unit 2135 determines that turning operation is not required.

On the other hand, when the center-of-gravity change detecting unit 2134 detects that there is a left bias in both of a pressure distribution detected by the pressure sensor sheet 2121a and a pressure distribution detected by the seat portion pressure sensor sheet 2121b and inputs information on the detection to the integrating unit 2135, the integrating unit 2135 determines that leftward turning operation has been inputted. When the center-of-gravity change detecting unit 2134 detects that there is a right bias in both of a pressure distribution detected by the pressure sensor sheet 2121a and a pressure distribution detected by the seat portion pressure sensor sheet 2121b and inputs information on the detection to the integrating unit 2135, the integrating unit 2135 determines that rightward turning operation has been inputted.

As such, only when the center-of-gravity change detecting unit 2134 detects that two pressure distributions have the same bias tendency, the integrating unit 2135 determines that leftward or rightward turning operation has been inputted. By this, turning operation can be accurately inputted. In other words, in the case in which two pressure distributions do not have the same bias tendency, a motion of the user 2091 made when he/she does not intend to perform turning operation can be allowed, such as when the user 2091 rides in the standing position riding type vehicle 2001 and simply changes his/her posture or performs some operation. Thus, erroneous input can be prevented.

After thus determining turning operation based on information on a left or right bias in pressure, the integrating unit 2135 integrates information on the turning operation and information on the depression states of the left foot switch 2111L and the right foot switch 2111R. For example, for a combination of information on depression of the right foot switch 2111R and information on a right bias in pressure, the standing position riding type vehicle 2001 in which the user 2091 rides as shown in FIGS. 47, 48A, and 48B outputs operation input information to make a forward motion while turning to the right, to the motor control unit 2136 from the integrating unit 2135. For a combination of information on depression of the right foot switch 2111R and information on a left bias in pressure, the standing position riding type vehicle 2001 in which the user 2091 rides as shown in FIGS. 47, 48A, and 48B outputs operation input information to make a forward motion while turning to the left, to the motor control unit 2136 from the integrating unit 2135. For a combination of information indicating no depression of either the left foot switch 2111L or the right foot switch 2111L and information on a left bias in pressure, operation input information such as a left "turn at that place" is outputted to the motor control unit 2136 from the integrating unit 2135.

The motor control unit 2136 converts the operation input information integrated by the integrating unit 2135 into the rotation directions and speeds of the motors 2137L and 2137R and thereby generates control signals for the motors 2137L and 2137R respectively connected to the axles of the left and right rear wheels 2107, and the function thereof is implemented by the control computer included in the control apparatus storage unit 2109.

As such, not only the functions of the switch depression detecting unit 2131 and the pressure detecting unit 2132 but also the functions of the center-of-gravity change detecting unit 2134, the integrating unit 2135, and the motor control unit 2136 are implemented by the control computer stored in the control apparatus storage unit 2109. In FIG. 56, the control computer is shown as the control computer and memory 2130.

The motor 2137L is an electric-powered motor connected to the axle of the rear wheel 2107 located on the left side of the user 2091 riding in the vehicle 2001. The motor 2137R is an electric-powered motor connected to the axle of the rear wheel 2107 located on the right side of the user 2091 riding in the vehicle 2001. The motors 2137L and 2137R are both stored in the battery and motor storage unit 2110 and are driven by current supplied by the battery which is likewise stored in the battery and motor storage unit 2110.

FIG. 57 is an example of a flowchart showing movement operation performed on the standing position riding type vehicle 2001 of the ninth embodiment and the operation of the standing position riding type vehicle 2001 based on the movement operation.

An example of a movement operation method for the standing position riding type vehicle 2001 will be described below in accordance with the flowchart in FIG. 57.

After starting the operation (e.g., after turning on power to the standing position riding type vehicle 2001), first, the pressure detecting unit 2132 checks whether there is an input to the pressure sensor sheets 2121a and 2121b (step S2110). If the pressure detecting unit 2132 determines that there is no input to either of the pressure sensor sheets 2121a or 2121b (NO at step S2110), then it is determined that the user 2091 is not riding, and thus, initial values stored in the initial value holding unit 2133 are deleted (step S2120) and processing returns to step S2110. At this time, specifically, step S2110 is repeatedly performed for a predetermined period of time, for example, for a certain period of time, e.g., on the order of 0.5 seconds, and if there is no input to either of the pressure sensor sheets 2121a and 2121b during the predetermined period of time, then the pressure detecting unit 2132 determines that "no one is riding" and thus proceeds to step S2120.

If the pressure detecting unit 2132 determines at step S2110 that there is an input to at least one of the pressure sensor sheets 2121a and 2121b (YES at step S2110), then processing proceeds to step S2130.

At step S2130, the pressure detecting unit 2132 checks whether initial values are stored in the initial value holding unit 2133 (step S2130).

If the pressure detecting unit 2132 determines at step S2130 that initial values are not stored in the initial value holding unit 2133 (NO at step S2130) and the pressure detecting unit 2132 determines that there are inputs to both of the pressure sensor sheets 2121a and 2121b, then the pressure detecting unit 2132 outputs, as initial values, the current (at the point in time when the determination is made at step S2130) inputs to the pressure sensor sheets 2121a and 2121b, to the initial value holding unit 2133. The initial value holding unit 2133 stores, as initial values, the measurement values of the pressure sensor sheets 2121a and 2121b outputted from the pressure detecting unit 2132 (step S2140). Namely, when conditions that initial values have been deleted and there are new inputs from the pressure sensor sheets 2121a and 2121b are met, the new initial values are written into the initial value holding unit 2133. The initial values are held as numerical matrices in the form of distributions of the pressure sensor sheets 2121a and 2121b as they are. Thereafter, processing proceeds to step S2150. When, at step S2130, initial values are not stored in the initial value holding unit 2133 (when NO at step S2130) and there is an input only to one of the pressure sensor sheets 2121a and 2121b, too, the current inputs to the pressure sensor sheets 2121a and 2121b are stored as initial values. Namely, for one of the pressure sensor sheets 2121a and 2121b with no input, 0 is inputted as its initial value.

If the pressure detecting unit 2132 determines at step S2130 that initial values are stored in the initial value holding unit 2133 (if YES at step S2130), then processing proceeds to step S2150 without going through step S2140.

At step S2150, the switch depression detecting unit 2131 detects depression states of the foot switches 2111L and 2111R. If the switch depression detecting unit 2131 detects that neither of the two left and right foot switches 2111L and 2111R are depressed, or if the switch depression detecting unit 2131 detects that both of the two left and right foot switches 2111L and 2111R are depressed (if NO at step S2150), then processing proceeds to step S2160.

At step S2160, the center-of-gravity change detecting unit 2134 detects whether the inputs to the pressure sensor sheets 2121a and 2121b differ from their corresponding initial values stored in the initial value holding unit 2133. If the center-of-gravity change detecting unit 2134 detects that there is no difference between the inputs to the pressure sensor sheets 2121a and 2121b and the initial values stored in the initial value holding unit 2133 (if NO at step S2160), then it is determined that there is no movement or turning operation input and thus processing returns to step S2110.

If the center-of-gravity change detecting unit 2134 detects at step S2160 that there is a right or left bias in the inputs to the pressure sensor sheets 2121a and 2121b as compared to the initial values stored in the initial value holding unit 2133 (if YES at step S2160), then the integrating unit 2135 sets the speeds for forward and backward motion based on the inputs from the foot switches 2111L and 2111R to 0 and creates operation input information, right or left "turn at that place", based on the differences between the inputs to the pressure sensor sheets 2121a and 2121b and the initial values. Thereafter, processing proceeds to step S2170.

For a detection method performed by the center-of-gravity change detecting unit 2134 at step S2160, for example, the initial values stored in the initial value holding unit 2133 are subtracted from their corresponding input values to the pressure sensor sheets 2121a and 2121b. In the example of the ninth embodiment, the pressure sensor sheets 2121a and 2121b each have a plurality of measurement points on their surfaces. Initial values are stored in the initial value holding unit 2133 for each measurement point, and subtraction of an initial value from an input value is performed for each measurement point by the center-of-gravity change detecting unit 2134. The center-of-gravity change detecting unit 2134 divides the plurality of measurement points into left and right areas and determines, for each of the left and right areas, a total of subtracted values. For the division into the left and right areas, the measurement points on the pressure sensor sheets 2121a and 2121b are divided into the left and right areas by setting a division line in an up-down direction at the center of a left-right width of each of the backrest 2101 and the seat portion 2102. The right side of the user 2091 riding in a neutral position is the right areas of the respective pressure sensor sheets 2121a and 2121b, and the left side is the left areas of the respective pressure sensor sheets 2121a and 2121b. A total for the right-side area is a total of subtracted values for the right areas of the respective pressure sensor sheets 2121a and 2121b, and a total for the left-side area is a total of subtracted values for the left areas of the respective pressure sensor sheets 2121a and 2121b. If the difference between the totals of subtracted values for the left and right areas is less than a predetermined value, e.g., 20%, relative to a total value of initial values stored in the initial value holding unit 2133, then the center-of-gravity change detecting unit 2134 detects that there is no change from the initial values. If the center-of-gravity change detecting unit 2134 detects that the difference between the totals of subtracted values for the left and right areas is greater than or equal to the predetermined value relative to the total value of initial values stored in the initial value holding unit 2133, then the center-of-gravity change detecting unit 2134 detects that there is a bias. If the total of subtracted values for the right areas of the pressure sensor sheets 2121a and 2121b is greater than that for the left areas, then the center-of-gravity change detecting unit 2134 detects that there is a right bias in pressure. If the total of subtracted values for the left areas is greater than that for the right areas, then the center-of-gravity change detecting unit 2134 detects that there is a left bias in pressure. When, for example, there is a right bias in pressure based on detection information from the center-of-gravity change detecting unit 2134, the integrating unit 2135 creates operation input information, right "turn at that place". When, for example, there is a left bias in pressure based on detection information from the center-of-gravity change detecting unit 2134, the integrating unit 2135 creates operation input information, left "turn at that place".

At step S2170, the motor control unit 2136 sets, based on the operation input information outputted from the integrating unit 2135, rotation speeds for controlling the rotation of the left and right motors 2137L and 2137R (step S2170). Specifically, the motor control unit 2136 sets motor drive voltages with opposite signs for the left and right motors, based on the operation input information "turn at that place" outputted from the integrating unit 2135. When the information from the integrating unit 2135 is, for example, operation input information, right "turn at that place", a negative drive voltage is set on the right motor 2137R and a positive drive voltage is set on the left motor 2137L, whereby the motors 2137R and 2137L are set to rotate at a constant speed. By this, at step S2210, the right motor 2137R is allowed to rotate in a backward motion direction and the left motor 2137L is allowed to rotate in a forward motion direction. By the motors 2137R and 2137L rotating in opposite directions at a constant speed, the left and right rear wheels 2107 rotate in opposite directions at a constant speed, thereby achieving "turn at that place" of the standing position riding type vehicle 2001. When the information from the integrating unit 2135 is, for example, operation input information, left "turn at that place", a positive drive voltage is set on the right motor 2137R and a negative drive voltage is set on the left motor 2137L whereby the motors 2137R and 2137L are set to rotate at a constant speed. By this, the right motor 2137R is allowed to rotate in a forward motion direction and the left motor 2137L is allowed to rotate in a backward motion direction. By the motors 2137R and 2137L rotating in opposite directions at a constant speed, the left and right rear wheels 2107 rotate in opposite directions a constant speed, thereby achieving "turn at that place" of the standing position riding type vehicle 2001.

On the other hand, if the switch depression detecting unit 2131 detects that one of the two left and right foot switches 2111L and 2111R is depressed (YES step S2150), then processing proceeds to step S2180.

At step S2180, the center-of-gravity change detecting unit 2134 detects whether the inputs to the pressure sensor sheets 2121a and 2121b differ from their corresponding initial values stored in the initial value holding unit 2133 (step S2180). The detection method is the same as that used at step S2160. If the center-of-gravity change detecting unit 2134 detects that there is no difference between the inputs to the pressure sensor sheets 2121a and 2121b and the initial values stored in the initial value holding unit 2133 (if NO at step S2180), i.e., if the center-of-gravity change detecting unit 2134 detects that there is no left or right bias in the inputs to the pressure sensor sheets 2121a and 2121b, then the integrating unit 2135 creates forward or backward motion operation input information without a turning operation, based on the information on depression of the foot switches 2111L and 2111R outputted from the switch depression detecting unit 2131. For example, when information indicating that there is depression of the right foot switch 2111R is inputted to the integrating unit 2135 from the switch depression detecting unit 2131, the integrating unit 2135 creates forward motion operation input information. When information indicating that there is depression of the left foot switch 2111L is inputted to the integrating unit 2135 from the switch depression detecting unit 2131, the integrating unit 2135 creates backward motion operation input information. When information indicating that both of the left foot switch 2111L and the right foot switch 2111R are stepped on and depressed is inputted to the integrating unit 2135 from the switch depression detecting unit 2131, the integrating unit 2135 determines stop. The created operation input information is outputted to the motor control unit 2136 from the integrating unit 2135. Thereafter, processing proceeds to step S2190.

At step S2190, the motor control unit 2136 controls the rotation of the left and right motors 2137L and 2137R based on the operation input information outputted from the integrating unit 2135. First, the motor control unit 2136 sets motor drive voltages with the same sign for the left and right motors, based on the forward or backward motion operation input information outputted from the integrating unit 2135. For example, in the case of forward motion operation input information, the motor control unit 2136 sets positive drive voltages on the left and right motors 2137L and 2137R. In the case of backward motion operation input information, the motor control unit 2136 sets negative drive voltages on the left and right motors 2137L and 2137R. The drive voltages are set by the motor control unit 2136 such that the motors 2137L and 2137R rotate at a constant speed. By this, the left and right motors 2137L and 2137R rotate in the same direction at a constant speed and thus the left and right rear wheels 2107 rotate in the same direction at a constant speed, thereby achieving forward or backward straight motion of the standing position riding type vehicle 2001 (step S2210).

On the other hand, if the center-of-gravity change detecting unit 2134 detects at step S2180 that there is a left or right bias in the inputs to the pressure sensor sheets 2121a and 2121b (if YES at step S2180), then processing proceeds to step S2200.

At step S2200, the integrating unit 2135 creates forward or backward motion operation input information based on the information on depression of the foot switches 2111L and 2111R, and creates left or right turn operation input information based on the information on a left or right pressure bias in the inputs to the pressure sensor sheets 2121a and 2121b. For example, when there are information on depression of the right foot switch 2111R and information on a right bias in pressure on the pressure sensor sheets 2121a and 2121b, the integrating unit 2135 creates forward-right movement operation input information. Likewise, in the case of a combination of information on depression of the right foot switch 2111R and information on a left bias in pressure on the pressure sensor sheets 2121a and 2121b, the integrating unit 2135 creates forward-left movement operation input information. In the case of a combination of information on depression of the left foot switch 2111L and information on a right bias in pressure on the pressure sensor sheets 2121a and 2121b, the integrating unit 2135 creates backward-right movement operation input information. In the case of a combination of information on depression of the left foot switch 2111L and information on a left bias in pressure on the pressure sensor sheets 2121a and 2121b, the integrating unit 2135 creates backward-left movement operation input information. Thereafter, processing proceeds to step S2210.

At step S2210, the motor control unit 2136 controls the rotation of the motors 2137L and 2137R based on the operation input information outputted from the integrating unit 2135. The motor control unit 2136 sets drive voltages of the left and right motors 2137L and 2137R, based on the operation input information outputted from the integrating unit 2135. For example, when forward-right movement operation input information is outputted from the integrating unit 2135, first, positive voltages are respectively set as the drive voltages of the left and right motors 2137L and 2137R, the amount of voltage required for turning operation is subtracted from the drive voltage of the right motor 2137R, and the amount of voltage required for turning operation is added to the drive voltage of the left motor 2137L. The amounts of voltage required for turning operation for the motors 2137L and 2137R have the same absolute value. By this, the rotation speed of the left motor 2137L is higher than that of the right motor 2137R, or the right motor 2137R rotates in a backward motion direction at low speed and the left motor 2137L rotates in a forward motion direction at high speed. Therefore, since the right rear wheel 2107 makes a forward or backward motion at low speed and the left rear wheel 2107 makes a forward motion at high speed, a forward-right movement of the standing position riding type vehicle 2001 is achieved. For the case of forward-left movement operation input information, too, similar operation is performed. Specifically, the amount of voltage required for turning operation is added to the drive voltage of the right motor 2137R and the amount of voltage required for turning operation is subtracted from the drive voltage of the left motor 2137L. In the case of backward-right movement operation input information, first, negative voltages are set as the drive voltages of the left and right motors 2137L and 2137R, the amount of voltage required for turning operation is added to the drive voltage of the right motor 2137R, and the amount of voltage required for turning operation is subtracted from the drive voltage of the left motor 2137L. By this, the rotation speed of the left motor 2137L is higher than that of the right motor 2137R, or the right motor 2137R rotates in a forward motion direction at low speed and the left motor 2137L rotates in a backward motion direction at high speed. Therefore, since the right rear wheel 2107 makes a backward or forward motion at low speed and the left rear wheel 2107 makes a backward motion at high speed, a backward-right movement of the standing position riding type vehicle 2001 is achieved. In the case of backward-left movement operation input information, negative voltages are set as the drive voltages of the left and right motors 2137L and 2137R, the amount of voltage required for turning operation is subtracted from the drive voltage of the right motor 2137R, and the amount of voltage required for turning operation is added to the drive voltage of the left motor 2137L.

By the drive voltages set by the motor control unit 2136 at step S2170, S2190, or S2200, the left motor 2137L and the right motor 2137R rotate (step S2210).

By the operation such as that described above, when the user 2091 rides in the standing position riding type vehicle 2001 of the ninth embodiment and tries to make a forward motion, the user 2091 steps on, for example, the foot switch 2111R, one of the foot switches 2111L and 2111R, located on the right side as viewed from the user 2091 riding in the vehicle 2001, whereby the vehicle 2001 makes a forward motion. When the user 2091 tries to make a backward motion, the user 2091 steps on, for example, the left foot switch 2111L which is one of the foot switches 2111, whereby the vehicle 2001 makes a backward motion. By the user 2091 tilting his/her center of gravity to the left or right without stepping on the foot switches 2111L and 2111R, the vehicle 2001 turns at that place. By the user 2091 tilting his/her center of gravity to the left or right with the foot switch 2111L or 2111R stepped on, the vehicle 2001 can change direction while making a forward or backward motion.

Note that although at step S2160 or S2180 detection of a right or left bias in pressure by the center-of-gravity change detecting unit 2134 is performed using a total value of differences between initial values and values at the left or right measurement points, such detection can be performed by, for example, determining a position of the center of gravity from inputs to the respective measurement points on the pressure sensor sheets 2121*a* and 2121*b* and comparing the position of the center of gravity with an initial value. In addition, although at step S2160 or S2180 the center-of-gravity change detecting unit 2134 detects that there is a bias in pressure, when there is a bias of 20% or more relative to a total value of initial values, other numerical values may be used.

As described above, according to the configuration according to the ninth embodiment, the backrest 2101 is tilted backward and the seat portion 2102 is tilted forward, whereby the line of gravity L1 from the spine to pelvis of the user 2091 is tilted about 10 degrees backward and the angle formed by the line of gravity L1 from the spine to pelvis of the user 2091 and the center line L2 of the femora becomes about 135 degrees. By this, the user 2091 can maintain a posture with the least load on his/her lower back or spine.

Furthermore, by tilting the footrest surface PS2 of the footrest 2103 backward to form the angle of the ankles of the user 2091 to be about 90 degrees, the user 2091 can take a seating posture where a natural distribution of load on the soles of the feet which is the same as that for standing upright is obtained, the user 2091 has very little fatigue even on a long hour ride and very little load on the body, and the standing position is maintained. Furthermore, by keeping the angle of the ankles at about 90 degrees, the user 2091 can support his/her weight at a natural joint angle which is the same as that for a normal standing position. This facilitates motion such as raising the leg to operate the foot switch 2111L or 2111R with the sole of the foot. Furthermore, by the angle of the ankles kept at about 90 degrees, the soles of the feet easily support load and thus operation inputs by the soles of the feet can be stably performed. Furthermore, for forward and backward acceleration occurring at traveling, too, the user can stably support load and maintain his/her posture. Hence, even without a handle, a handrail, or the like, in front of the user 2091, it is safe and the user 2091 can be provided with a sense of openness while ensuring his/her upper body's workability.

In addition, by mounting the backrest surface PS1 of the backrest 2101 so as to be tilted backward and mounting the footrest surface P52 of the footrest 2103 such that the angle formed by the line of gravity L1 from the spine to pelvis of the user 2091 and a straight line passing through the soles of the feet (a straight line along the footrest surface PS2) is about 90 degrees, the user 2091 can distribute load on the back being in contact with the backrest 2101, the gluteal region and the upper ends of the femora being in contact with the seat portion 2102, and further the soles of the feet. By achieving a posture with no load concentration on the ischial bone and further with no application of local load to the spine, pelvis, and soles of feet, the user 2091 can sit with a standing posture maintained and without sliding off of the seat portion 2102. By this, since the user 2091 does not need to straddle like a saddle-type work chair, the user 2091 can ride even when wearing clothes that are difficult to straddle such as a skirt or kimono.

In addition, by providing the foot switches 2111L and 2111R and the pressure sensor sheets 2121*a* and 2121*b* which are examples of operation input means on the footrest 2103, the backrest 2101, and the seat portion 2102 and by not providing any operational device such as operation input means in front of the user 2091, the user 2091 can maintain a slightly tilted backward standing posture. Thus, a problem can be solved such as the user 2091 falling forward (the body of the user 2091 leaning forward so much that he/she almost falls) or falling due to forward and backward acceleration at movement. Furthermore, since the area in front of the seat is open, there is nothing that hinders motion of the arms and upper body of the user 2091 and thus large activity space where, for example, the user 2091 extends his/her hand to a shelf with the user 2091 riding, can be taken and the user 2091 can also get a sense of openness. Since there is no obstacle when getting in and out of the vehicle 2001, a smooth getting-in/out motion is made, enabling to reduce load at getting in and out.

Standing position riding type vehicles of the present invention are useful as golf carts, vehicles for industrial use, wheelchairs, etc. In addition, the standing position riding type vehicles of the present invention can also be applied to applications such as automobiles, train seats, work chairs, etc.

Though the present invention has been described above based on the above first to ninth embodiments, the present invention should not be limited to the above-described first to ninth embodiments. For example, the present invention also includes the following cases.

Each of the above-described control units is actually a computer system that includes, for example, a microprocessor, ROM, RAM, hard disk unit, display unit, keyboard, and mouse. A computer program is stored on the RAM or the hard disk unit. Functions of each of the control units can be achieved by the microprocessor operating according to the computer program. The computer program mentioned here is a combination of a plurality of instruction codes that indicate commands to a computer for achieving predetermined functions.

In other words, in each of the above-mentioned embodiments, each component may be composed of dedicated hardware, or implemented by executing programs for components feasible with software. Each component can be implemented as a result that a program executing part such as a CPU reads and executes software programs recorded in a recording medium such as a hard disk or semiconductor memory. Here, software that implements an information-processing device according to each of the above-mentioned embodiments is a following program. That is to say, this program has a computer execute the units/steps defined in claims. The program has a computer execute the units/steps defined in claims.

The entire disclosure of Japanese Patent Applications Nos. 2010-204122, 2010-223501, and 2011-028077 filed on Sep. 13, 2010, Oct. 1, 2010, and Feb. 14, 2011 including specifications, claims, drawings, and summaries are incorporated herein by reference in their entireties.

It is to be noted that by appropriately combining any of the above-described various embodiments or variants, advantages effects provided by each of them can be obtained.

Although the present invention is fully described in connection with embodiments with reference to the accompanying drawings, various variations or modifications are apparent to those skilled in the art. It is to be understood that such variations or modifications are included therein within the scope of the invention as described in the appended claims.

INDUSTRIAL APPLICABILITY

A riding type vehicle and a method of controlling a riding type vehicle of the present invention have means capable of operating a riding type mobile robot which aids daily life, by body motion without using hands and thus are useful when moving without stopping daily life activities such as opening and closing a door and shopping. In addition, the present invention is also useful for driving a personal vehicle, mobility aid equipment, or health aid equipment, or is useful as a control method therefor.

What is claimed is:

1. A riding type vehicle comprising:
a vehicle main body;
a backrest supported above the vehicle main body and supporting a back of a rider;
a seat portion disposed above the vehicle main body and below the backrest, and supporting a gluteal region of the rider;
a plurality of drive wheels rotatably supported at a lower portion of the vehicle main body;
a driving unit disposed at the lower portion of the vehicle main body, that drives the plurality of drive wheels to allow the vehicle main body to make a forward motion, a backward motion, or a turn;
a posture sensor for the backrest disposed in a portion of the backrest with which left and right shoulder blades of the rider come into contact;
a contact-position-dependent type operational intention determining unit that determines whether there is an operational intention of the rider, by the posture sensor detecting a change in a posture of the rider;
a left-right amount-of-change comparison type turn intention determining unit that determines, only when the operational intention determining unit determines that there is an operational intention of the rider, whether a difference between pressure values of portions with which the left and right shoulder blades of the rider come into contact exceeds a seating confirmation threshold value, and determines that there is a left or right turn intention of the rider when it is determined that the difference between the pressure values exceeds the seating confirmation threshold value, the pressure values being outputted from the posture sensor for the backrest; and
a drive control unit that performs drive control of the driving unit according to the left or right turn intention of the rider determined by the turn intention determining unit.

2. The riding type vehicle according to claim 1, wherein the portion of the backrest with which the left and right shoulder blades of the rider come into contact and which has the posture sensor for the backrest disposed therein is an area with which the left and right shoulder blades of the rider come into contact.

3. The riding type vehicle according to claim 2, wherein the posture sensor for the backrest is disposed in a portion with which backrest upper left and right portions can come into contact, the backrest upper left and right portions including the left and right shoulder blades of the rider and further including back portions where back ribs are located at a width of the shoulder blades.

4. The riding type vehicle according to claim 2, further comprising a posture sensor for the seat portion disposed in a portion of the seat portion with which the gluteal region of the rider comes into contact.

5. The riding type vehicle according to claim 3, wherein the turn intention determining unit determines whether there is a turn intention of the rider, from information on a relationship between a magnitude of pressure received by the posture sensor from parts of the rider from the left and right shoulder blades thereof to the back ribs thereof, and a size of an area where the pressure is equal to or beyond a certain value.

6. The riding type vehicle according to claim 4, wherein
the operational intention determining unit determines that there is an operational intention when a magnitude of pressure of the posture sensor for the backrest exceeds a backrest pressure threshold value or a size of an area with pressure equal to or beyond a certain value exceeds a backrest area threshold value, and when a magnitude of pressure of the posture sensor for the seat portion exceeds a seat portion pressure threshold value or a size of an area with pressure equal to or beyond a certain value exceeds a seat portion area threshold value, and
the turn intention determining unit determines that there is a left or right turn intention of the rider when the operational intention determining unit determines that there is an operational intention and a difference in pressure sum total value between left and right in portions with which the left and right shoulder blades of the rider respectively come into contact exceeds the seating confirmation threshold value, the pressure sum total values being sum total values of pressure in areas where the posture sensor for the backrest indicates pressure equal to or beyond a certain value.

7. The riding type vehicle according to claim 4, further comprising a posture sensor for a backrest lower central portion that can come into contact with a part of the backrest with which a back portion where lumbar vertebrae of the rider are located comes into contact, wherein
the operational intention determining unit determines that there is an operational intention when a magnitude of pressure of the posture sensor for the backrest lower central portion exceeds a backrest lower central portion pressure threshold value or a size of an area with pressure equal to or beyond a certain value exceeds a backrest lower central portion area threshold value, and when a magnitude of pressure of the posture sensor for the seat portion exceeds a seat portion pressure threshold value or a size of an area with pressure equal to or beyond a certain value exceeds a seat portion area threshold value, and
the turn intention determining unit determines that there is a left or right turn intention of the rider when the operational intention determining unit determines that there is an operational intention and a difference in pressure sum total value between left and right in the portions with which the left and right shoulder blades of the rider respectively come into contact exceeds the seating confirmation threshold value, the pressure sum total values being sum total values of pressure in areas where the posture sensor for the backrest indicates pressure equal to at beyond a certain value.

8. The riding type vehicle according to claim 5, wherein
the operational intention determining unit determines that there is an operational intention when a magnitude of sensor pressure from the posture sensor for the backrest lower central portion and the posture sensor for the seat portion exceeds a backrest lower central portion pressure threshold value or a size of an area with pressure equal to or beyond a certain value exceeds backrest lower central portion area threshold value, and
the turn intention determining unit determines that there is a left or right turn intention of the rider when the operational intention determining unit determines that there is an operational intention and a difference in pressure sum total value between left and right exceeds the seating confirmation threshold value, the pressure sum total values being sum total values of pressure in areas where the posture sensor for the backrest provided in the portions with which the left and right shoulder blades of the rider come into contact indicates pressure equal to or beyond a certain value.

9. The riding type vehicle according to claim 1, further comprising:
a riding posture determining unit that analyzes pressure distribution conditions of each posture sensor using a size of an area where the posture sensor indicates a value equal to or beyond a certain value, the pressure distribution conditions varying by riding posture of the rider; and
a weight determining unit that determines, using the distribution conditions of output values from the posture sensor analyzed by the riding posture determining unit, a weight for the output values from the posture sensor, wherein
in at least one of a determination process by the operational intention determining unit that determines whether there is an operational intention and a determination process by the turn intention determining unit that determines whether there is a left or right turn intention of the rider, as the output values from the posture sensor, output values from the posture sensor obtained by weighting the output values from the posture sensor by the weight determining unit are used.

10. The riding type vehicle according to claim 4, further comprising:
a riding posture determining unit that determines a difference in riding posture by comparing pressure sum total values, the pressure sum total values being sum total values of pressure in areas where the posture sensor for the backrest and the posture sensor for the seat portion indicate pressure equal to or beyond a certain value; and
a weight determining unit that determines, when a pressure sum total value of the posture sensor for the backrest and a pressure sum total value of the posture sensor for the seat portion are in specified ranges, a weight for each sensor using a whole pressure sum total value obtained by further summing the pressure sum total values of the respective sensors, or using a ratio of the pressure sum total value of each sensor to a maximum pressure sum total value of each sensor, the pressure sum total value of the posture sensor for the backrest being a sum total value of pressure in an area where the posture sensor for the backrest contactably disposed at the backrest upper left and right portions of the rider indicates pressure equal to or beyond a certain value, and the pressure sum total value of the posture sensor for the seat portion being a sum total value of pressure in an area where the posture sensor for the seat portion indicates pressure equal to or beyond a certain value, wherein
the turn intention determining unit is configured by a left-right amount-of-change comparison type turn intention determining unit that determines whether there is a left or right turn intention of the rider using a difference between left and right pressure sum total values the posture sensor for the backrest, the left and right pressure sum total values being weighted by the weight determined by the weight determining unit.

11. The riding type vehicle according to claim 7, further comprising:
a riding posture determining unit that determines a difference in riding posture by comparing pressure sum total values, the pressure sum total values being sum total values of pressure in areas where the posture sensor for the backrest and the posture sensor for the backrest lower central portion indicate pressure equal to or beyond a certain value; and a weight determining unit that determines, when a pressure sum total value of the posture sensor for the backrest and a pressure sum total value of the posture sensor for the backrest lower central portion are in specified ranges, a weight for each sensor using a whole pressure sum total value obtained by further summing the pressure sum total values of the respective sensors, or using a ratio of the pressure sum total value of each sensor to a maximum pressure sum total value of each sensor, the pressure sum total value of the posture sensor for the backrest being a sum total value of pressure in an area where the posture sensor for the backrest contactably disposed at the backrest upper left and right portions of the rider indicates pressure equal to or beyond a certain value, and the pressure sum total value of the posture sensor for the backrest lower central portion being a sum total value of pressure in an area where the posture sensor for the backrest lower central portion indicates pressure equal to or beyond a certain value, wherein the turn intention determining unit is configured by a left-right amount-of-change comparison type turn intention determining unit that determines whether there is a left or right turn intention of the rider using a difference between left and right pressure sum total values of the posture sensor for the backrest, the left and right pressure sum total values being weighted by the weight determined by the weight determining unit.

12. The vehicle according to claim 7, wherein
when output values from the posture sensor for the seat portion, the posture sensor for the backrest lower central portion, or the posture sensor for the backrest exceed a threshold value indicating an upper limit of measurement, the weight determining unit sets a weight for a corresponding sensor to a smaller value than those for other sensors or to zero, and
the turn intention determining unit determines whether there is a left or right turn intention using output values from the posture sensor for the backrest, the output values being weighted by the weight determined by the weight determining unit.

13. The vehicle according to claim 1, further comprising: a notifying unit that issues a notification to urge the rider to ride so as to come into contact with the seat portion when, as a result of analysis by the riding posture determining unit, output values from the posture sensor for the seat portion are less than or equal to the seating confirmation threshold value.

14. The riding type vehicle according to claim 1, further comprising: a footrest supported at a front portion of the vehicle main body and supporting soles of feet of the rider.

15. The riding type vehicle according to claim 1, wherein backrest portions that can come into contact with at least a spine or lumbar vertebrae of the rider include a fixed backrest portion fixed regardless of whether there is contact of the rider; and movable backrest portions, portions of which each having the posture sensor for the backrest can be moved by contact of the rider.

16. The riding type vehicle according to claim 15, wherein
a front side of each of the left and right movable backrest portions is provided on substantially same plane as a front side of the fixed backrest portion, and
a main displacement direction of each of the left and right movable backrest portions is a direction perpendicular to the plane.

17. The riding type vehicle according to claim 15, wherein the drive control unit converts a displacement of each of the left and right movable backrest portions into a distance and changes a drive instruction according to an amount of change in the distance.

18. The riding type vehicle according to claim 1, wherein each of the movable backrest portions and the fixed backrest portion are coupled together by an elastic material so as to be movable with respect to the vehicle main body.

19. The riding type vehicle according to claim 1, wherein in a state as viewed from a side with respect to a movement direction of the vehicle main body which is orthogonal to a backrest surface, the backrest surface of the backrest is tilted backward, an angle of the tilt formed with a vertical plane is 10 degrees, and an angle formed by the backrest and a seat surface of a gluteal region support portion is 135 degrees.

20. The riding type vehicle according to claim 1, wherein a footrest surface of the footrest is tilted backward, an angle of the footrest surface formed with a horizontal plane is 10 degrees, and an angle formed by the backrest surface of the backrest and the footrest surface of the footrest is 90 degrees.

21. A method of controlling a riding type vehicle, wherein
the riding type vehicle includes a seat portion and backrest portions operated by a change in posture of a rider and provided such that the rider is in substantially standing position when riding in the vehicle,
the backrest portions include a fixed backrest portion disposed in a position that can come into contact with a body trunk of the rider and fixed to a standing position riding type vehicle main body; and movable backrest portions that can be moved with respect to the riding type vehicle main body achieving the substantially standing position and that can follow a change in posture of the rider,
the method comprising:
with the movable backrest portions disposed left-right symmetrically with respect to the fixed backrest portion, detecting left and right moving displacements by a backrest posture sensor; and
by a drive control unit, calculating an amount of displacement from each of the moving displacements detected by the sensor and outputting a drive instruction based on the amounts of displacement, thereby allowing the riding type vehicle to make a turn.

22. A method of controlling a riding type vehicle that controls drive of a riding type vehicle including a vehicle main body; a backrest supported above the vehicle main body and supporting a back of a rider; a seat portion disposed above the vehicle main body and below the backrest, and supporting a gluteal region of the rider; a plurality of drive wheels rotatably supported at a lower portion of the vehicle main body; and a driving unit disposed at the lower portion of the vehicle main body and driving the plurality of drive wheels to allow the vehicle main body to make a forward motion, a backward motion, or a turn,
the method comprising:
detecting, by a posture sensor for the backrest, a change in posture of the rider, thereby determining whether there is an operational intention of the rider by a contact-position-dependent type operational intention determining unit, the posture sensor for the backrest being disposed in a portion of the backrest with which left and right shoulder blades of the rider come into contact,
only when the operational intention determining unit determines that there is an operational intention of the rider, determining, by a left-right amount-of-change comparison type turn intention determining unit, whether a difference between pressure sum total values exceeds a seating confirmation threshold value, and determining that there is a left or right turn intention of the rider when the difference between the pressure sum total values exceeds the seating confirmation threshold value, the pressure sum total values being sum total values of pressure in areas where the sensor provided in the portion with which the left and right shoulder blades of the rider come into contact indicates pressure equal to or beyond a certain value, and the sum total values being outputted from the posture sensor for the backrest, and performing, by a drive control unit, drive control of the driving unit according to the left or right turn intention of the rider determined by the turn intention determining unit.

\* \* \* \* \*